US012736027B2

(12) United States Patent
Flaherty et al.

(10) Patent No.: US 12,736,027 B2
(45) Date of Patent: Sep. 15, 2026

(54) FAIL SAFE SYSTEM FOR WIND TURBINE NACELLE

(71) Applicant: Kodair Wind Designs Limited, Athlone (IE)

(72) Inventors: John Flaherty, Athenry (IE); Shane Ledwith, Galway (IE); Derek Hodge, Athenry (IE); Sergei Bondarevski, Galway (IE)

(73) Assignee: Kodair Wind Designs Limited, Athlone (IE)

( * ) Notice: Subject to any disclaimer, the term of this patent is extended or adjusted under 35 U.S.C. 154(b) by 0 days.

(21) Appl. No.: 19/039,766

(22) Filed: Jan. 28, 2025

(65) Prior Publication Data

US 2025/0243845 A1 Jul. 31, 2025

Related U.S. Application Data

(60) Provisional application No. 63/627,177, filed on Jan. 31, 2024.

(51) Int. Cl.
*F03D 7/02* (2006.01)
*F03D 17/00* (2016.01)

(52) U.S. Cl.
CPC ......... *F03D 7/0264* (2013.01); *F03D 17/013* (2023.08); *F05B 2270/107* (2013.01); *F05B 2270/326* (2013.01)

(58) Field of Classification Search
CPC .... F03D 1/0671; F03D 7/0224; F03D 7/0244; F03D 7/0248; F03D 7/0252;
(Continued)

(56) References Cited

U.S. PATENT DOCUMENTS 2,516,576 A 7/1950 Jacobs
3,159,221 A 12/1964 Gaubis et al.
(Continued)

FOREIGN PATENT DOCUMENTS

CN 102400856 A 4/2012
CN 102562452 A 7/2012
(Continued)

OTHER PUBLICATIONS

Extended European Search Report for European Patent Application No. 25155155.2, dated Jun. 18, 2025, 14 pages.
(Continued)

*Primary Examiner* — Christopher R Legendre
(74) *Attorney, Agent, or Firm* — Kinney & Lange, P.A.

(57) ABSTRACT

A system for a wind turbine nacelle includes a rotor head, a plurality of blade holders connected to the rotor head, and a shaft having a first end that extends into the rotor head. Linear movement of the shaft causes movement of the plurality of blade holders. The system further includes an electromechanical pitch actuator connected to a second end of the shaft and configured to translate linearly to move the shaft linearly. The system further includes a linear drive system connected to the electromechanical pitch actuator. The system further includes a fail-safe system connected to the electromechanical pitch actuator via the linear drive system. The fail safe system actuates to force the electromechanical pitch actuator rearward to move the blades into a stall blade position.

18 Claims, 90 Drawing Sheets

(58) Field of Classification Search
CPC .... F03D 7/0256; F03D 7/0264; F03D 7/0268; F03D 17/013; F05B 2270/107; F05B 2270/326; F05B 2270/76
See application file for complete search history.

(56) References Cited

U.S. PATENT DOCUMENTS

| | | | |
|---|---|---|---|
| 3,905,661 | A | 9/1975 | Orr |
| D252,572 | S | 8/1979 | Hanson |
| 4,307,311 | A | 12/1981 | Grozinger |
| D271,303 | S | 11/1983 | Ovelmen |
| 4,522,564 | A | 6/1985 | Carter et al. |
| 4,653,982 | A | 3/1987 | Kojima et al. |
| 4,668,109 | A | 5/1987 | Basso |
| 5,354,175 | A | 10/1994 | Coleman et al. |
| D377,642 | S | 1/1997 | Drake |
| 5,685,694 | A | 11/1997 | Jones et al. |
| D517,986 | S | 3/2006 | Wobben |
| 7,179,056 | B2 | 2/2007 | Siegfriedsen |
| D584,686 | S | 1/2009 | Gudewer |
| D587,649 | S | 3/2009 | Gudewer |
| D602,860 | S | 10/2009 | Versteegh |
| D602,861 | S | 10/2009 | Talab |
| D637,954 | S | 5/2011 | Munk-Hansen et al. |
| D639,239 | S | 6/2011 | Gudewer et al. |
| D639,240 | S | 6/2011 | Gudewer et al. |
| D640,630 | S | 6/2011 | Schutz |
| D657,744 | S | 4/2012 | Lee et al. |
| D658,124 | S | 4/2012 | Lee et al. |
| 8,277,184 | B2 | 10/2012 | Nies et al. |
| D671,071 | S | 11/2012 | Ai et al. |
| 8,550,769 | B2 | 10/2013 | Behnke et al. |
| D695,683 | S | 12/2013 | Al et al. |
| D699,677 | S | 2/2014 | Manrique et al. |
| D709,452 | S | 7/2014 | Mogensen et al. |
| D717,729 | S | 11/2014 | Munk-Hansen |
| D717,730 | S | 11/2014 | Munk-Hansen |
| D724,027 | S | 3/2015 | Bitsch et al. |
| D727,264 | S | 4/2015 | Schmid |
| D766,828 | S | 9/2016 | Yamada et al. |
| 9,617,981 | B2 | 4/2017 | Hancock |
| D794,564 | S | 8/2017 | Graefe |
| D801,927 | S | 11/2017 | Cooper, II |
| D824,331 | S | 7/2018 | Schuenemann |
| D829,172 | S | 9/2018 | Cooper |
| 10,066,602 | B2 | 9/2018 | Beekmann et al. |
| D960,836 | S | 8/2022 | Papini |
| D1,012,851 | S | 1/2024 | Munk-Hansen |
| 12,297,816 | B2 | 5/2025 | Nies et al. |
| 2011/0211957 | A1 | 9/2011 | Folsom et al. |
| 2013/0088009 | A1 | 4/2013 | Cousineau et al. |
| 2018/0287438 | A1 | 10/2018 | Muniz Casais et al. |
| 2018/0320665 | A1 | 11/2018 | Lieckfeldt |
| 2020/0173424 | A1 | 6/2020 | Claramunt Estecha et al. |
| 2022/0025845 | A1 | 1/2022 | Baun et al. |
| 2024/0125301 | A1 | 4/2024 | Nies et al. |
| 2025/0243840 | A1 | 7/2025 | Flaherty et al. |
| 2025/0243841 | A1 | 7/2025 | Flaherty et al. |
| 2025/0243845 | A1 * | 7/2025 | Flaherty ................ F03D 1/0671 |
| 2025/0243849 | A1 | 7/2025 | Flaherty et al. |

FOREIGN PATENT DOCUMENTS

| | | | |
|---|---|---|---|
| CN | 104061121 | A | 9/2014 |
| CN | 108119305 | A | 6/2018 |
| CN | 110905721 | A | 3/2020 |
| CN | 214035961 | U | 8/2021 |
| DE | 584505 | C | 9/1933 |
| DE | 102012110024 | A1 | 5/2013 |
| EP | 1291521 | A1 | 3/2003 |
| EP | 2317137 | B1 | 7/2012 |
| EP | 3308449 | B1 | 8/2019 |
| IT | VR20130105 | A1 | 11/2014 |
| KR | 20130090227 | A | 8/2013 |
| KR | 20230146463 | A | 10/2023 |
| WO | 2019215466 | A1 | 11/2019 |

OTHER PUBLICATIONS

Extended European Search Report for European Patent Application No. 25155163.6, dated Jun. 18, 2025, 7 pages.
Extended European Search Report for European Patent Application No. 25155202.2, dated Jun. 18, 2025, 9 pages.
Extended European Search Report for European Patent Application No. 25155211.3, dated Jun. 13, 2025, 10 pages.

* cited by examiner

FAIL SAFE SYSTEM FOR WIND TURBINE NACELLE

CROSS-REFERENCE TO RELATED APPLICATION(S)

This application claims the benefit of U.S. Provisional Application No. 63/627,177, filed Jan. 31, 2024, and entitled "FAIL SAFE SYSTEM FOR WIND TURBINE NACELLE," the disclosure of which is hereby incorporated by reference in its entirety.

BACKGROUND

Wind power is a clean and environmentally friendly energy source. Most modern wind turbines typically include a foundation, a tower, a nacelle containing a generator, and a rotor head with one or more rotor blades. The rotor blades capture kinetic energy from wind using known aerodynamic principles and transmit the kinetic energy to rotational energy. The rotational energy turns a rotor shaft, which couples the rotor head and blades to the generator. The generator converts the rotational energy to electrical energy, which may be deployed for domestic use, commercial use, or utility grid distribution.

Wind turbines can be complicated in construction and can require the assembly of many sub-systems. Normal wind turbine nacelle configurations include a chassis, which supports rotor bearings, a power train, and a generator. A yaw drive system is connected to the chassis and rotates the nacelle so that it is facing into and is aligned with the changing wind direction. The rotor head, with one or more blades and with a blade pitch system, is connected to the rotor shaft. Each subsystem is assembled using mechanical fittings, which require regular maintenance and can be a potential failure point. To ensure continued reliability of wind systems, strict tolerancing is also required both in the manufacture and assembly of each subsystem. This increases the cost of manufacture and complicates the routine servicing of the wind turbine.

In a conventional horizontal axis wind turbine, a tower extends vertically from the ground, and a nacelle is disposed on top of the tower. The nacelle houses and supports the electrical generation components, the rotor shaft, rotor bearing systems, and the rotor head and blade pitching system.

Standard wind turbine configurations require a large nacelle space-claim, where subsystems are mounted in a linear format. The rotor head is mounted to the rotor shaft. The rotor shaft is supported by two rotor bearings, which need minimum center-to-center distance. The generator is coupled to the rotor shaft directly or through a gear drive system. The pitch actuator is mounted to the rear of the generator. This standard configuration can create excessive yaw bearing overhang loads, which complicates the yaw system design.

Accordingly, the industry would benefit from an advancement in wind turbine design that would improve the nacelle configuration.

SUMMARY

A system for a wind turbine nacelle includes a rotor head, a plurality of blade holders connected to the rotor head, and a shaft having a first end that extends into the rotor head. Linear movement of the shaft causes movement of the plurality of blade holders. The system further includes an electromechanical pitch actuator connected to a second end of the shaft and configured to translate linearly to move the shaft linearly. The system further includes a linear drive system connected to the electromechanical pitch actuator. The system further includes a fail-safe system connected to the electromechanical pitch actuator via the linear drive system. The fail safe system actuates to force the electromechanical pitch actuator rearward to move the blades into a stall blade position.

A method for stopping a wind turbine nacelle having one or more blades includes detecting an operational condition of the wind turbine nacelle that requires an emergency stop. The method further includes triggering a fail safe system to pull a electromechanical pitch actuator along with a shaft of a pitch shaft assembly to rotate the one or more blades to a stall blade position.

DETAILED DESCRIPTION

Overview

Wind turbine nacelle 10 includes three blades facing up-wind. It is a direct drive machine in which a forward end of a rotor generator shaft is directly connected to a rotor head and blade pitch system. This direct drive configuration offers improved efficiency over gearbox machines used in other wind turbine designs.

Wind turbine nacelle 10 employs both active blade pitch provided by a blade trim actuator system and yaw control provided by a yaw drive system to align the wind turbine nacelle into the wind.

The blades are mounted on bearings in the rotor head, which allows them to be pitched. Pitch actuation is achieved using an electro-mechanical ram which moves a linkage system by means of a steel rod which passes through the center of the generator and rotor shaft.

The blade pitch control can be used to limit rotation speed and power extraction. It can also be used to feather the blades through 90 degrees, thereby acting as both a brake and a means of incapacitating the turbine in extreme weather.

Speed control is achieved by means of active pitch control, and in an emergency braking situation, the blades are feathered out of the wind, which results in a very firm stop.

A fail-safe system is also employed should blade pitch electro-mechanical ram fail. It is also activated should there be a power failure. A battery backup powers a high load mechanical drive system that comprises a motor, gearbox, and trapezoidal drive, which is capable of pulling blades out of the wind and bringing the wind turbine nacelle to a stop.

The yaw angle of the turbine is controlled using a slew drive mechanism, which is coupled to a wind vane. The slew drive consists of a slew bearing with a yaw worm drive, which is coupled to a DC motor and planetary gearbox.

The front mounted generator is a radial flux design which employs permanent magnets on the generator rotor and epoxy encased coils on the generator stator. In one embodiment, the design employs eighty-one coils with eighty-four magnet sets. The generator is air cooled using an outer casting stator having radially projecting cooling fins, which acts as a heat sink to dissipate heat from the coils mounted on the inner surface of the stator.

Wind turbine nacelle 10 employs a cast chassis onto which the generator is built. The rotor shaft carries the generator rotor, rotor bearings and the head that is mounted to the front end of the generator rotor shaft. The chassis is attached to the yaw drive bearing, which in turn is attached to the stub mast. The turbine can be shipped in this configuration. During installation, wind turbine nacelle 10 is suspended vertically and the stub mast is bolted to the top of the tower, which is tilted horizontally during installation. After the blades are attached, hydraulic rams are used to erect the tower and wind turbine nacelle 10.

Nacelle Housing (FIGS. 1A-2F)

Figure 1A:
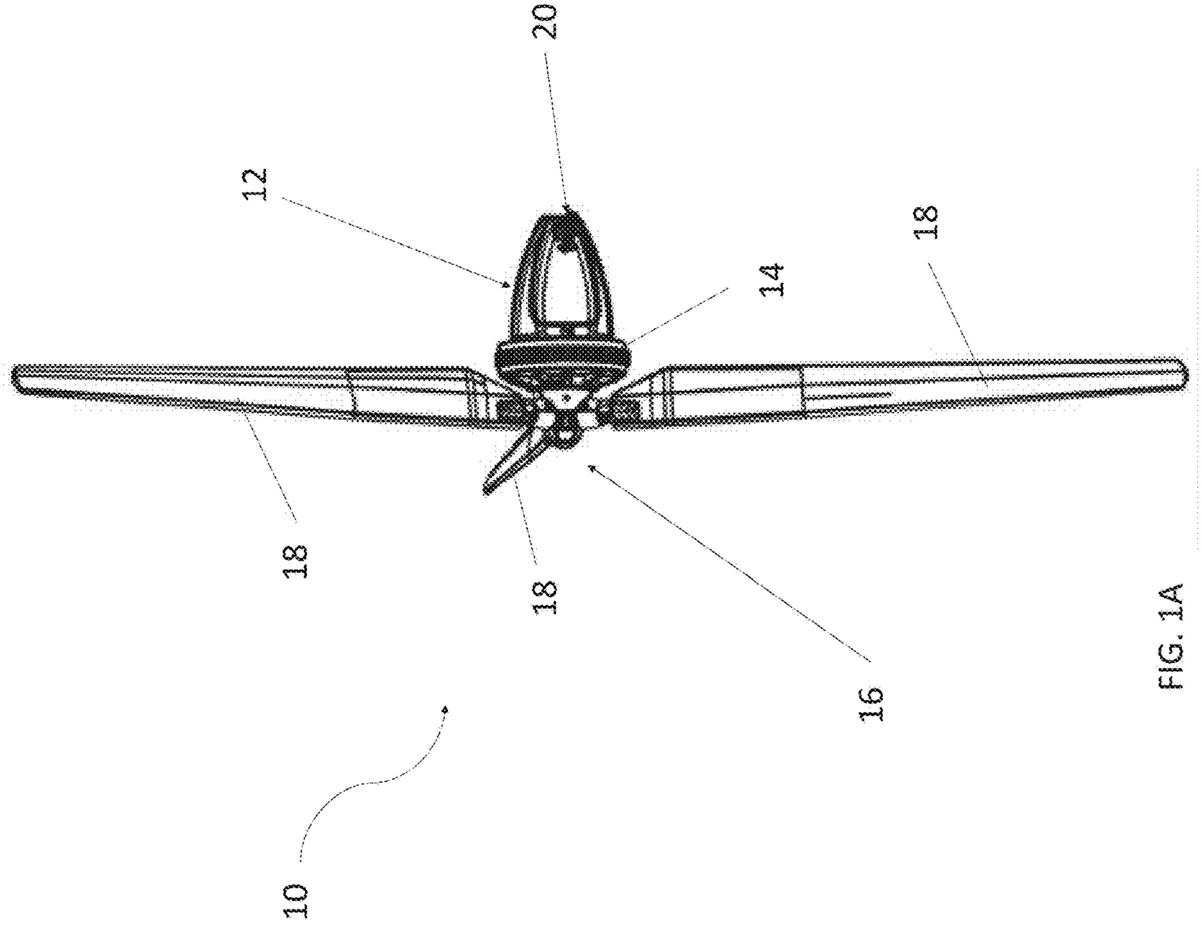
FIG. 1A is a top view of a wind turbine nacelle.
Figure 1B:
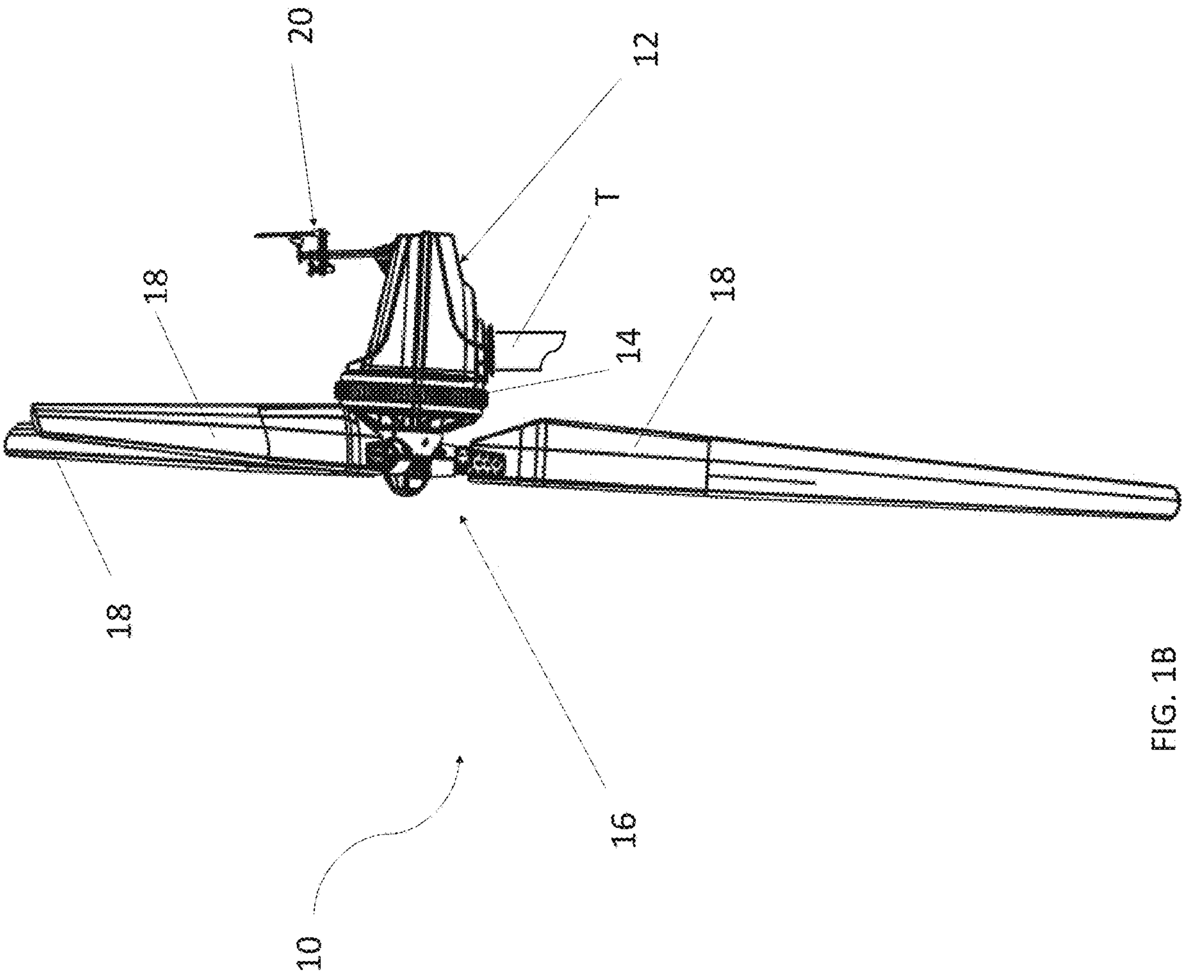
FIG. 1B is a side view of the wind turbine nacelle.
Figure 1C:
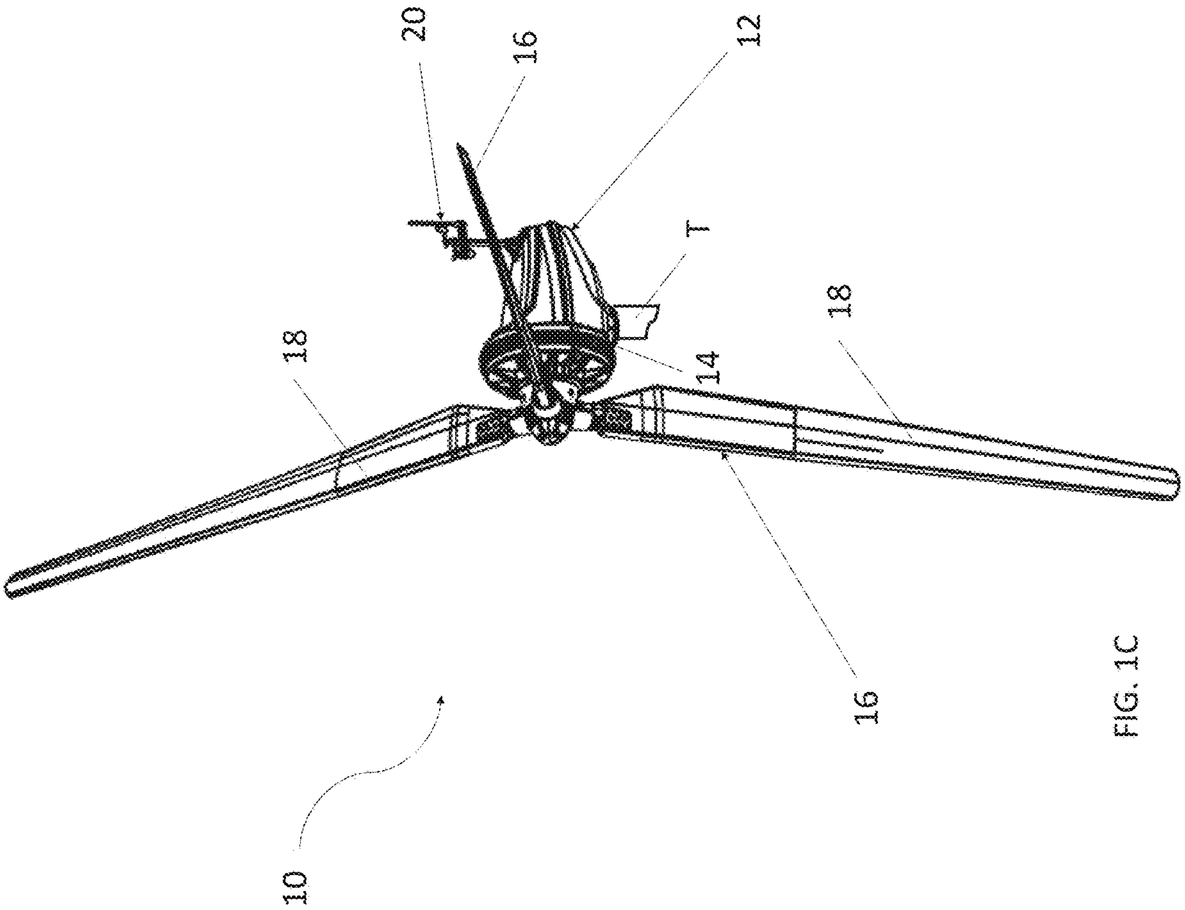
FIG. 1C is an isometric view of the wind turbine nacelle.
Figure 1D:
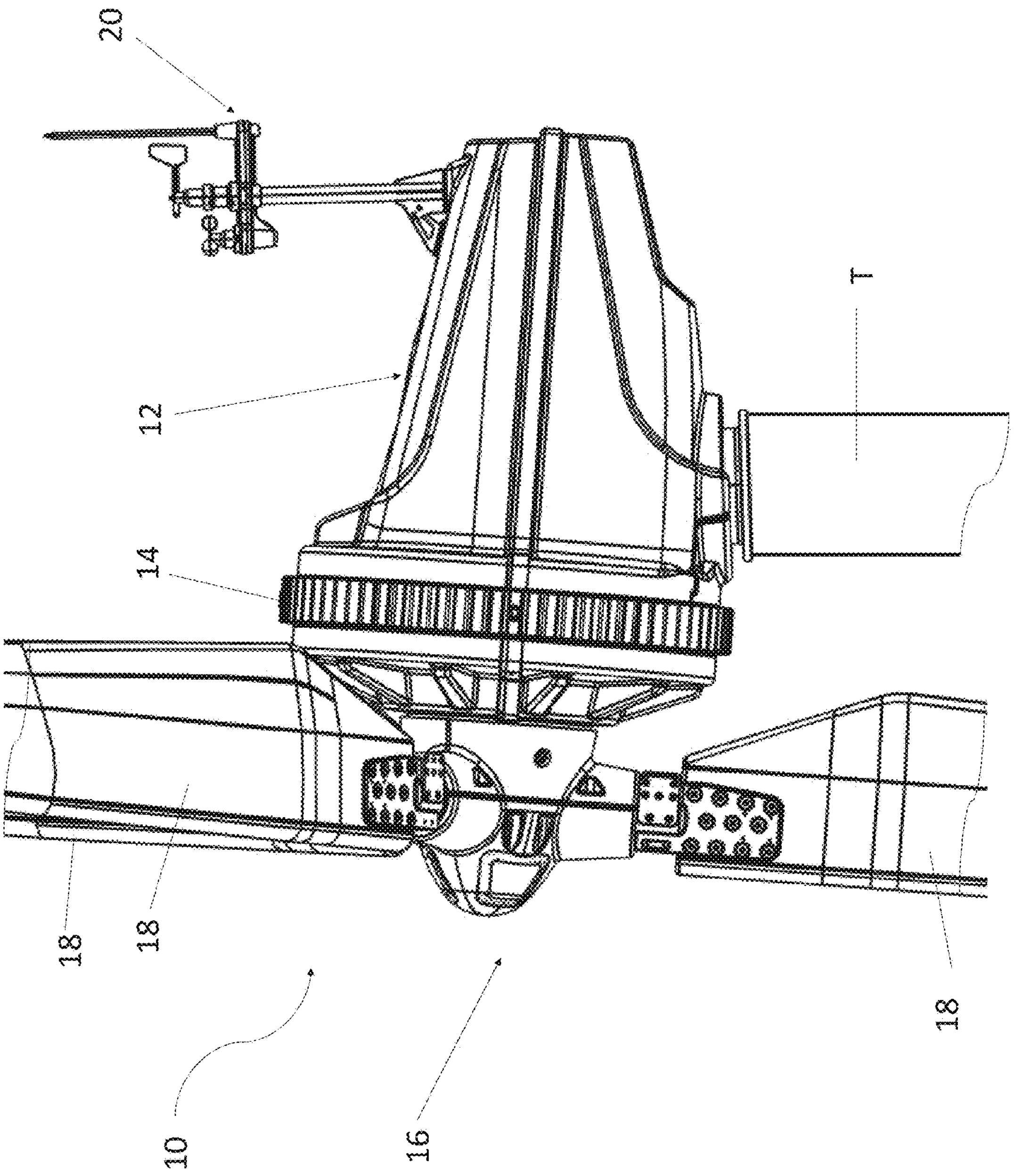
FIG. 1D is an enlarged partial side view of the wind turbine nacelle.

FIG. 1A is a top view of wind turbine nacelle 10. FIG. 1B is a side view of wind turbine nacelle 10. FIG. 1C is an isometric view of the wind turbine nacelle. FIG. 1D is an enlarged partial side view of the wind turbine nacelle 10. FIGS. 1A-1D will be discussed together. Wind turbine nacelle 10 includes housing 12, generator 14, rotor head and blade pitch system 16 (including blades 18), and wind sensing system 20. Also shown in FIGS. 1A-1D is tower T.

Housing 12 of wind turbine nacelle 10 encloses a portion of generator 14 of wind turbine nacelle 10 and a portion of rotor head and blade pitch system 16 of wind turbine nacelle 10. Rotor head and blade pitch system 16 is rotatable. Blades 18 of rotor head and blade pitch system 16 are exposed at a front of wind turbine nacelle 10. Wind turbine nacelle 10 includes three blades 18. Wind sensing system 20 is mounted on a top surface of housing 12 at a rear of wind turbine nacelle 10. Wind turbine nacelle 10 is mounted on a top end of wind turbine tower T.

Housing 12 provides a streamlined enclosure for the components of wind turbine nacelle 10, which uses generator 14 to convert rotational energy of rotor head and blade pitch system 16 to electrical energy. Blades 18 of rotor head and blade pitch system 16 interact with wind to cause rotation of rotor head and blade pitch system 16 to generate such rotational energy. Wind sensing system 20 produces a wind speed signal and a wind direction signal that is used to control and adjust wind turbine nacelle 10 to optimize the production of rotational energy, and therefore electrical energy, by wind turbine nacelle 10.

Figure 2A:
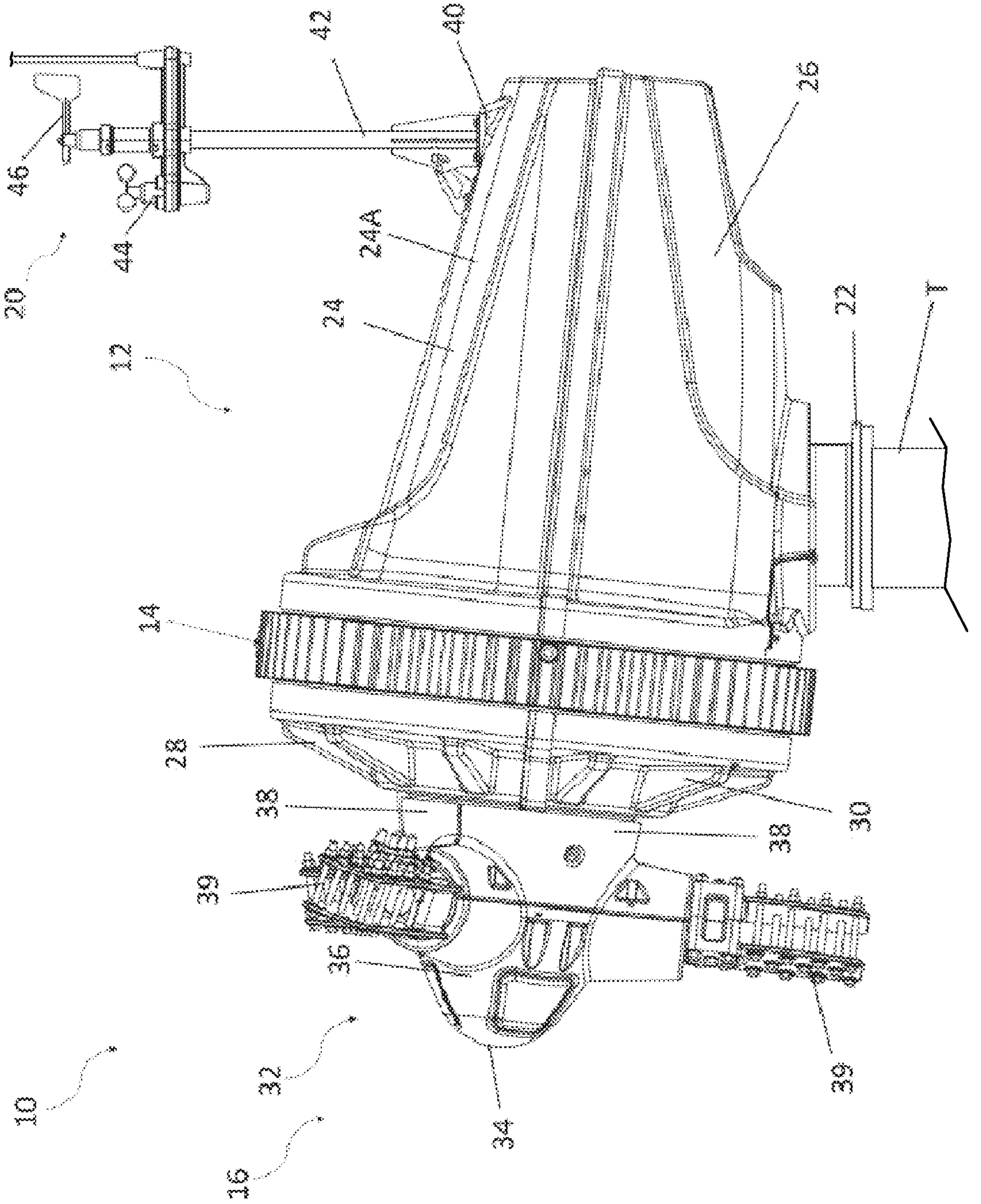
FIG. 2A is a side view of the wind turbine nacelle showing a housing and a wind sensing system of the wind turbine nacelle.
Figure 2B:
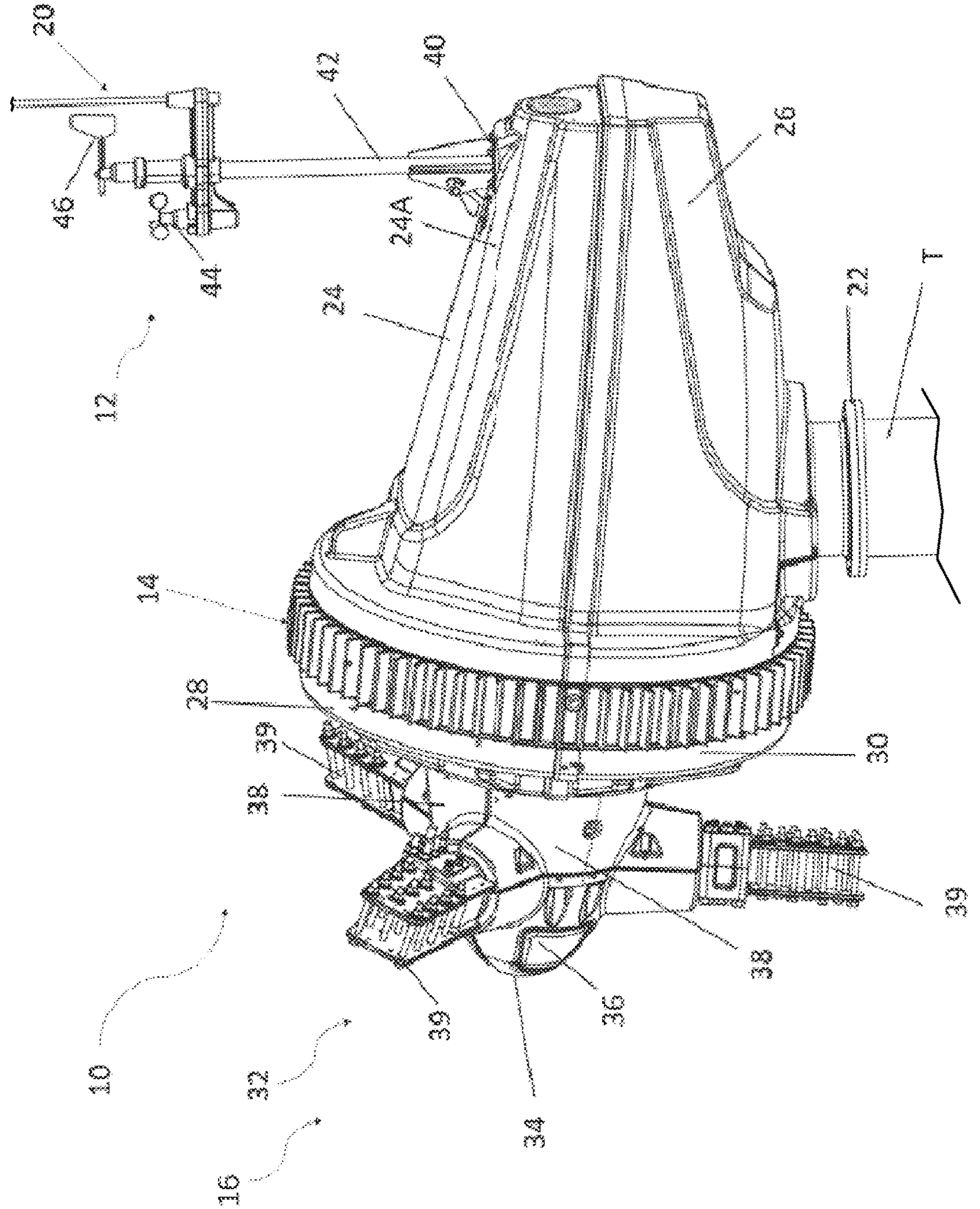
FIG. 2B is an isometric view of the wind turbine nacelle showing the housing and the wind sensing system of the wind turbine nacelle.
Figure 2C:
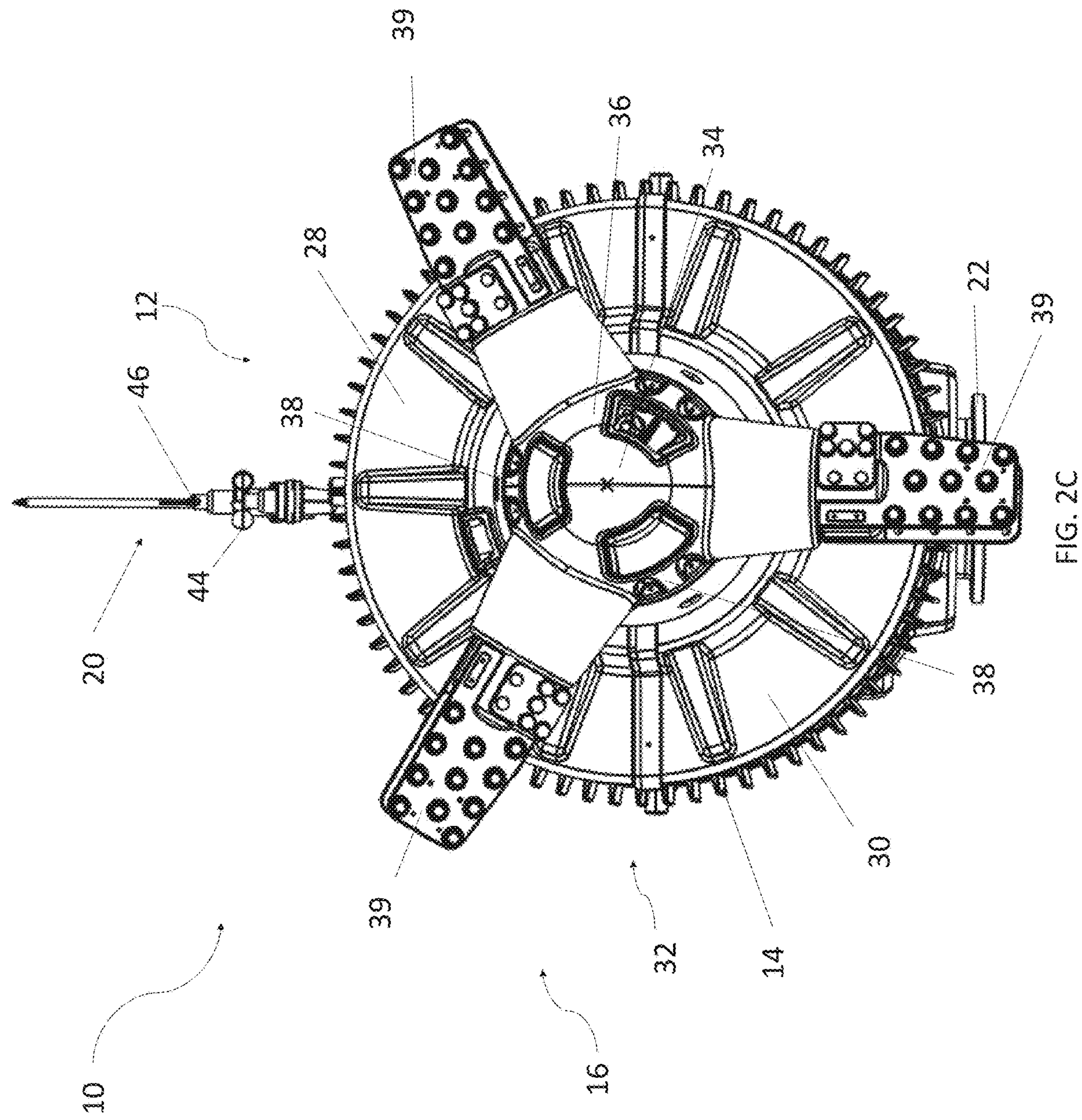
FIG. 2C is a front isometric view of the wind turbine nacelle showing a housing and the wind sensing system of the wind turbine nacelle.
Figure 2D:
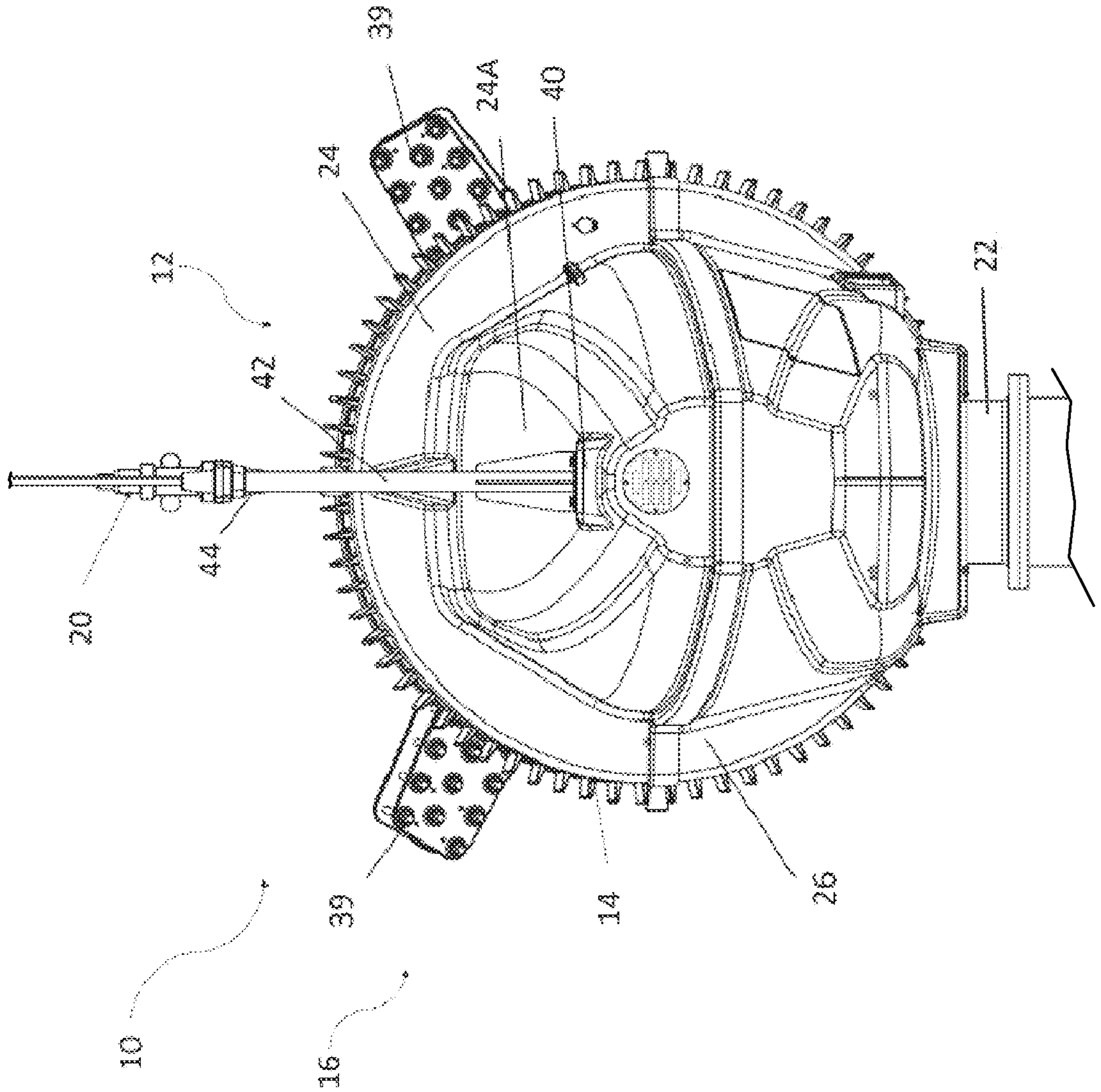
FIG. 2D is a rear isometric view of the wind turbine nacelle showing a housing and the wind sensing system of the wind turbine nacelle.
Figure 2E:
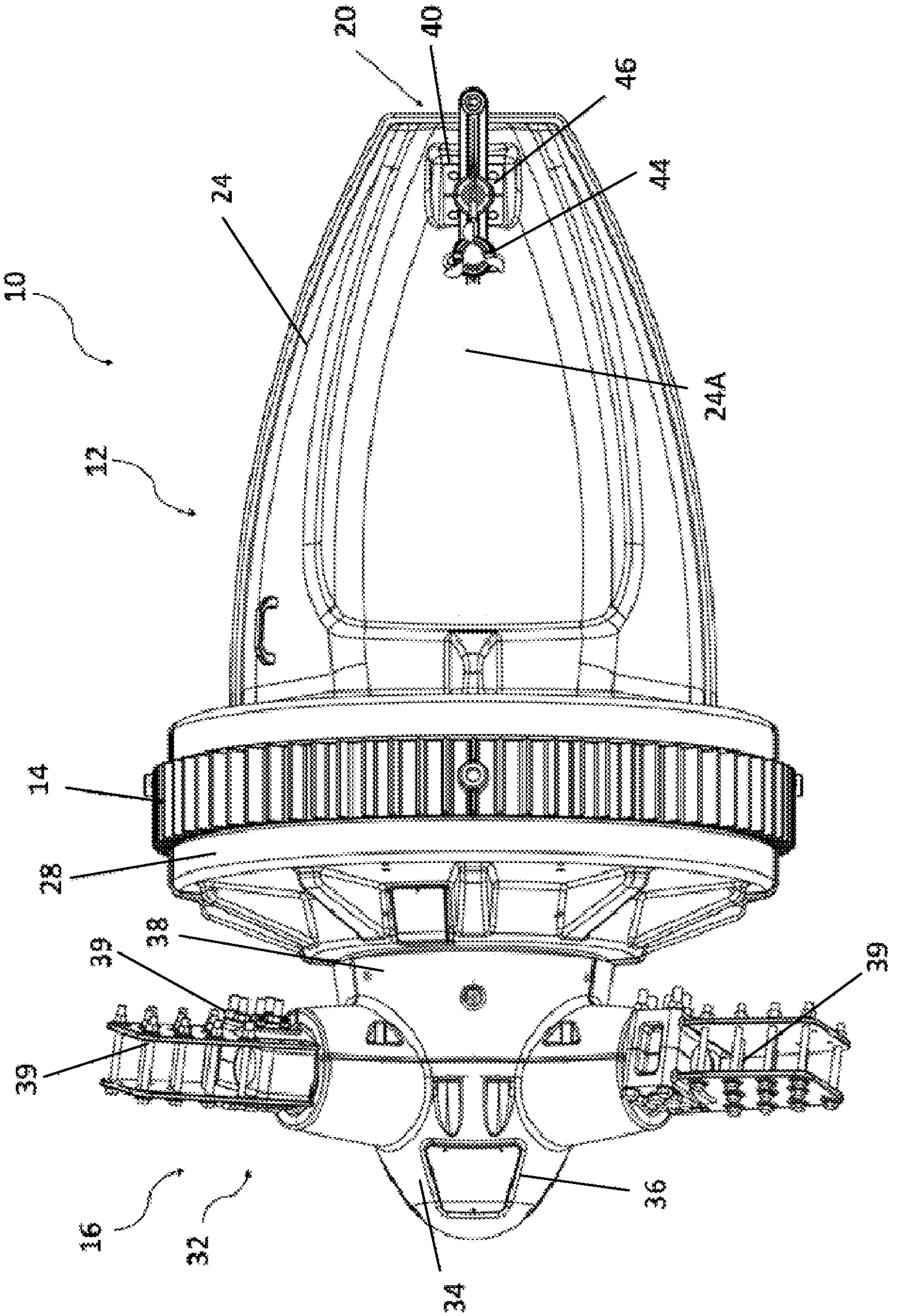
FIG. 2E is a top view of the wind turbine nacelle showing a housing and the wind sensing system of the wind turbine nacelle.
Figure 2F:
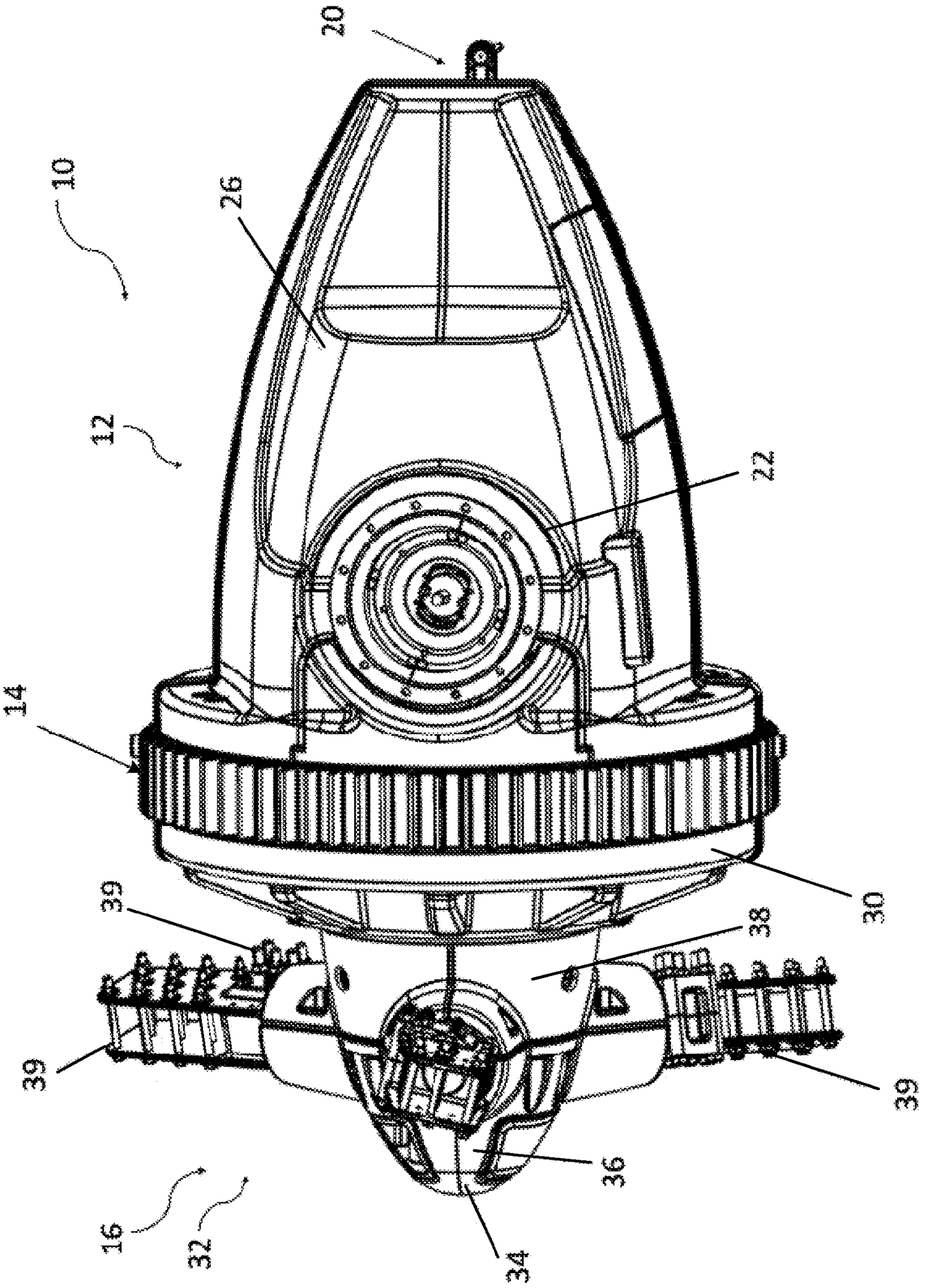
FIG. 2F is a bottom view of the wind turbine nacelle showing a housing of the wind turbine nacelle.

FIG. 2A is a side view of wind turbine nacelle 10 showing housing 12 and wind sensing system 20 of wind turbine nacelle 10. FIG. 2B is an isometric view of wind turbine nacelle 10 showing housing 12 and wind sensing system 20. FIG. 2C is a front isometric view of wind turbine nacelle 10 showing housing 12 and wind sensing system 20. FIG. 2D is a rear isometric view of wind turbine nacelle 10 showing housing 12 and wind sensing system 20 of wind turbine nacelle 10. FIG. 2E is a top view of wind turbine nacelle 10 showing housing 12 and wind sensing system 20 of wind turbine nacelle 10. FIG. 2F is a bottom view of wind turbine nacelle 10 showing housing 12. FIGS. 2A-2F will be discussed together. Wind turbine nacelle 10 includes housing 12, generator 14, rotor head and blade pitch system 16, wind sensing system 20, and stub mast 22. Housing 12 includes top rear outer cover 24 (having top surface 24A), bottom rear outer cover 26, top front outer cover 28, bottom front outer cover 30, rotor head cover 32 (which includes nose 34, front fairings 36, and rear fairings 38). Rotor head and blade pitch system 16 includes blade holders 39. Wind sensing system 20 includes base 40, shaft 42, anemometer 44, and wind vane 46.

Housing 12 of wind turbine nacelle 10 encloses a portion of generator 14 and a portion of rotor head and blade pitch system 16. Wind sensing system 20 is mounted on a top surface of housing 12 at a rear of wind turbine nacelle 10. Stub mast 22 extends down from wind turbine nacelle 10 to mount wind turbine nacelle 10 onto a top end of tower T.

Top rear outer cover 24 is a top rear portion of housing 12. Bottom rear outer cover 26 is a bottom rear portion of housing 12. Top front outer cover 28 is a top front portion of housing 12. Bottom front outer cover 30 is a bottom front portion of housing 12. A rearward portion of generator 14 is housed within top rear outer cover 24 and bottom rear outer cover 26. A forward portion of generator 14 is housed within top front outer cover 28 and bottom front outer cover 30. A portion of generator 14 is exposed between rear covers 26 and 26 and front covers 28 and 30. Rotor head cover 32 is the front-most portion of housing 12, forward of top front outer cover 28 and bottom front outer cover 30. Nose 34 of rotor head cover 32 makes up the nose, or most forward portion, of wind turbine nacelle 10. Front fairings 36 of rotor head cover 32 are between nose 34 and rear fairings 38 of rotor head cover 32. Rear fairings 38 are between front fairings 36 and top front outer cover 28 and bottom front outer cover 30. Blade holders 39 of rotor head and blade pitch system 16 are axially between front fairings 36 and rear fairings 38. Blades 18 (shown in FIGS. 1A-1D) attach to blade holders 39, as shown in FIGS. 1A-1D. Each one of blades 18 is mounted to a different one of three blade holders 39. Covers 24, 26, 28, 30, and 32, along with generator 14 and stub mast 22, fit together to enclose and protect the internal components of wind turbine nacelle 10.

Wind sensing system 20 is mounted on top surface 24A of top rear outer cover 24. Base 40 is attached to top surface 24A. Shaft 42 extends vertically upward from base 40. Anemometer 44 and wind vane 46 are mounted at the upper end of shaft 42. Anemometer 44 produces a wind speed signal, and wind vane 46 produces a wind direction signal.

Rotor head and blade pitch system 16 is used to control rotation speed and power extraction of wind turbine nacelle 10. Further, rotor head and blade pitch system 16 can feather blades through 90 degrees using blade holders 39, acting as both a brake and means of incapacitating wind turbine nacelle 10 in extreme weather. The wind speed signal from anemometer 44 is used to control the blade pitch of rotor head and blade pitch system 16, and thereby rotational speed of generator 14. The wind direction signal from wind vane 46 is used to adjust yaw of wind turbine nacelle 10 so that rotor head and blade pitch system 16 faces directly into the wind. As such, wind sensing system 20 is used to optimize performance of wind turbine nacelle 10.

Configuration of Wind Turbine Nacelle (FIGS. 3-8E; Also See FIGS. 1A-2F)

Figure 3:
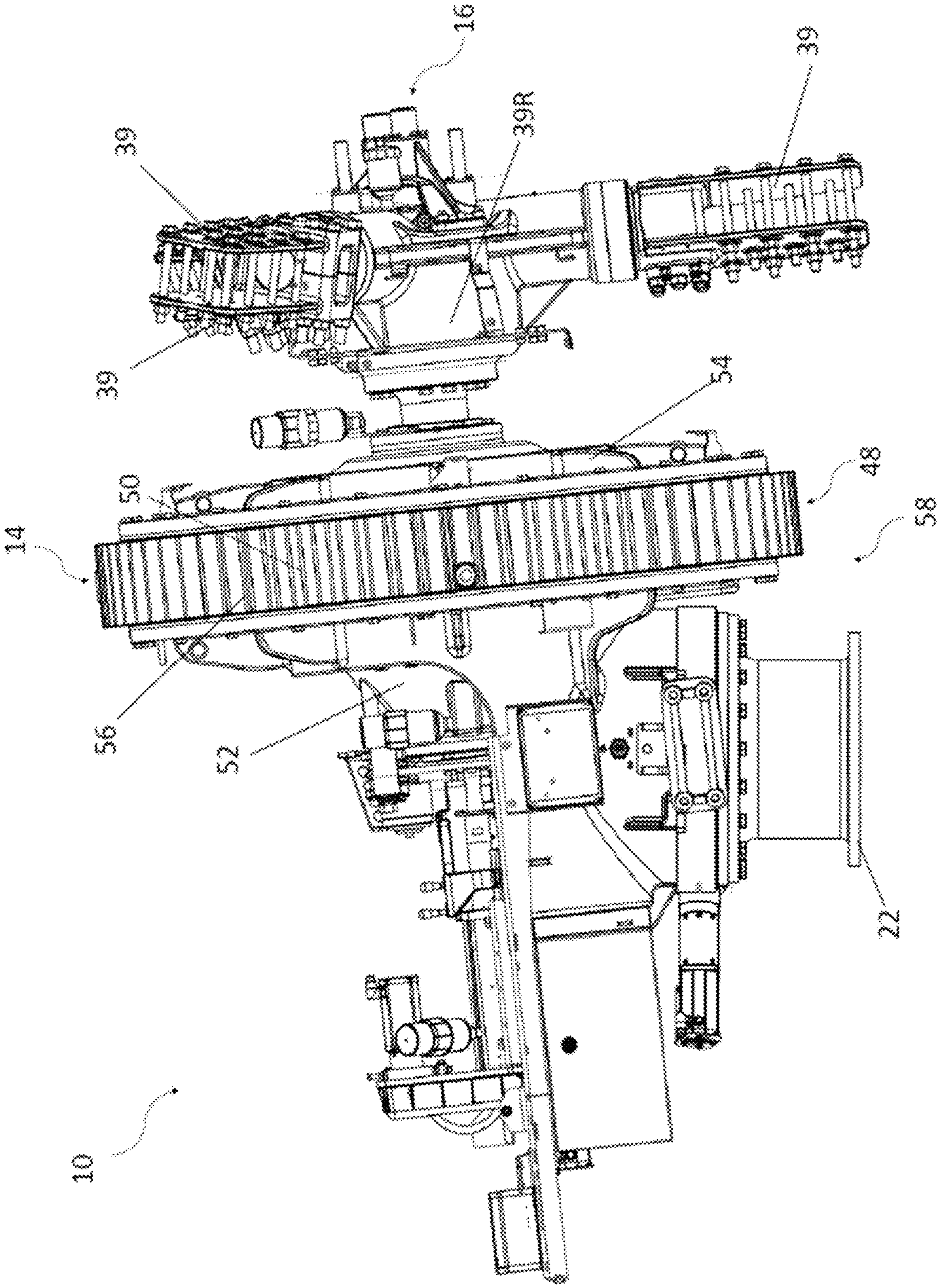
FIG. 3 is a side view of the wind turbine nacelle with part of the housing removed to show the stator assembly.

FIG. 3 is a side view of wind turbine nacelle 10 with part of housing 12 removed to show stator assembly 48. Wind turbine nacelle 10 includes generator 14, rotor head and blade pitch system 16, and stub mast 22. Generator 14 includes stator assembly 48 and rotor assembly 50. Rotor head and blade pitch system 16 includes blade holders 39 and rotor head 39R. Stator assembly 48 includes rear chassis 52, front chassis 54, and stator ring 56 (which make up frame 58 of wind turbine nacelle 10).

Generator 14 includes stationary stator assembly 48 and rotatable rotor assembly 50. Rotor assembly 50 is coupled with stator assembly 48. Rotor head and blade pitch system 16 is connected to rotor assembly 50. Rotor head and blade pitch system 16 has blade holders 39 connected to rotor head 39R, which is connected to rotor assembly 50. Blade holders 39 are rotatable. Rotor head and blade pitch system 16 can control the speed of generator 14 by rotating blade holders 39 to control the pitch of blades 18.

Rear chassis 52 is a rear portion of stator assembly 48. A bottom of rear chassis 52 is connected to a top of stub mast 22. Front chassis 54 is a front portion of stator assembly 48. Stator ring 56 is a portion of stator assembly 48 between rear chassis 52 and front chassis 54. Rear chassis 52 is connected to a rear surface of stator ring 56 and extends rearward from stator ring 56. Front chassis 54 is connected to a front surface of stator ring 56 and extends forward from stator ring 56. A portion of rotor assembly 50 is within stator ring 56.

Because rotor head 39R is connected to rotor assembly 50 and blade holders 39, which hold blades 18, rotation of blades 18 via blade holders causes rotation of rotor assembly 50. As such, rotor head and blade pitch system 16 controls the speed of generator 14. Rear chassis 52, front chassis 54, and stator ring 56 of stator assembly 48 of generator 14 are connected to form frame 58 of wind turbine nacelle 10. Frame 58 is the main structural component of generator 14.

Frame 58 is rotatably mounted on stub mast 22. Generator 14 can be built directly onto rear chassis 52. Frame 58 supports the internal structure and components of wind turbine nacelle 10. Frame 58 centers the mass of wind turbine nacelle 10 over the center of tower T.

Figure 4A:
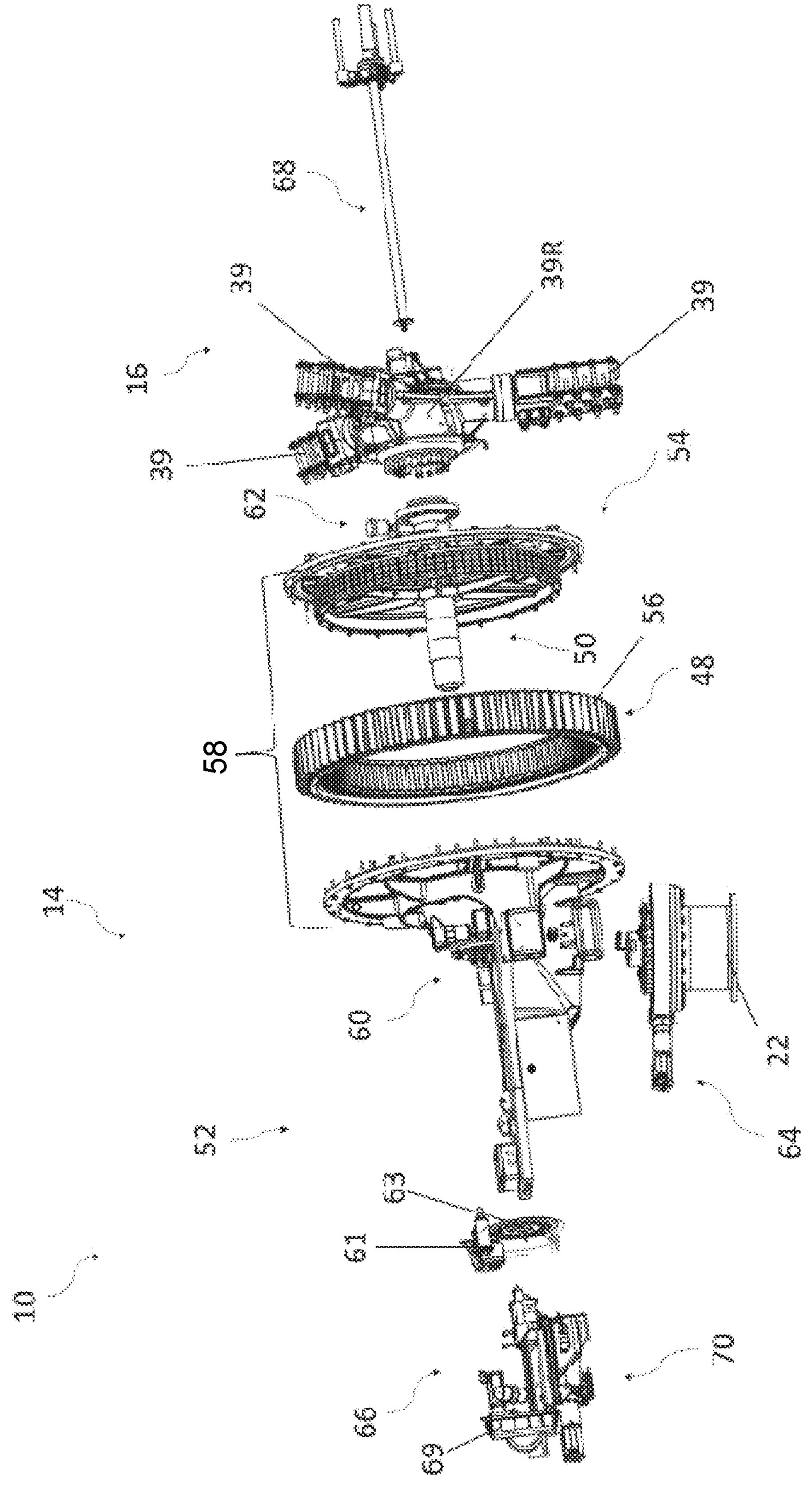
FIG. 4A is an exploded side view of the wind turbine nacelle with the housing removed to show a frame of the wind turbine nacelle.
Figure 4B:
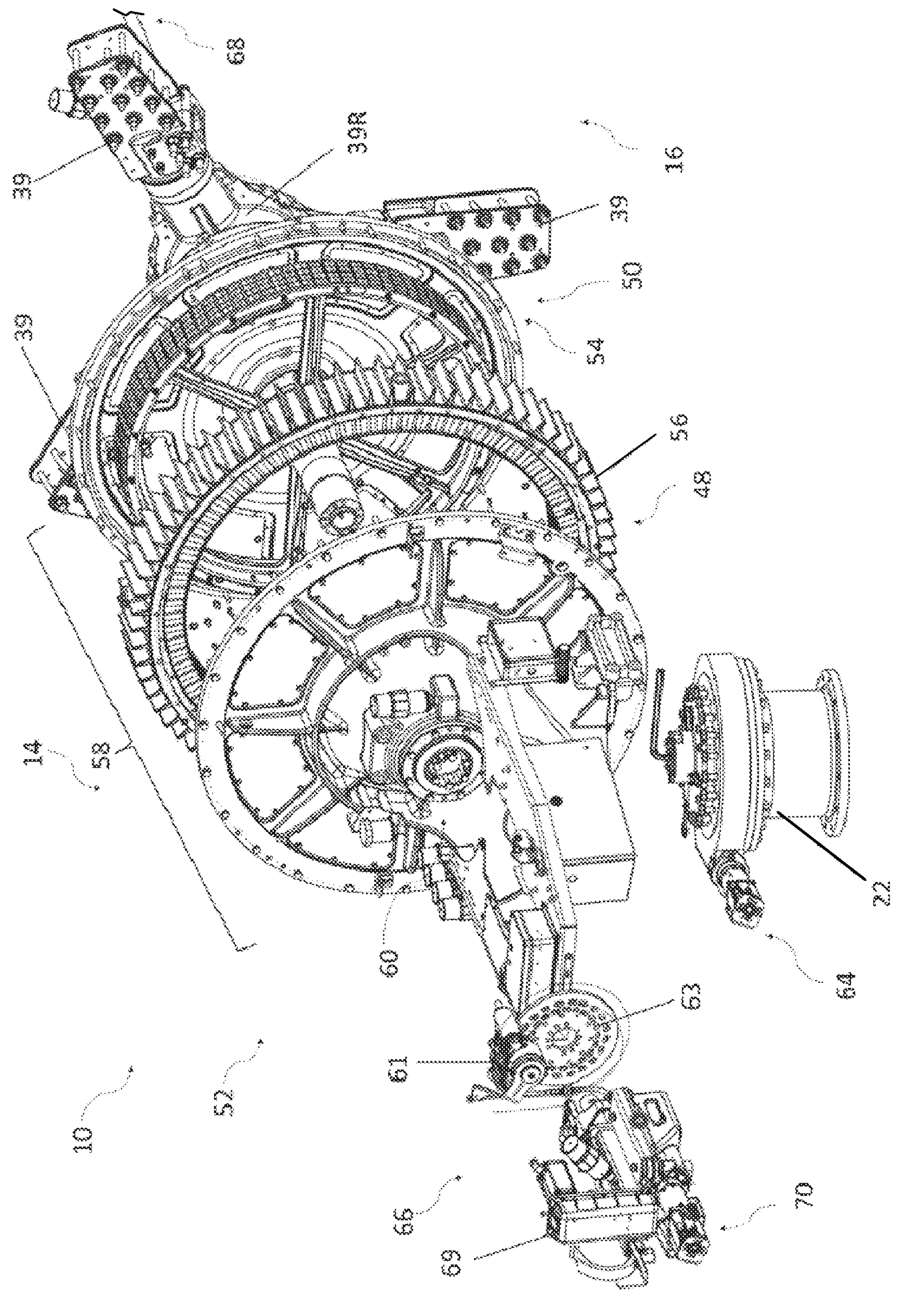
FIG. 4B is an exploded isometric view of the wind turbine nacelle with the housing removed to show the frame of the wind turbine nacelle.

FIG. 4A is an exploded side view of wind turbine nacelle 10 with housing 12 removed to show frame 58 of wind turbine nacelle 10. FIG. 4B is an exploded isometric view of wind turbine nacelle 10 with housing 12 removed to show frame 58 of wind turbine nacelle 10. FIGS. 4A and 4B will be discussed together. Wind turbine nacelle 10 includes generator 14, rotor head and blade pitch system 16, stub mast 22, rear bearing assembly 60, service brake 61, front bearing assembly 62 (shown in FIG. 4A), brake service disc 63, yaw drive system 64, blade trim actuator system 66, which includes pitch shaft assembly 68 and electromechanical pitch actuator 69, and fail safe system 70. Generator 14 includes stator assembly 48 and rotor assembly 50. Rotor head and blade pitch system 16 includes blade holders 39 and rotor head 39R. Stator assembly 48 includes rear chassis 52, front chassis 54, and stator ring 56 (which make up frame 58 of wind turbine nacelle 10).

Generator 14 is connected to rotor head and blade pitch system 16. Specifically, rotor assembly 50 is connected to rotor head 39R. A bottom portion of generator 14 is connected to stub mast 22. Rear bearing assembly 60 is near a rear portion of generator 14, housed in rear chassis 52. Service brake 61 is near a rear portion of generator 14, connected to rear chassis 52. Front bearing assembly 62 is near a front portion of generator 14, housed in front chassis 54. Brake service disc 63 is behind rear bearing assembly 60 and contacts service brake 61. Yaw drive system 64 is mounted between the lower end portion of generator 14, or a bottom of rear chassis 52, and stub mast 22. Blade trim actuator system 66 extends through generator 14. Pitch shaft assembly 68 of blade trim actuator system 66 extends from a forward portion of wind turbine nacelle 10, through front chassis 54, stator ring 56, and rear chassis 52 of generator 14, to connect to electromechanical pitch actuator 69 at a rear portion of wind turbine nacelle 10. Fail safe system 70 is connected to electromechanical pitch actuator 69.

Rear bearing assembly 60 supports a rear end of rotor assembly 50. Break service disc 63 interacts with service brake 61 and rotor assembly 50 when rotor assembly 50 is not rotating. Front bearing assembly 62 supports a forward end of rotor assembly 50. Yaw drive system 64 rotates wind turbine nacelle 10, or frame 58, at stub mast 22 about a vertical axis V or “V-axis” to orient wind turbine nacelle 10 so that rotor head and blade pitch system 16 faces directly into the wind. Blade trim actuator system 66 uses pitch shaft assembly 68 and electromechanical pitch actuator 69 to control the rotational speed of generator 14 based upon a wind speed signal produced by anemometer 44. Linear movement produced by electromechanical pitch actuator 69 is converted to rotational movement at blade holders 39 of pitch shaft assembly 68. Each blade holder 39 is rotatable about a radial axis with respect to a rotational axis of rotor head and blade pitch system 16. Blade trim actuator system 66 rotates blade holders 39 to position blades 18 in a desired position relative to the wind. Fail safe system 70 is coupled to electromechanical pitch actuator 69 and moves pitch shaft assembly 68 in a direction that reduces rotational speed of generator 14 when blade trim actuator system 66 is not functioning properly. As such, in the event that blade trim actuator system 66 is unable to move pitch shaft assembly 68 in a direction that reduces rotational speed of generator 14, fail safe system 70 can cause blades 18 (shown in FIGS. 1A-1D) to rotate to a position parallel to the wind direction to reduce rotational speed of generator 14 to a minimum.

Figure 5A:
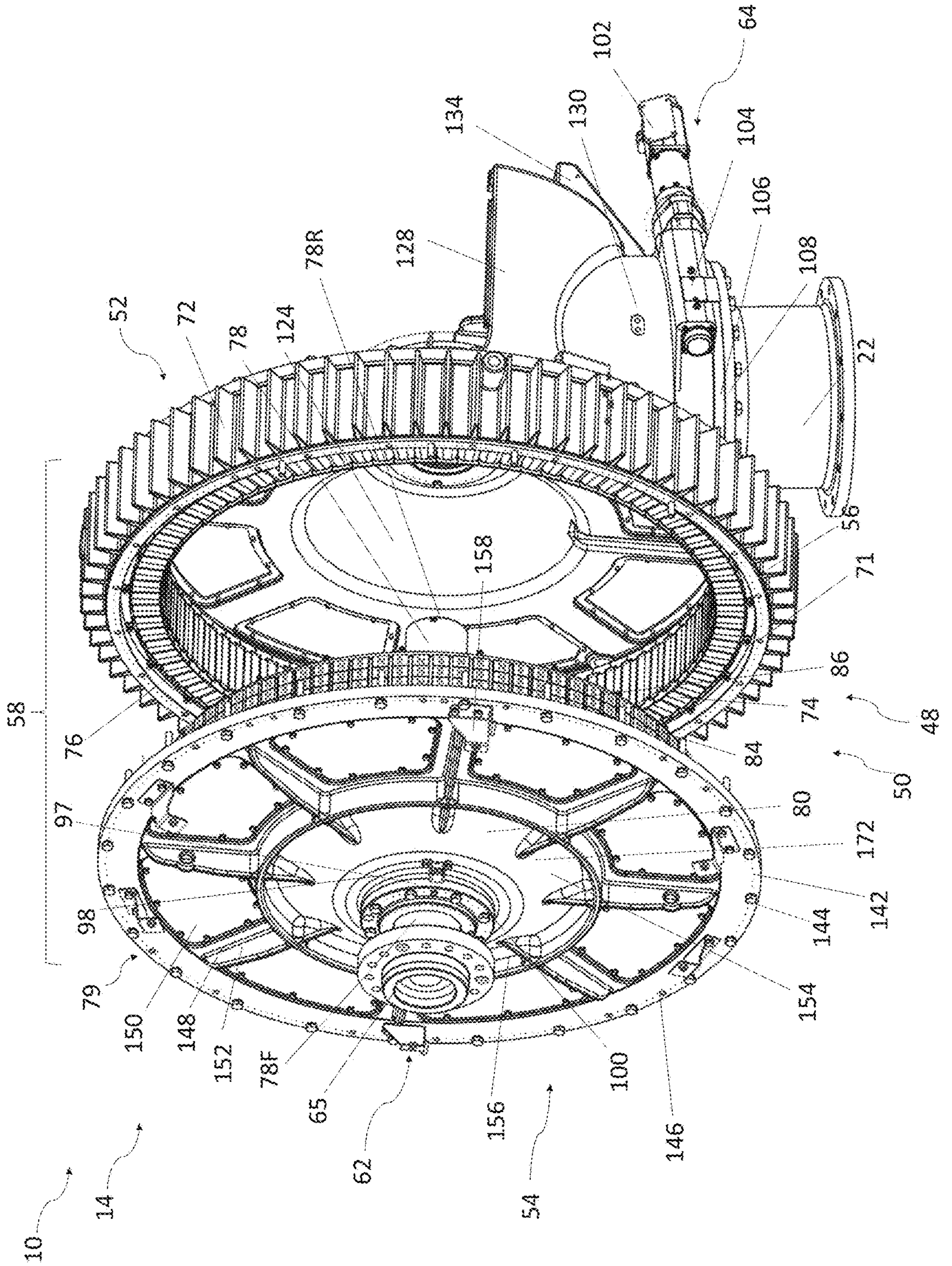
FIG. 5A is an exploded isometric view of the generator showing the stator assembly and the rotor assembly.
Figure 5B:
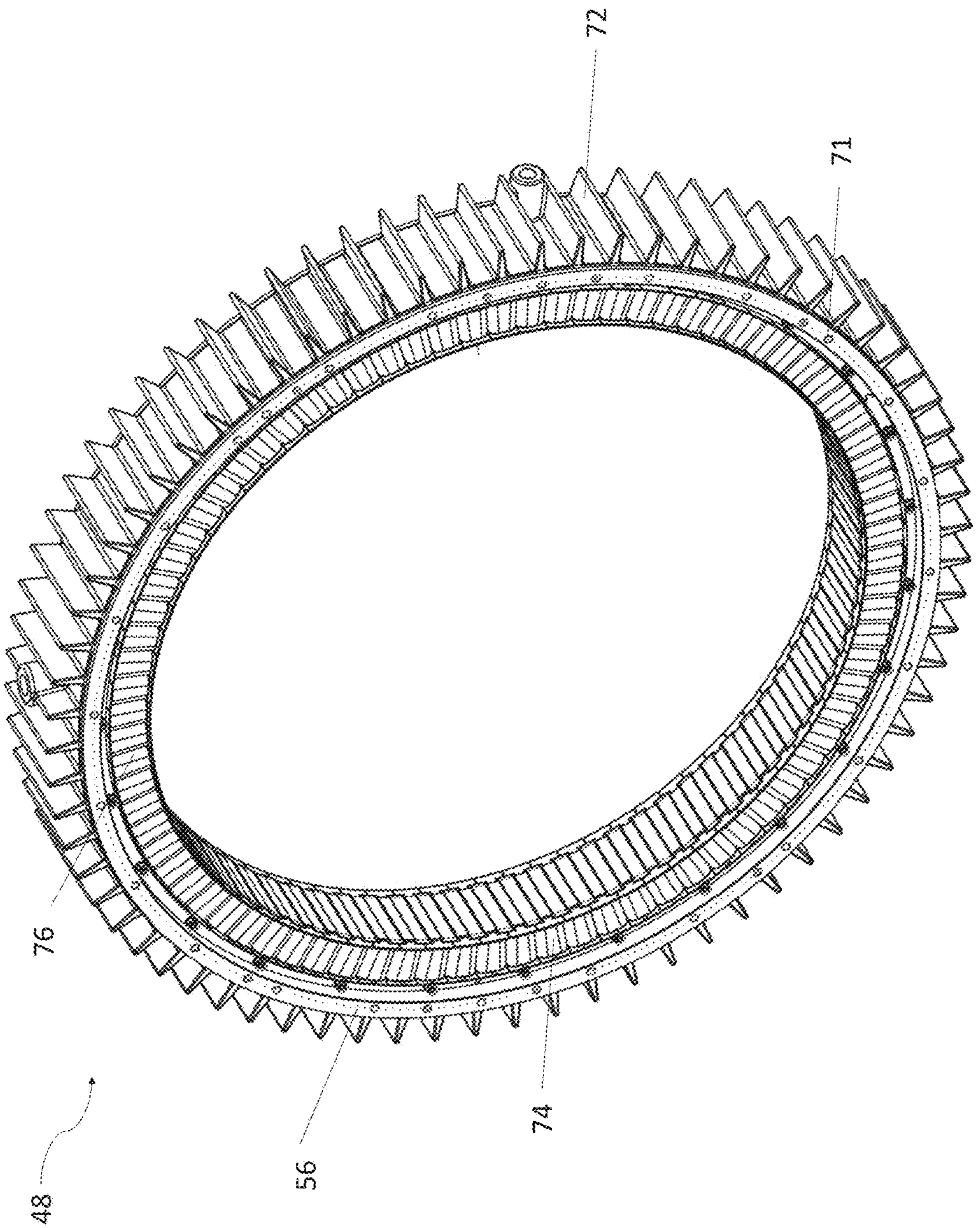
FIG. 5B is an isometric view of a stator ring of the stator assembly.
Figure 5C:
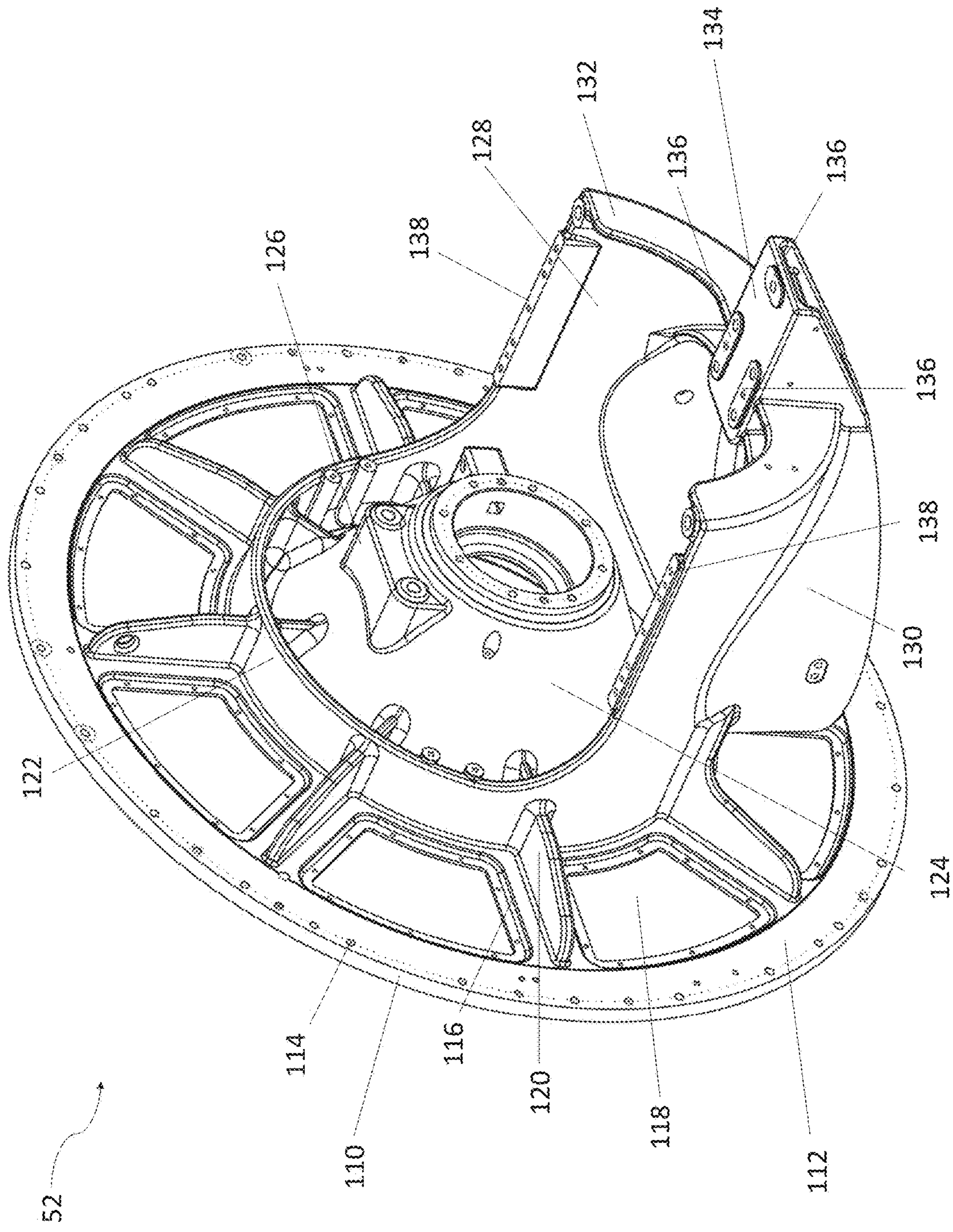
FIG. 5C is an isometric view of the rear chassis of the stator assembly.
Figure 5D:
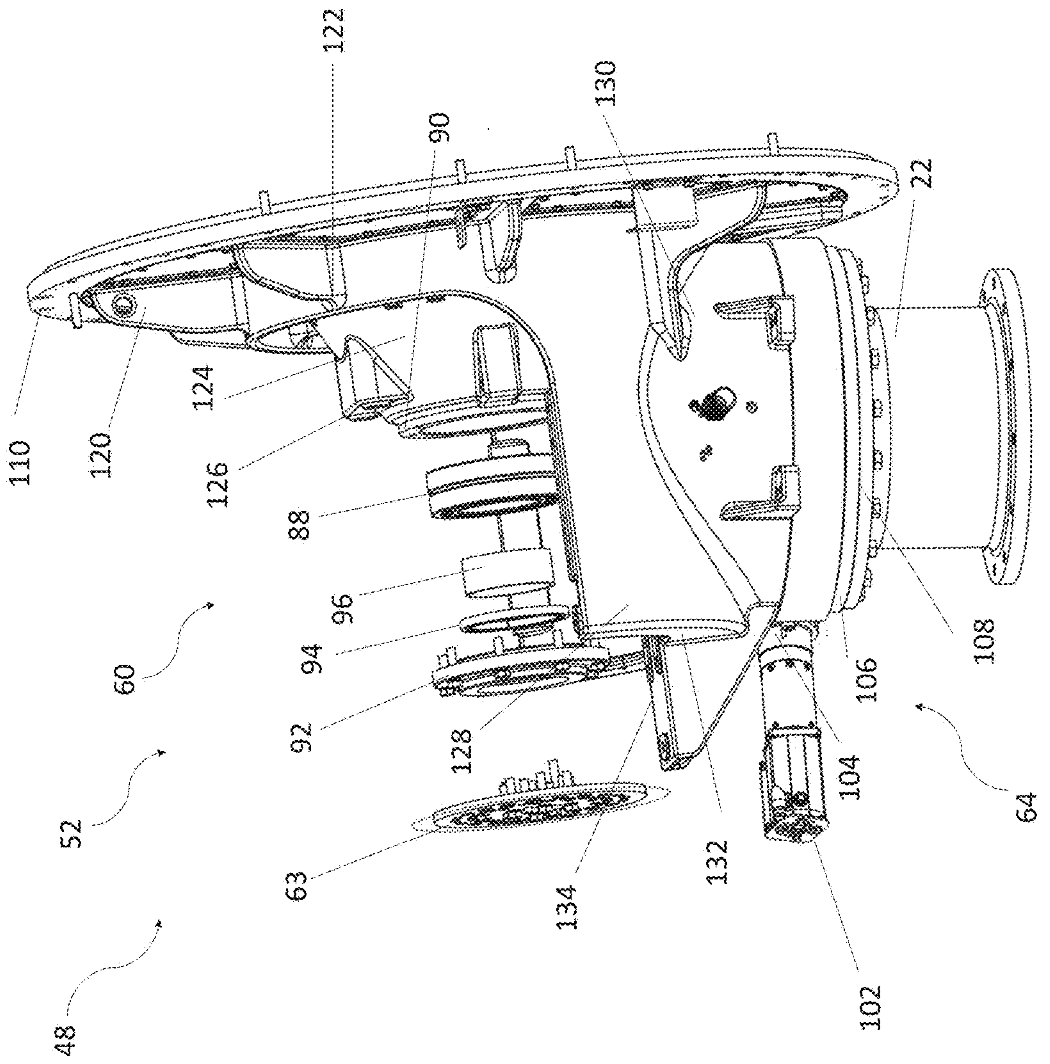
FIG. 5D is an exploded side view of the rear chassis showing the rear bearing assembly and a yaw drive system.
Figure 5E:
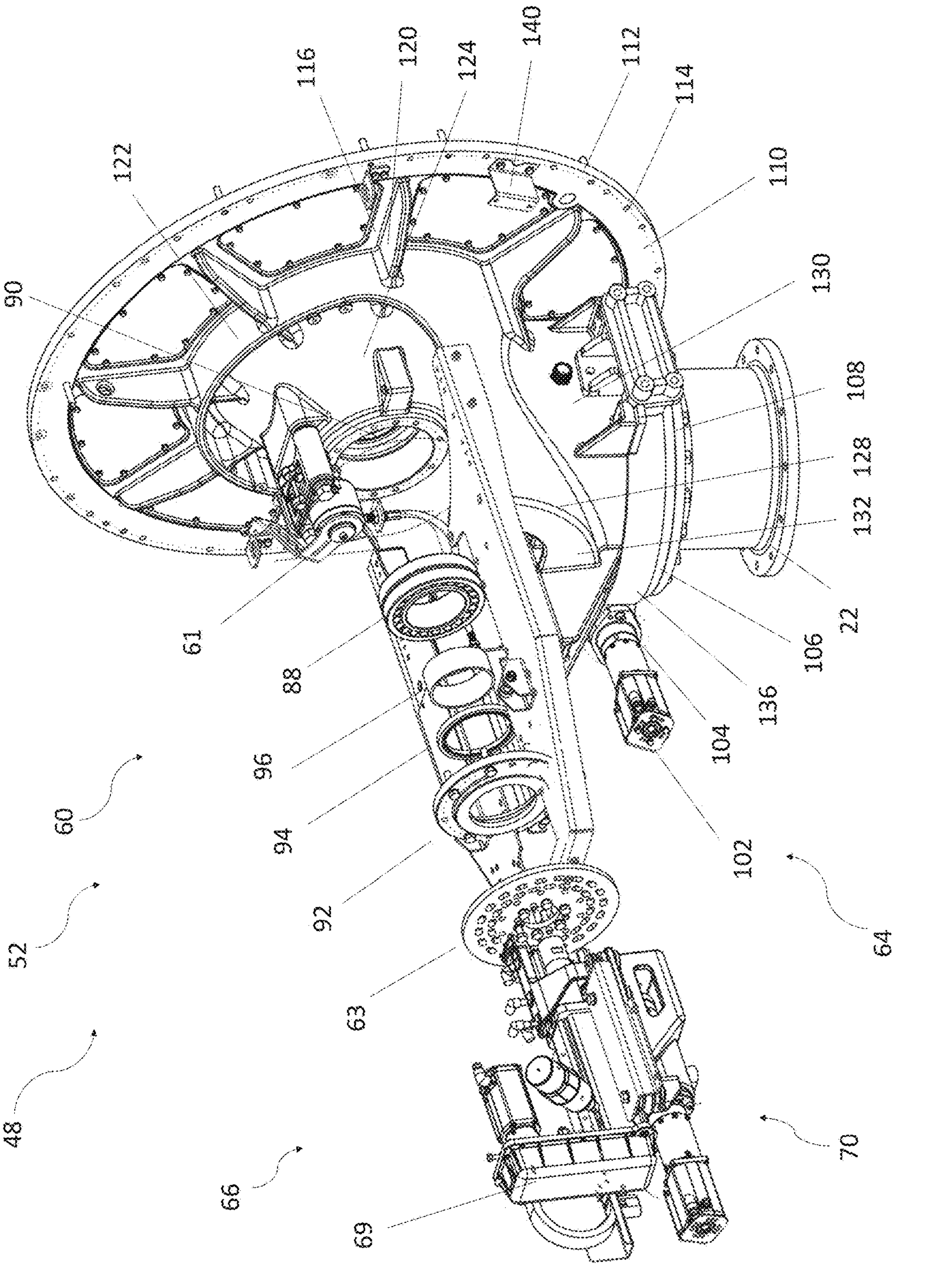
FIG. 5E an exploded isometric view of the rear chassis showing the rear bearing assembly, the yaw drive system, and a portion of a blade trim actuator system.

FIG. 5A is an exploded isometric view of generator 14 showing stator assembly 48 and rotor assembly 50. FIG. 5B is an isometric view of stator ring 56 of stator assembly 48. FIG. 5C is an isometric view of rear chassis 52 of stator assembly 48. FIG. 5D is an exploded side view of rear chassis 52 showing rear bearing assembly 60 and yaw drive system 64. FIG. 5E is an exploded isometric view of rear chassis 52 showing rear bearing assembly 60, yaw drive system 64, and a portion of blade trim actuator system 66. FIGS. 5A-5E will be discussed together.

Wind turbine nacelle 10 includes generator 14, stub mast 22, rear bearing assembly 60, service brake 61, front bearing assembly 62 (shown in FIG. 5A), brake service disc 63, yaw drive system 64, connection plate 65 (shown in FIG. 5A), blade trim actuator system 66 (shown in FIG. 5E), which includes electromechanical pitch actuator 69, and fail-safe system 70. Generator 14 includes stator assembly 48 and rotor assembly 50. Stator assembly 48 includes rear chassis 52, front chassis 54, stator ring 56 (which includes ring mounting holes 71), which make up frame 58, outer cooling fins 72, stator windings 74, and stator winding insulation 76. Rotor assembly 50 includes rotor generator shaft 78 (having rear end 78R and forward end 78F) and rotor 79, which includes rotor hub 80, rotor spokes 82, rotor ring 84, and rotor permanent magnet array 86.

Rear bearing assembly 60 (shown in FIGS. 5D and 5E) includes rear bearing 88 (positioned in rear bearing housing 90), rear seal plate 92, rear seal 94, and sleeve 96. Front bearing assembly 62 includes front bearing 97 (positioned in front bearing housing 98) and front seal plate 100. Yaw drive system 64 includes motor 102, yaw worm drive 104, yaw bearing 106, and yaw brake assembly 108.

Rear chassis 52 includes circular mounting flange 110, circular rib 112, flange mounting holes 114, radial struts 116, apertures 118, stiffeners 120, inner ring 122, rear cone 124, service brake mount 126, half-pipe section 128, cylindrical neck section 130, rear end wall 132, actuator support platform 134, mounting pads 136, and side mounts 138, mounting brackets 140, and mounting pads 141. Front chassis 54 includes circular mounting flange 142, circular rib 144, flange mounting holes 146, radial struts 148, apertures 150, stiffeners 152, front cone 154, inner ring 156, and mounting brackets 158.

Stator assembly 48 of generator includes rear chassis 52 at rear portion, front chassis 54 at a front portion, and stator ring 56 between rear chassis 52 and front chassis 54. Stator ring 56 is connected to rear chassis 52 and front chassis 54. Rear chassis 52, front chassis 54, and stator ring 56 form frame 58 of wind turbine nacelle 10. Stator ring 56 surrounds rotor assembly 48. Rear bearing assembly 60 is mounted to a rear portion of rear chassis 52. Service brake 61 is connected to rear chassis 52. Front bearing assembly 62 is mounted to a front portion of front chassis 54. Brake service disc 63 contacts service brake 61. Yaw drive system 64 is mounted to a stub mast 22 and the bottom of rear chassis 52. Yaw drive system 64 is connected between he bottom of frame 58 and stub mast 22. Connection plate 65 is forward of front chassis 54 and contacts a front surface of front chassis 54. Blade trim actuator system 66 has pitch shaft assembly 68 that extends from a forward portion of wind turbine nacelle 10, through generator 14, and connects to electromechanical pitch actuator 69 at a rear portion of wind turbine nacelle 10. Fail safe system 70 is connected to a bottom of electromechanical pitch actuator 69, mounted on rear chassis 52.

Stator ring 56 has ring mounting holes 71 extending axially through stator ring 54. Outer cooling fins 72 are connected and perpendicular to an outer surface of stator ring 56. Cooling fins 72 extend around an entire circumference of stator ring 56. Stator ring 56 has a plurality of circumferentially spaced cooling fins 72 on the outer surface of stator ring 56. Stator windings 74 are fixed coils, or electrical windings, that are mounted on the inner surface, at an inner diameter, of stator ring 56. Stator winding insulation 76 is between stator windings 74 on the inner diameter of stator ring 56. Rotor assembly 50 has rotor generator shaft 78 that extends from rotor 79 such that rotor 79 is mounted on rotor generator shaft 78. Rotor generator shaft 78 extends out from rotor hub 80 of rotor 79. Rotor 79 is within stator ring 56, such that stator ring 56 surrounds rotor 79. Rotor generator shaft 78 extends through front chassis 52, stator ring 56, and rear chassis 54 of stator assembly 48. Rotor generator shaft 78 has rear end 78R at the back end and forward end 78F at the front end. A bore extends through a center of rotor generator shaft 78 from rear end 78R to forward end 78F. Service brake disc 63 is mounted to rear end 78R of rotor generator shaft 78. Forward end 78F extends through rotor hub 80. Rotor generator shaft 78 extends axially from rotor hub 80 to connect to rotor hub and blade pitch system 16 via connection plate 65, which is at forward end 78F of rotor generator shaft 78. Rotor spokes 82 are connected to a circumference of rotor hub and extend radially from rotor hub 80 to connect to rotor ring 84. As such, rotor ring 84 is concentric with rotor hub 80. Rotor ring 84 is an outer ring of rotor assembly 48 and supports rotor permanent magnet array 86. Rotor permanent magnet array 86 comprises magnets mounted on an outer surface of rotor ring 84 opposite and separated, or spaced by, an air gap from stator windings 74. Rotor permanent magnet array 86 faces stator windings 74 on an inner surface of stator ring 54 as stator ring surrounds rotor ring 84.

Rear bearing assembly 60 is housed, or mounted, in rear chassis 52 and supports rear end 78R of rotor generator shaft 78. Rear bearing assembly 60 has rear bearing 88 mounted in rear bearing housing 90. Rear bearing assembly 60 supports rear end 78R of rotor generator shaft 78, which extends through rear bearing assembly 60. Rear bearing housing 90 is within, or formed in, rear chassis 52. Rear end 78R of rotor generator shaft 78 extends through rear bearing 88. Rear seal plate 92 connects to rear bearing housing 90 to enclose rear bearing 88 within rear chassis 52. Rear seal 94 is between rear bearing 88 and rear seal plate 92. Sleeve 96 is positioned within rear bearing 88 and fits around rotor generator shaft 78. Front bearing assembly 62 supports forward end 78F of rotor generator shaft 78, which extends through front bearing assembly 62. Front bearing assembly 62 is housed, or mounted, in front chassis 54 and supports forward end 78F of rotor generator shaft 78. Front bearing assembly 62 has front bearing 97 mounted in front bearing housing 98. Front bearing assembly 62 supports forward end 78F or rotor generator shaft 78, which extends through front bearing assembly 62. Front bearing housing 98 is within, or formed in, front chassis 54. Forward end 78F of rotor generator shaft 78 extends through front bearing 97. Front seal plate 100 is connected to front bearing housing 98 of front chassis 54 to enclose front bearing 97 within front chassis 54. Front seal plate 100 is between front chassis 54 and connection plate 65. Connection plate 65 connects forward end 78F of rotor generator shaft 78 to rotor head and blade pitch system 16.

Yaw drive system 64 is mounted on rear chassis 52. Motor 102 of yaw drive system 64 is connected to a yaw worm drive 104. Motor 102 powers yaw worm drive 104. Yaw bearing 106 is connected to yaw worm drive 104 to rotate and rear chassis 52. As such, yaw drive system 64 rotates frame 58 wind turbine nacelle 10 about a vertical axis V or "V-axis," which passes through the center of stub mast 22 and tower T (shown in FIGS. 1B-2B), to control orientation of generator 14 with respect to wind direction. Yaw drive system 64 orients wind turbine nacelle 10 so that blades 18 of rotor head and blade pitch system 16 are aligned with the ever-changing wind direction. Yaw brake assembly 108 is positioned within yaw bearing 106 and connected to rear chassis 52.

Circular mounting flange 110 is an outer portion of rear chassis. Circular rib 112 is a flange around the periphery of circular mounting flange 110 of rear chassis 52. Circular rib 112 is an outer portion of rear chassis 52. Flange mounting holes 114 are holes that extend axially through circular mounting flange 110. Flange mounting holes 114 align with ring mounting holes 71 of stator ring 56. Radial struts 116 of rear chassis 52 are connected to and extend radially in from circular mounting flange 110. Apertures 118 are spaces between radial struts 116. Stiffeners 120 extend out from radial struts 116 and are connected to inner ring 122 on one end. Inner ring 122 is concentric with circular mounting flange 110 and is radially inward from circular mounting flange 110. Radial struts 116 are connected to inner ring 122. Rear cone 124 is connected to an inner diameter of inner ring 122 and extends rearward from inner ring 122, and thus circular mounting flange 110. As such, rear cone 124 decreases in diameter as rear cone 124 extends rearward. Rear cone 124 forms rear bearing housing 90. Service brake mount 126 projects out from a top side of rear cone 124 behind inner ring 122. Service brake 61 is mounted on service brake mount 126. Service brake 61 on service brake mount 126 is engaged with service brake disc 63 when rotor assembly 50 is not rotating and is disengaged when rotor assembly 50 is rotating.

Half-pipe section 128 has a half-pipe, or trough, shape. Half-pipe section 128 is connected to and extends rearward from a bottom half of inner ring 122, and therefore rearward from circular mounting flange 110. Half-pipe section 128 has an open top. Cylindrical neck section 130 is a pipelike section that is connected to a bottom of half-pipe section 128. Cylindrical neck section 130 extends downward from half-pipe section 128. Yaw drive system 64 is connected to cylindrical neck section 130. Yaw drive system 64 is positioned between stub mast 22 and cylindrical neck section 130 of rear chassis 50. Rear end wall 132 is positioned at a rear end of half-pipe section 128. Actuator support platform is connected to a top of rear end wall 132 on a central portion of rear end wall 132. Mounting pads 136 are positioned on a top surface of actuator support platform 134. Side mounts 138 are positioned on top of the sides of half-pipe section 128. Mounting brackets 140 are attached to and circumferentially spaced along circular rib 112 adjacent circular mounting flange 110. Rear chassis 52 may have any number of mounting brackets 140. Mounting pads 141 are connected to a rear end of one or more mounting brackets 140, as shown in FIG. 5E.

Circular mounting flange 142 is an outer portion of front chassis 54. Circular rib 144 is a rib extending rearward from a center of circular mounting flange 142. Flange mounting holes 146 are holes that extend axially through circular mounting flange 142. Flange mounting holes 146 align with ring mounting holes 71 of stator ring 56 and flange mounting holes 114 of rear chassis 52. Radial struts 148 of front chassis 54 are connected to and extend radially in from circular mounting flange 142. Apertures 150 are spaces between radial struts 148. Stiffeners 152 extend out from radial struts 148. Front cone 154 is connected to an inner diameter of inner ring 156 of front chassis 54 and decreases in diameter as front cone 154 extends forward. Front cone 154 forms front bearing housing 98. Inner 156 is concentric with circular mounting flange 142. Radial struts 148 are connected to inner ring 156. The ends of stiffeners 152 are connected to inner ring 156. Mounting brackets 158 are attached to and circumferentially spaced along a forward surface of circular mounting flange 142. Front chassis 54 may have any number of mounting brackets 158.

Generator 14 is responsible for electrical power generation. Stator windings 74 are assembled to an inner surface of stator ring 56. Rotor generator shaft 78 is coupled by rotor hub 80 and rotor spokes 82 to rotor ring 84. Rotor permanent magnet array 86 is mounted on the outer surface of rotor ring 84 to interact with stator windings 74. Rotation of rotor generator shaft 78 by rotor head and blade pitch system 16 generates electrical power as rotor permanent magnet array 68 rotates past stator windings 74.

Rotor head and blade pitch system 16 is designed to carry blades 18, which are clamped into blade holders 39. Rotor head and blade pitch system 16 controls rotation speed of blades 18 to maximize energy from variable wind speeds. Rotor head and blade pitch system 16 is also used to rotate blades 18 to a stall condition. Rotor head and blade pitch system 16 is mounted on rear chassis 52.

Rotor generator shaft 78 has rotor 79, front bearings 62, front chassis 54, stator ring 56, rear chassis 52, and rear bearing assembly 60 mounted on rotor generator shaft 78. Stator ring 56 has ring mounting holes 71 that align with flange mounting holes 114 of rear chassis 52 and flange mounting holes 146 of front chassis 54. Fasteners, such as bolts or screws, can be used with ring mounting holes 71, flange mounting holes 114, and flange mounting holes 146 to join rear chassis 52, front chassis 54, and stator ring 56 together to form frame 58. Spaced mounting brackets 140 provide attachment sites for mounting top rear outer cover 24 and bottom rear outer cover 26 (shown in FIGS. 2A, 2B, 2D, 2E, 2F, and 3A). Mounting brackets 158 are circumferentially spaced and attached to a front surface of circular mounting flange 142 of rear chassis 52 to provide attachment sites for mounting top front outer cover 28 and bottom front outer cover 30 (shown in FIGS. 2A, 2B, 2C, 2E, and 2F).

Frame 58 provides structural support for the components of wind turbine nacelle 10, including housing 12, generator 14, rotor head and blade pitch system 16, wind sensing system 20, stub mast 20, cooling fins 72, blade holders 39, and blades 18. Frame 58 centers the mass of wind turbine nacelle 10 over the center of tower T. Frame 58 of wind turbine nacelle 10 is the main structural component of generator 14, allowing generator 14 to be built directly onto rear chassis 52. Because rotor generator shaft 78 carries front bearing assembly 62, rotor assembly 50, and stator chassis 48, tighter manufacturing tolerances are achieved, allowing generator 14 to have a small gap between stator windings 74 and rotor permanent magnet array 86, which enhances electrical generation efficiency.

Figure 6:
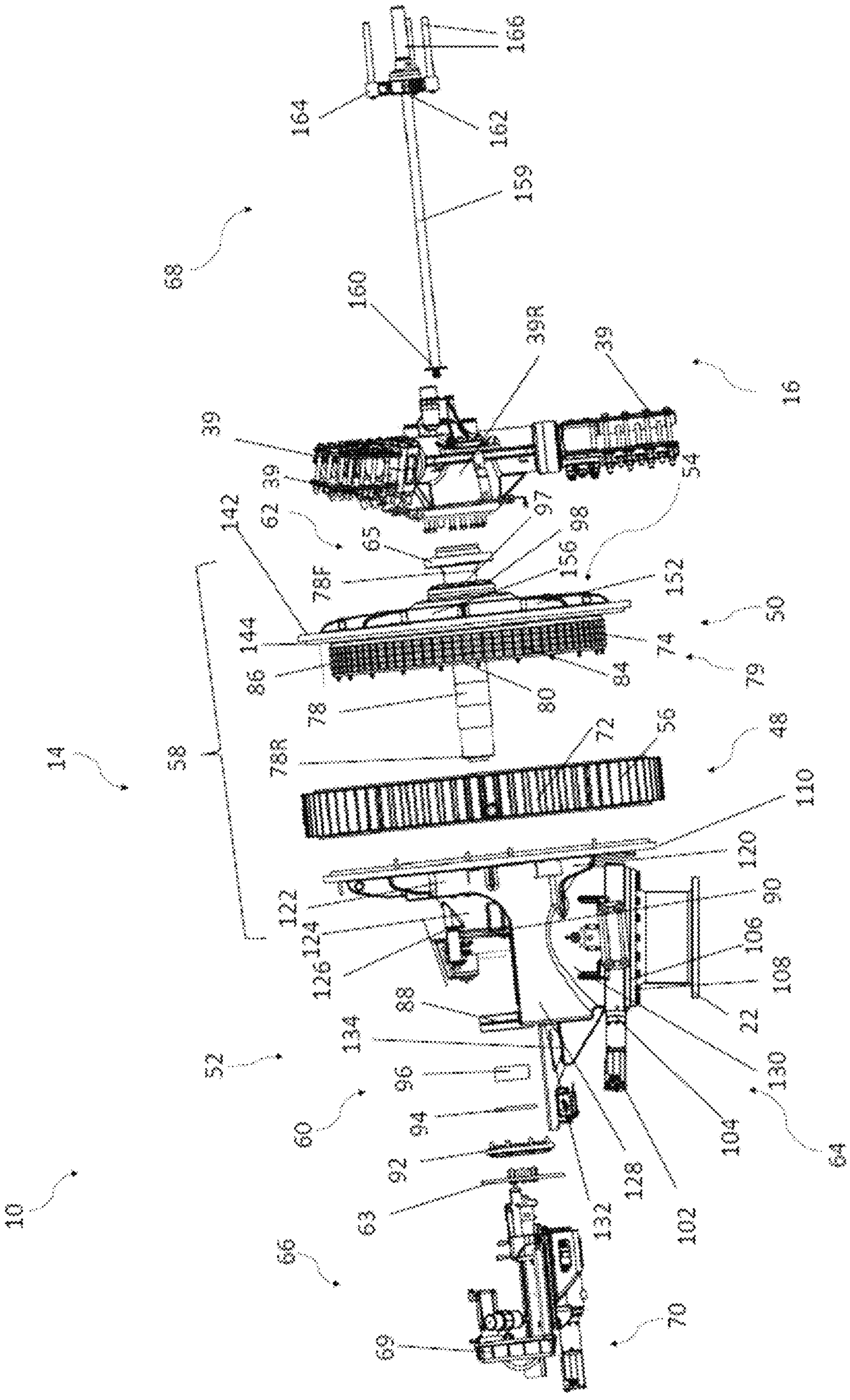
FIG. 6 is an exploded side view of the wind turbine nacelle with the housing removed, showing blade trim actuator system and overspeed fail safe system.
Figure 7:
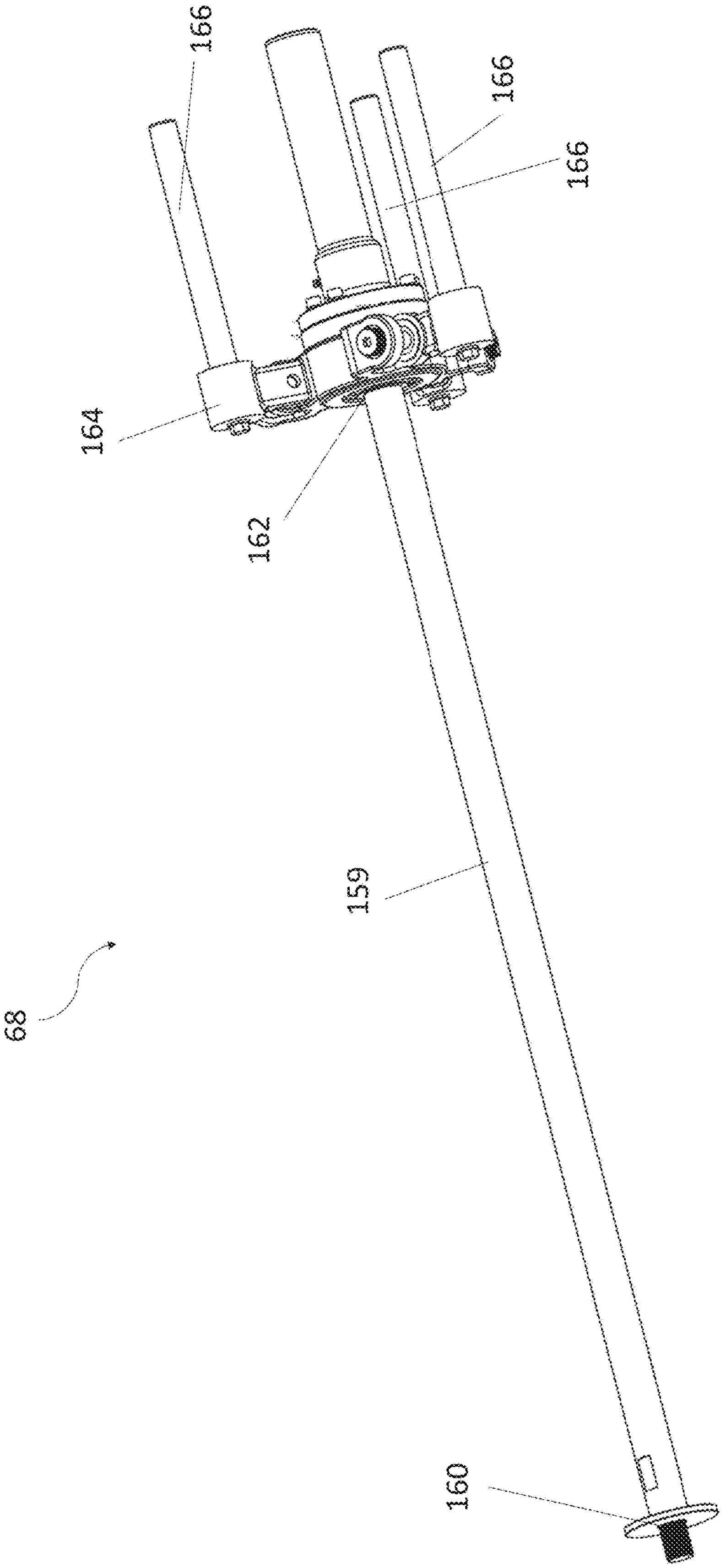
FIG. 7 is an isometric view of the pitch shaft assembly.

FIG. 6 is an exploded side view of wind turbine nacelle 10 with housing 12 removed, showing blade trim actuator system 66 and fail-safe system 70. FIG. 7 is an isometric view of pitch shaft assembly 68.

Wind turbine nacelle 10 includes generator 14, rotor head and blade pitch system 16, stub mast 22, rear bearing assembly 60, service brake 61, front bearing assembly 62, brake service disc 63, yaw drive system 64, connection plate 65, blade trim actuator system 66, which includes pitch shaft assembly 68, electromechanical pitch actuator 69, and fail-safe system 70. Generator 14 includes stator assembly 48 and rotor assembly 50. Rotor head and blade pitch system 16 includes blade holders 39 and rotor head 39R. Stator assembly 48 includes rear chassis 52, front chassis 54, stator ring 56 (which includes ring mounting holes 71), which make up frame 58, outer cooling fins 72, stator windings 74, and stator winding insulation 76. Rotor assembly 50 includes rotor generator shaft 78 (having rear end 78R and forward end 78F) and rotor 79, including rotor hub 80, rotor spokes 82, rotor ring 84, and rotor permanent magnet array 86.

Rotor head 39R of rotor head and blade pitch system 16 is connected to forward end 78F of rotor generator shaft 78 via connection plate 65. As such, rotor generator shaft 78 supports rotor head and blade pitch system 16. Rotation of rotor head 39R via blades 18 causes rotation of rotor generator shaft 78.

Rear bearing assembly 60 includes rear bearing 88 (positioned in rear bearing housing 90), rear seal plate 92, rear seal 94, and sleeve 96. Front bearing assembly 62 includes front bearing 97 (positioned in front bearing housing 98), and front seal plate 100. Yaw drive system 64 includes motor 102, yaw worm drive 104, yaw bearing 106, and yaw brake assembly 108. Rear chassis 52 includes circular mounting flange 110, circular rib 112, flange mounting holes 114, radial struts 116, apertures 118, stiffeners 120, inner ring 122, rear cone 124, service brake mount 126, half-pipe section 128, cylindrical neck section 130, rear end wall 132, actuator support platform 134, mounting pads 136, and side mounts 138, mounting brackets 140, and mounting pads 141. Front chassis 54 includes circular mounting flange 142, circular rib 144, flange mounting holes 146, radial struts 148, apertures 150, stiffeners 152, front cone 154, inner ring 156, and mounting brackets 158.

Pitch shaft assembly 68 includes shaft 159, rear end 160, forward end 162, pitch head 164, and guide rods 166.

Blade trim actuator system 66 is mounted on rear chassis 52 and connected to rear end 160 of shaft 159 of pitch shaft assembly 68. Pitch shaft assembly 68 is connected between the forward end of electromechanical pitch actuator 69, extends through rotor generator shaft 78, and connects at its forward end to rotor hub and blade pitch system 16. Fail-safe system 70 is attached to electromechanical pitch actuator. Fail-safe system 70 has backup battery power.

Pitch shaft assembly 68 has shaft 159 that extends through the bore in rotor generator shaft 78, through front bearing assembly 62, front chassis 54, stator ring 56, rear chassis 52, and rear bearing assembly 60. Shaft 159 has rear end 160 at one end and forward end 162 at the other end. Rear end 160 is connected to electromechanical pitch actuator 69. Forward end 162 is connected to pitch head 164, which as guide rods 166 extending out of pitch head 164 to give pitch shaft assembly 68 a trident-like shape. Blade holders 39 are connected to pitch shaft assembly 68 at pitch head 164.

Blade trim actuator system 66 operates electromechanical pitch actuator 69 and pitch shaft assembly 68 to control pitch of blades 18. Electro-mechanical electromechanical pitch actuator 69 is designed to move pitch shaft assembly 68 forward and backward under load. Forward linear movement of pitch shaft assembly 68 causes rotation of blade holders 39, and therefore blades 18, to increase rotational speed of generator 14. Rearward linear movement of pitch shaft assembly 68 by blade trim actuator system 66 causes rotation of blade holders 39 to rotate blades 18 in an opposite direction to decrease rotational speed of generator 14. Linear movement of pitch head 164 is converted to rotational movement of blade holders 39 and blades 18 to control rotational speed of wind turbine nacelle 10. Fail safe system 70 moves forward and back under extreme load. Fail-safe system 70 operates rotor hub and blade pitch system 16 using blade trim actuator system 66 coupled to pitch shaft assembly 68. In the event of an emergency, fail-safe system 70 is designed to pull electromechanical pitch actuator 69 and coupled pitch shaft assembly 68 rearward, causing blades 18 to rotate into a stall condition.

Figure 8A:
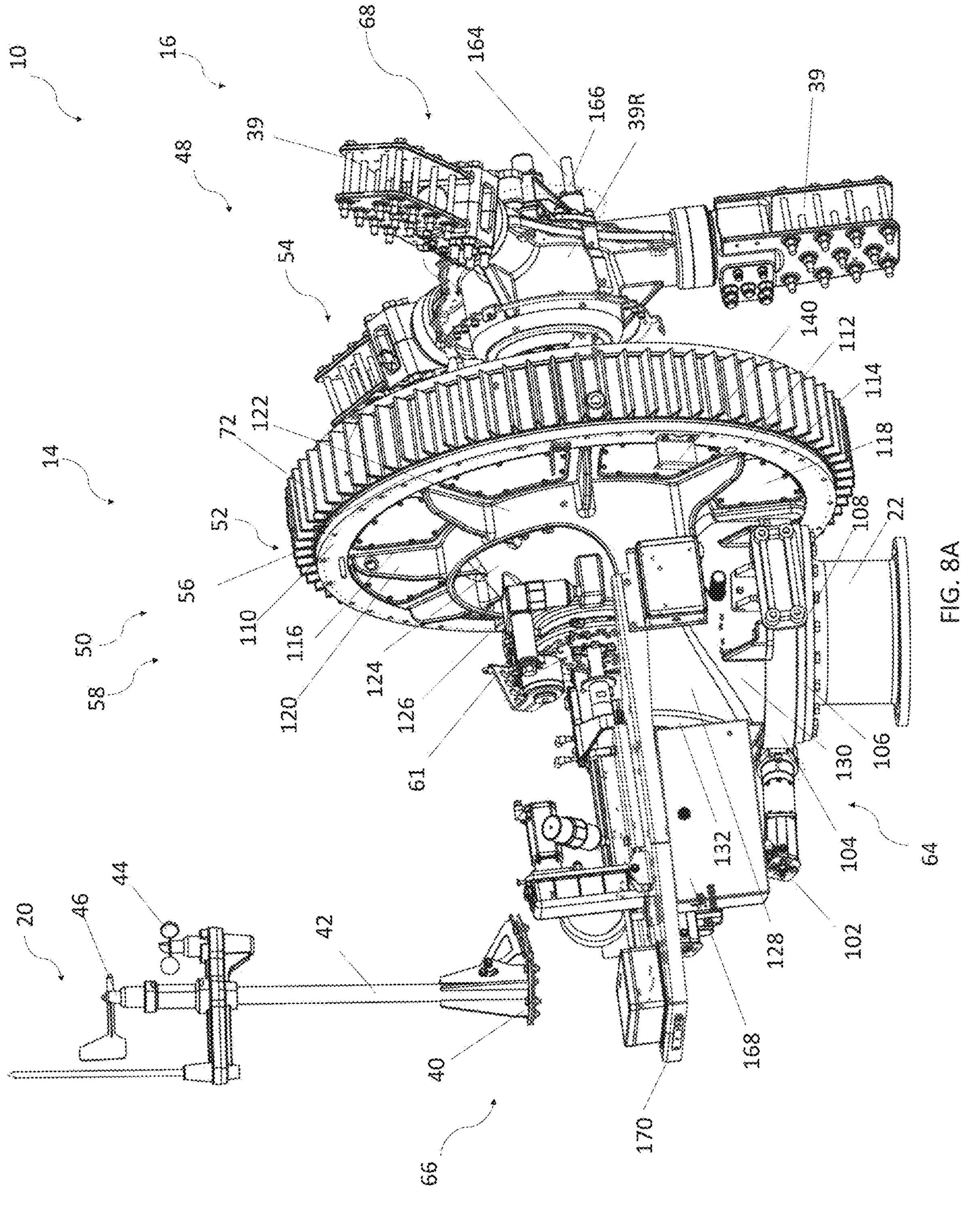
FIG. 8A is an isometric view from a left side of the wind turbine nacelle with the housing removed showing the controller.
Figure 8B:
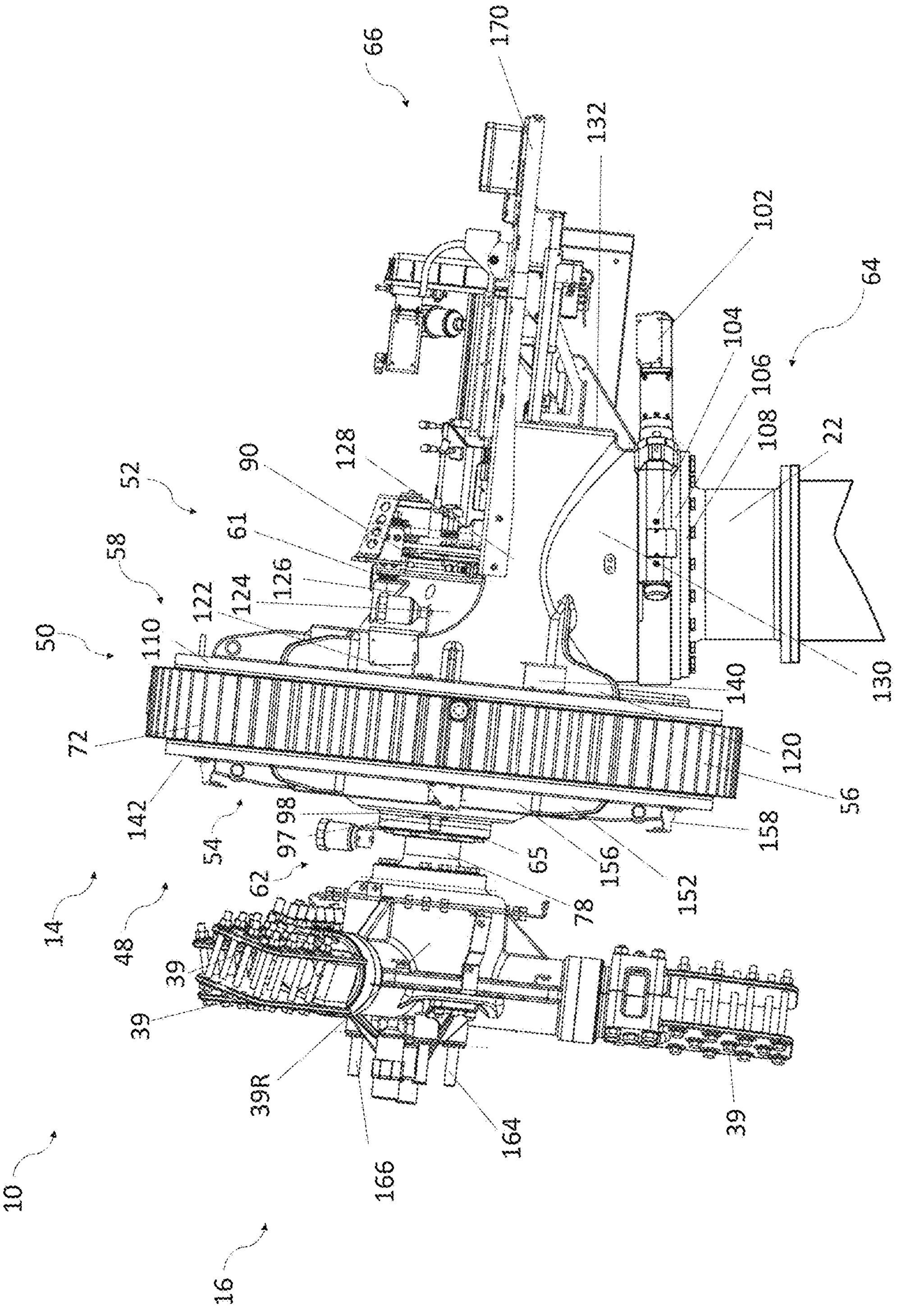
FIG. 8B is a left side view of the wind turbine nacelle with the housing removed, and with the nacelle mounted on an upper end of a tower.
Figure 8C:
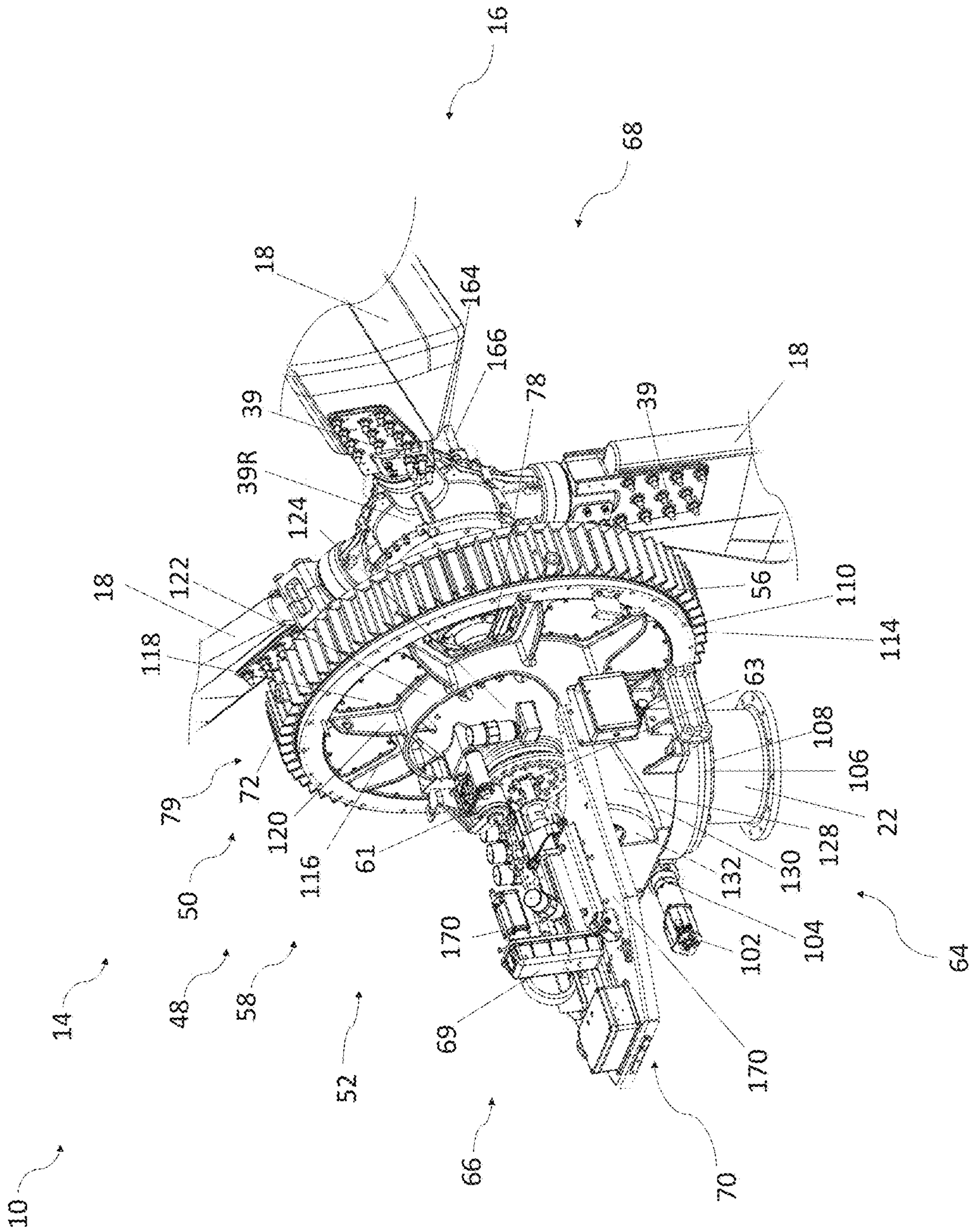
FIG. 8C is an isometric view from a right side showing internal components of the wind turbine nacelle with the housing removed and with blades attached.
Figure 8D:
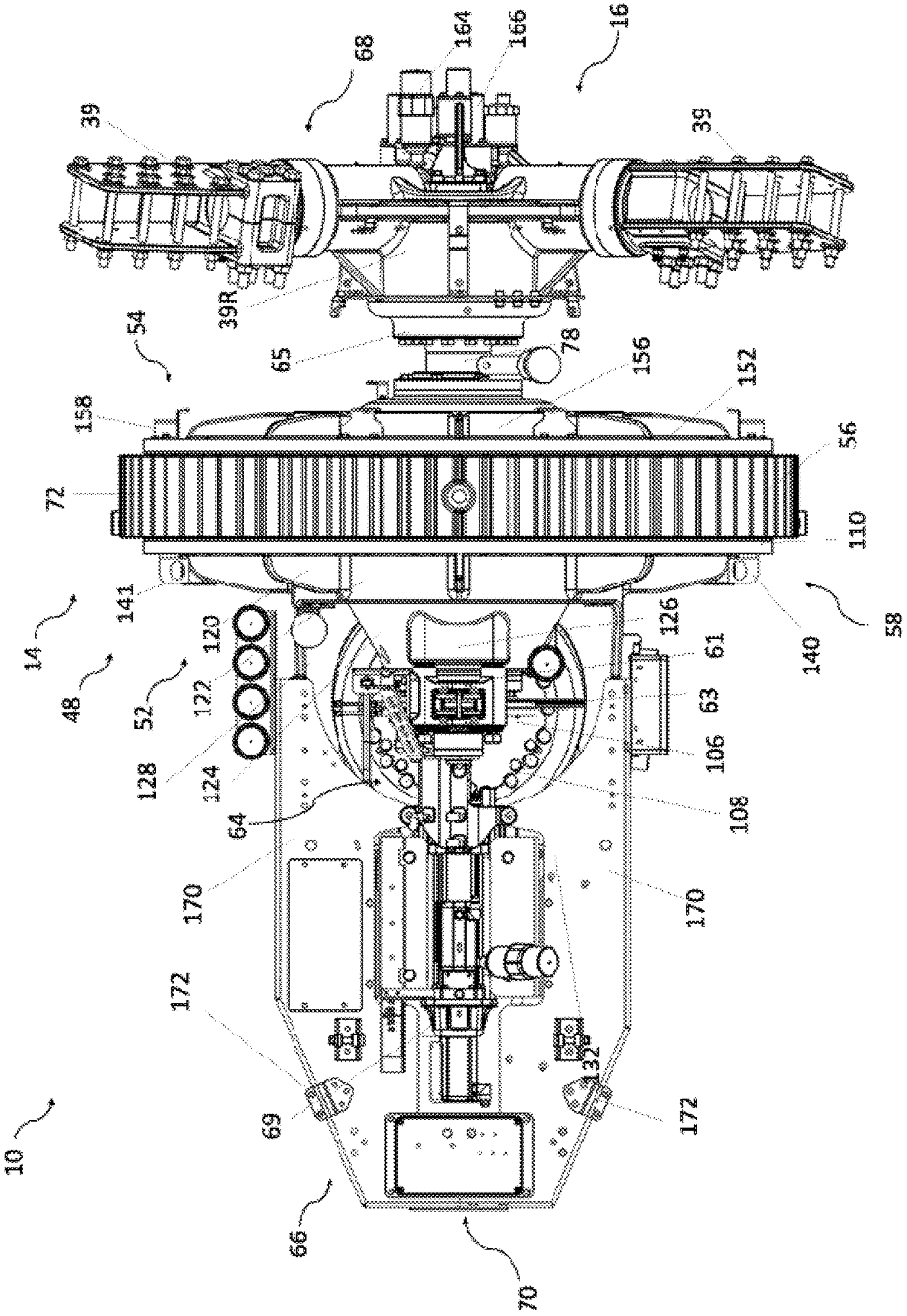
FIG. 8D is a top view of the wind turbine nacelle with the housing removed.
Figure 8E:
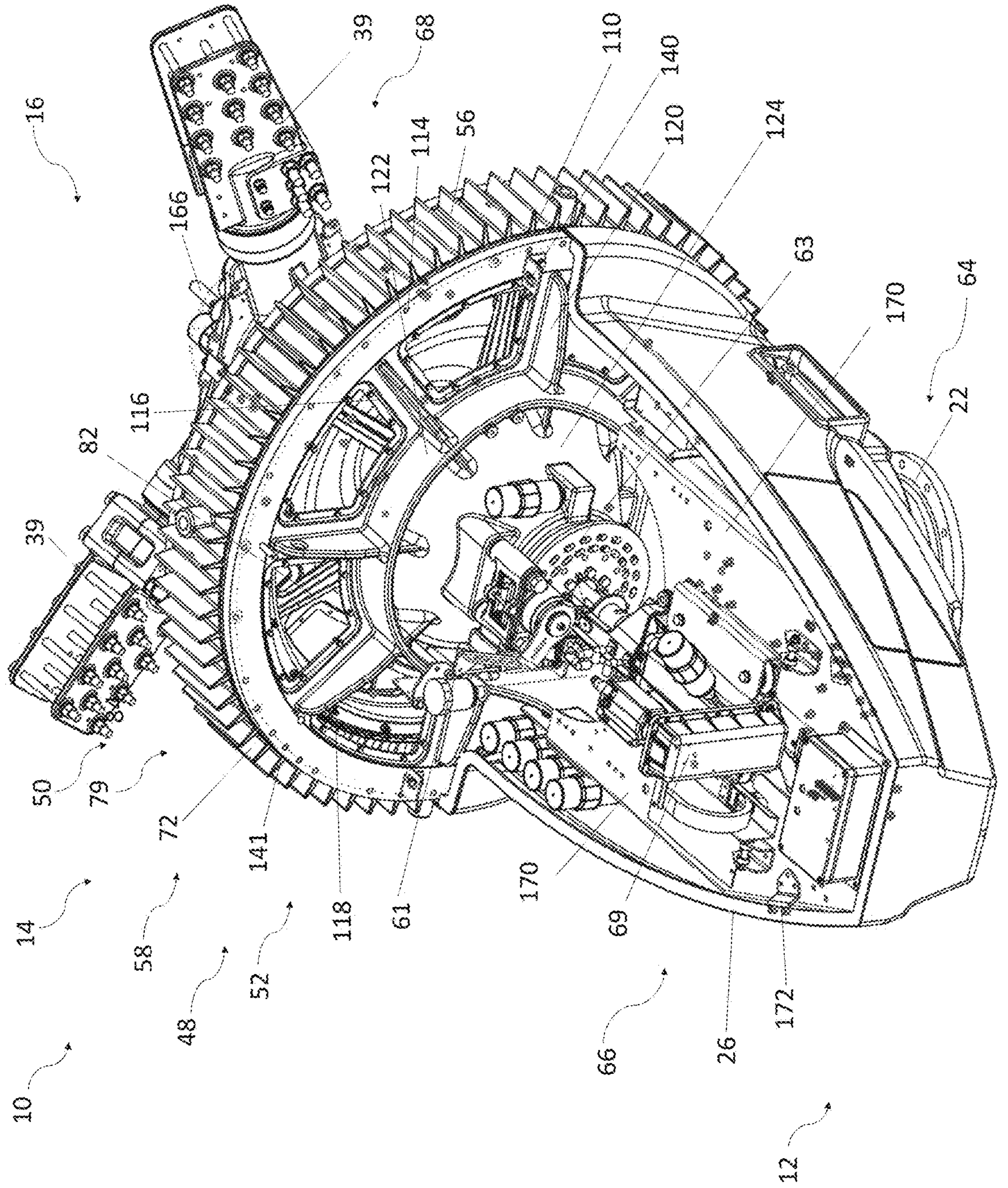
FIG. 8E is an isometric view from the right and rear side of the wind turbine nacelle with housings removed except for a bottom rear outer cover.

FIG. 8A is an isometric view from a left side of wind turbine nacelle 10 with housing 12 removed showing controller 168. FIG. 8B is a left side view of wind turbine nacelle 10 with housing 12 removed, and with wind turbine nacelle 10 mounted on an upper end of tower T. FIG. 8C is an isometric view from a right side showing internal components of wind turbine nacelle 10 with housing 12 removed and with blades attached. FIG. 8D is a top view of wind turbine nacelle 10 with housing 12 removed. FIG. 8E is an isometric view from the right and rear side of wind turbine nacelle 10 with housings removed except bottom rear outer cover 26. FIGS. 8A-8E shown assembled views of wind turbine nacelle 10. In FIGS. 8A-8D, housing 12 is removed. In FIG. 8E, housing 12 has been removed except for bottom rear outer cover 26. In FIG. 8A, anemometer 44 and wind vane 46 are also shown. FIGS. 8A-8E will be discussed together.

Wind turbine nacelle 10 includes generator 14, rotor head and blade pitch system 16, stub mast 22, rear bearing assembly 60, service brake 61, front bearing assembly 62, brake service disc 63, yaw drive system 64, connection plate 65, blade trim actuator system 66, which includes pitch shaft assembly 68 and electromechanical pitch actuator 69, fail-safe system 70, controller 168, mounting platforms 170, and brackets 172. Generator 14 includes stator assembly 48 and rotor assembly 50. Rotor head and blade pitch system 16 includes blade holders 39 and rotor head 39R. Stator assembly 48 includes rear chassis 52, front chassis 54, stator ring 56 (which includes ring mounting holes 71), which make up frame 58, outer cooling fins 72, stator windings 74, and stator winding insulation 76. Rotor assembly 50 includes rotor generator shaft 78 (having rear end 78R and forward end 78F), rotor hub 80, rotor spokes 82, rotor ring 84, and rotor permanent magnet array 86.

Rear bearing assembly 60 includes rear bearing 88 (positioned in rear bearing housing 90), rear seal plate 92, rear seal 94, and sleeve 96. Front bearing assembly 62 includes front bearing 97 (positioned in front bearing housing 98), and front seal plate 100. Yaw drive system 64 includes motor 102, yaw worm drive 104, yaw bearing 106, and yaw brake assembly 108. Rear chassis 52 includes circular mounting flange 110, circular rib 112, flange mounting holes 114, radial struts 116, apertures 118, stiffeners 120, inner ring 122, rear cone 124, service brake mount 126, half-pipe section 128, cylindrical neck section 130, rear end wall 132, actuator support platform 134, mounting pads 136, side mounts 138, mounting brackets 140, and mounting pads 141. Front chassis 54 includes circular mounting flange 142, circular rib 144, flange mounting holes 146, radial struts 148, apertures 150, stiffeners 152, front cone 154, inner ring 156, and mounting brackets 158.

Pitch shaft assembly 68 includes shaft 159, rear end 160, forward end 162, pitch head 164, and guide rods 166.

As seen in FIG. 8A, controller 168 is attached to wind turbine nacelle 10. Mounting platforms 170 are mounted to rear chassis 52 at side mounts 138. As seen in FIG. 8B, wind turbine nacelle 10 has two mounting platforms 170. A first mounting platform 170 is mounted on one side of rear chassis 52, and a second mounting platform 170 is mounted on the other side of rear chassis 52. Brackets 172 are attached to rear ends of mounting platforms 170. A first bracket 172 is attached to a rear end of the first mounting platform 170. A second bracket 172 is attached to a rear end of the second mounting platform 170. Mounting brackets 172 are angled with respect to mounting platforms 170 such that mounting brackets 172 are attached to bottom rear outer cover 26, as seen in FIG. 8E. Mounting platforms 170 support electromechanical pitch actuator 69, which is mounted to rear chassis 52 via mounting platforms 170. Mounting brackets 172 help stabilize electromechanical pitch actuator 69 and rear chassis 52.

Yaw Drive System (FIGS. 9-17B; Also See FIGS. 1A-1D, 2A-2E, 5A, 5D, 5E)

Figure 9:
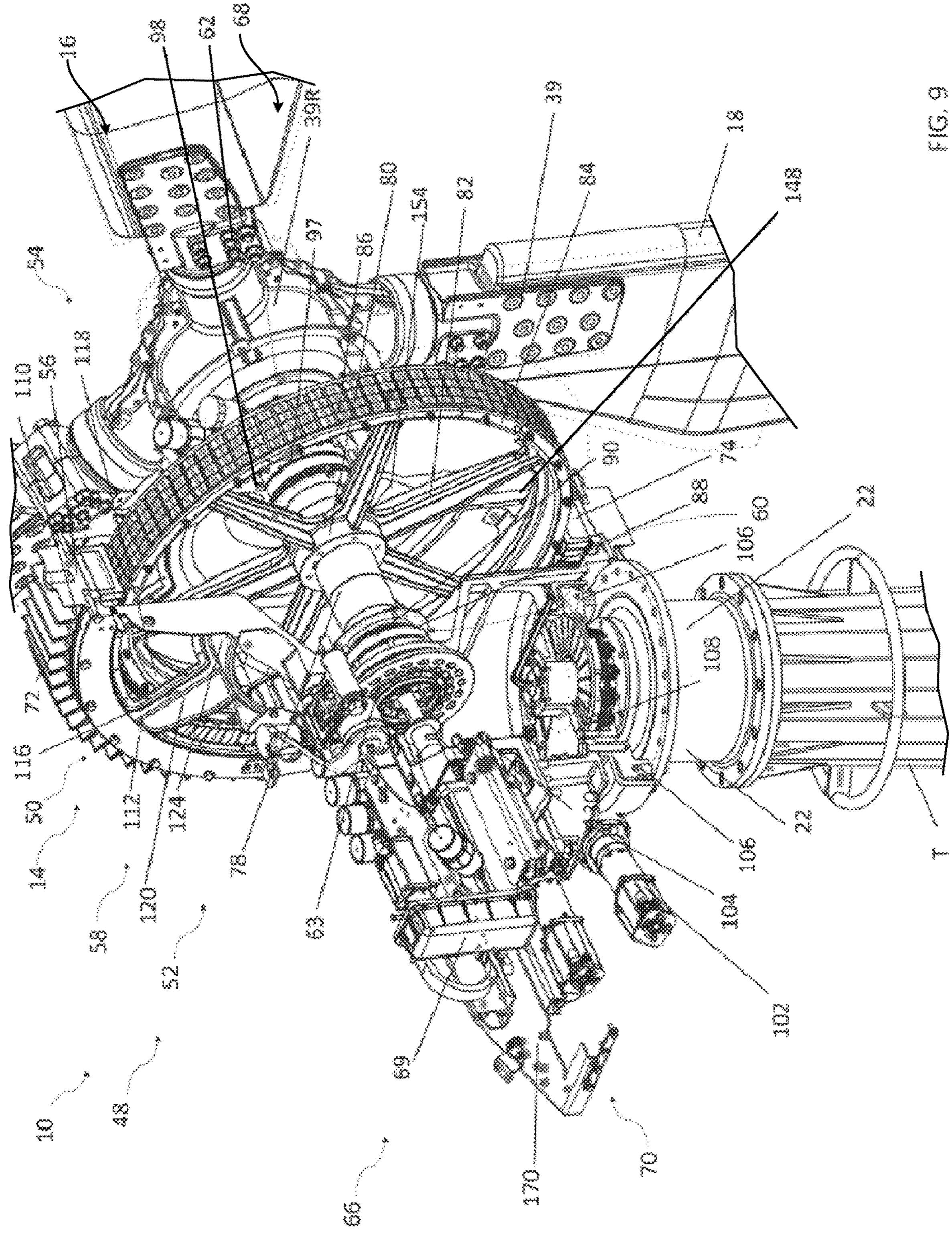
FIG. 9 is a partial cross-sectional orthographic view of the wind turbine nacelle with the housing removed and mounted on a wind turbine tower.
Figure 10A:
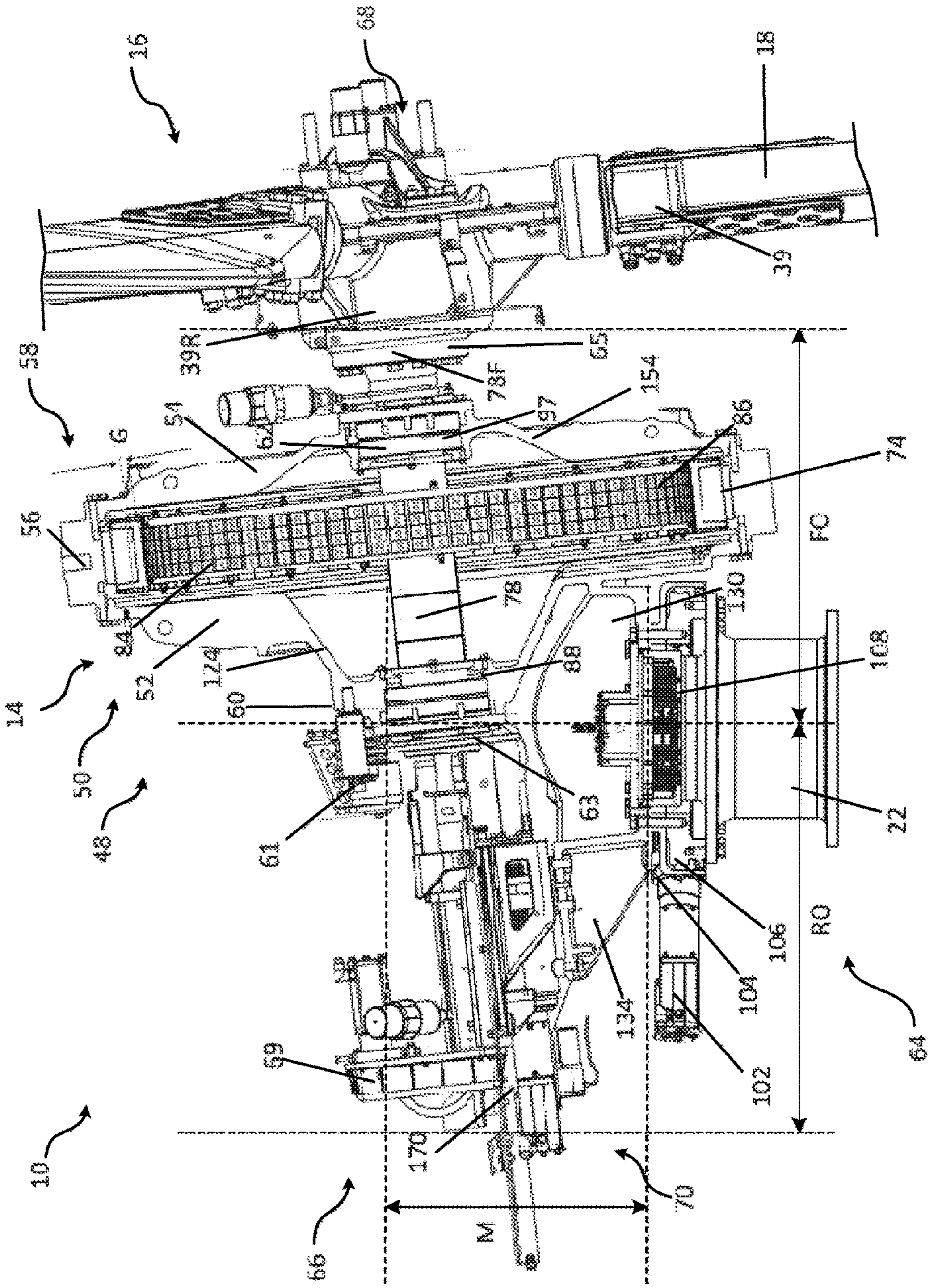
FIG. 10A is a partial cross-sectional side view of the wind turbine nacelle with the housing removed.
Figure 10B:
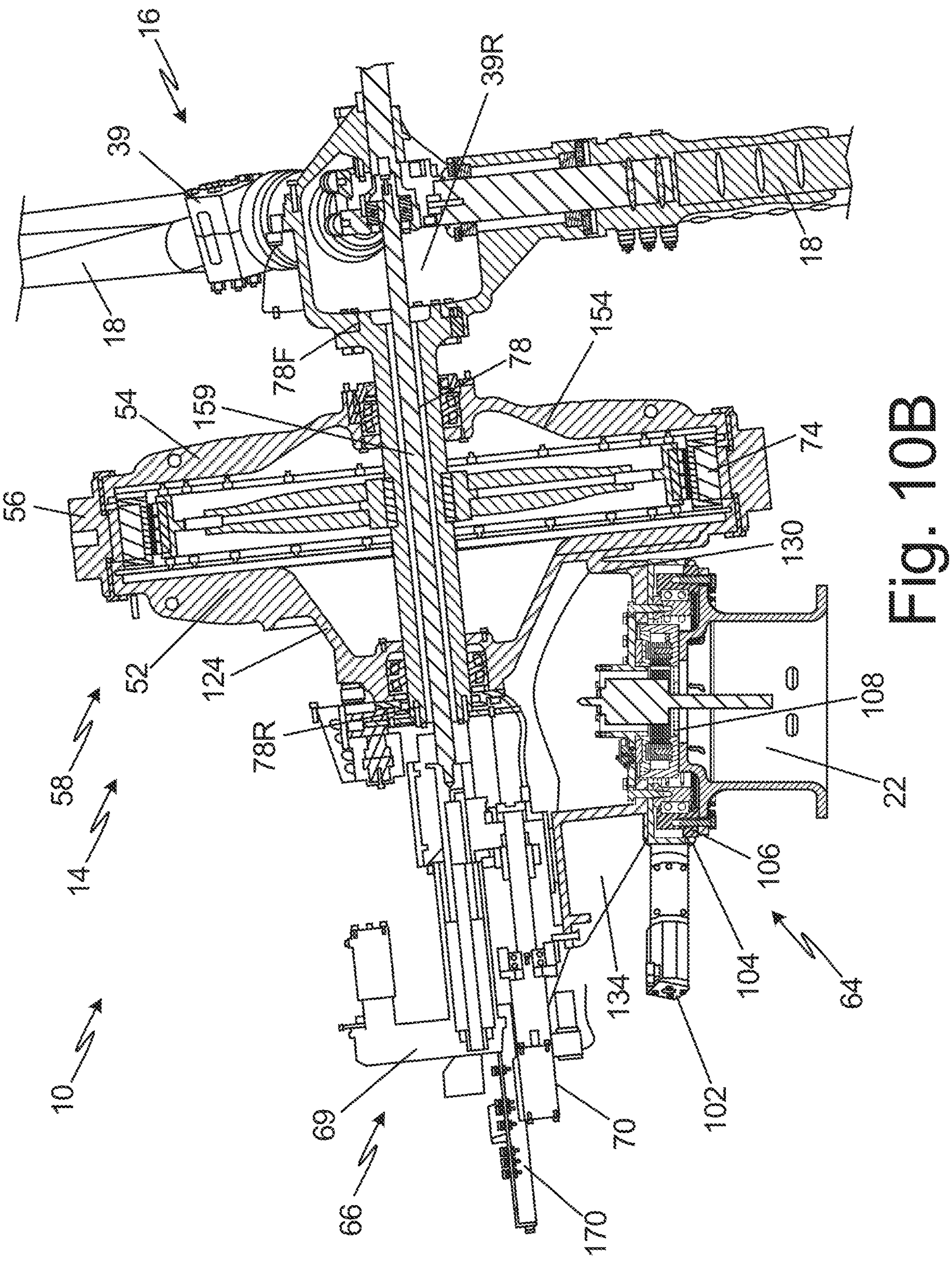
FIG. 10B is a cross-sectional view of the wind turbine nacelle.
Figure 11:
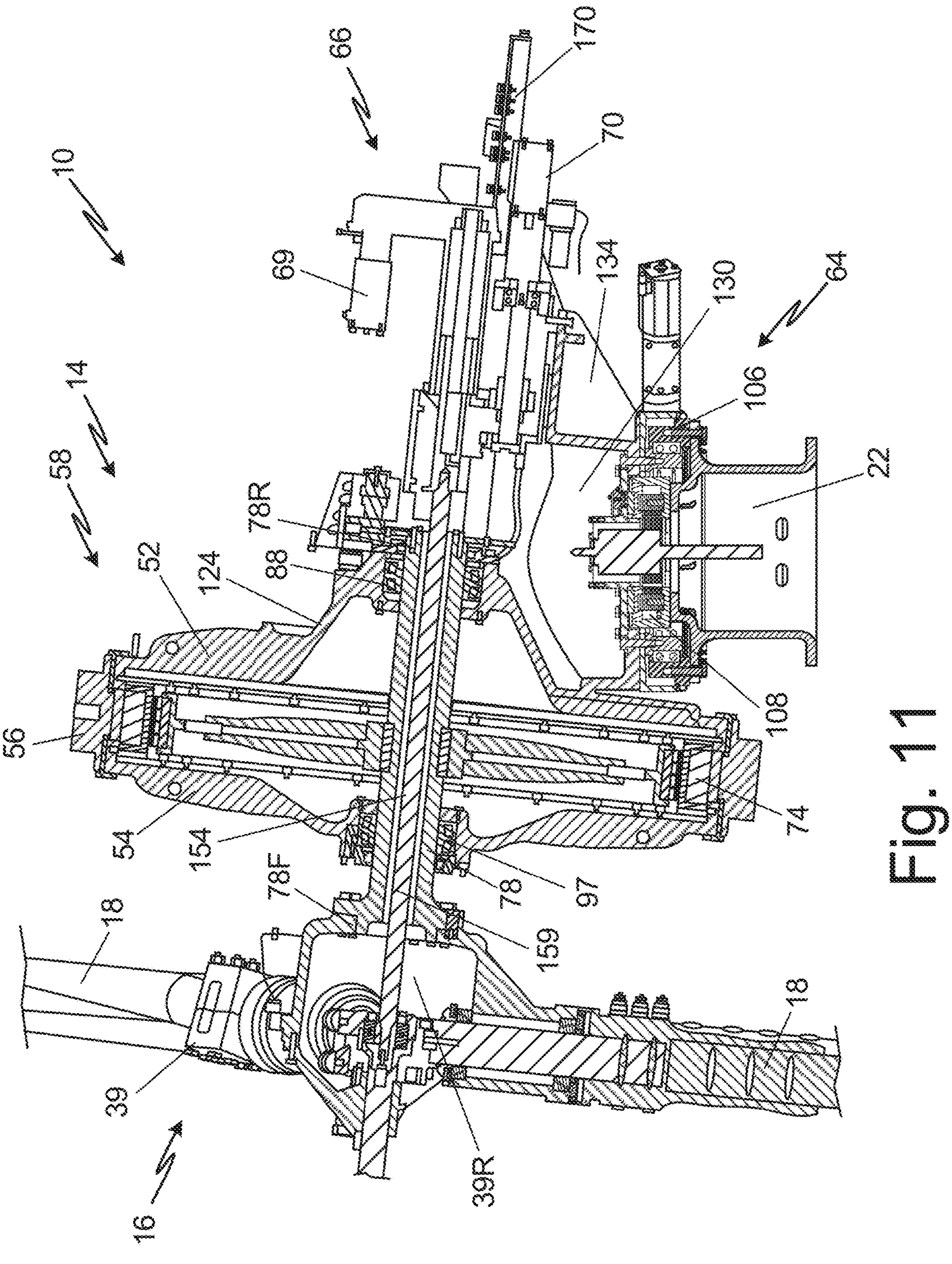
FIG. 11 is a cross-sectional view of the wind turbine nacelle with the housing removed.

FIG. 9 is a partial cross-sectional orthographic view of wind turbine nacelle 10 with housing 12 removed and mounted on wind turbine tower T. FIG. 10A is a partial cross-sectional side view of wind turbine nacelle 10 with housing 12 removed. FIG. 10B is a cross-sectional view of wind turbine nacelle 10. FIG. 11 is a cross-sectional view of wind turbine nacelle 10 with housing 12 removed. FIGS. 9-11 will be discussed together.

Wind turbine nacelle 10 includes housing 12, generator 14, rotor head and blade pitch system 16 (including blades 18), stub mast 22, rear bearing assembly 60, service brake 61, front bearing assembly 62, brake service disc 63, yaw drive system 64, connection plate 65, blade trim actuator system 66, which includes pitch shaft assembly 68 and electromechanical pitch actuator 69, fail-safe system 70, and mounting platforms 170. Generator 14 includes stator assembly 48 and rotor assembly 50. Rotor head and blade pitch system 16 includes blade holders 39 and rotor head 39R. Stator assembly 48 includes rear chassis 52, front chassis 54, stator ring 56 (which includes ring mounting holes 71), which make up frame 58, outer cooling fins 72, and stator windings 74. Rotor assembly 50 includes rotor generator shaft 78 (having rear end 78R and forward end 78F), rotor hub 80, rotor spokes 82, rotor ring 84, and rotor permanent magnet array 86. Also shown in FIG. 9 is wind turbine tower T.

As shown in FIGS. 5D and 5E, rear bearing assembly 60 includes rear bearing 88 (positioned in rear bearing housing 90), rear seal plate 92, rear seal 94, and sleeve 96. Front bearing assembly 62 includes front bearing 97 (positioned in front bearing housing 98), and front seal plate 100 (as shown in FIG. 5A). Yaw drive system 64 includes motor 102, yaw worm drive 104, yaw bearing 106, and yaw brake assembly 108. Rear chassis 52 includes circular mounting flange 110, circular rib 112, flange mounting holes 114, radial struts 116, apertures 118, stiffeners 120, inner ring 122, rear cone 124, service brake mount 126, half-pipe section 128, cylindrical neck section 130, rear end wall 132, actuator support platform 134, and mounting brackets 140. Front chassis 54 includes circular mounting flange 142, circular rib 144, radial struts 148, apertures 150, stiffeners 152, front cone 154, inner ring 156, and mounting brackets 158 (see FIGS. 5A-8E).

Pitch shaft assembly 68 includes shaft 159, rear end 160, forward end 162, pitch head 164, and guide rods 166. FIG. 10A also shows magnet gap G, moment M, Front overhang FO, and rear overhang RO.

Frame 58 is mounted on top of stub mast 22 and wind turbine tower T. Frame 58 is configured so that generator 14 is part of nacelle frame 58. Stator assembly 48 has nacelle frame 58 as the structural member of generator 14. Magnet gap G is the distance between stator windings 74 of stator assembly 48 and rotor permanent magnet array 86 of rotor assembly 50. Rotor hub and blade pitch system 16 is attached to forward end 78F of rotor generator shaft 78, which extends through frame 58. Rear bearing housing 90 is located in rear chassis 52, and front bearing housing 98 is located in front chassis 54. Rear bearing 88 is positioned with maximum center-to-center distance from front bearing 97. Rotor generator shaft 78 extends through rear bearing 88 and front bearing 97. Front bearing 97 is positioned close to rotor head 39R, which reduces loads on rotor generator shaft 78. Yaw drive system 64 is connected between the bottom of frame 58 and stub mast 22, which is mounted on the top end of tower T. Yaw drive system 64 is mounted to frame 58, where a machined area ensures a precision fit. Blade trim actuator system 66 and yaw drive system 64 are both mounted on cylindrical neck section 130 of rear chassis 52. Front overhang FO is the distance from the vertical axis extending through a center of stub mast 22 and a front end of shaft 159 of pitch shaft assembly 68. Rear overhang RO is the distance from the vertical axis extending through a center of stub mast 22 and a back end of wind turbine nacelle 10, such as an end of fail-safe system 70 or an end of yaw drive system 60. Moment M of wind turbine nacelle 10 is decreased as the distance from the center of balance of frame 58, a central axis of stub mast 22, is decreased, and the weight of frame 58 is decreased.

Frame 58 provides a single support structure to which all systems and components (such as housing 12, yaw drive system 64, blade trim actuator system 66, and fail-safe system 70) of wind turbine nacelle 10 are mounted, and thus, all systems and components are supported by frame 58. Further, frame 58 allows for a more compact design, having a smaller moment M and reducing overhang loads, including front overhang FO and rear overhang RO, on yaw drive system 64, including yaw bearing 106. The conical shapes of rear cone 124 and front cone 154 maximize the bearing center-to-center distance between front bearing 97 and rear bearing 88 without creating excessive over-hang on yaw drive system 64. Additionally, frame 58 is more accurate to produce, allowing for better efficiency of generator 14 as magnet gap G, the gap between stator windings 74 and rotor permanent magnet array 86, is closer, and thus more optimal. Because wind turbine nacelle 10 has a simpler design that requires fewer parts, wind turbine nacelle 10 has greater reliability. For example, wind turbine nacelle 10 has fewer mechanical fixing, and thus will have less failures. Wind turbine nacelle 10 is also more cost-effective to manufacture and service because wind turbine nacelle 10 has fewer components.

Yaw Bearing (FIGS. 12A-13B; Also See FIGS. 9-11)

Figure 12A:
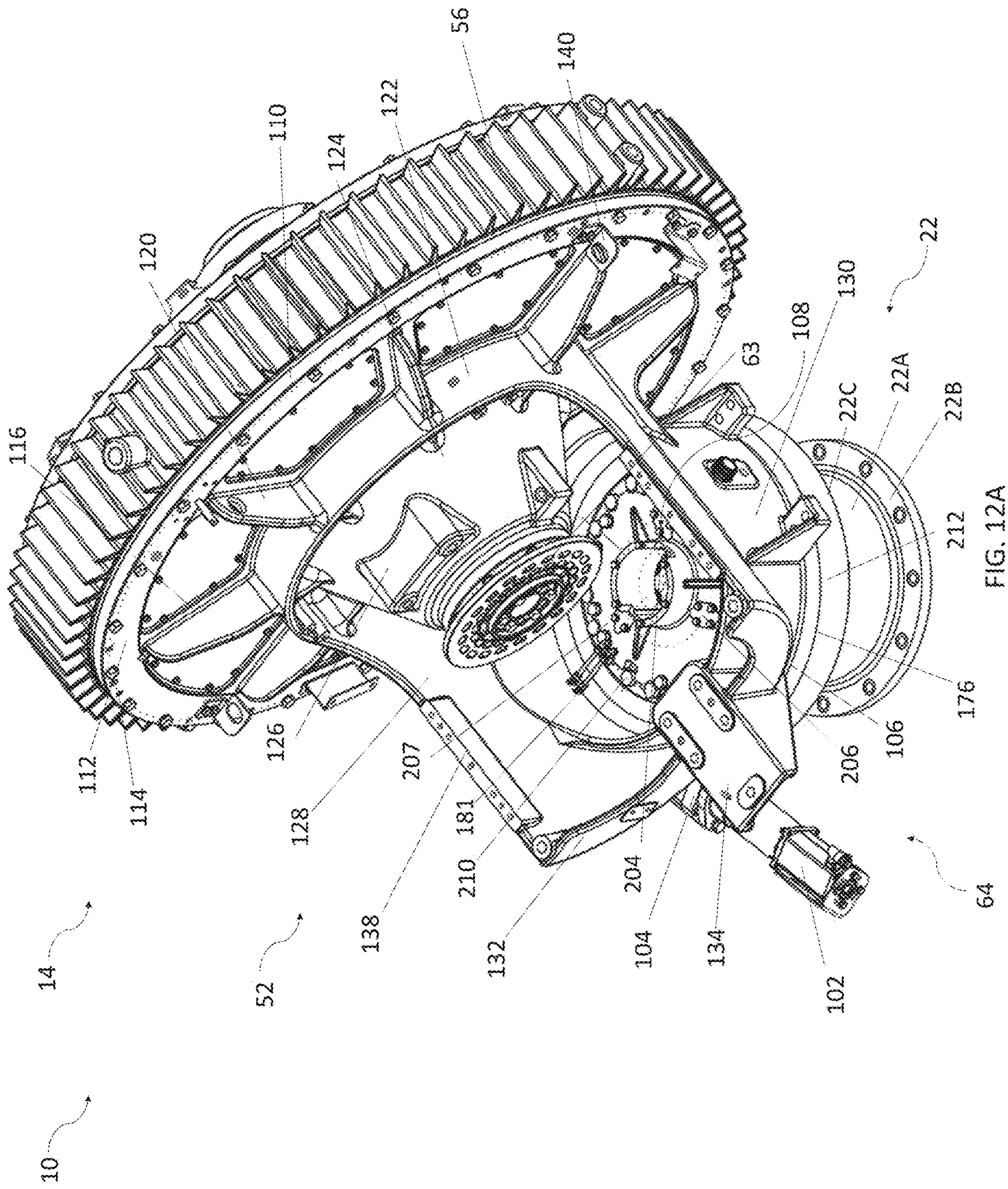
FIG. 12A is an isometric view from above showing a rear chassis mounted on a stub mast and including a yaw drive system with a yaw brake assembly that is positioned within a cylindrical neck section of the rear chassis.
Figure 12B:
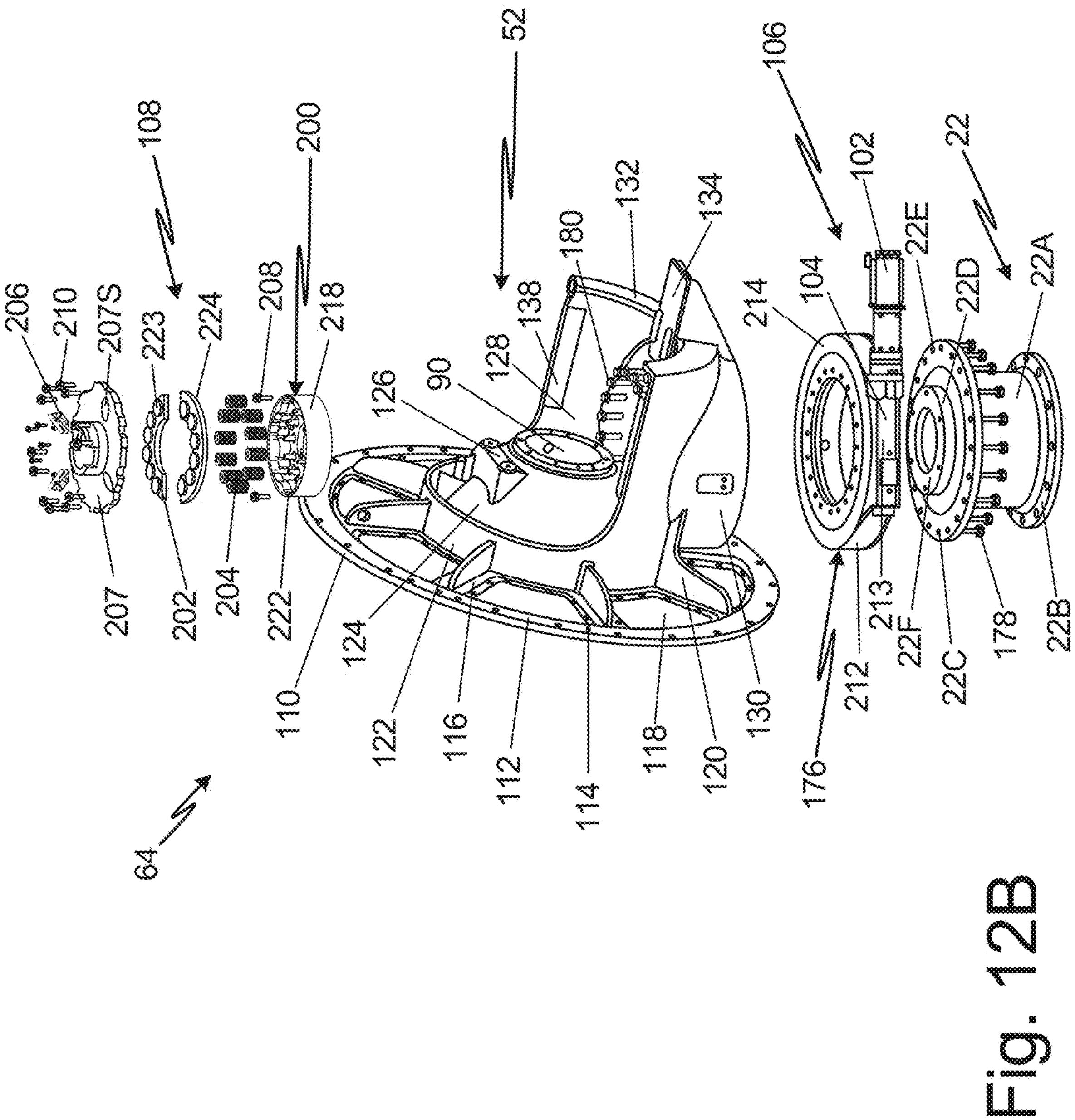
FIG. 12B is an exploded view of the stub mast and the yaw drive system.
Figure 12C:
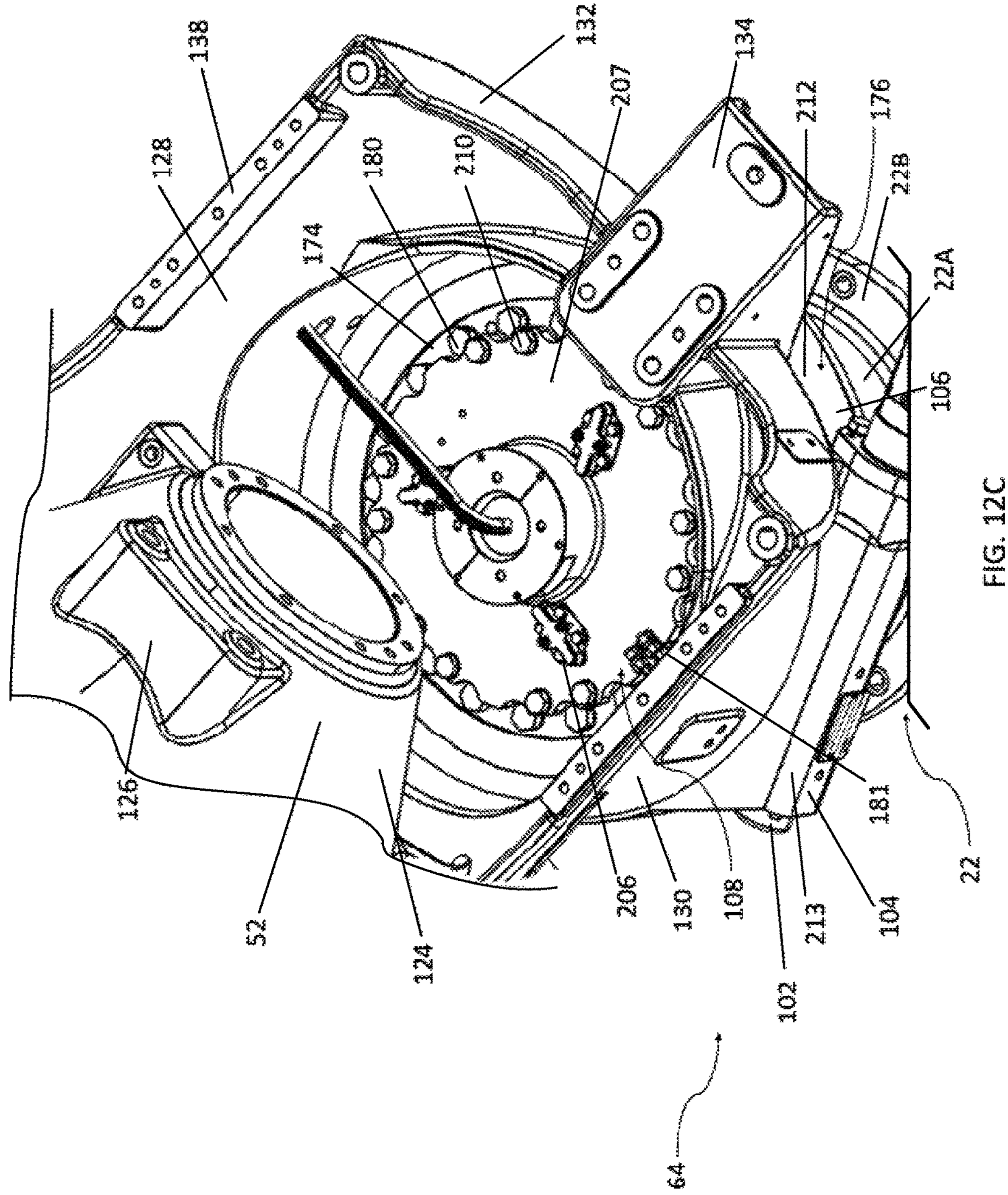
FIG. 12C is an isometric view from above the yaw drive system showing the yaw brake assembly mounted in the rear chassis and without brush assemblies.
Figure 12D:
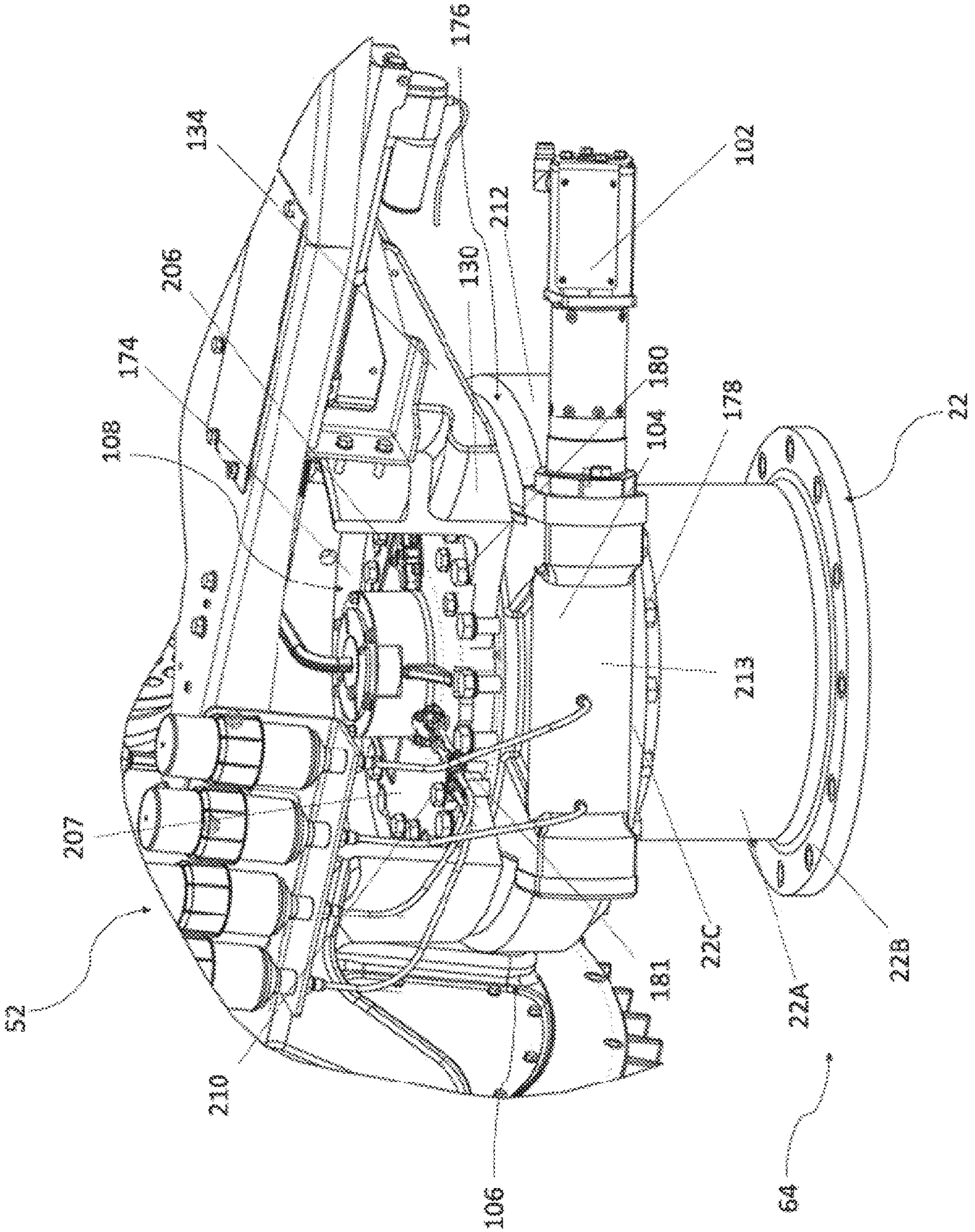
FIG. 12D is a cutaway isometric view of the yaw drive system showing the yaw brake assembly mounted in the rear chassis.
Figure 12E:
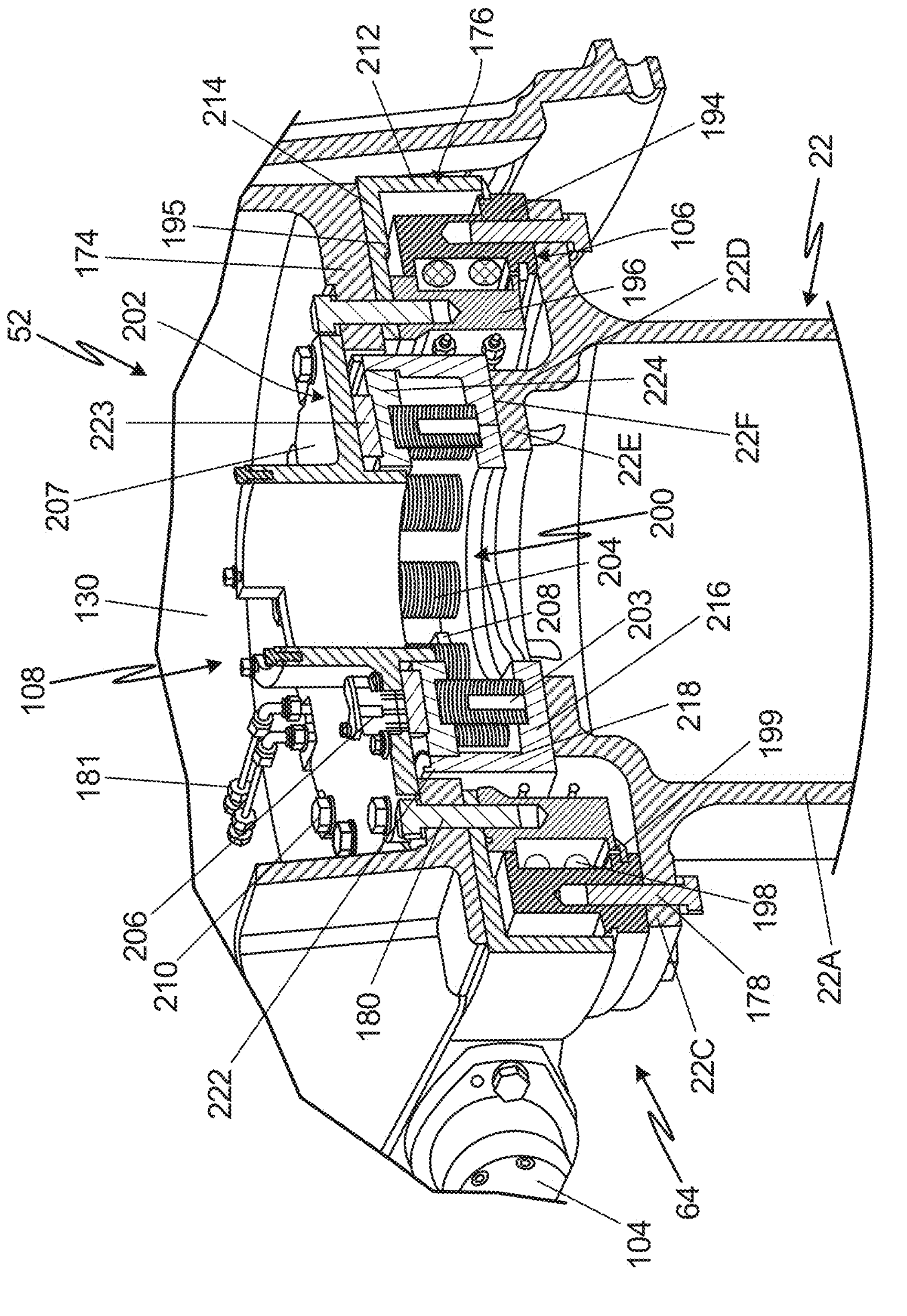
FIG. 12E is a partial cross-sectional view of the yaw drive system showing the yaw brake assembly mounted in the rear chassis.
Figure 12F:
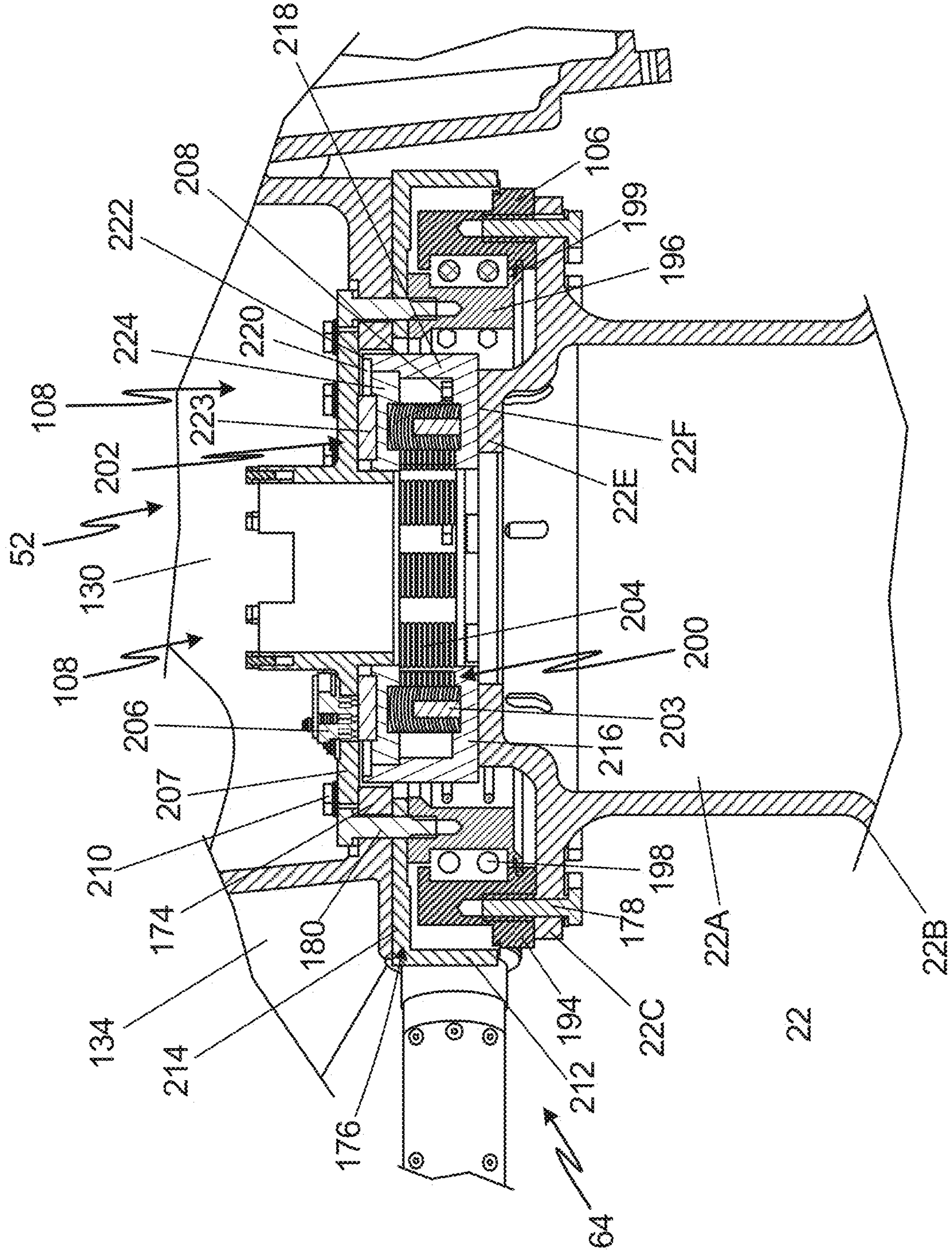
FIG. 12F is a cross-sectional side view of the yaw drive system showing the yaw brake assembly mounted in the rear chassis.
Figure 12G:
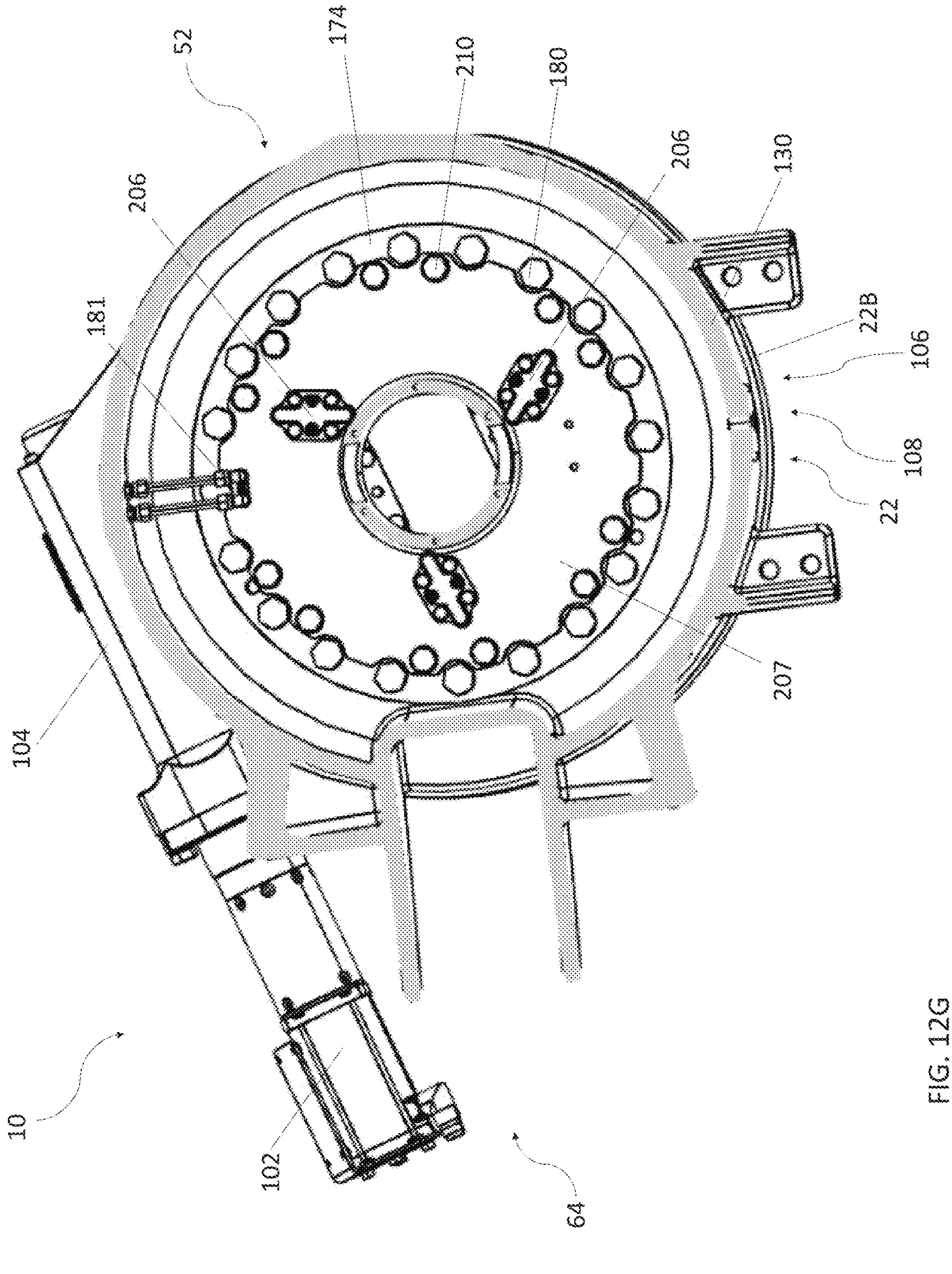
FIG. 12G is a top view of the yaw drive system showing the yaw brake assembly mounted in the rear chassis.
Figure 13A:
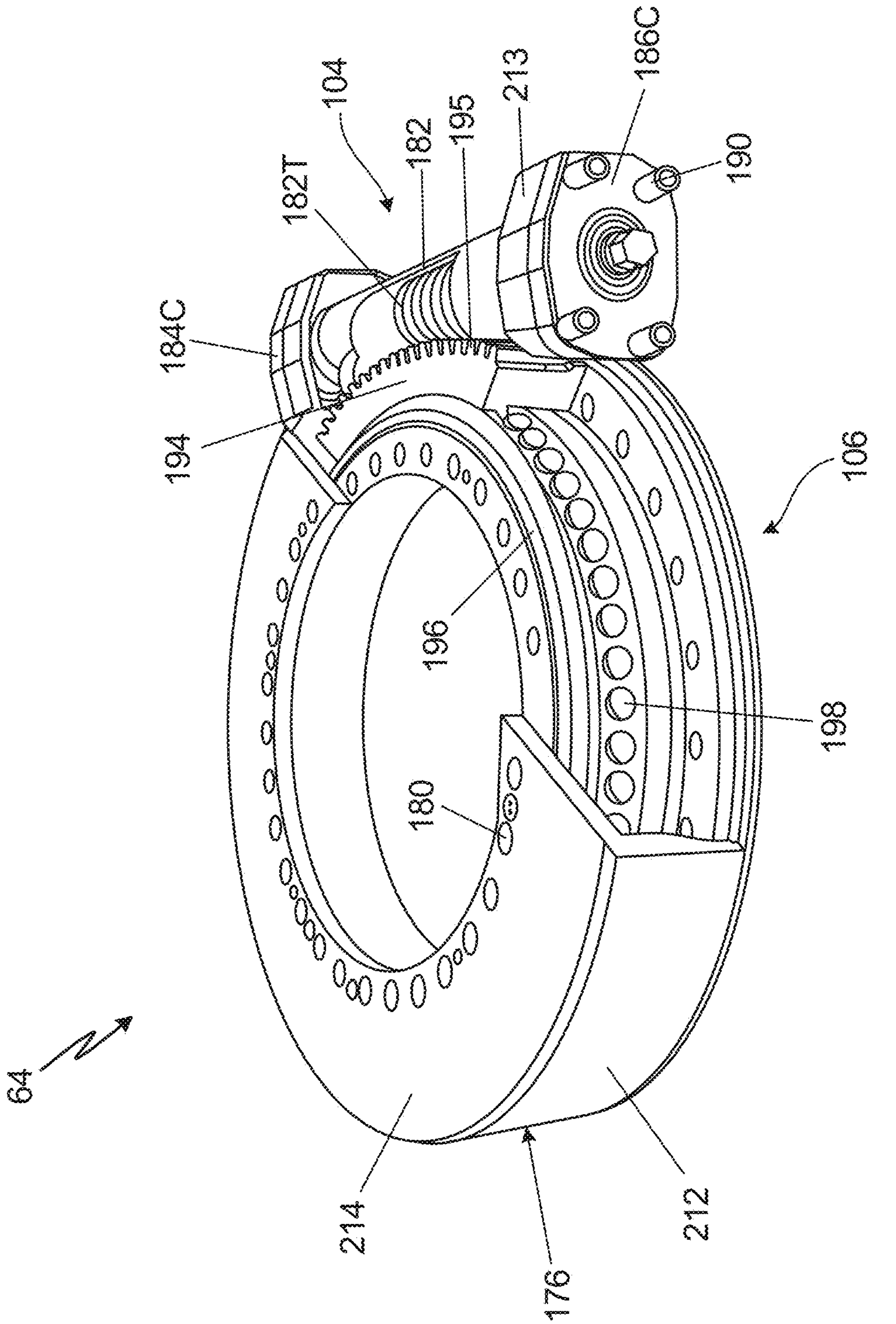
FIG. 13A is a cutaway isometric view of the yaw drive system.
Figure 13B:
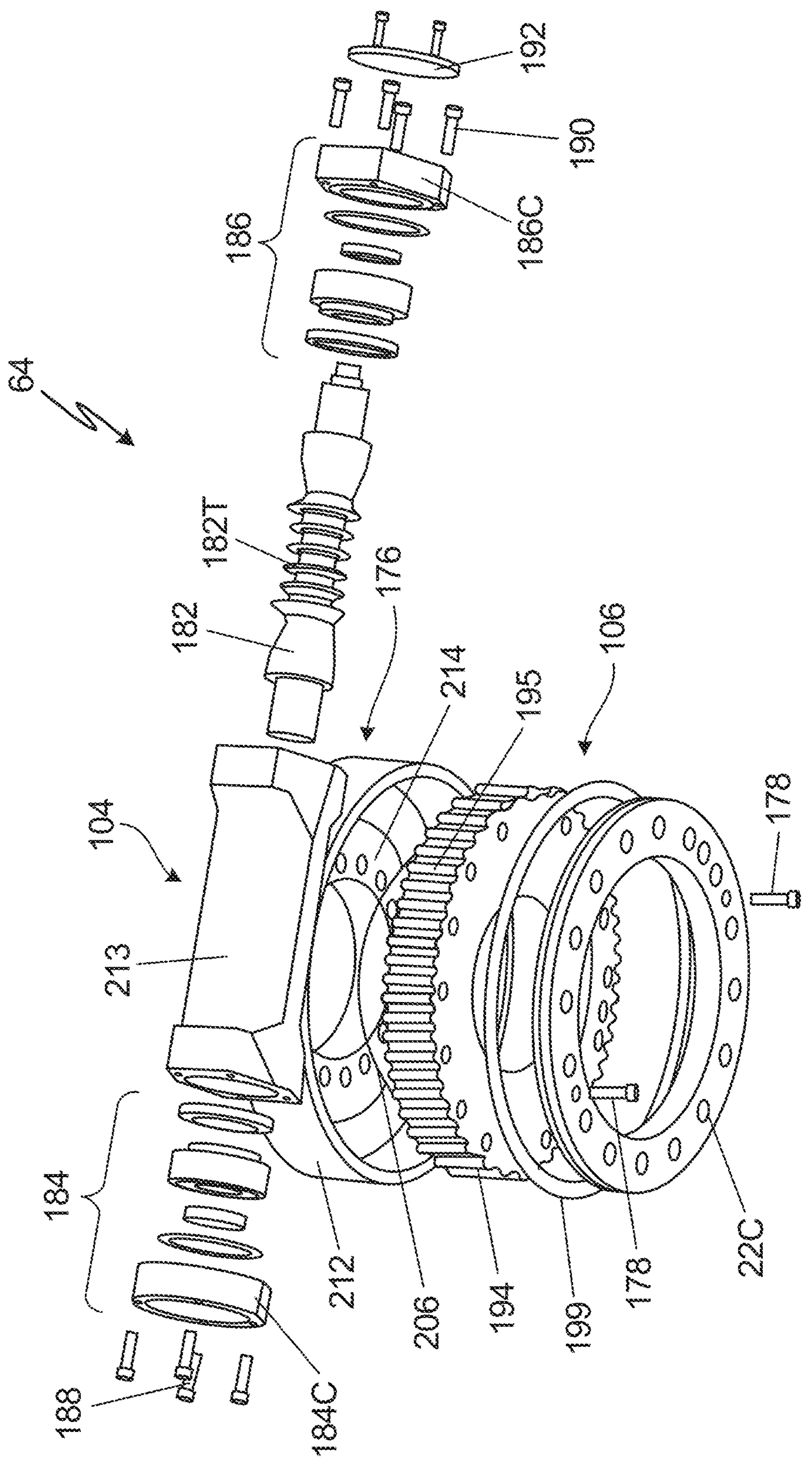
FIG. 13B is an exploded view of the yaw drive system and the stub mast.

FIG. 12A is an isometric view from above showing rear chassis 52 mounted on stub mast 22 and including yaw drive system 64 with yaw brake assembly 108 that is positioned within cylindrical neck section 130 of rear chassis 52. FIG. 12B is an exploded view of stub mast 22 and yaw drive system 64. FIG. 12C is an isometric view from above yaw drive system 64 showing yaw brake assembly 108 mounted in rear chassis 52 and without brush assemblies 206. FIG. 12D is a cutaway isometric view of yaw drive system 64 showing yaw brake assembly 108 mounted in rear chassis 52. FIG. 12E is a partial cross-sectional view of yaw drive system 64 showing yaw brake assembly 108 mounted in rear chassis 52. FIG. 12F is a cross-sectional side view of yaw drive system 64 showing yaw brake assembly 108 mounted in rear chassis 52. FIG. 12G is a top view of yaw drive system 64 showing yaw brake assembly 108 mounted in rear chassis 52. FIG. 13A is a cutaway isometric view of yaw drive system 64. FIG. 13B is an exploded view of yaw drive system 64 and stub mast 22. In FIG. 13B, stub mast 22 is only partially shown. FIGS. 12A-13B will be discussed together.

Wind turbine nacelle 10 includes generator 14, stub mast 22 (which includes cylindrical body 22A, bottom flange 22B, outer upper flange 22C, pedestal 22D, inner brake support flange 22E, and yaw brake disc surface 22F), and yaw drive system 64. Generator 14 includes rear chassis 52 (which includes circular mounting flange 110, circular rib 112, flange mounting holes 114, radial struts 116, apertures 118, stiffeners 120, inner ring 122, rear cone 124, service brake mount 126, half-pipe section 128, cylindrical neck section 130, rear end wall 132, actuator support platform 134, side mounts 138, mounting brackets 140, inner neck flange 174) and stator ring 56.

Yaw drive system 64 includes motor 102, yaw worm drive 104, yaw bearing 106, yaw brake assembly 108, yaw drive housing 176, bolts 178, bolts 180, and grease system 181. Yaw worm drive 104 includes screw 182 (having threading 182T), first bearing assembly 184 (having cap 184C), second bearing assembly 186 (having cap 186C), fasteners 188, fasteners 190, and connection plate assembly 192. Yaw bearing 106 includes outer casing 194 (having teeth 195), inner casing 196, and ball bearings 198, and seal 199. Yaw brake assembly 108 includes a yaw brake caliper 200, brake pad 202, spring guides 203, springs 204, brush assemblies 206, brake disk 207, bolts 208, and bolts 210. Yaw drive housing 176 includes vertical annular portion 212, worm drive housing 213, and horizontal annular portion 214. Yaw brake caliper 200 includes lower flange 216, neck 218, shoulder 220, and upper flange 222. Brake pad 202 includes friction pads 223 and backing plate 224.

Stub mast 22 has hollow cylindrical body 22A. Bottom flange 22B extends outward from a bottom of cylindrical body 22A. Outer upper flange 22C extends outward from a top of cylindrical body 22A. Pedestal 22D extends inward and up from a top of cylindrical body 22A. Inner brake support flange 22E extends inward from a top of pedestal 22D. Yaw brake disc surface 22F is the upper surface of inner brake support flange 22E.

Yaw drive system 64 is affixed to rear chassis 52. Motor 102 of yaw drive system 64 is connected to yaw worm drive 104 of yaw drive system 64. Yaw worm drive 104 is connected to yaw bearing 106 and yaw drive housing 176 of yaw drive system 64. Yaw brake assembly 108 is positioned on yaw brake disc surface 22F of inner brake support flange 22E of stub mast 22. Yaw brake assembly 108 is connected to cylindrical neck section 130 of rear chassis 52. Yaw brake assembly 108 is coaxial with stub mast 22 and cylindrical neck section 130 of chassis 52. Yaw drive housing 176 surrounds yaw bearing 106 and is connected to cylindrical neck section 130. Yaw drive housing 176 connects yaw worm drive 104 to yaw bearing 106. Bolts 178 connect yaw bearing 106 to outer upper flange 22C of stub mast 22. Bolts 180 connect cylindrical neck section 130 to yaw drive housing 176 and yaw bearing 106. Grease system 181 extends through cylindrical neck section 130 of rear chassis 52 and through yaw drive system 64.

Yaw worm drive 104 has screw 182 within yaw drive housing 176. Screw 182 has a middle portion with threading 182T that contacts yaw bearing 106. First bearing assembly 184 is positioned on a first end portion of screw 182 and is locked into position via cap 184C at an end of first bearing assembly 184. Second bearing assembly 186 is positioned on a second end portion of screw 182 and is locked into position via cap 186C at an end of second bearing assembly 186. Fasteners 188 are screws, bolts, or any other suitable fasteners that extend through cap 184C into yaw drive housing 176. Fasteners 190 are screws, bolts, or any other suitable fasteners that extend through cap 186C into yaw drive housing 176. Connection plate assembly 192 is connected to cap 186C and motor 102 of yaw drive system 64.

Outer casing 194 is an outer portion of yaw bearing 106. Outer casing 194 is fixed in place to outer upper flange 22C of stub mast 22. Bolts 178 extend upward through mounting holes in outer upper flange 22C to connect outer upper flange 22C to outer casing 194. Outer casing 194 has teeth 195 on the outer surface of outer casing 194. Teeth 195 of outer casing 194 contact and interact with threading 182T of screw 182. Inner casing 196 is an inner portion of yaw bearing 106. Inner casing 196 is connected to yaw drive housing 176 and cylindrical neck section 130 of rear chassis 52 and is rotatable with yaw drive housing 176 and cylindrical neck section 130. Inner casing 196 rotates around stub mast 22. Inner casing 196 is rotatably connected to outer casing 194. Bolts 180 extend downward through mounting holes in inner neck flange 174 of cylindrical neck section 130 to connect the bottom end of rear chassis 52 and yaw drive housing 176 to inner casing 196. Ball bearings 198 are positioned in a space between outer casing 194 and inner casing 196. Seal 199 is positioned at the bottom of yaw bearing 106 between outer casing 194 and inner casing 196.

Yaw brake assembly 108 has yaw brake caliper 200 positioned within cylindrical neck section 130 of rear chassis 52. Yaw brake caliper 200 is positioned on yaw brake disc surface 22F of stub mast 22. Brake pad 202, spring guides 203, and springs 204 of yaw brake assembly 108 are positioned inside yaw brake caliper 200. Spring guides 203 are connected to and extend up from a bottom of yaw brake caliper 200. Springs 204 are positioned on spring guides 203. Yaw brake assembly 108 has a plurality of spaced springs 204. Brake pad 202 is positioned on springs 204 such that springs 204 are between caliper 200 and brake pad 202. Brush assemblies 206 are connected to brake disk 207 and extend through brake disk 207 to contact brake pad 202. In this embodiment, yaw brake assembly 108 has three brush assemblies 206. In alternate embodiments, yaw brake assembly 206 may have any suitable number of brush assemblies 206. Brake disk 207 is positioned on top of brake pad 202. As such, brake pad 202 is between springs 204 and brake disk 207 with brush assemblies 206. Brake disk 207 is connected to inner neck flange 174 of rear chassis 52. Bolts 208 extend through a bottom of yaw brake caliper 200 and into yaw brake disc surface 22F of stub mast 22 to connect yaw brake caliper 200 to stub mast 22. Bolts 210 extend through brake disk 207 and into inner neck flange 174 of cylindrical neck section 130 of rear chassis 52 to connect brake disk 207 to rear chassis 52.

Vertical annular portion 212 is a vertical annular portion of yaw drive housing 176. Worm drive housing 213 is a cylindrical-like portion connected to vertical annular portion 212. Worm drive housing 213 has an opening through an interior portion of worm drive housing 213. Screw 182 of yaw worm drive 104 is housed within worm drive housing 213 of yaw drive housing 176, and an opening in worm drive housing 213 allows threading 182T of screw 182 to engage teeth 195 of outer casing 194 of yaw bearing 106. Horizontal annular portion 214 is a horizontal portion of yaw drive housing 176 connected to vertical annular portion 212. Bolt 180 extends through inner neck flange 174 of neck section 130 and vertical annular portion 214 into inner casing 196 to connect rear chassis 52 and yaw drive housing 176 to yaw bearing 106.

Lower flange 216 of yaw brake caliper 200 is a bottom of yaw brake caliper 200. Lower flange 216 is connected to a lower portion of neck 218 of yaw brake caliper 200 and extends radially inward from neck 218. Lower flange 216 is an inner annular portion of yaw brake caliper 200. Lower flange 216 forms a hole through a center of yaw brake caliper 200, which is in alignment with the annular space through stub mast 22, such that a slip ring can be positioned through yaw brake caliper 200 to bring prevent cable twisting to allow power from generator 14 to travel down wind turbine tower T. Lower flange 216 forms a bottom portion of yaw brake assembly 108. Lower flange 216 is positioned on yaw brake disc surface 22F of inner brake support flange 22E of stub mast 22. Lower flange 216 is connected to inner brake support flange 22E via bolts 208, which connect yaw brake caliper 200 to stub mast 22. Spring guides 203 are rod-like and are connected to, or extend up, from lower flange 216. Springs 204 are positioned on lower flange 216 over spring guides 203. A bottom of neck 218 is connected to lower flange 216 and extends upward. Neck 218 of yaw brake caliper 200 is annular such that yaw brake caliper 200 is hollow. Neck 218 is radially between inner neck flange 174 of rear chassis 52 and brake pad 202 of yaw brake assembly 108. Shoulder 220 of yaw brake caliper 200 is formed by neck 218 at an inner portion of neck 218. Brake pad 202 is positioned on shoulder 220. Upper flange 222 of yaw brake caliper 200 is connected to an upper portion of neck 218 of yaw brake caliper 200 and extends upward from neck 218. Upper flange 222 is annular.

Friction pads 223 of brake pad 202 are connected to a top surface of backing plate 224 of brake pad 202. Backing plate 224 is positioned on springs 204. Brake disk 207 is positioned on friction pads 223 such that friction pads 223 contact a bottom surface of brake disk 207. As such, backing plate 224 is between friction pads 223 and springs 204.

Motor 102 of yaw worm drive 104 can drive, or initiate movement of, screw 182 of yaw worm drive 104 within worm drive housing 213 of yaw drive housing 176. Fasteners 188 attach cap 184C to worm drive housing 213 and fasteners 190 attach cap 186C to worm drive housing 213, keeping first bearing assembly 184, second bearing assembly 186, and screw 182 positioned within worm drive housing 213. First bearing assembly 184 and second bearing assembly 186 maintain the position of screw 182 within worm drive housing 213 of yaw drive housing 176. Motor 102 of yaw worm drive 104 is connected to screw 182 via connection plate assembly 192.

Inner casing 196 of yaw bearing 106 rotates along ball bearings 198 and outer casing 194 of yaw bearing 106. Bottom flange 22B of stub mast 22 connects to tower T (shown in FIGS. 1B-2B and 9) so that stub mast 22 is stationary. Stub mast 22 is connected to outer casing 194 of yaw bearing 106 such that outer casing 194 is also stationary, or does not rotate. Inner casing 196 of yaw bearing 106 is free to rotate about a vertical rotational axis of stub mast 22. Brake disk 207 with brush assemblies 206 of yaw brake assembly 108 is connected to rotating inner casing 196 of yaw bearing 106 via inner neck flange 174 of cylindrical neck section 130 of rear chassis 52. Yaw worm drive 104 is connected to rotating inner casing 196 of yaw bearing 106 via yaw drive housing 176. As such, inner casing 196 of yaw bearing 106 rotates with rear chassis 52, brake disk 207 with brush assemblies 206, yaw drive housing 176, and yaw worm drive 104.

As seen in FIG. 13A, non-rotating outer casing 194 of yaw bearing 106 has teeth 195 that engage threading 182T of screw 182 of yaw worm drive 104 to cause yaw worm drive 104 to rotate inner casing 196 of yaw bearing 106 as screw 182 rotates along teeth 195 but does not move axially within worm drive housing 213. As inner casing 196 of yaw bearing 106 rotates, rear chassis 52 rotates along with brake disk 207 of yaw brake assembly 108. Thus, rear chassis 52, yaw drive housing 176, yaw worm drive 104, motor 102, brake disk 207 with brush assemblies, and inner casing 196 of yaw bearing 106 rotate around outer casing 194 of yaw bearing 106 and a vertical axis of stub mast 22 and cylindrical neck section 130 of rear chassis 52. As a result, motor 102 can initiate yaw worm drive 104 to rotate rear chassis 52, rotating wind turbine nacelle 10 to adjust the yaw of wind turbine nacelle 10 based on the wind direction determined by wind vane 46 of wind sensing system 20 (shown in FIGS. 2A-2E). Further, when yaw worm drive 104 rotates rear chassis 52, brush assemblies 206 rotating with brake disk 2007 contact stationary brake pad 202 to interact with friction pads 223 of brake pad 202 to clean brake pad 202. Grease system 181 automatically greases worm drive 104 and yaw bearing 106 of yaw drive system 64, grease traveling from an automatic greaser, through rear chassis 52, and down into yaw drive system 64.

Yaw drive system 64 rotates wind turbine nacelle 10, either clockwise or counterclockwise, to turn wind turbine nacelle 10 into a more optimal direction with respect to the wind. Yaw drive system 64 adjusts the yaw of wind turbine nacelle 10 to direct rotor head 39R perpendicular to the wind so that blades 18 are always aligned with the ever-changing wind direction, maximizing the energy extracted from the wind and reducing running loads.

Yaw Brake Assembly (FIGS. 14A-16C; Also See FIGS. 10A-12B, 12E-12F)

Figure 14A:
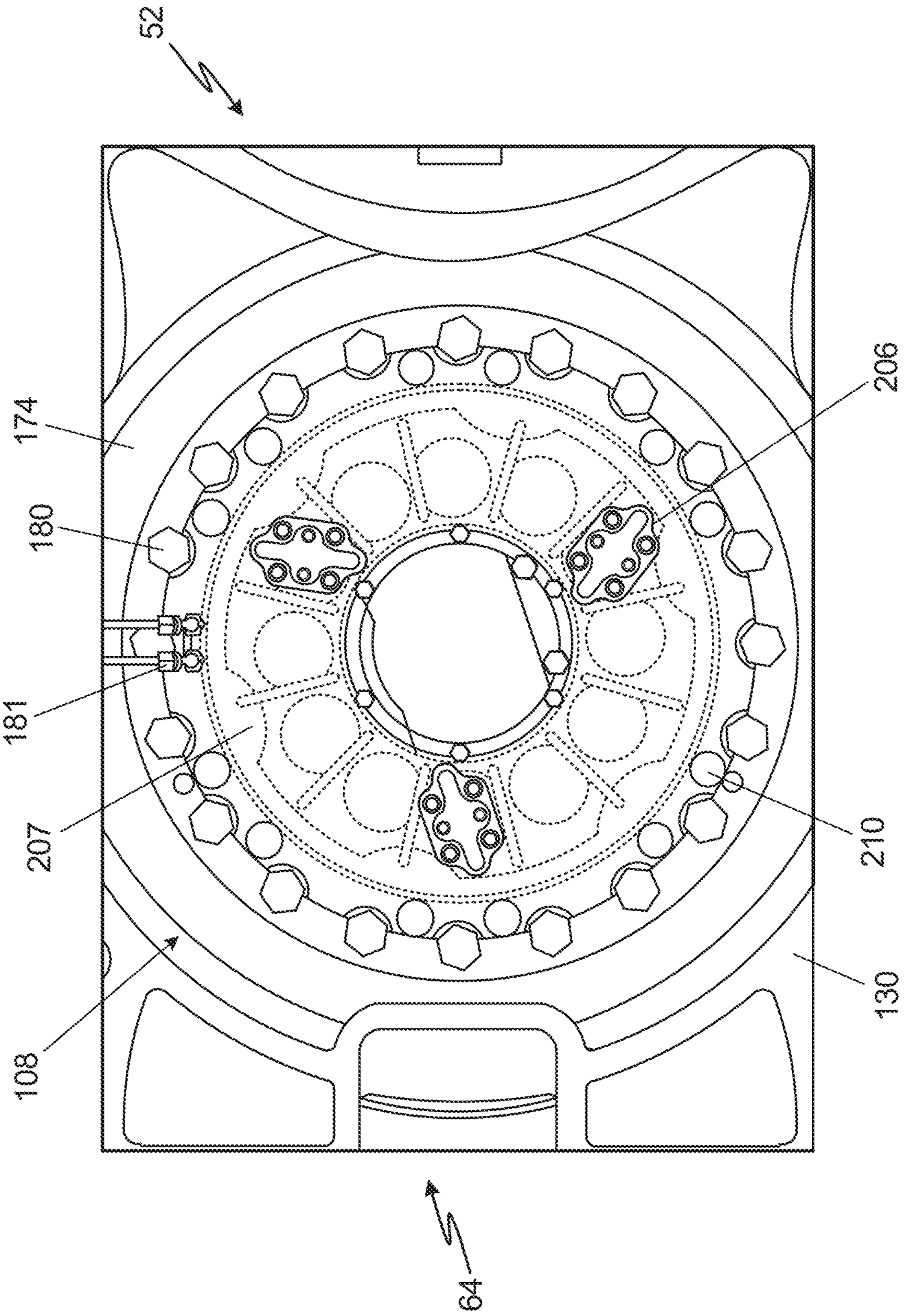
FIG. 14A is a top partial view of the yaw drive system showing the yaw brake assembly.
Figure 14B:
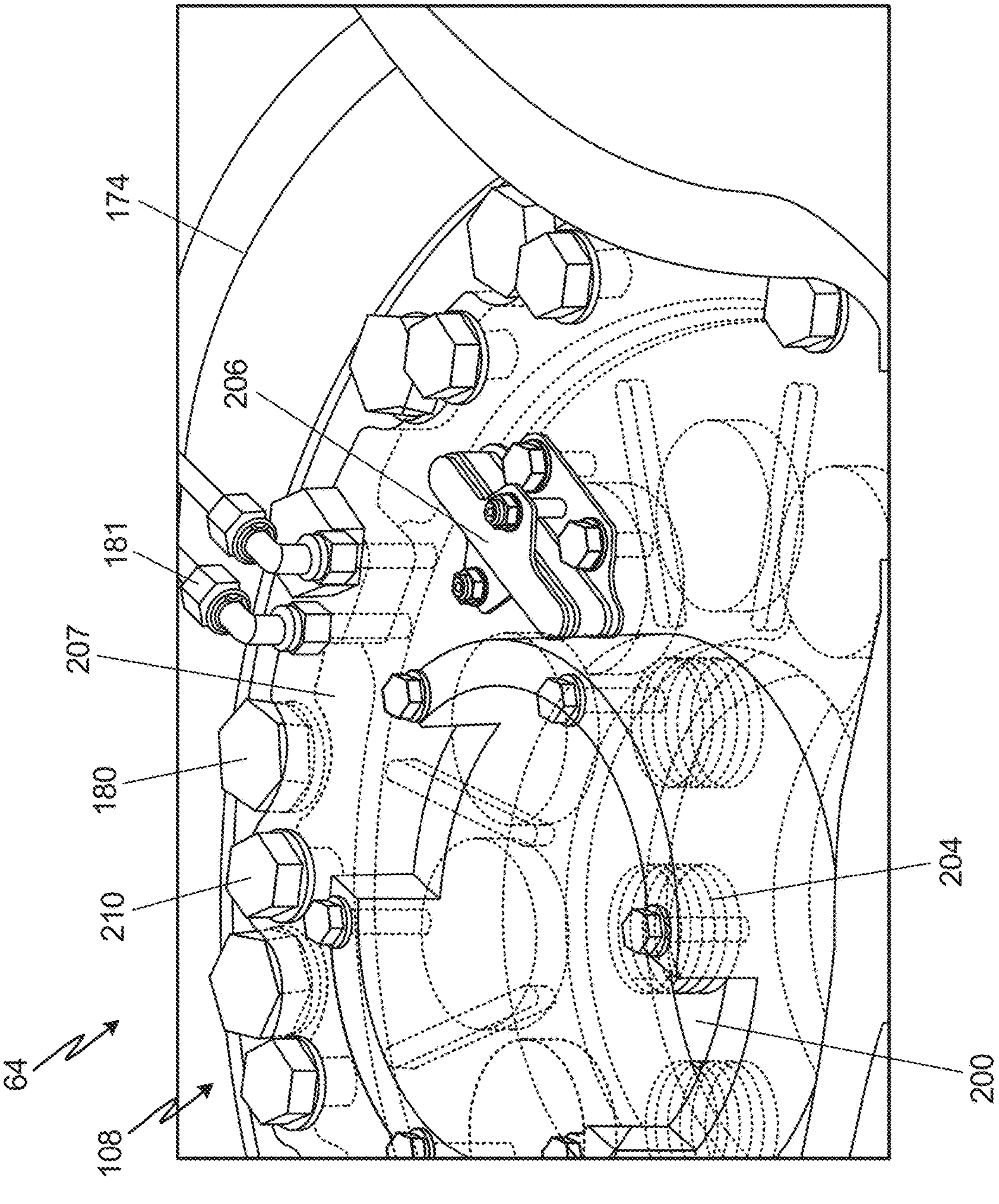
FIG. 14B is an enlarged partial cutaway isometric view of the yaw drive system showing the yaw brake assembly.
Figure 14C:
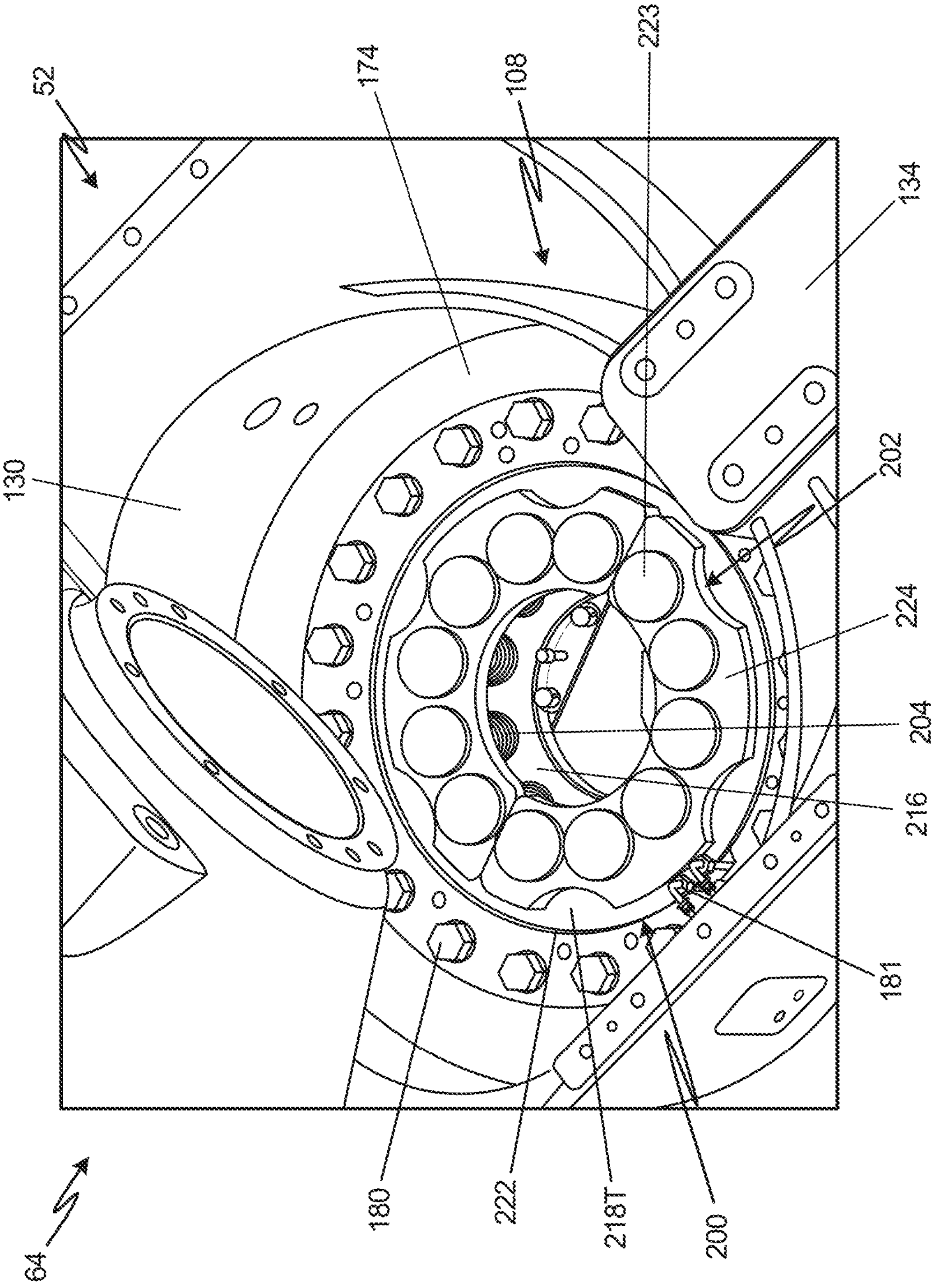
FIG. 14C is a partial isometric view from above the yaw drive system showing the yaw brake assembly mounted in the rear chassis and with a brake disk removed.
Figure 15A:
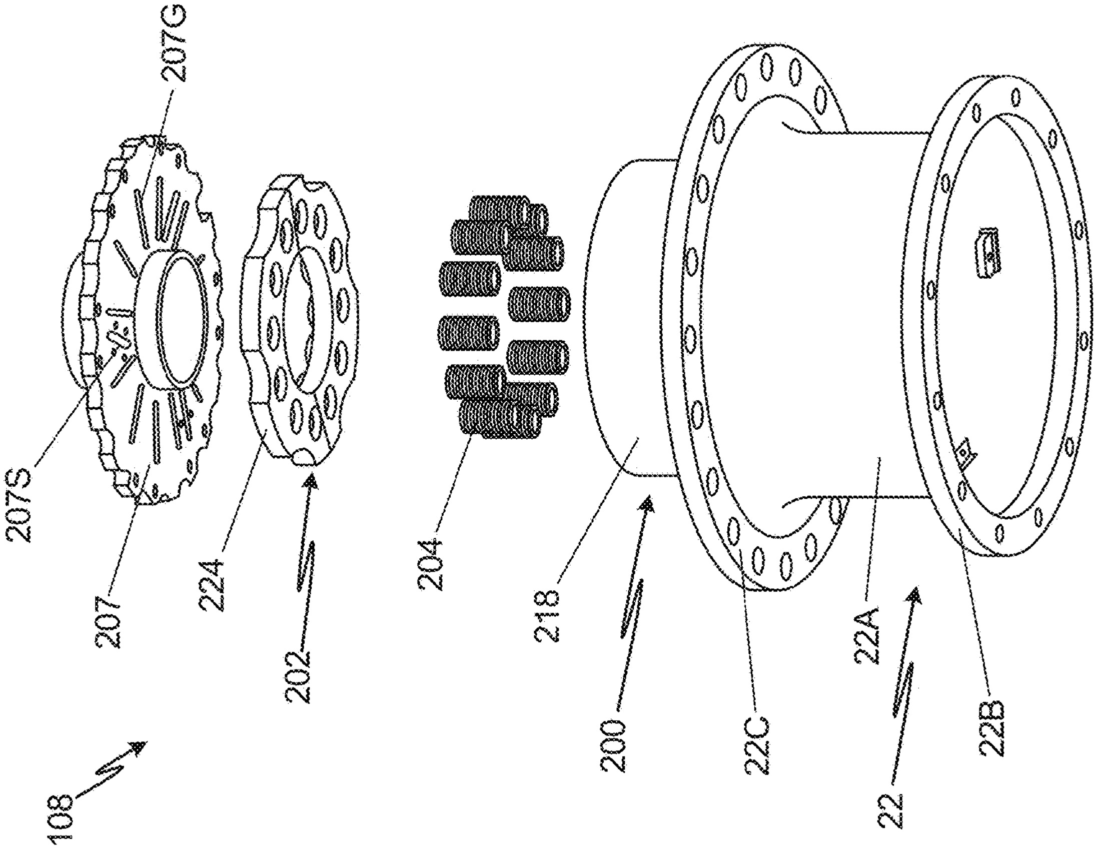
FIG. 15A is an exploded isometric view of the yaw brake assembly and the stub mast from below.
Figure 15B:
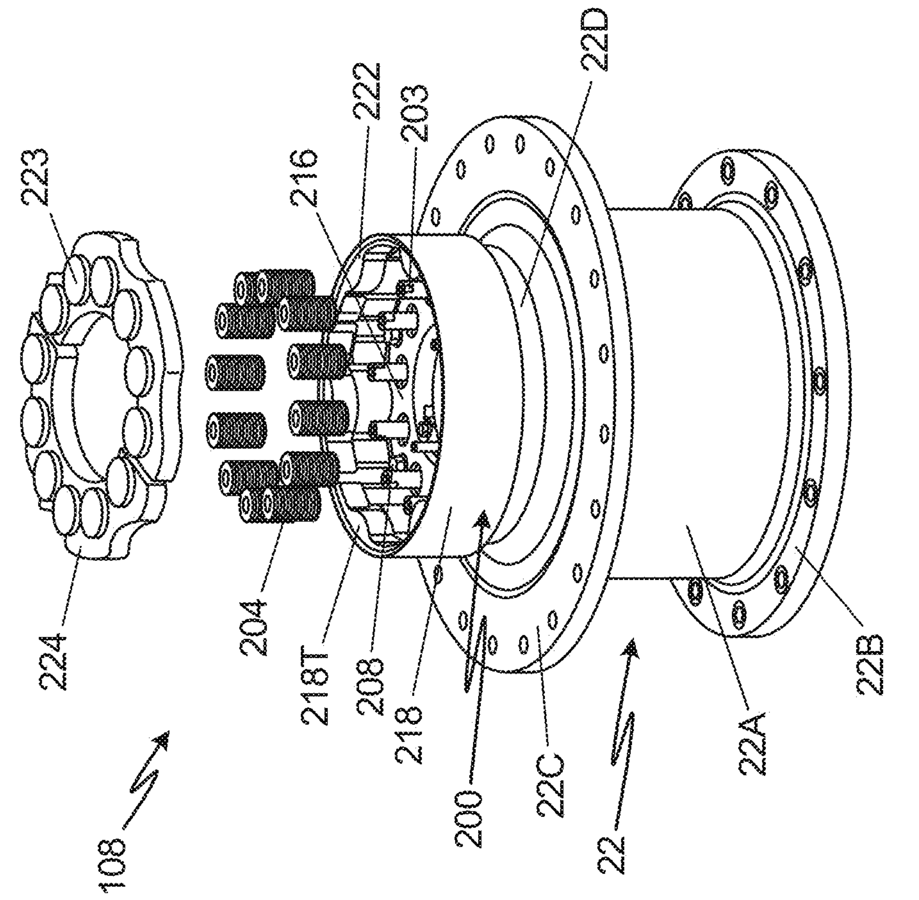
FIG. 15B is a partially exploded isometric view of the yaw brake assembly from above not showing the brake disk and connected to the stub mast.
Figure 15C:
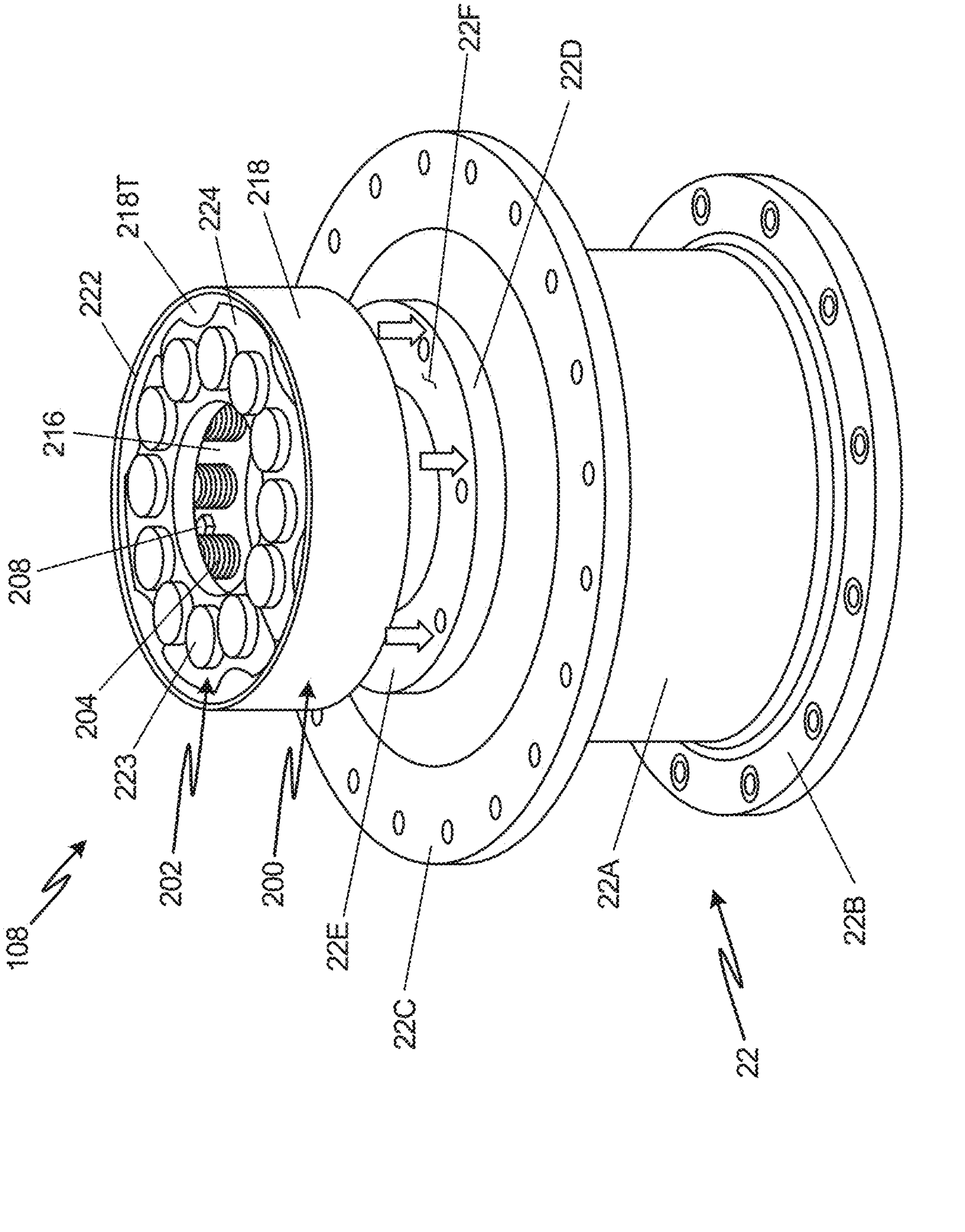
FIG. 15C is a partially exploded isometric view of the yaw brake assembly not showing the brake disk and the stub mast.
Figure 15D:
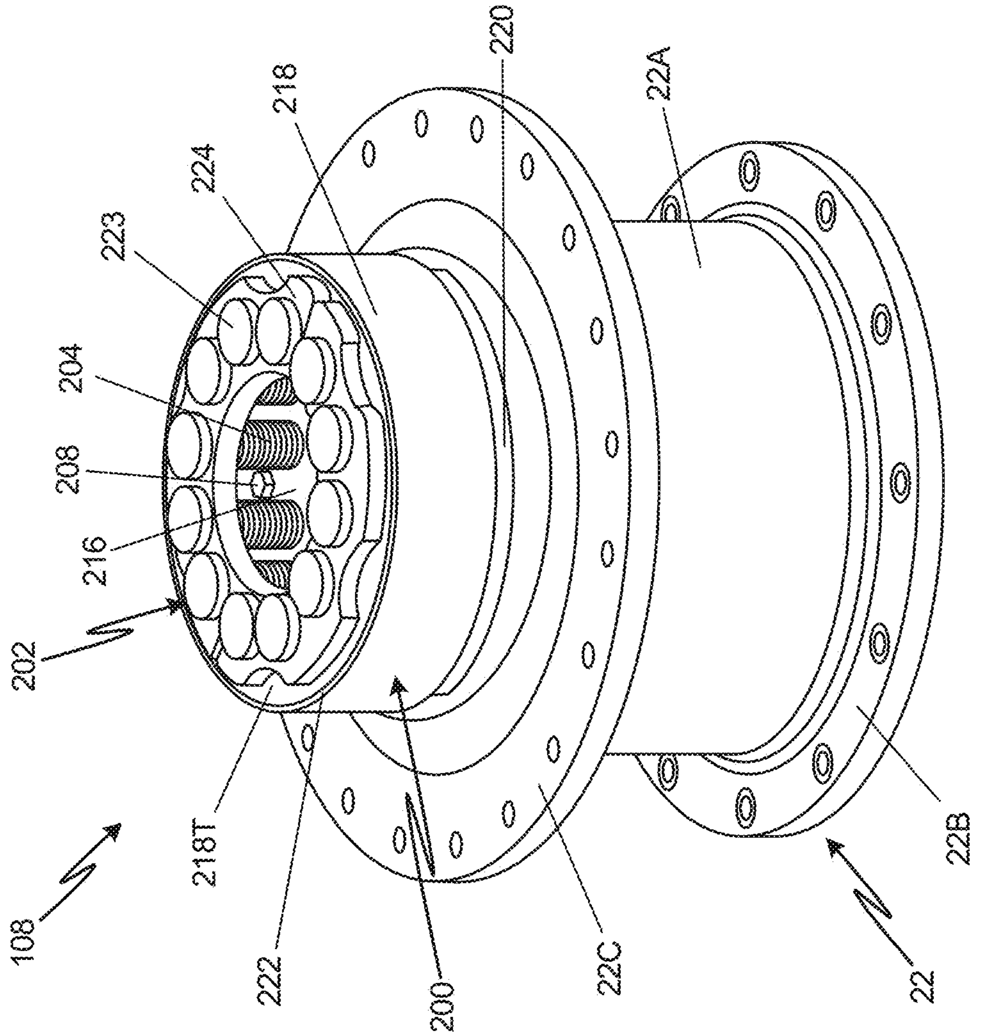
FIG. 15D is an assembled isometric view of the yaw brake assembly not showing the brake disk and the stub mast.
Figure 15E:
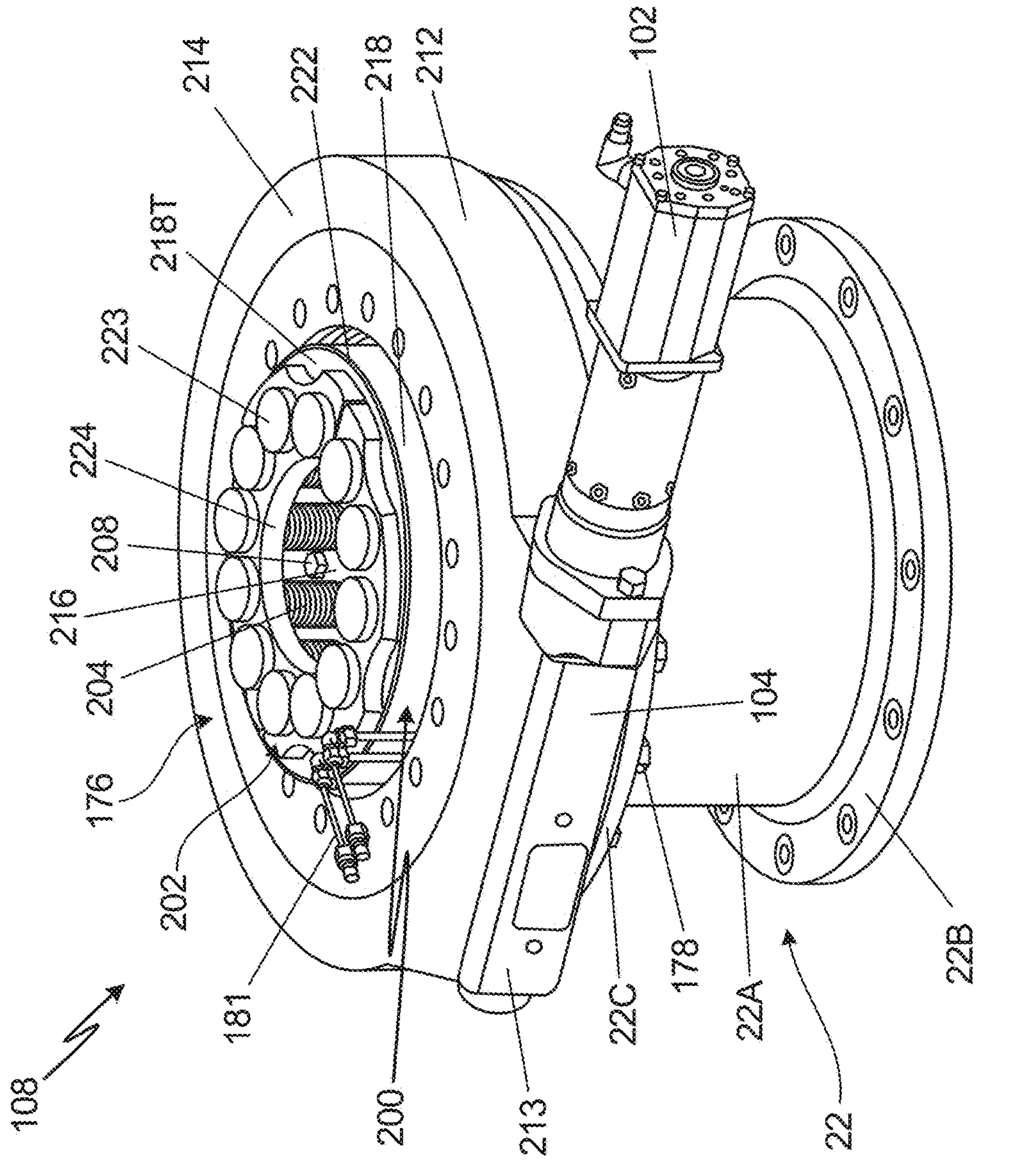
FIG. 15E is an assembled isometric view of the yaw brake assembly not showing the brake disk, the stub mast, and a yaw drive housing from above.
Figure 15F:
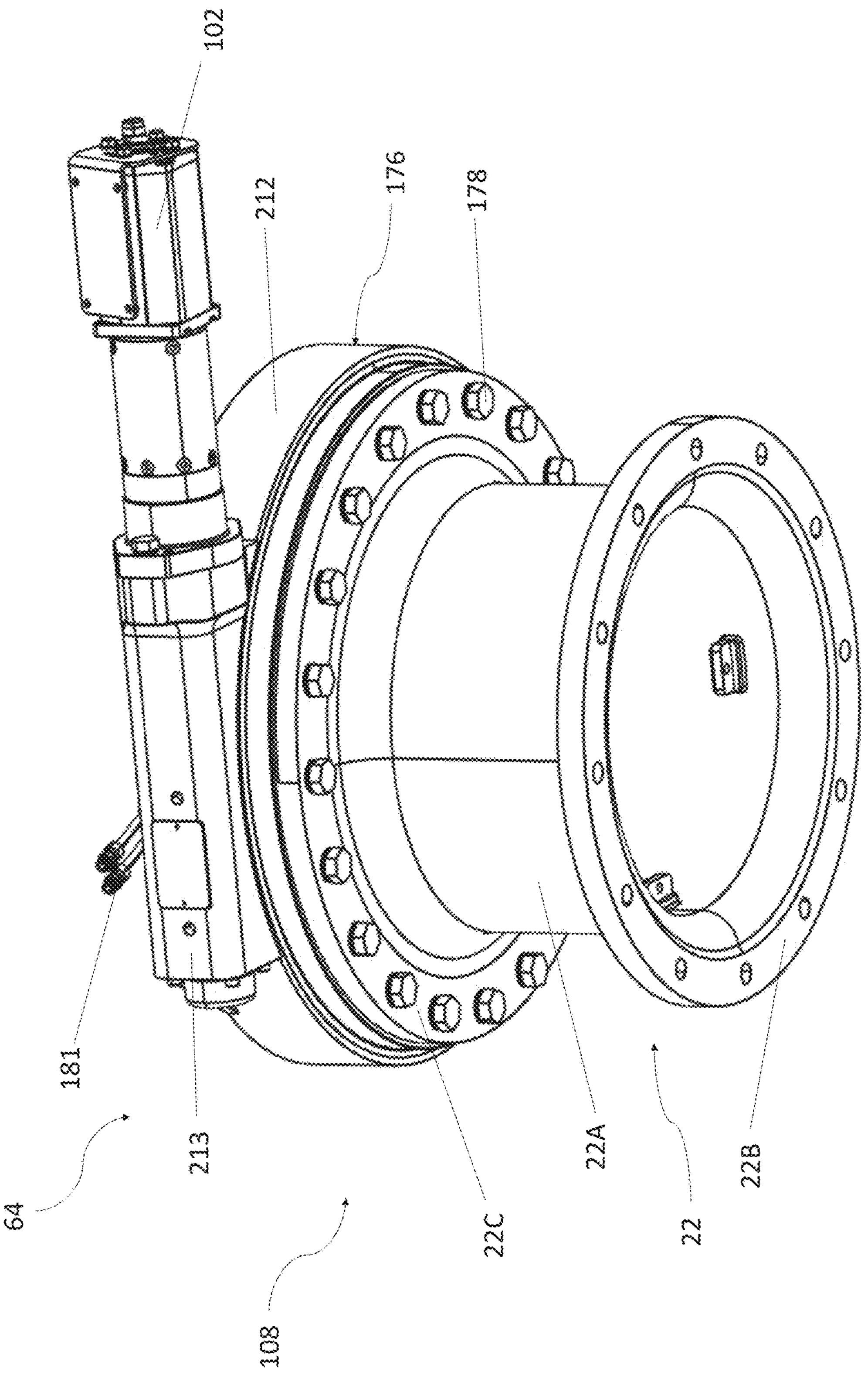
FIG. 15F is an assembled isometric view of the yaw brake assembly, the stub mast, and a yaw drive housing from below.
Figure 15G:
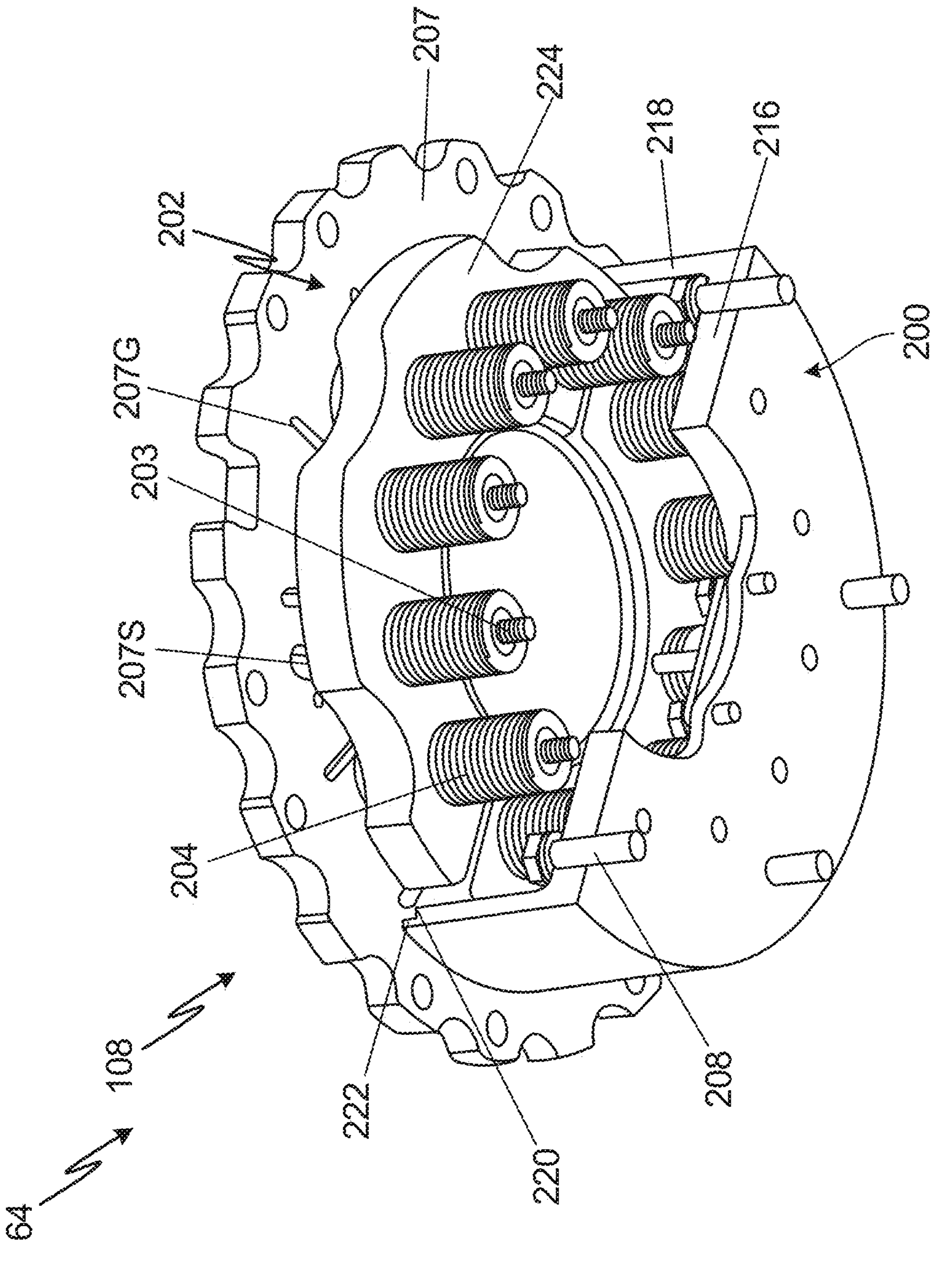
FIG. 15G is an assembled isometric view of the yaw brake assembly from below.
Figure 16B:
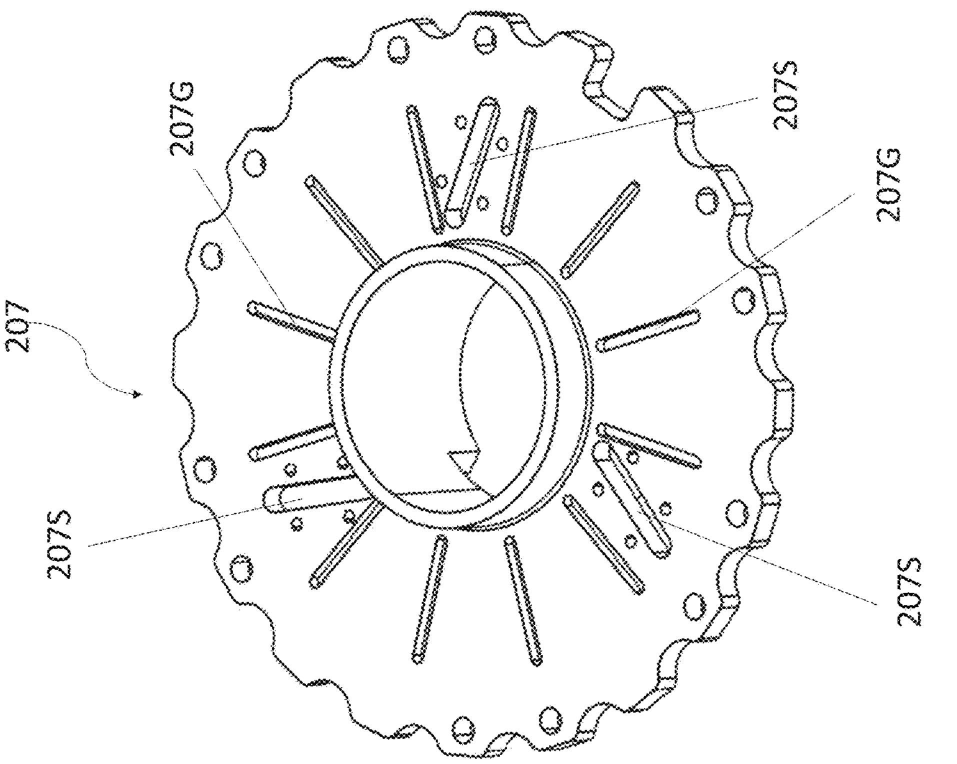
FIG. 16B is an isometric view of a bottom of the brake disk of the yaw brake assembly.
Figure 16A:
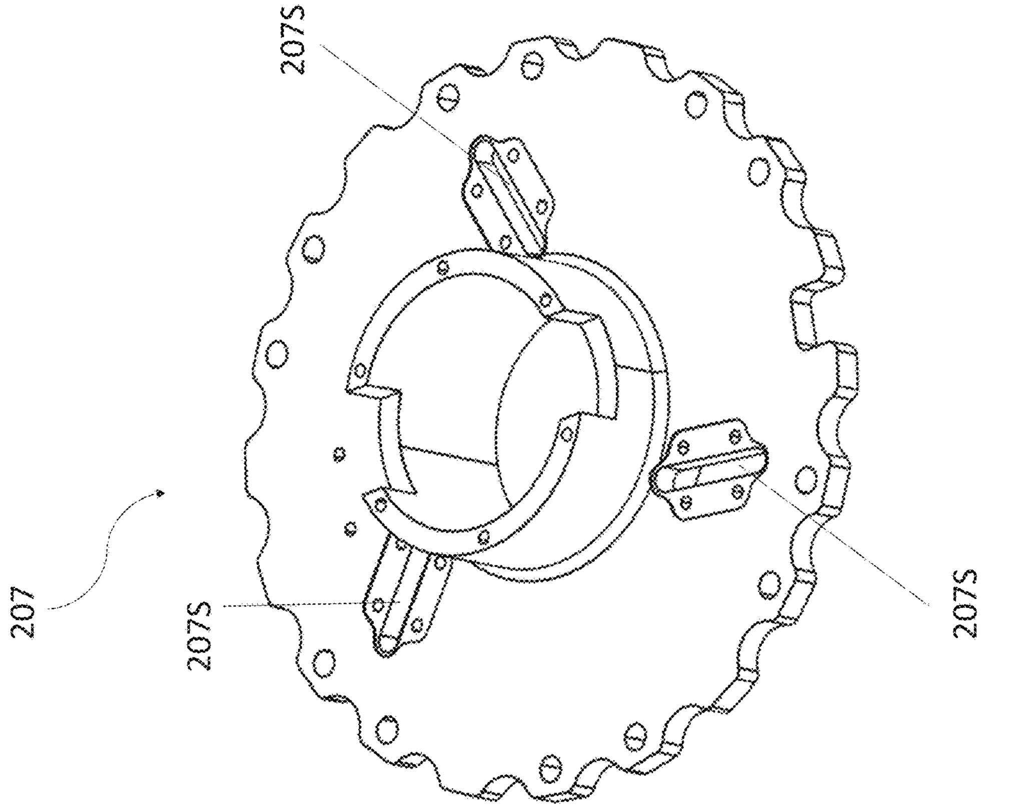
FIG. 16A is an isometric view of a top of the brake disk of the yaw brake assembly.
Figure 16C:
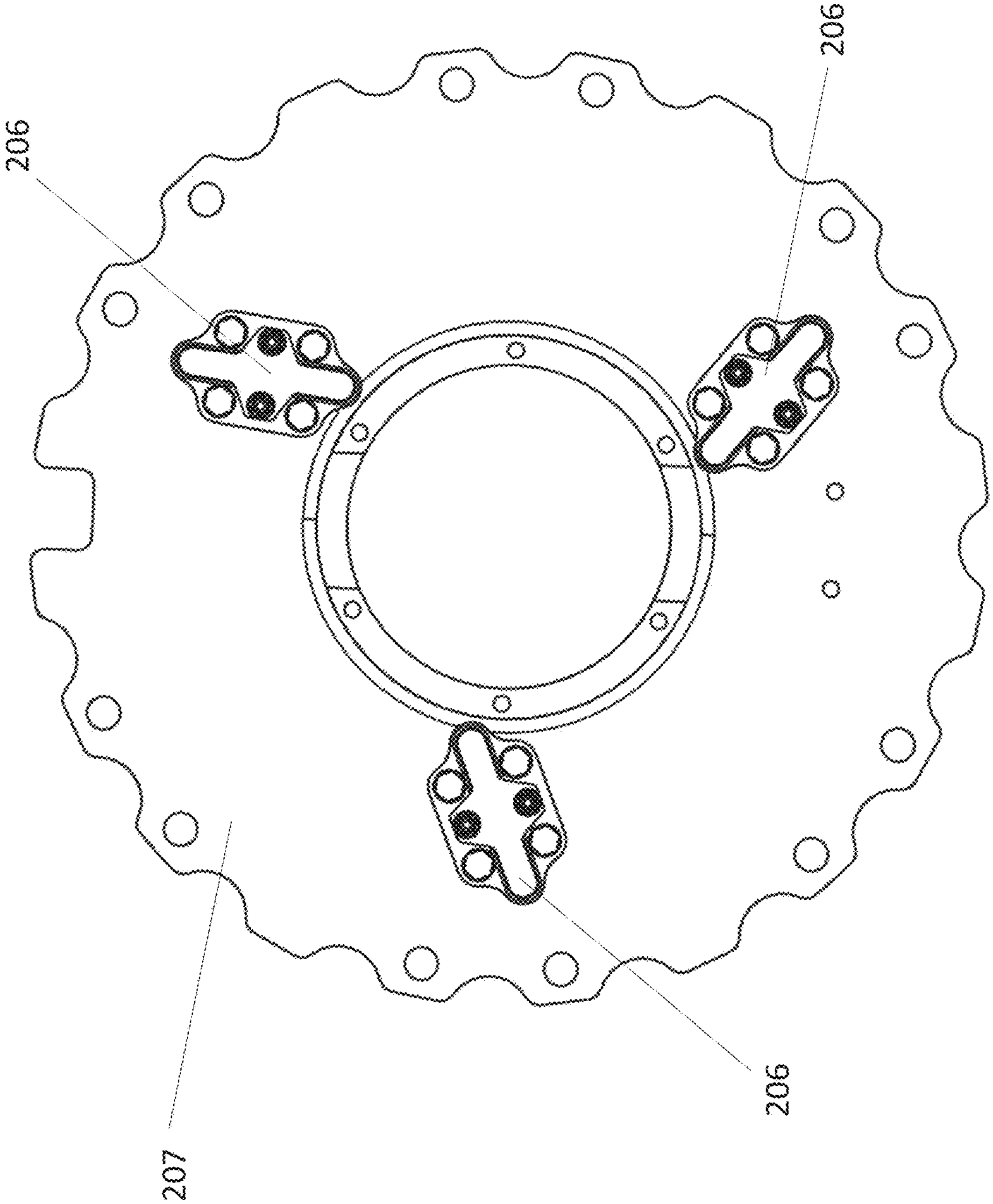
FIG. 16C is a top view of the brake disk of the yaw brake assembly showing the brush assemblies positioned in the brake disk.

FIG. 14A is a top partial view of yaw drive system 64 showing yaw brake assembly 108. FIG. 14B is an enlarged partial cutaway isometric view of yaw drive system 64 showing yaw brake assembly 108. FIG. 14C is a partial isometric view from above yaw drive system 64 showing yaw brake assembly 108 mounted in rear chassis 52 and with brake disk 208 removed. FIG. 15A is an exploded isometric view of yaw brake assembly 108 and stub mast 22 from below. FIG. 15B is a partially exploded isometric view of yaw brake assembly 108 from above not showing brake disk 208 and connected to stub mast 22. FIG. 15C is a partially exploded isometric view of yaw brake assembly 108 not showing brake disk 208 and stub mast 22. FIG. 15D is an assembled isometric view of yaw brake assembly 108 not showing brake disk 208 and stub mast 22. FIG. 15E is an assembled isometric view of yaw brake assembly 108 not showing brake disk 208, stub mast 22, and yaw drive housing 176 from above. FIG. 15F is an assembled isometric view of yaw brake assembly 108, stub mast 22, and yaw drive housing 176 from below. FIG. 15G is an assembled isometric view of yaw brake assembly 108 from below. FIG. 16A is an isometric view of a top of brake disk 208 of yaw brake assembly 108. FIG. 16B is an isometric view of a bottom of brake disk 208 of yaw brake assembly 108. FIG. 16C is a top view of brake disk 208 of yaw brake assembly 108 showing brush assemblies 206 positioned in brake disk 208. FIGS. 14A-16C will be discussed together.

Wine turbine nacelle 10 includes generator 14, stub mast 22 (which includes cylindrical body 22A, bottom flange 22B, outer upper flange 22C, pedestal 22D, inner brake support flange 22E, yaw brake disc surface 22F), and yaw drive system 64. Generator 14 includes rear chassis 52, which includes cylindrical neck section 130, actuator support platform 134, and inner neck flange 174. Yaw drive system 64 includes motor 102, yaw worm drive 104, yaw brake assembly 108, and yaw drive housing 176, bolts 180, and grease system 181. Yaw brake assembly 108 includes a yaw brake caliper 200, brake pad 202, spring guides 203, springs 204, brush assemblies 206, brake disk 207 (including grooves 207G and slots 207S), bolts 208, and bolts 210. Yaw drive housing 176 includes vertical annular portion 212 and worm drive housing 213. Yaw brake caliper 200 includes lower flange 216, neck 218 (having tabs 218T), shoulder 220, and upper flange 222. Brake pad 202 includes friction pads 223 and backing plate 224.

Stub mast 22 has hollow cylindrical body 22A. Bottom flange 22B extends outward from a bottom of cylindrical body 22A. Outer upper flange 22C extends outward from a top of cylindrical body 22A. Pedestal 22D extends inward and up from a top of cylindrical body 22A. Inner brake support flange 22E extends inward from a top of pedestal 22D. Yaw brake disc surface 22F is the upper surface of inner brake support flange 22E.

Yaw brake assembly 108 of yaw drive system 64 is positioned on stub mast 22 and is concentric with yaw bearing 106 and vertical annular portion 212 of yaw drive housing 176. Yaw brake assembly 108 is positioned on yaw brake disc surface 22F of inner brake support flange 22E of stub mast 22. A portion of yaw brake assembly 108 is connected to cylindrical neck section 130 of rear chassis 52. Yaw brake assembly 108 is positioned radially inside yaw drive housing 176.

Yaw brake caliper 200 is positioned on yaw brake disk surface 22F of inner brake support 22E of stub mast 22. Lower flange 216 of yaw brake caliper 200 is connected to inner brake support flange 22E of stub mast 22 via bolts 208. Yaw brake caliper 200 makes up a portion of an exterior of yaw break assembly 108. Yaw brake caliper has neck section 218 connected to lower flange 216 on one end and upper flange 222 on the other end. Tabs 218T are protrusions that extend inward from an inner surface, or inner diameter, of neck 218. Yaw brake caliper 200 has six tabs 218T. Shoulder 220 extends inward from neck 218.

Each of a plurality of spaced springs 204 is positioned in yaw brake caliper 200 on one of spaced spring guides 203 that extend up from lower flange 216 of yaw brake caliper 200. In this embodiment, yaw brake assembly 108 has twelve spring guides 203 and twelve springs 204. In alternate embodiments, yaw brake assembly 108 may have any suitable number of spring guides 203 and springs 204. As such, springs 204 are within yaw brake caliper 200. During assembly of wind turbine nacelle 10, springs 204 are initially in an uncompressed state.

Brake pad 202 of yaw brake assembly 108 is positioned on springs 204 within neck 218 of yaw brake caliper 200, resting on shoulder 220 of yaw brake caliper 200. When springs 204 are in an uncompressed state, brake pad 202 extends past upper flange 222 of yaw brake caliper 200. Brake pad 202 comprises, or is divided into, two separate halves, or sections, that form a ring, the ends of a first half of brake pad 202 contacting the ends of a second half of brake pad 202. Both halves of brake pad 202 are arranged in a close circle against neck 218 of brake caliper 200. Brake pads 202 are shaped to fit snugly within yaw brake caliper 200. Brake pad 202 has indentations into which tabs 218T of yaw brake caliper 200 fit.

Yaw bearing 106, yaw worm drive 104, and yaw drive housing 176 are fitted over yaw brake caliper 200 to surround yaw brake caliper 200. Rear chassis 52 is connected to yaw bearing 106. Backing plate 224 is connected to rear chassis 52 to force springs 204 into a compressed state. A bottom surface of backing plate 224 of brake pad 202 contacts springs 204. Backing plate 224 is made of metal. Friction pads 223 of brake pad 202 are bonded to a top surface of backing plate 224. Friction pads 223 are spaced from each other. In this embodiment, friction pads 223 are cylindrical. In alternate embodiments, friction pads 223 may be any suitable shape. Friction pads 223 are made of friction material. Friction pads 223 contact brake disk 207.

Brake disk 207 is positioned on friction pads 223 of brake pad 202. Brake disk 207 is secured to inner neck flange 174 of cylindrical neck section 130 of rear chassis 52 via bolts 210 such that springs 304 are between lower flange 216 of yaw brake caliper 200 and brake pad 202. Brake disk 207 has spaced grooves 207G extending partially into brake disk 207 from bottom surface of brake disk 207 such that grooves 207G face friction pads 223 of brake pad 202. Grooves 207G extend radially along brake disk 207. Brake disk 207 has slots 207S extending through brake disk 207 from the top surface of brake disk 207 to the bottom surface of brake disk 207. In this embodiment, brake disk 207 has three slots 207S. In alternate embodiments, brake disk 207 may have any number of slots, matching the number of brush assemblies 206. Brush assemblies 206 are connected to brake disk 207. Each brush assembly 206 extends through one of slots 207S of brake disk 207 to contact friction pads 223.

Brake pad 202 is shaped to stay in place within yaw brake caliper 200. Tabs 218 of neck 218 of yaw brake caliper 200 are shaped to grip and lock sections of brake pad 202 together. Backing plate 224 of brake pad 202 fits between and around tabs 218T so that brake pad 202 cannot move side-to-side within yaw brake caliper 200. As a result, brake pad 202 does not move horizontally, or along the x-axis or y-axis, within yaw brake caliper 200. Brake pad 202 can only move in a vertical direction, as a result of pressure from spring 204.

Bolts 208 extend through lower flange 216 of yaw brake caliper 200 and into inner brake support flange 22E to connect, or fasten, yaw brake caliper 200 to stub mast 22. Bolts 210 extend through brake disk 207 into inner neck flange 174 of cylindrical neck section 130 of rear chassis 52 to connect, or fasten, brake disk 207 to rear chassis 52 and apply a downward force onto brake pad 202. As such, brake disk 207 pushes brake pad 202 down from an uncompressed state to a compressed state where brake pad 202 is fully within yaw brake caliper 200. As a result, brake pad 202 compresses springs 204 by applying the downward force onto springs 204. Springs 204 are prevented from movement by lower flange 216 of yaw brake caliper 200. In response, springs 204 provide an upward force onto the backing plate 224 of the brake pad 202, providing brake pressure. Metal backing plate 224 of brake pad 202 spreads and applies the force from springs 204 to friction pads 223.

Yaw bearing 106, yaw worm drive 104, and yaw drive housing 176 are fitted over yaw brake caliper 200 to surround yaw brake caliper 200. Stationary friction pads 223 are pushed against rotating brake disk 207. Force is constantly applied to friction pads 223 of brake pad 202 of yaw brake assembly 108 via springs 204 such that brake pad 202 is permanently engaged with, or forced against, brake disk 207. Brake pad 202 has a coefficient of friction that creates the braking torque that enables constant force against brake pad 202, without causing slip stick. Thus, yaw brake assembly 108 exerts a constant braking torque on brake disk 207 to impose a holding torque on yaw drive system 64 that damps yaw movement of wind turbine nacelle 10 but does not cause slipstick. As such, yaw brake assembly 108 constantly stabilizes yaw bearing 106, preventing wind turbine nacelle 10 from oscillating due to rotation and vibration of rotor assembly 50.

Yaw worm drive 104 of yaw drive system 64 provides a rotational force via yaw bearing 106 that overcomes the constant braking torque on brake disk 207 when rear chassis 52 of wind turbine nacelle 10 is rotated. Rotation of wind turbine nacelle 10 via rotation of rear chassis 52 is stopped when the rotational force generated by yaw worm drive 104 is overcome by the constant braking torque generated by yaw brake assembly 108. Applying a constant torque to counter rotational movement of yaw drive system 64 via yaw brake assembly 108 also eliminates backlash between threading 185T of screw 182 of yaw worm drive 104 and teeth 195 of outer casing 194 of yaw bearing 106.

Spring guides 203 control the position of springs 204, preventing springs 204 from moving side-to-side. The force from springs 204 and the friction from brake pad 202 on brake disk 207 creates, or exerts, braking torque on rear chassis 22. Applying enough pressure via bolts 210 and brake disk 207 to springs 204 can cause springs 204 to compress to the point that pressure against brake pad 202 is sufficient for yaw brake assembly 108 to come to a complete stop. The brake pressure, or force, from springs 204, also preloads the yaw bearing 106, which removes manufacturing tolerance.

Friction pads 223 of brake pad 202 wear down during operation. As rear chassis 52 and brake disk 207 with brush assemblies 206 is rotated, tabs 218T of neck 218 of yaw brake caliper 200 push the sections of brake pad 202 together. The positioning of each section of brake pad 202 ensures brake pad 202 locks together and all sections of brake pad 202 act as one. Movement of brake pad 202 in any direction other than up and down is limited by the tight fit of brake pad 202 within yaw brake caliper 200. As friction pads 223 wear down, metal backing plate 226 of brake pad 202 is pushed farther up by springs 204. When friction pads 223 of brake pad 202 wear to a level that requires replacement, brake disk 207 can be removed by removing bolts 210, making brake pad 202 easily accessible for service. Yaw brake assembly 108 may include a trigger that sends a signal indicating that service is required to replace brake pad 202.

Brake pad 202 has friction pads 223 that are shaped and spaced from each other to allow dust to escape, ensuring friction pads 223 and brake disk 207 are protected from contamination. Friction pads 223 do not move during operation of wind turbine nacelle 10 and the critical spring compression gap is maintained throughout operation of wind turbine nacelle 10. As brake disk 207 moves, any contamination between brake disk 207 and friction pads 223 falls into the spaces around friction pads 223, onto backing plate 224. Optimal contact between friction pads 223 of brake pad 202 and brake disk 207 allows for removal of brake dust and other contaminants from friction pads 223 as brake pad 202 rotates. Dust and other contaminants that have built up over time are scraped by spring-loaded wire brush assemblies 206 off friction pads 223 to fall into the space around friction pads 223, such as the space between friction pads 223, and onto backing plate 224. Further, as brake pad 202 rotates, contaminants are also collected by grooves 207G of brake disk 207. Grooves 207G can act as a knife to clean away buildup of brake dust that has compressed onto friction pads 223. Contaminants may collect in grooves 207G and fall beyond edges of friction pads 223 to be deposited into the space around friction pads 223, onto backing plate 224, when grooves 207G are no longer in alignment with friction pads 223. Wind turbine nacelle 10 can be serviced, brake disk 207 being easily removable, to remove dust and contaminants from backing plate 224. As such, brush assemblies 206 and grooves 207G of brake disk 207 clean friction pads 223 by removing loose brake material, dust, or other contaminants from friction pads 223 as brake disk 207 rotates.

Rotational movement of wind turbine nacelle 10 is damped by central yaw brake assembly 108 to avoid oscillation of wind turbine nacelle 10, which is caused by the movement of rotor assembly 50 and wind turbulence during normal operation and during yaw adjustment. Because yaw brake assembly 108 is permanently applied, damage to yaw drive system 64 when wind turbine nacelle 10 is moving is reduced, increasing reliability of yaw drive system 64. Wind turbine nacelle 10 also produces less noise. Further, removing bearing clearance increases the life of yaw bearing 106.

Ensuring brake pad 202 does not move in any horizontal direction ensures optimal performance of yaw brake assembly 108. Implementing a brake dust management system also ensures that reliable performance of yaw brake assembly 108 is maintained, as corrosion and contamination is prevented. Cleaning friction pads 223 of brake pad 202 and an inner surface of brake disk 207 by removing contaminants, such as braking dust, is critical to the operation of yaw brake assembly 108 as it prevents contaminants from affecting contact between brake pad 202 and brake disk 207. The life of brake disk 202 is extended. Further, servicing yaw brake assembly 108 to replace parts, such as brake pads 202, is simplified because brake disk 207 is easily removable to expose brake pad 202.

Figure 17A:
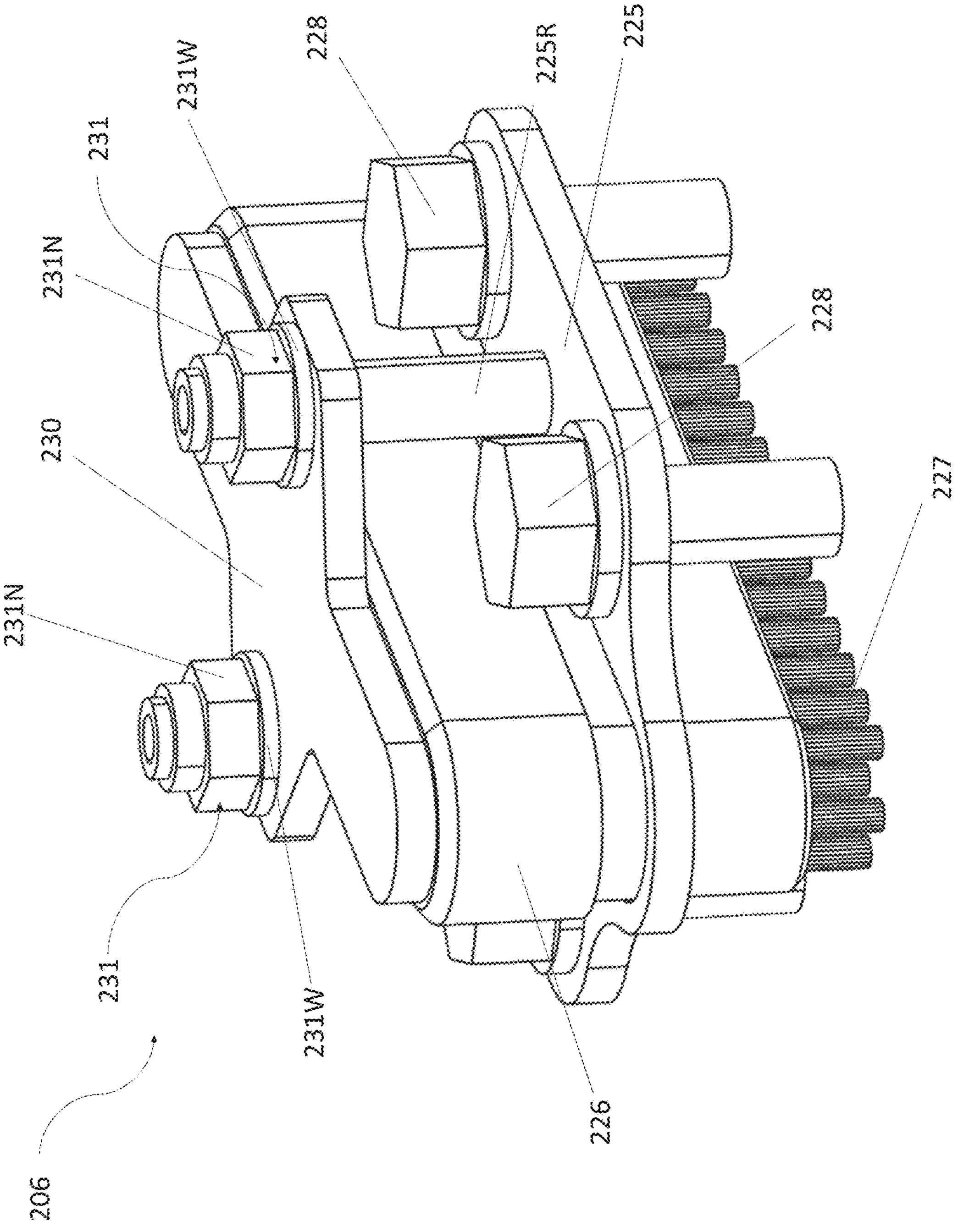
FIG. 17A is an assembled isometric view of one of the brush assemblies.
Figure 17B:
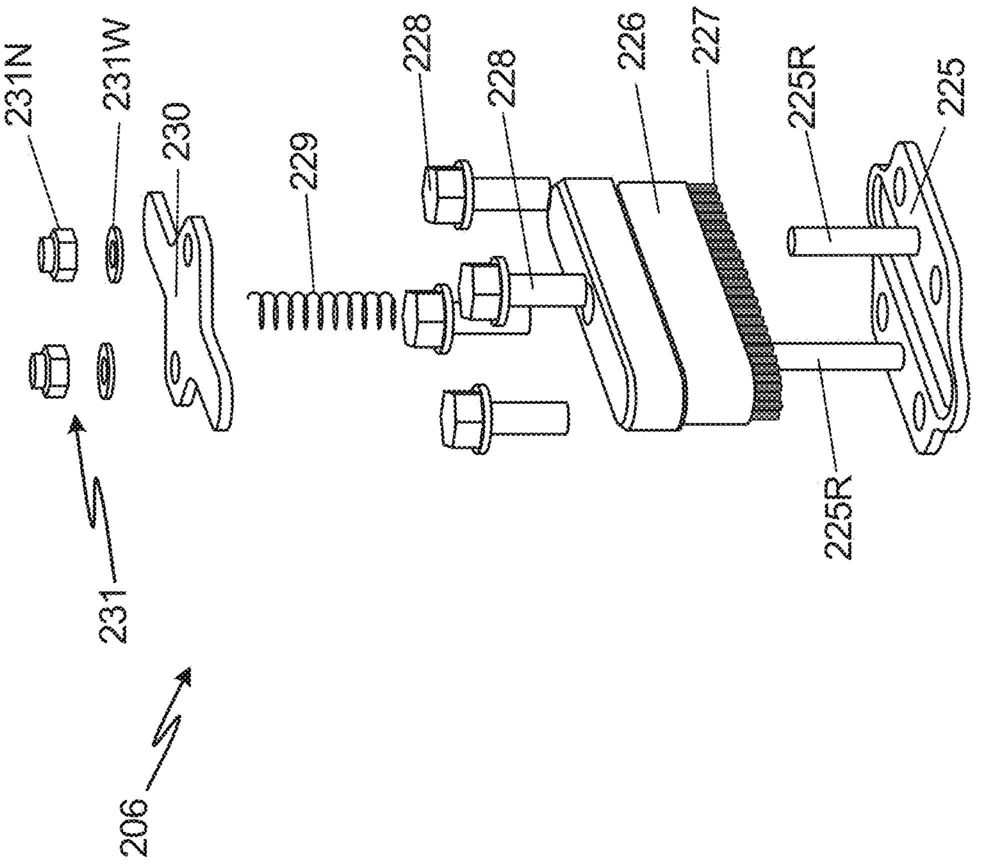
FIG. 17B is an exploded view of one of the brush assemblies.

Brush Assemblies (FIGS. 17A-17B; Also See FIGS. 10A-11, 12C-12G, 14A-14B, 16C)

FIG. 17A is an assembled isometric view of one of brush assemblies 206. FIG. 17B is an exploded view of one of brush assemblies 206. FIGS. 17A and 17B will be discussed together. Brush assembly 206 includes mounting chassis 225 (having rods 225R), brush body 226, bristles 227, connectors 228, spring 229 (shown in FIG. 17B), plate 230, and connectors 231 (each including washer 231W and nut 231N).

Brush assembly 206 has mounting chassis 225 with a flat body portion, which has a slot in the center. Two rods 225R extend up from the body portion of mounting chassis 225. Brush body 226 extends through the slot in mounting chassis 225 such that mounting chassis 225 surrounds a middle portion of brush body 226. Mounting chassis 225 contacts a shoulder within the middle portion of brush body 226. Brush body 226 is made of plastic. Bristles 227 extend downward from a bottom of brush body 226. Bristles 227 are made of stainless steel. Connectors 228 extend through holes in mounting chassis. Spring 229 is positioned in a top portion of brush body 226. Plate 230 is positioned over spring 229 and connected and secured to mounting chassis 228 via two connectors 231. In this embodiment, each connector 231 includes washer 231W and nut 231N. In alternate embodiments connectors 231 may be any suitable connectors. Each of rods 225R of mounting chassis 225 extends through one of two holes in plate 230 and through one of two washers 231W. Each of rods 225R of mounting chassis 225 also extends through one of two nuts 231N such that washers 231W are between plate 230 and respective nut 231N. Each nut 231N is secured onto one rod 225R of mounting chassis 225.

Mounting chassis 225 and connectors 228 mount and connect brush assembly 206 to brake disk 207. Connectors 231 connect plate 230 to rods 225R of mounting chassis 225, which connects brush body to mounting chassis 225. Plate 230 is also connected via connectors 231 to rods 225R to exert downward force to compress spring 229. As a result, spring 229 exerts downward force on brush body 226 to force bristles 227 at a bottom of brush body 226 to maintain contact with brake pad 202 during rotation of brake disk 207, which causes movement of brush assemblies 206. Further, downward force from spring 229 ensures that bristles 227 stay in contact with brake disk 207 as brake disk 207 wears and is reduced in height. Spring 229 applies enough pressure to scrub away contaminants on the surfaces of friction pads 223, but not so much pressure that friction pads 223 are exposed to excessive wear. Spring 229 maintains pressure of brush assembly 206 on brake pad 202.

Spring-loaded bristles 227 contact brake pad 202 to remove contaminants from friction pads 223 of brake pad 202. As bristles 227 move over a top portion of friction pads 223 of brake pads, contaminants will be forced off the top surfaces of friction pads 223 into spaces around friction pads 223. As such, the top of brake pad 202 is cleaned to yield optimal surfaces of frictions pads 223. Pad glazing is prevented. As a result, the bottom surface of brake disk 207 that faces friction pads is also kept in an optimal condition as less contaminants on friction pads causes less wear to the bottom surface of brake disk 207.

Brake dust management of yaw brake assembly 108 of wind turbine nacelle 10 by brush assemblies 206 maintains reliable performance of yaw brake assembly 108. Corrosion is reduced or prevented, contact between brake pad 202 and brake disk 207 is not affected by contaminants, and slip stick is prevented, reducing noise caused by contaminants on brake pad 202. Brush assemblies 206 extend the life of brake pad 202 and brake disk 207. Cost and time associated with maintenance of wind turbine nacelle 10 is reduced and the life of wind turbine nacelle 10 is extended.

Wind Turbine Blade Pitch System with Bearing Preload (FIGS. 18A-25B)

Figure 18A:
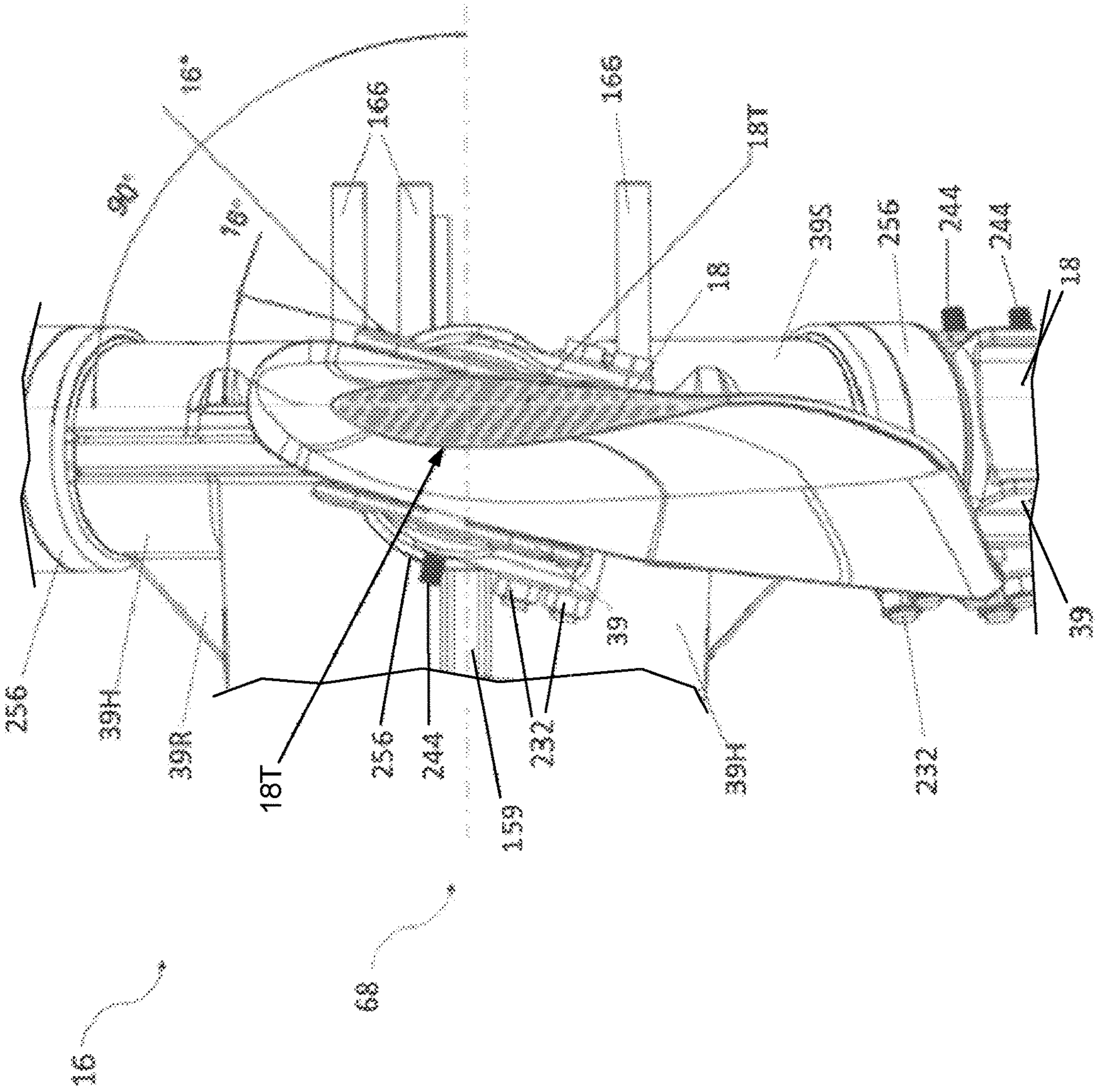
FIG. 18A is an isometric view of the wind turbine nacelle showing a blade in a maximum power blade position.
Figure 18B:
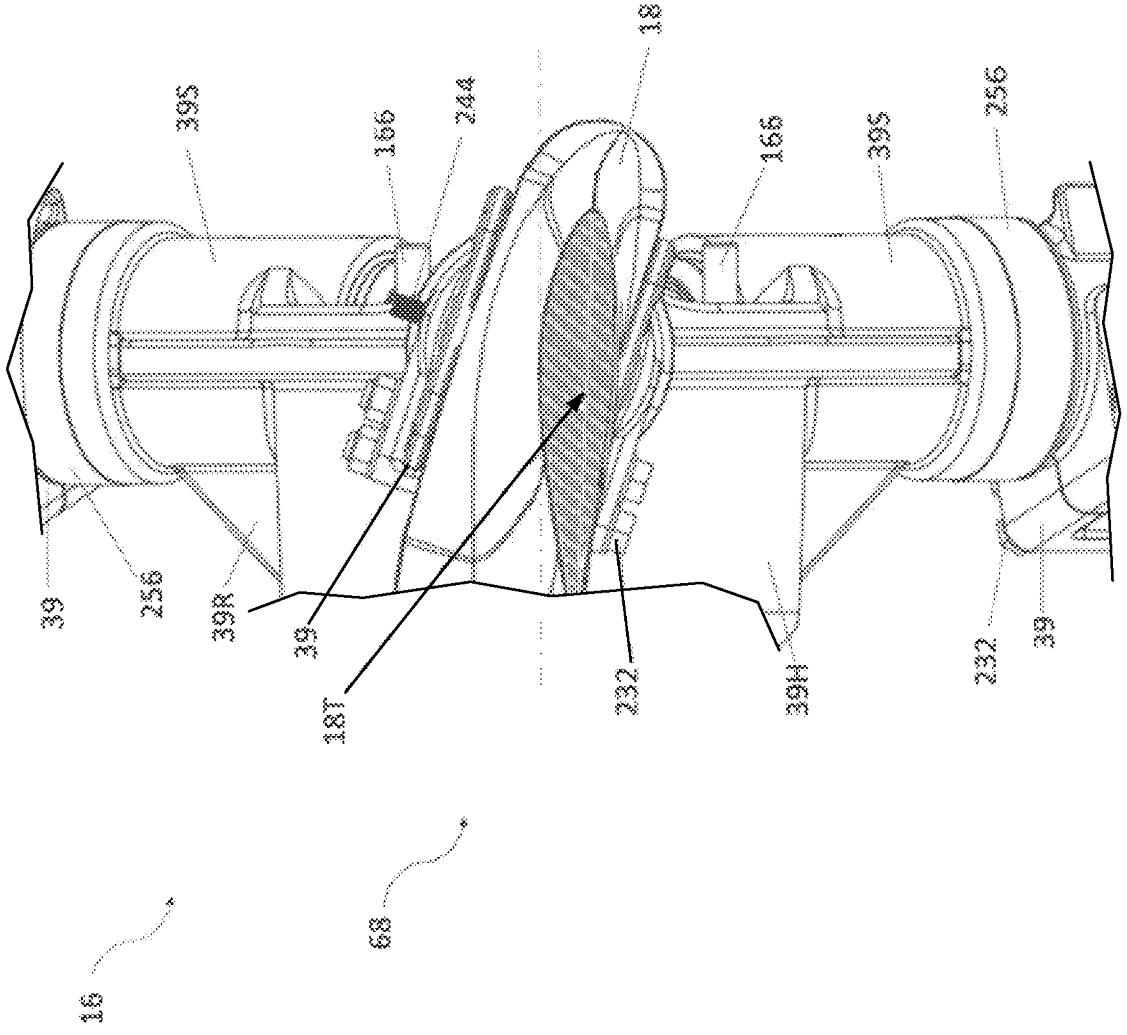
FIG. 18B is an isometric view of the wind turbine nacelle showing a blade in a stall blade position.
Figure 19A:
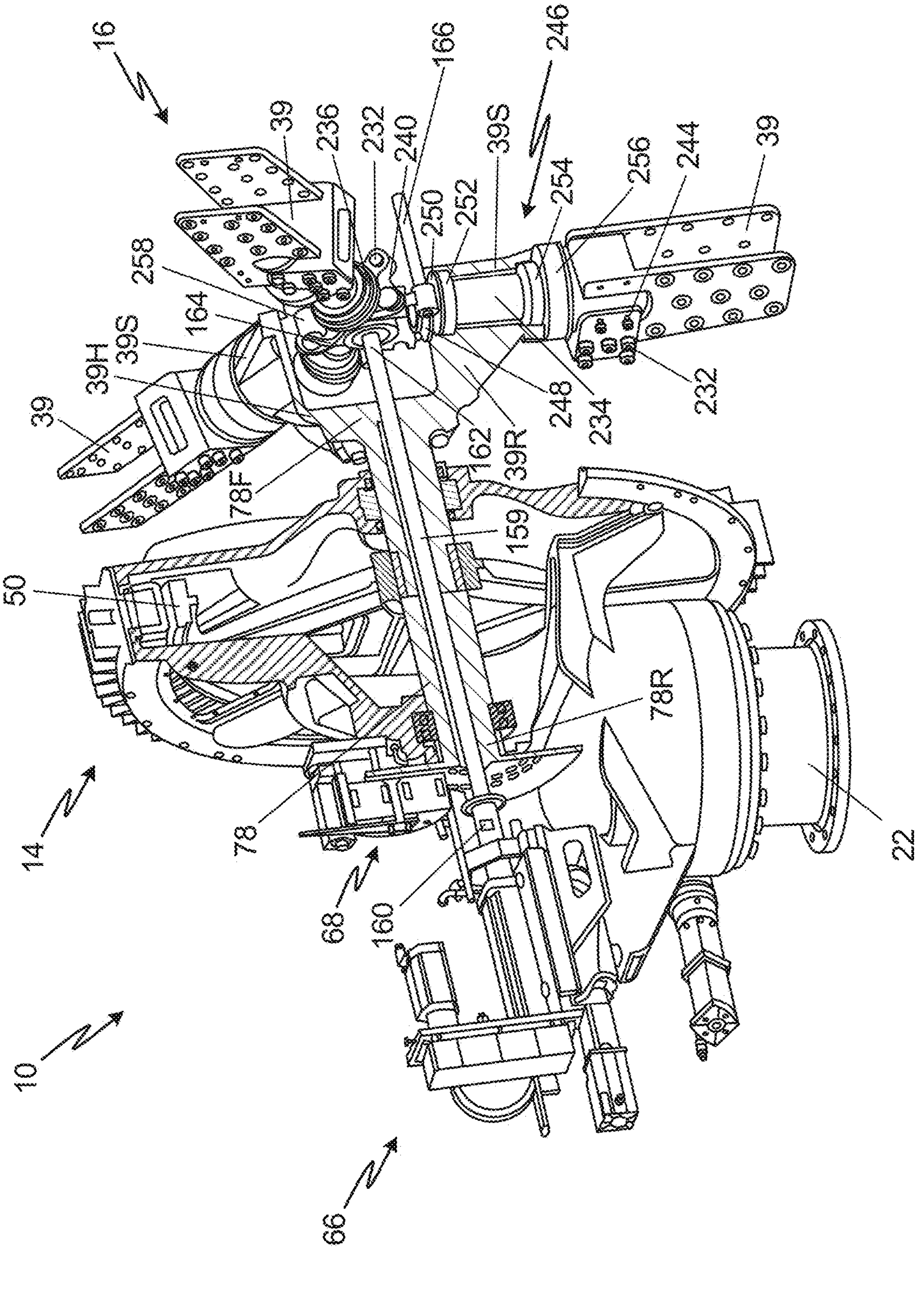
FIG. 19A is an isometric partial sectional view of the wind turbine nacelle showing a rotor head and blade pitch system and a pitch shaft assembly.
Figure 19B:
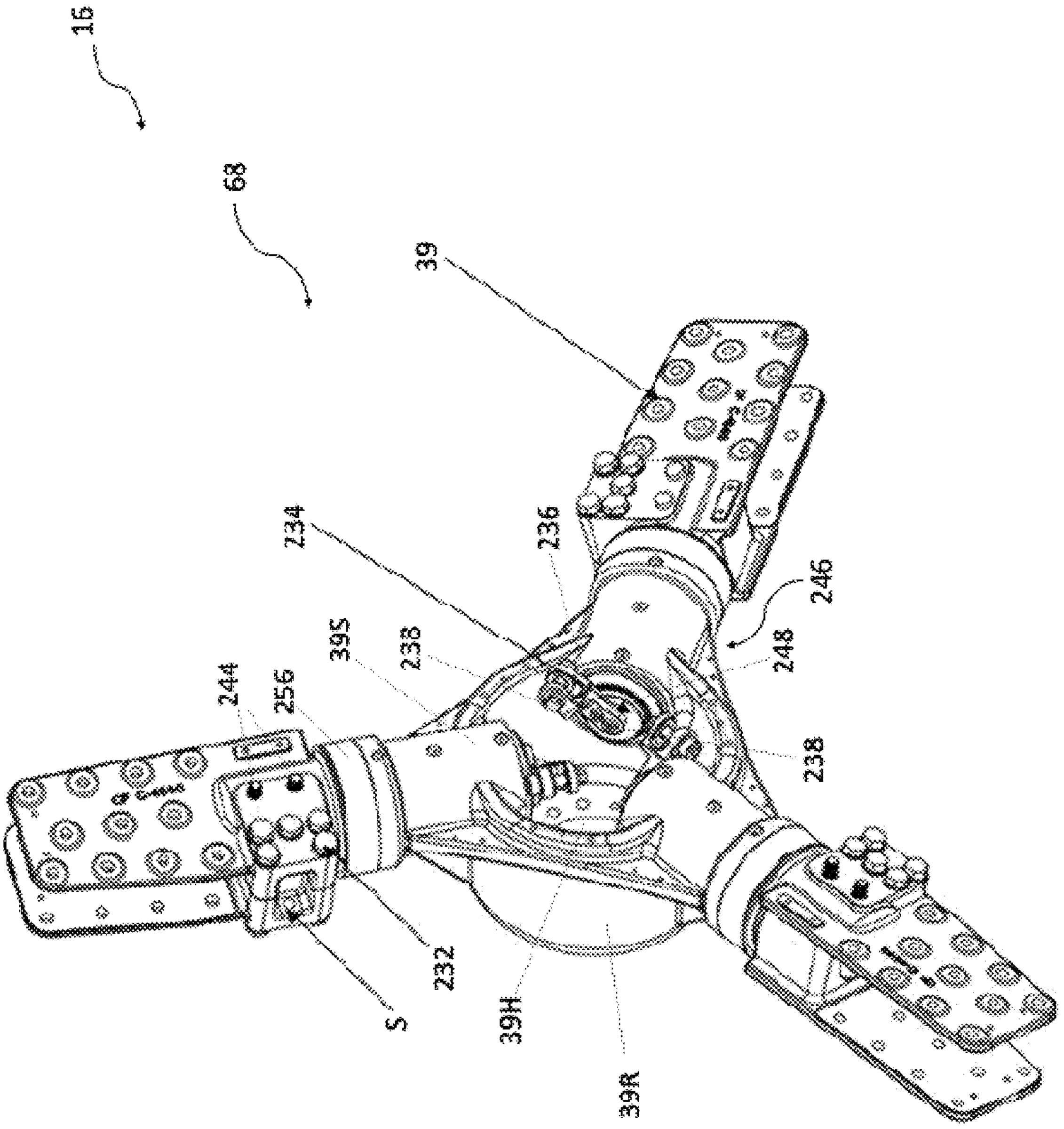
FIG. 19B is a partial isometric view showing the rotor head and blade pitch system.
Figure 20:
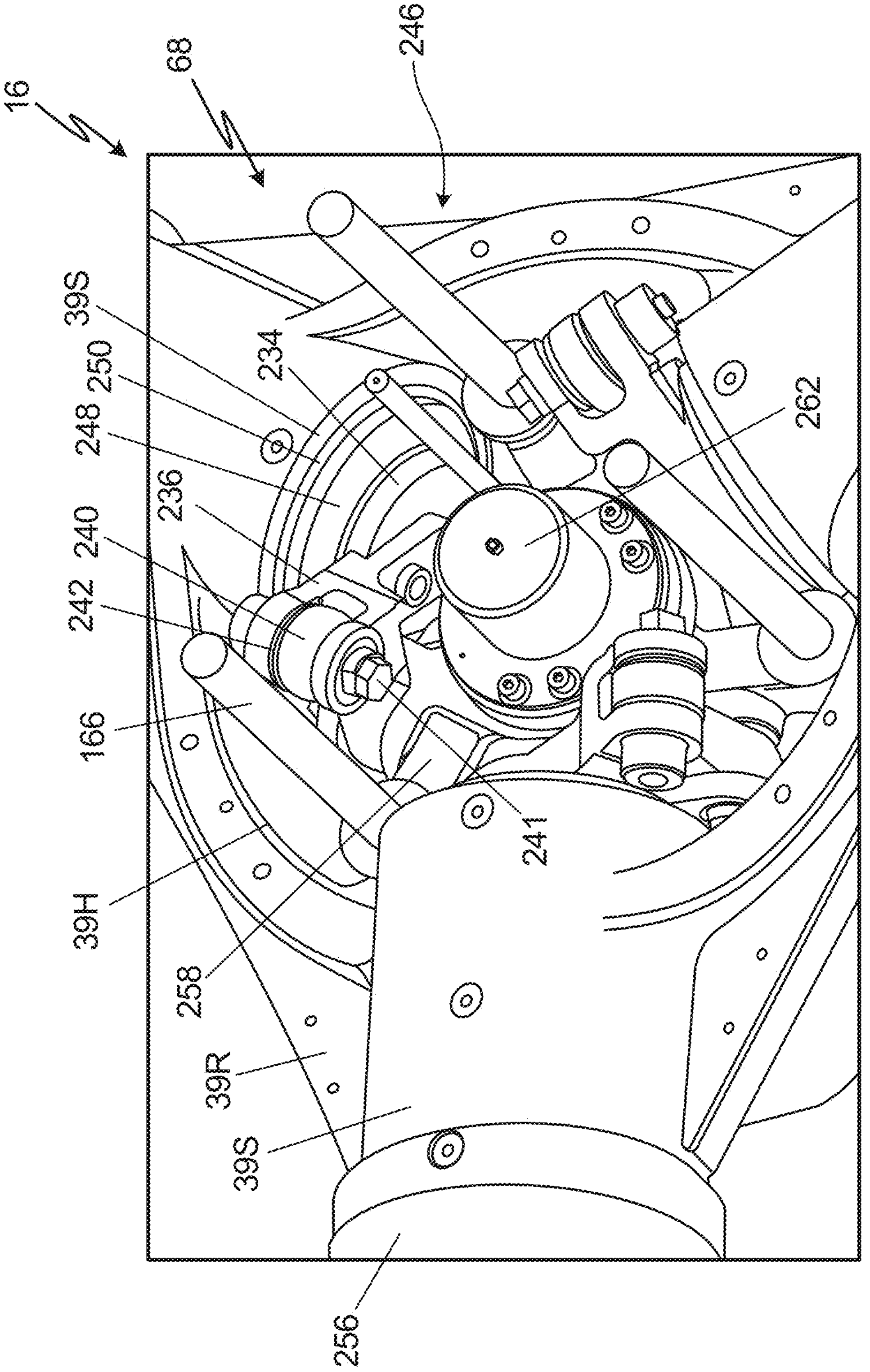
FIG. 20 is a partial oblique view showing the rotor head and blade pitch system connected to the pitch shaft assembly.
Figure 21A:
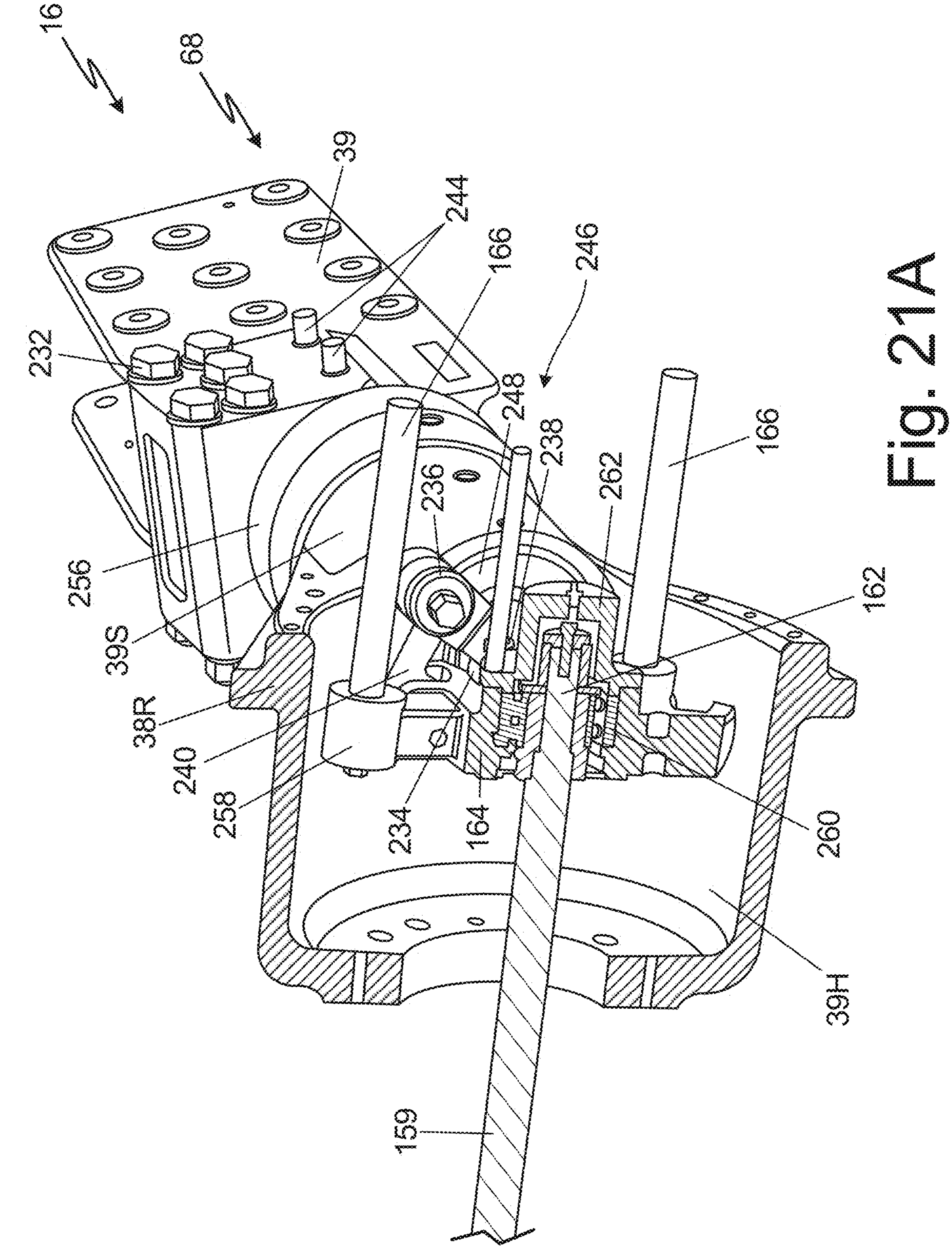
FIG. 21A is a partial cross-sectional view showing the rotor head and blade pitch system connected to the pitch shaft assembly and in a maximum power blade position.
Figure 21B:
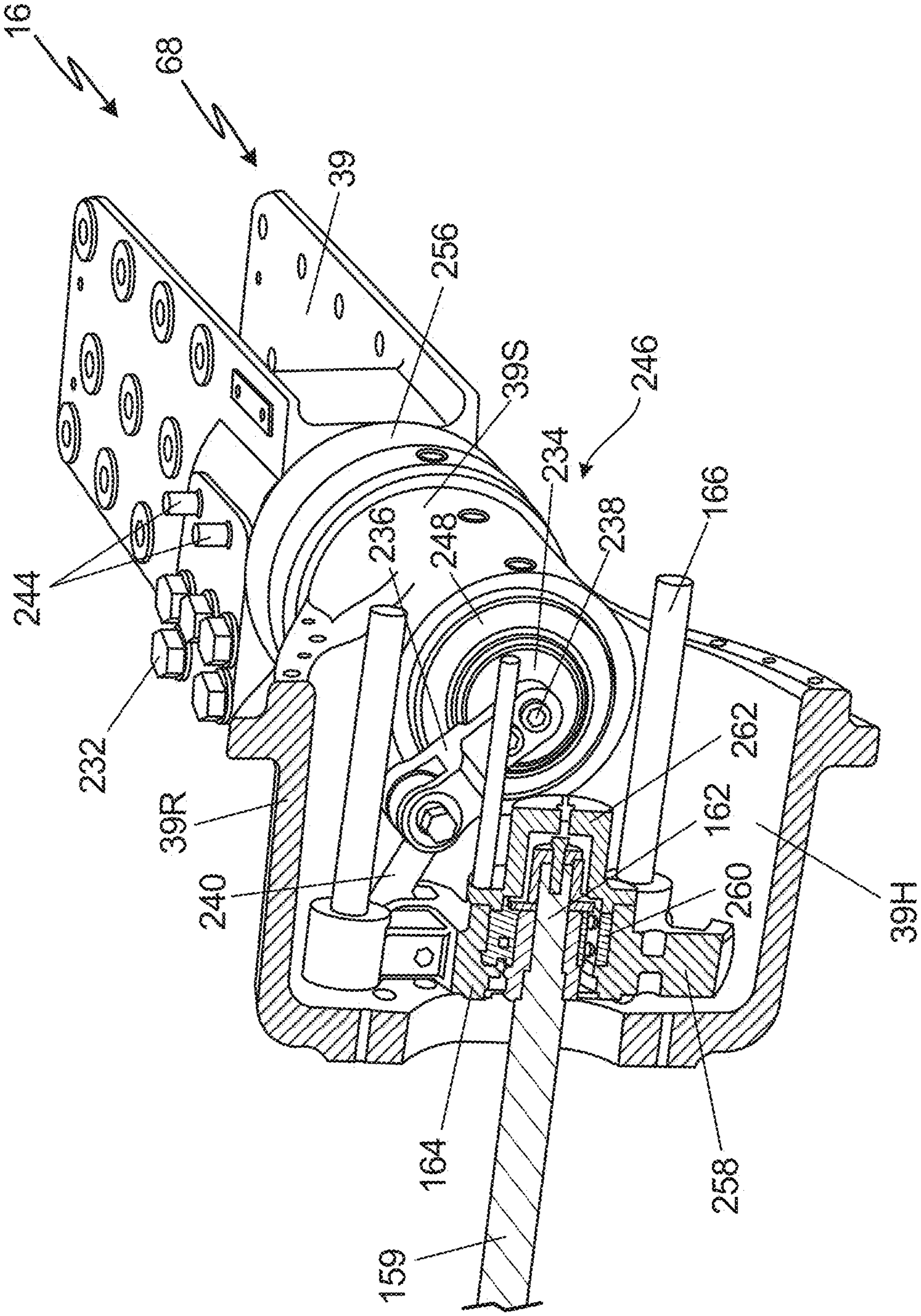
FIG. 21B is a partial cross-sectional view showing the rotor head and blade pitch system connected to the pitch shaft assembly and in a stall blade position.
Figure 22A:
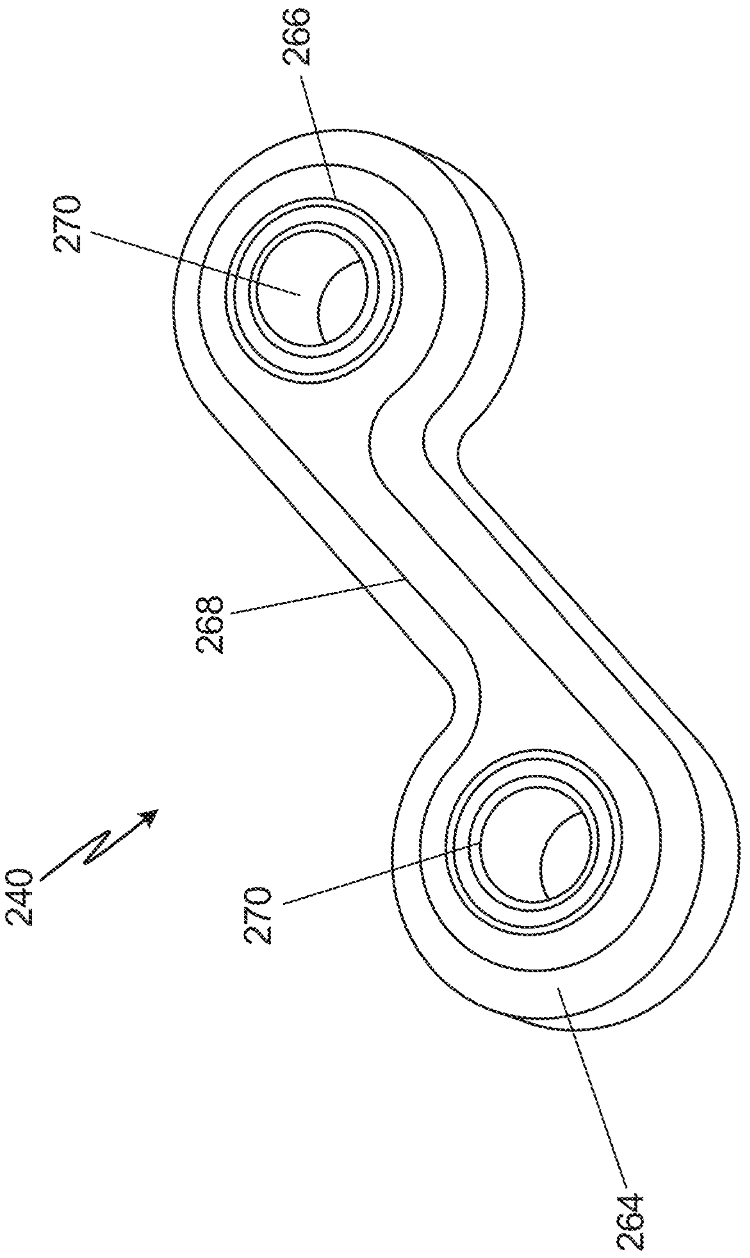
FIG. 22A is an isometric view of a dog bone linkage of the rotor head and blade pitch system.
Figure 22B:
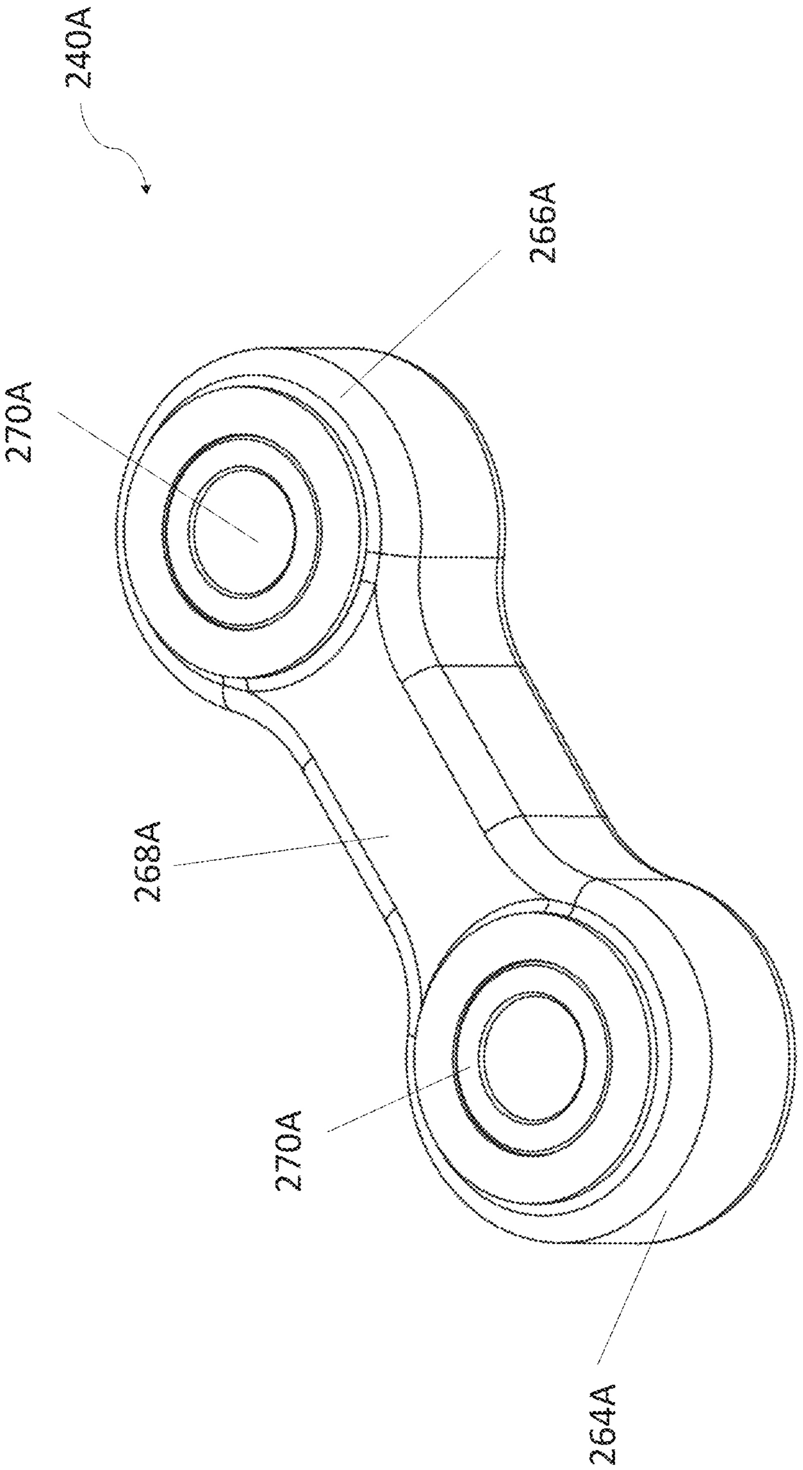
FIG. 22B is an isometric view of a second embodiment of a dog bone linkage.

FIG. 18A is an isometric view of wind turbine nacelle 10 showing blade 18 in a maximum power blade position. FIG. 18B is an isometric view of wind turbine nacelle 10 showing blade 18 in a stall blade position. FIG. 19A is an isometric partial sectional view of wind turbine nacelle 10 showing rotor head and blade pitch system 16 and pitch shaft assembly 68. FIG. 19B is a partial isometric view showing rotor head and blade pitch system 16. FIG. 20 is a partial oblique view showing rotor head and blade pitch system 16 connected to pitch shaft assembly 68. FIG. 21A is a partial cross-sectional view showing rotor head and blade pitch system 16 connected to pitch shaft assembly 68 and in a maximum power blade position. FIG. 21B is a partial cross-sectional view showing rotor head and blade pitch system 16 connected to pitch shaft assembly 68 and in a stall blade position. FIG. 22A is an isometric view of dog bone linkage 240 of rotor head and blade pitch system 16. FIG. 22B is an isometric view of dog bone linkage 240A. FIGS. 18A-22B will be discussed together.

Wind turbine nacelle 10 includes generator 14, rotor head and blade pitch system 16, stub mast 22, and blade trim actuator system 66, which includes pitch shaft assembly 68. Generator 14 includes rotor assembly 50, which includes rotor generator shaft 78 (having rear end 78R and forward end 78F). Rotor head and blade pitch system 16 includes blades 18 (each having blade tip 18T), blade holders 39, rotor head 39R, rotor head housing 39H, shaft housings 39S, bolts 232, blade shafts 234, pitch linkages 236, center bolts 238, dog bone linkages 240 (or dog bone linkages 240A), bolts 241, anti-rattle washers 242, pins 244, and blade bearing systems 246, each of which includes backstop 248, inner seal 250, inner bearing 252, outer bearing 254, and compression plate 256. Pitch shaft assembly 68 includes shaft 159, rear end 160, forward end 162, pitch head 164, guide rods 166, spider 258, spider bearing 260, and nose guide 262. Each dog bone linkage 240 includes circular portion 264, circular portion 266, center portion 268, and linkage bushes 270. Each dog bone linkage 240A includes circular portion 264A, circular portion 266A, center portion 268A, and linkage bushes 270A.

Blades 18 are connected to blade holders 39 at proximal ends of blades 18, which are opposite blade tips 18T. As shown in FIGS. 18A and 18B, blade tips 18T are the distal ends of blades 18. Blade holders 39 are rotatably connected to rotor head 39R. Rotor head 39R is a casting that includes rotor head housing 39R and shaft housings 39S. Rotor head housing 39H is an open cylindrical portion of rotor head 39R. Rotor head housing 39H has an open upstream end and a closed downstream end that is connected to forward end 78F of rotor generator shaft 78. Shaft 159 of pitch shaft assembly 68 extends through rotor generator shaft 78 and a circular opening in the closed downstream end of rotor head housing 39H. As such, forward end 162 of shaft 159 and pitch head 164 of pitch shaft assembly 68 are positioned within rotor head housing 39H. Guide rods 166 extend beyond the open upstream end of rotor head housing 39H. Shaft housings 39S are portions of rotor head 39R that are connected to rotor head housing 39R adjacent the open upstream end of rotor head housing 39R. Rotor head 39R includes three shaft housings 39S. Each of three blade holders 39 is connected to rotor head 39R at one of three shaft housings 39S.

Saw-cuts S are saw-cut shaped slits in blade holders 39. Each of blade holders 39 has two halves clamped together at one saw cut S and locked in place, or held together, via a series of bolts 232 that extend through both halves of blade holder 39, connecting the two halves of blade holder 39. Each blade holder 39 is clamped around a distal end of one blade shaft 234, bolts 232 extending through each blade holder 39 and blade shaft 234, securing blade holder 39 around a distal portion of blade shaft 234. In alternate embodiments, blade holder 39 and blade shaft 234 may have an interference fit. Blade shafts 234 are cylindrical shafts adjacent rotor head 39R and extending through shaft housings 39S such that portions of blade shafts 234 are within shaft housings 39S. Rotor head and blade pitch system 16 includes three blade shafts 234, each blade shaft extending through a respective shaft housing 39S. As such, each of three blade shafts 234 extends through one of blade holders 39 and one of shaft housings 39S. Blade shafts 234 are spaced from interior surfaces of shaft housings 39S such that each shaft housing 39S surrounds and is spaced from a respective blade shaft 234. Each shaft housing 39S surrounds a proximal portion of one blade shaft 234. Each blade shaft 234 is rotatable relative to shaft housing 39S. Each blade shaft 234 has a smooth outer surface as blade shafts 234 are not threaded.

Rotor head and blade pitch system 16 has three pitch linkages 236 and three center bolts 238. Each of blade shafts 234 is connected to one of pitch linkages 236 via one of center bolts 238. Center bolt 238 extends through pitch linkage 236 and into a center portion of blade shaft 234 from a proximal end of blade shaft 234. As seen in FIGS. 19B, 20, and 21B, a first end of pitch linkage 236 is connected to blade shaft 234 and a second end of pitch linkage 236 is connected to dog bone linkage 240. Pitch linkage 236 is fork-like with a single portion connected to blade shaft 234 and the two-pronged portion connected to dog bone linkage 240. A first end of dog bone linkage 240 is positioned within the two-pronged portion of pitch linkage 236. Rotor head and blade pitch system 16 includes three dog bone linkages 240. Each of dog bone linkages 240 is connected to one of pitch linkages 236 and to pitch head 164 of pitch shaft assembly 68. Rotor head and blade pitch system 16 includes three bolts 241. As seen in FIG. 20, each of bolts 241 extends through one of pitch linkages 236 and one of dog bone linkages 240 to connect dog bone linkages 240 to respective pitch linkages 236. Each of three anti-rattle washers 242 is positioned between one of dog bone linkages 240 and one of pitch linkages 236 and around one of bolts 241. As such, a proximal end of each shaft 234 is connected to pitch shaft assembly 68 adjacent a forward end 162 of shaft 159 of pitch shaft assembly 68. A distal end of each shaft 234 is connected to a respective blade holder 39 via two pins 244 that extend through each blade holder 39 and each blade shaft 234. Pins 244 are steel.

Each of three blade holders 39 is connected to one of three shaft housings 39S of rotor head 39R via one of three blade bearing systems 246. As such, blade bearing systems 246 connect rotor head 39R to blade holders 39. Each blade shaft 234 is surrounded by one of blade bearing systems 246. Each blade bearing system 246 has backstop 248 surrounding a proximal portion of blade shaft 234 adjacent the proximal end of blade shaft 234 that is connected to pitch linkage 236. A proximal portion of backstop 248 extends outside of shaft housing 39S and a distal portion of backstop 248 contacts and extends within shaft housing 39S. The proximal portion of backstop 248 abuts pitch linkage 236. Backstop 248 is secured to blade shaft 234 via an interference fit between backstop 248 and blade shaft 234. Blade shaft 324 has an annular lip adjacent a proximal end of blade shaft 234 that fits within a shoulder of backstop 248. Inner seal 250 is mounted around blade shaft 234 between the distal portion of backstop 248 and shaft housing 39S. Inner seal 250 is positioned around a portion of backstop 248 within shaft housing 39S such that inner seal 250 is radially between shaft housing 39S and backstop 248, and therefore between blade shaft 234 and shaft housing 39S. Inner seal 250 contacts an inner surface of shaft housing 39S. An end of inner seal 250 is flush with an end of shaft housing 39S, as seen in FIG. 20. Inner seal 250 is adjacent backstop 248 and inner bearing 252 within shaft housing 39S. Inner bearing 252 is a tapered roller bearing. Inner bearing 252 surrounds blade shaft 234 such that inner bearing 252 is between blade shaft 234 and shaft housing 39S. Inner bearing 252 contacts the inner surface of shaft housing 39S and the outer surface of blade shaft 39S. Inner bearing 252 is mounted on blade shaft 234 via an interference fit. Inner bearing 252 is positioned against backstop 248 and inner seal 250, inner bearing 252 engaging backstop 248 and inner seal 250.

Outer bearing 254 is a tapered roller bearing. Outer bearing 254 surrounds blade shaft 234, outer bearing 254 being mounted on blade shaft 234 axially opposed and axially spaced from inner bearing 252 mounted on blade shaft 234. Outer bearing 254 is significantly axially spaced from inner bearing 252. As such, outer bearing 254 is between blade shaft 234 and shaft housing 39S. Outer bearing 254 contacts the inner surface of shaft housing 39S and the outer surface of blade shaft 39S. Outer bearing 254 is mounted on blade shaft 234 via a close slide fit. In alternate embodiments, outer bearing 254 may be mounted on blade shaft 234 via an interference fit. Outer bearing 254 is positioned against compression plate 256. Compression plate 256 surrounds blade shaft 234 such that compression plate 256 contacts an outer surface of blade shaft 234. Compression plate 256 is positioned between a distal end of shaft housing 39S and a proximal end of blade holder 39. An outer surface of compression plate 256 is flush with an outer surface of blade shaft 234 and an outer surface of blade holder 39.

Spider 258 of pitch shaft assembly 68 is a portion of pitch head 164 that connects to dog bone linkages 240. Spider 258 and dog bone linkages 240 are connected via a fastener, such as a bolt, that extends through spider 258 and dog bone linkage 240. Guide rods 166 extend through open cylindrical portions of spider 258. Spider bearing 260 is positioned between spider 258 and forward end 162 of shaft 159, as seen in FIGS. 21A and 21B. Nose guide 262 is positioned over forward end 162 of shaft 159 and against an end of spider 258 and spider bearing 260.

As seen in FIG. 22A, dog bone linkage 240 has circular portion 264 on one end and circular portion 266 on the other end. Circular portions 264 and 266 are ring-like with openings through the centers of each of circular portions 264 and 266. Center portion 268 is between circular portion 264 and circular portion 266. Center portion 268 is connected to circular portion 264 and circular portion 266 at an angle, such that dog bone linkage 240 has an S-like shape. Linkage bushes 270 are positioned around inner openings in center portions 264 and 266. As such, inner diameter of center portion 264 is surround by linkage bush 270, and inner diameter of center portion 266 is surrounded by linkage bush 270. Each bolt 241 extends through one of linkage bushes 270 of dog bone linkage 240.

Dog bone linkage 240A, as seen in FIG. 22B, may alternatively be used in place of dog bone linkage 240 in rotor head and blade pitch system 16. For example, rotor head and blade pitch system 16 may include either dog bone linkages 240 or dog bone linkages 240A depending on the size of wind turbine nacelle 10. Each dog bone linkage 240A has circular portion 264A on one end and circular portion 266A on the other end. Circular portions 264A and 266A are ring-like with openings through the centers of each of circular portions 264A and 266A. Center portion 268A is between circular portion 264A and circular portion 266A. Center portion 268A is a straight segment connected to a center portion of circular portion 264A and a center portion circular portion 266A. As such, dog bone linkage 240A is not at an angle with respect to circular portion 264A and circular portion 266, and dog bone linkage 240A has a straight shape, or I-like shape, rather than the S-like shape of dog bone linkage 240 seen in FIG. 22A. Linkage bushes 270A are positioned around inner openings in center portions 264A and 266A. As such, inner diameter of center portion 264A is surrounded by linkage bush 270A, and inner diameter of center portion 266A is surrounded by linkage bush 270A. Each bolt 241 extends through one of linkage bushes 270A of dog bone linkage 240A when dog bone linkage 240A is used in place of dog bone linkage 270.

Rotor head and blade pitch system 16 carries blades 18, which are clamped into blade holders 39. Blades 18 rotate with the wind to rotate blade holders 39, causing rotate rotor head 39 and rotor generator shaft 78 to rotate. Rotation of rotor generator shaft 78 causes rotation of rotor 50, which generates energy via movement caused by the wind. Blades 18 can be rotated via blade holders 39 to change the amount of rotation of rotor head 39. Increasing or decreasing the speed of rotor head 39 increases or decreases the speed of rotor generator shaft 78, which increases or decreases the speed of rotor assembly 50. The speed of rotor assembly 50 changes the amount of energy that is generated by wind turbine nacelle 10.

As shown in FIG. 18A, blades 18 may be moved to a maximum power blade position. In the maximum power blade position, blades 18 are positioned to generate maximum speed of rotor head 39R from the wind, generating maximum power. In the maximum power blade position, blade holders 39 are rotated until the chord of tip 18T of each blade 18 is perpendicular to the direction of the wind.

As shown in FIG. 18B, blades 18 may be moved to a stall blade position. In the stall blade position, blades 18 are positioned to reduce speed of rotor head 39R from the wind until rotor head 39R comes to a stop, or moves a little as possible, stopping or reducing the generation of power. In the stall blade position, blade holders 39 are rotated until the chord of tip 18T of each blade 18 is parallel to the direction of the wind.

Blade trim actuator system 66 can be engaged to change the position of blade holders 39, which changes the position of blades 18. As blade holders are secured to rotatable blade shaft 234, rotating blade shaft 234 causes rotation of blade holders 39. Blade shafts 234 are rotated via rotor head and blade pitch system 16 and pitch shaft assembly 18.

As shown in FIG. 21A, shaft 159 can move forward toward the open end of rotor head housing 39H, pushing spider 258 forward along with shaft 159. As spider 258 moves forward, spider 258 pushes dog bone linkages 240 forward. As dog bone linkages 240 are pushed forward, dog bone linkages 240 push pitch linkages 236. Pushing pitch linkages 236 causes rotation of blade shafts 234 in a clockwise direction. As blade shafts 234 rotate clockwise, blade holders 39 rotate clockwise.

As shown in FIG. 21B, shaft 159 can move backward toward the closed end of rotor head housing 39H, pulling spider 258 backward along with shaft 159. As spider 258 moves backward, spider pulls dog bone linkages 240 backward. As dog bone linkages 240 are pulled backward, dog bone linkages 240 pull pitch linkages 236. Pulling pitch linkages 236 causes rotation of blade shafts 234 in a counterclockwise direction. In alternate embodiments, pulling pitch linkages 236 can cause rotation of blade shafts 234 in a clockwise direction while pushing pitch linkages 236 can cause rotation of blade shafts in a counterclockwise direction. As blade shafts 234 rotate counter-clockwise, blade holders rotate counter-clockwise. As such, linear movement of shaft 159 forward or backward causes rotational movement of blade holders 39, which rotate blades 18 to change the position of blades 18 relative to the wind.

Blade trim actuator system 66 can adjust the angle of blades 18 of wind turbine nacelle 10 via rotor head and blade pitch system 16 to change the pitch of blades 18, and thus change the angle of attack of wind turbine nacelle 10. As a result, the power obtainable from wind turbine nacelle 10 at lower wind speeds is maximized. Further, wind turbine nacelle 10 can be operated at higher wind speeds, reducing the obtainable power but preventing damage to wind turbine nacelle 10 that can result from blades 18 rotating at too great a speed. Blades 18 can also be rotated into a stall blade position. Rotating blades 18 into a stall blade position acts as a braking system, stopping wind turbine nacelle 10 when necessary, such as when wind speed is too great, in case of malfunction of a critical component, or when wind turbine nacelle 10 requires maintenance. For example, if generator 14 overheats or is disconnected from the electrical grid, generator 14 will stop torquing the rotation of rotor assembly 50, which will start accelerating rapidly within seconds. In such a case, it is necessary to stop wind turbine nacelle 10. Rotor head and blade pitch system 16 and blade trim actuator system maximize energy generated by wind turbine nacelle at variable wind speeds while also providing over-speed protection.

Figure 23A:
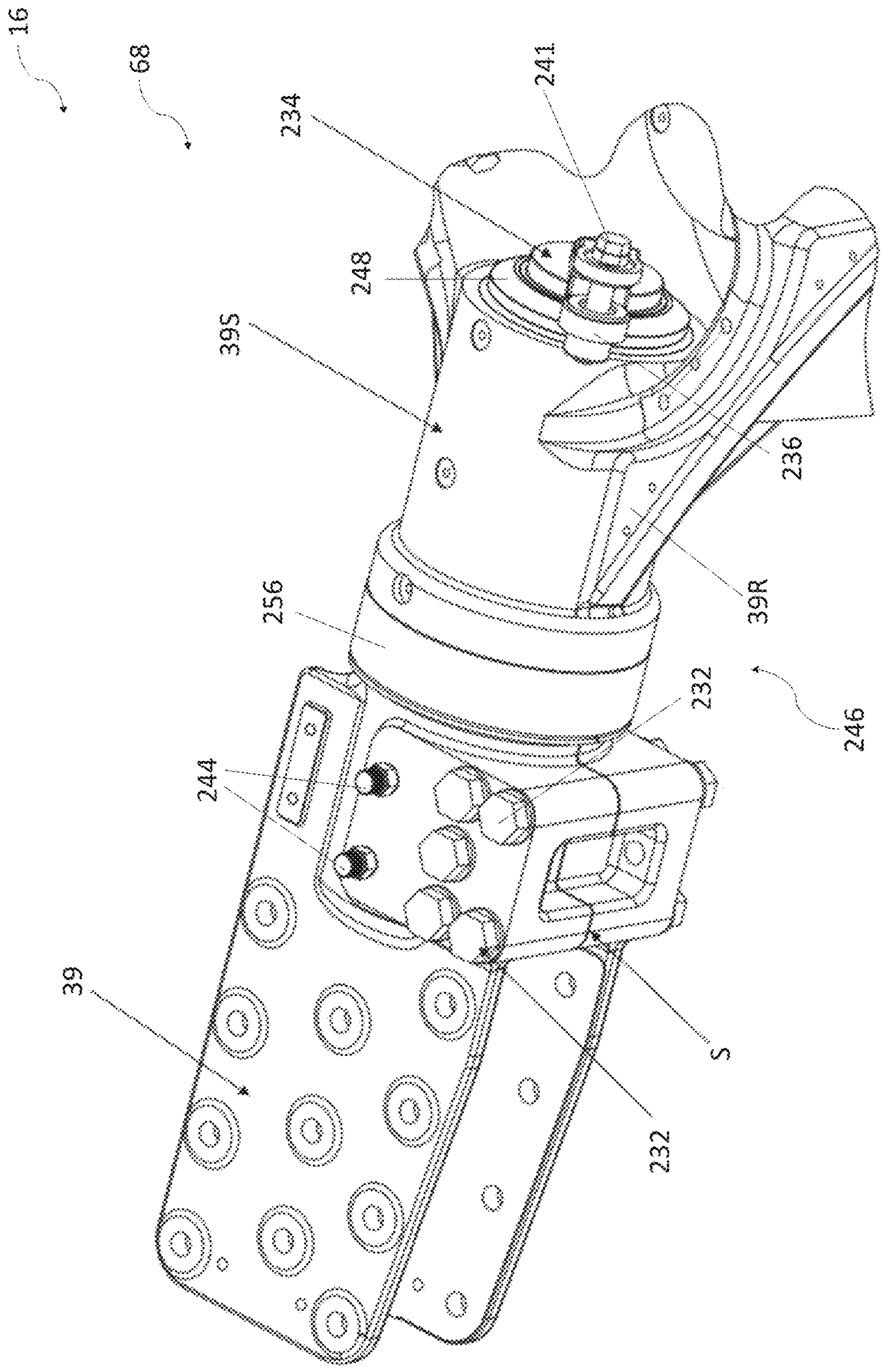
FIG. 23A is a partial isometric view of a portion of the rotor head and blade pitch system showing one blade holder.
Figure 23B:
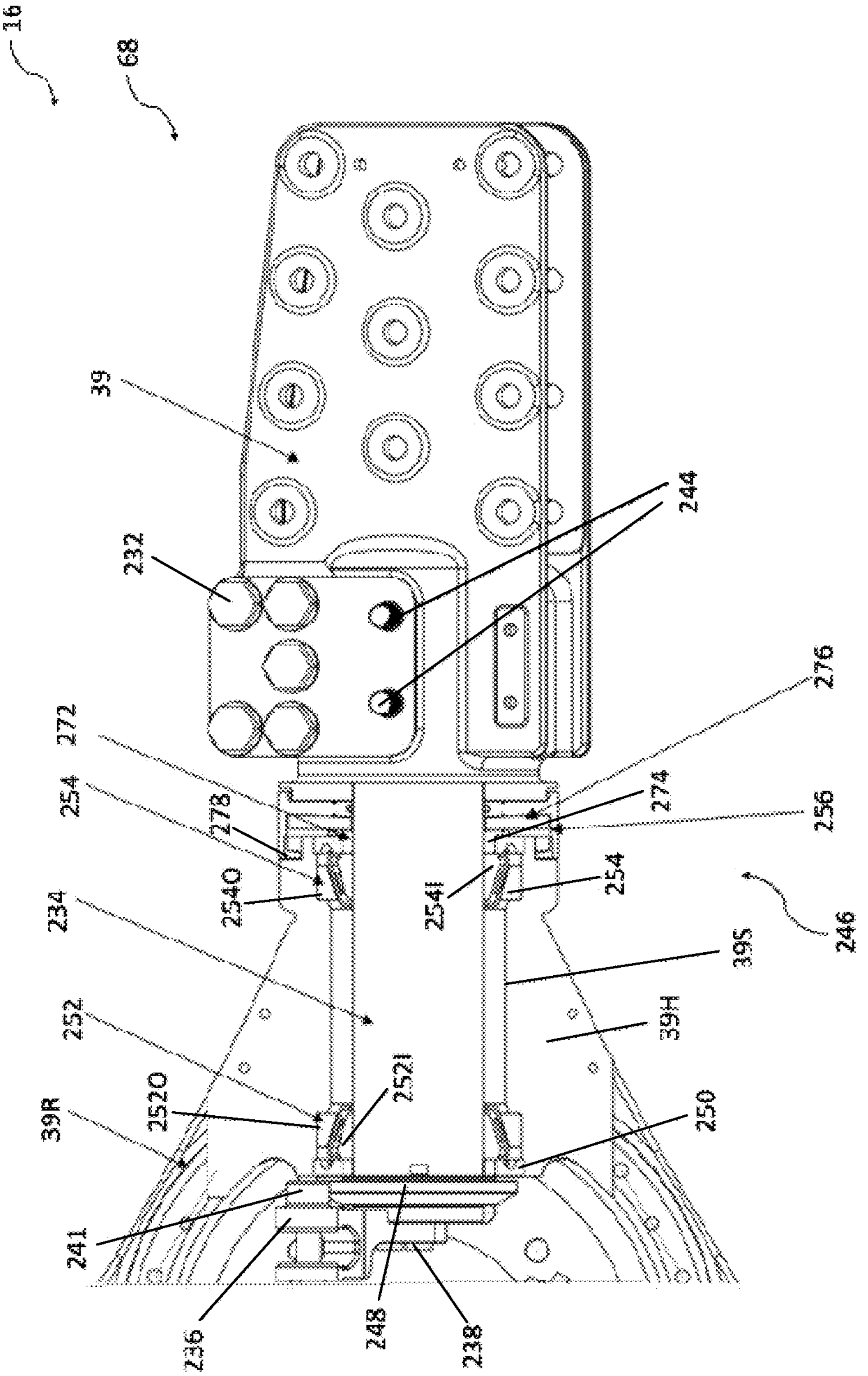
FIG. 23B is a partial isometric view of a portion of the rotor head and blade pitch system showing a blade bearing system with a portion of a rotor head and a shaft housing in cross-section.
Figure 24A:
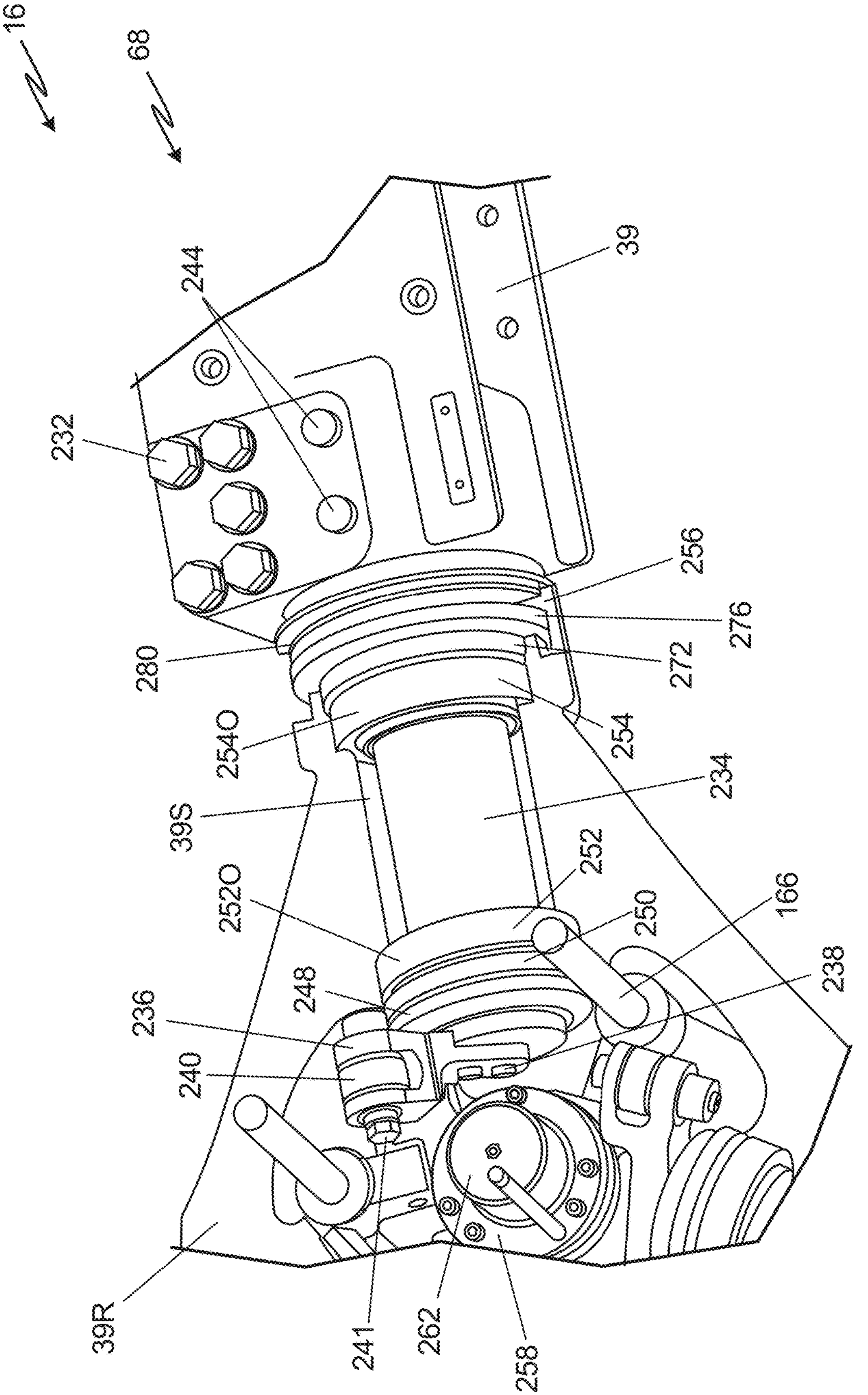
FIG. 24A is a partial isometric view of a portion of the rotor head and blade pitch system connected to the pitch shaft assembly showing the blade bearing system with a portion of the rotor head and the shaft housing in cross-section.
Figure 24B:
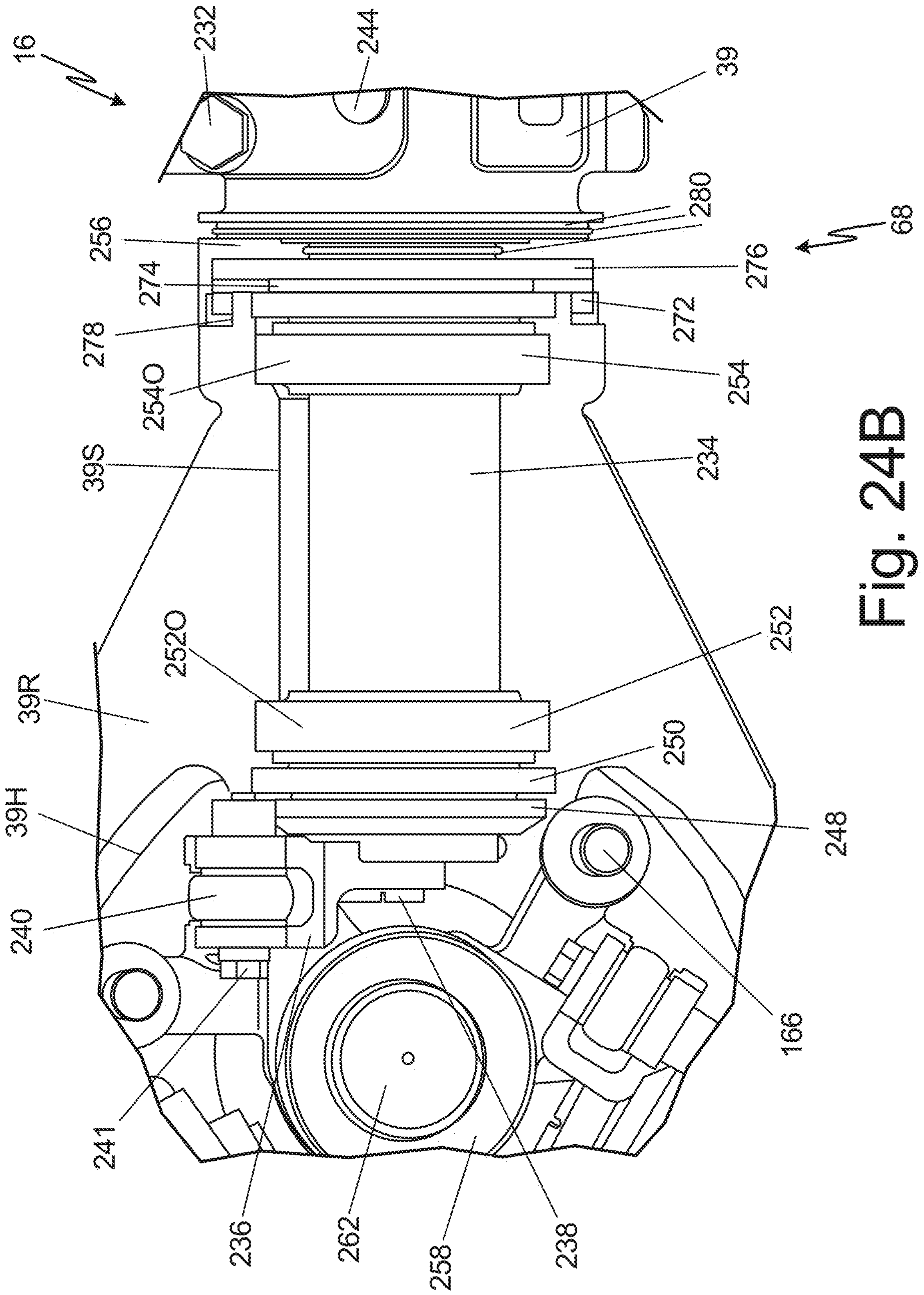
FIG. 24B is a partial end view of a portion of the rotor head and blade pitch system connected to the pitch shaft assembly showing the blade bearing system with a portion of the rotor head and the shaft housing in cross-section.
Figure 25A:
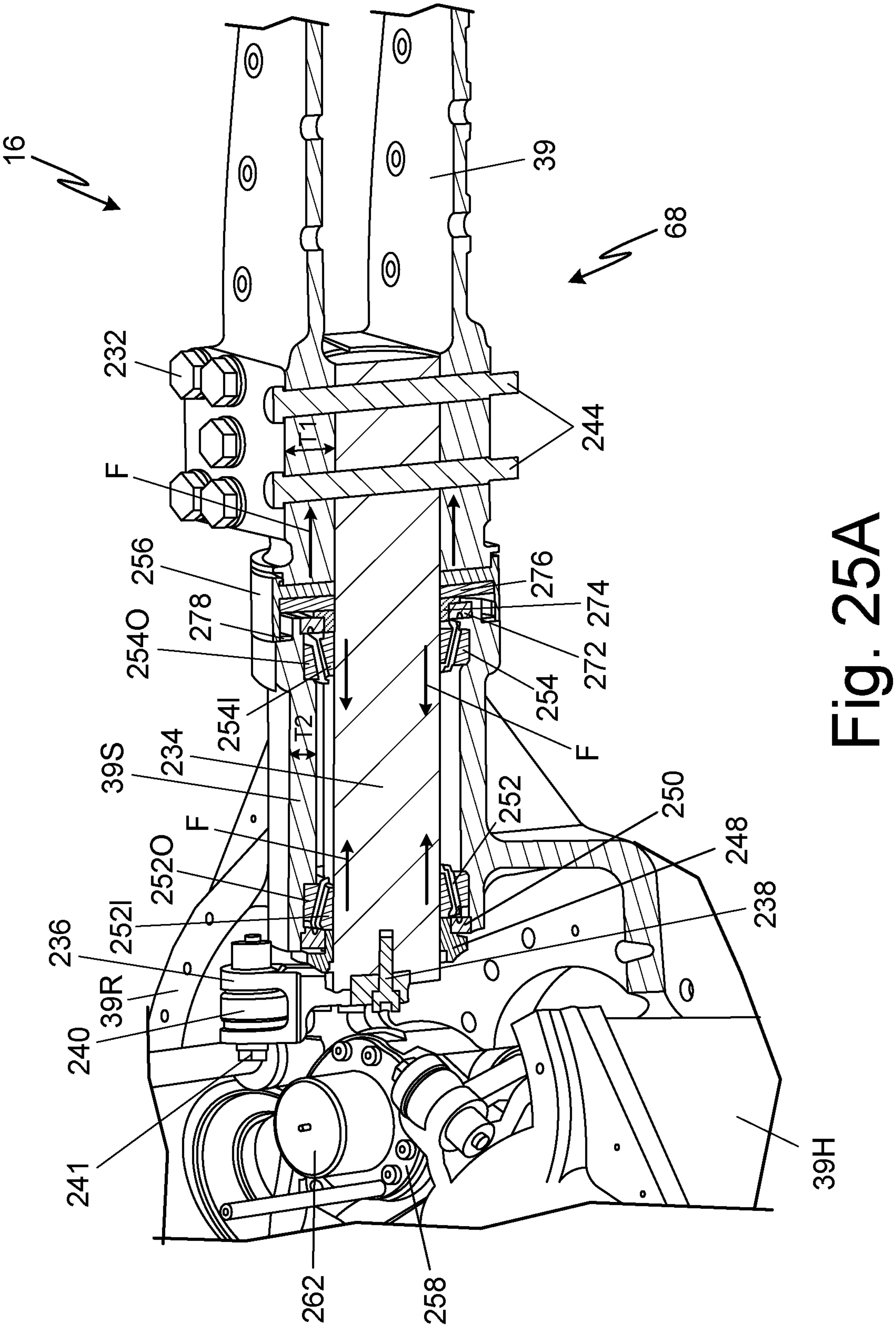
FIG. 25A is a partial isometric view of a portion of the rotor head and blade pitch system connected to the pitch shaft assembly showing the blade bearing system with a portion of the rotor head and blade pitch system removed.
Figure 25B:
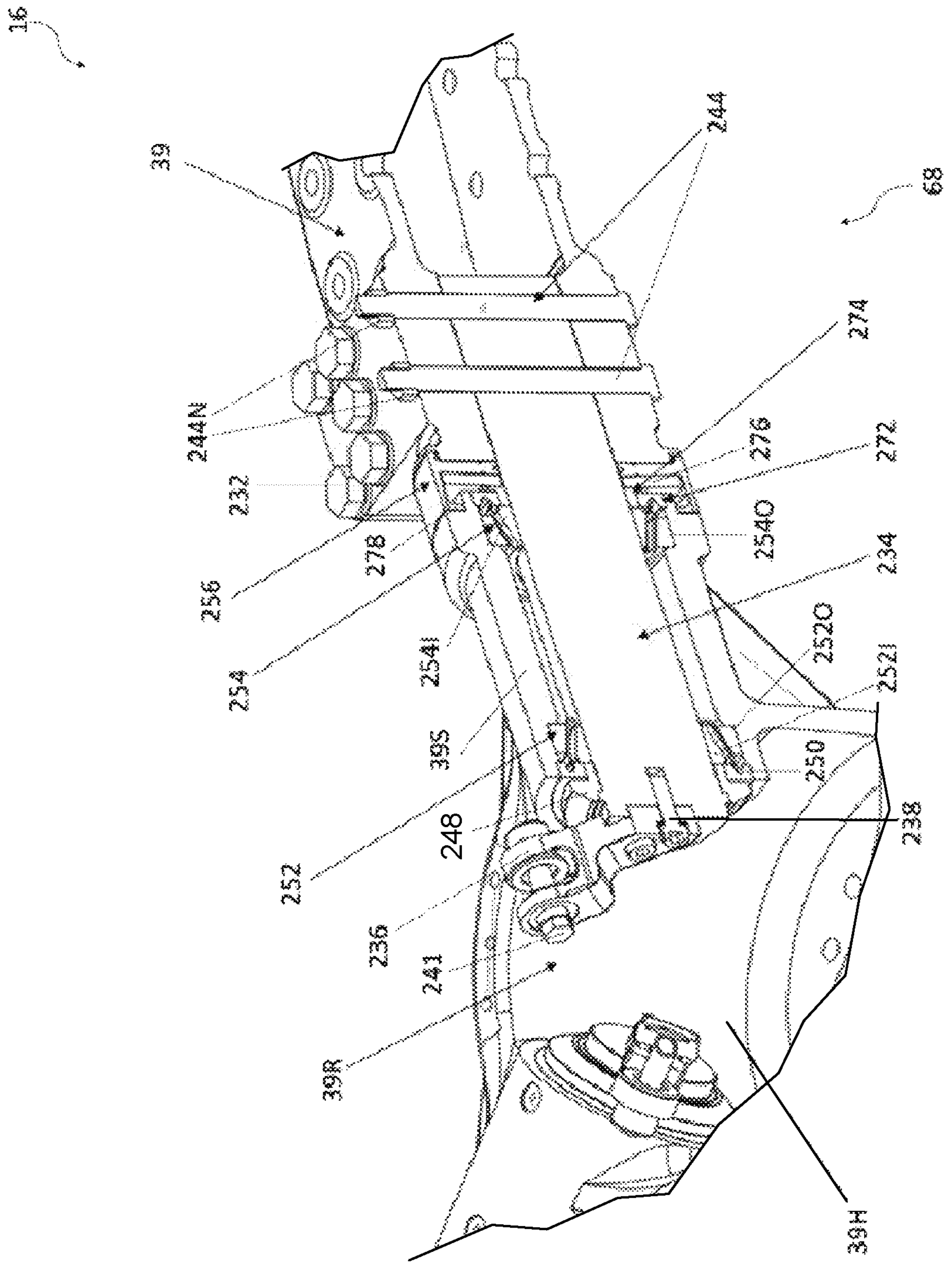
FIG. 25B is a partial cross-sectional isometric view perspective view of a portion of the rotor head and blade pitch system connected to the pitch shaft assembly showing the blade bearing system with a portion of the rotor head and blade pitch system removed.

FIG. 23A is a partial isometric view of a portion of rotor head and blade pitch system 16 showing one blade holder 39. FIG. 23B is a partial isometric view of a portion of rotor head and blade pitch system 16 showing blade bearing system 246 with a portion of rotor head 39R and shaft housing 39S in cross-section. FIG. 24A is a partial isometric view of a portion of rotor head and blade pitch system 16 connected to pitch shaft assembly 68 showing blade bearing system 246 with a portion of rotor head 39R and shaft housing 39S in cross-section. FIG. 24B is a partial end view of a portion of rotor head and blade pitch system 16 connected to pitch shaft assembly 68 showing blade bearing system 246 with a portion of rotor head 39R and shaft housing 39S in cross-section. FIG. 25A is a partial isometric view of a portion of rotor head and blade pitch system 16 connected to pitch shaft assembly 68 showing blade bearing system 246 with a portion of rotor head and blade pitch system 16 removed. FIG. 25B is a partial cross-sectional isometric view perspective view of a portion of rotor head and blade pitch system 16 connected to pitch shaft assembly 68 showing blade bearing system 246 with a portion of rotor head and blade pitch system 16 removed. In FIGS. 25A and 25B, blade holder 39, rotor head housing 39H, shaft housing 39S, blade shaft 234, pitch linkage 236, center bolt 238, pins 244, and blade bearing system 246 are shown in cross-section. FIGS. 23A-25B will be discussed together.

Wind turbine nacelle 10 includes generator 14, rotor head and blade pitch system 16, and blade trim actuator system 66, which includes pitch shaft assembly 68. Rotor head and blade pitch system 16 includes blade holders 39, rotor head 39R, rotor head housing 39H, shaft housings 39S, bolts 232, blade shafts 234, pitch linkages 236, center bolts 238, dog bone linkages 240, bolts 241, anti-rattle washers 242, pins 244, pin nuts 244N and blade bearing systems 246, each of which includes back stop 248, inner seal 250, inner bearing 252 (having inner race 252I and outer race 252O), outer bearing 254 (having inner race 254I and outer race 254O), compression plate 256, outer seal 272, spring ring 274, conical spring 276, second seal 278, and seals 280. Pitch shaft assembly 68 pitch head 164, guide rods 166, spider 258, spider bearing 260, and nose guide 262.

Saw-cuts S are saw-cut shaped slits in blade holders 39. Each of blade holders 39 has two halves clamped together at saw cut S and locked in place, or held together, via a series of bolts 232 that extend through both halves of blade holder 39. Each blade holder 39 is clamped around a distal end of one blade shaft 234, bolts 232 extending through each blade holder 39 and blade shaft 234, securing blade holder 39 around a distal portion of blade shaft 234. Each blade shaft 234 has a smooth outer surface as blade shafts 234 are not threaded. As seen in FIG. 25A, pins 244 extend through cross drilled holes in each blade shaft 234 and respective blade holder 39 to lock blade holders 39 to blade shafts 234. Pins 244 extend through a region of blade holder 39 that has thickness T1 that is greater than thickness T2 of shaft housing 39S, as seen in FIG. 25A. As seen in FIG. 25B, pins 244 are secured to blade holders 39 and blade shafts 234 via pin nuts 244N, which are threaded around ends of pins 244.

Each of three blade holders 39 is connected to one of three shaft housings 39S of rotor head 39R via one of three blade bearing systems 246. Blade bearing system 246 has backstop 248 secured to blade shaft 234 via an interference fit. Backstop 248 is positioned around blade shaft 234 adjacent the proximal end of blade shaft 234. A proximal portion of backstop 248 extends outside of shaft housing 39S and a distal portion of backstop 248 contacts and extends within shaft housing 39S. Blade shaft 324 has an annular lip adjacent a proximal end of blade shaft 234 that fits within a shoulder of backstop 248. Inner seal 250 is mounted around blade shaft 234 between backstop 248 and shaft housing 39S. Inner seal 250 is an oil seal. Inner seal 250 contacts an inner surface of shaft housing 39S. Inner seal 250 contacts inner bearing 252 within shaft housing 39S. Inner bearing 252 is a tapered roller bearing that is secured to blade shaft 234 via an interference fit. Inner race 252I is an inner casing of inner bearing 252. Outer race 252O is an outer casing of inner bearing 252. Inner race 252I contacts blade shaft 234, and outer race 252O contacts shaft housing 39S. Inner race 252I of inner bearing 252 is positioned against backstop 248 and inner seal 250, and outer race 252O of inner bearing 252 is positioned against and inner seal 250. Inner bearing 252 is axially opposed to outer bearing 254.

Outer bearing 254 is a tapered roller bearing that is secured to blade shaft 234 via a close slide fit. Outer bearing 254 fits against a shoulder formed in shaft housing 39S, the shoulder of shaft housing 39S preventing outer bearing 254 from moving axially toward inner bearing 252. Outer bearing 254 is mounted on blade shaft 234 axially opposed and axially spaced from inner bearing 252. Inner bearing 252 and outer bearing 254 are mounted face-to-face such a large center-to-center distance exists between inner race 252I of inner bearing 252 and inner race 254I of outer bearing 254. Inner race 254I is an inner casing of outer bearing 254. Outer race 254O is an outer casing of outer bearing 254. Inner race 254I contacts blade shaft 234, and outer race 252O is contacts shaft housing 39S. Outer race 252O of outer bearing 252 is positioned against the shoulder formed by shaft housing 39S. Inner race 254I of outer bearing 254 is positioned against outer seal 272 and spring ring 274 while outer race 254O of outer bearing 254 is positioned against outer seal 272. Outer seal 272 is an oil seal mounted around spring ring 274. Spring ring 274 has an inner conical portion mounted on and positioned around blade shaft 234 and under outer seal 272. Spring ring 274 has an outer conical portion connected to the inner conical portion and positioned between outer seal 272 and conical spring 276. Spring ring 274 contacts inner race 254I of outer bearing 254. In alternate embodiments, blade bearing system 246 may not include spring ring 274. Outer bearing 254 is positioned against compression plate 256 via outer seal 272 and spring ring 274. Compression plate 256 surrounds blade shaft 234 and is positioned between a distal end of shaft housing 39S and a proximal end of blade holder 39. In alternate embodiments, blade bearing system 246 may not include compression plate 256.

Conical spring 276 is a cone-shaped pre-loaded spring that is mounted on and surrounds blade shaft 234. Conical spring 276 may be a Belleville spring. Conical spring 276 is positioned between outer bearing 254 and blade holder 39.

Specifically, conical spring 276 is between spring ring 274 and compression plate 256. As such, compression plate 256 is between conical spring 276 and blade holder 39. Spring ring 274 is positioned between outer bearing 254 and conical spring 276. Backstop 248 and inner bearing 252 are spaced from outer bearing 254 and conical spring 276 to compress conical spring 276. Conical spring 276 engages inner race 254I of outer bearing 254 via spring ring 274 to exert preload force F on outer bearing 254 via spring ring 274. Inner bearing 252 is spaced from outer bearing 254 so that conical spring 276 compresses to generate preload force F that is also exerted on inner bearing 252. Second seal 278 is positioned inside compression plate 256 radially outward from outer seal 272 and outer bearing 254. Second seal is positioned against a shoulder formed in an outer portion of shaft housing 39S. Seals 280 are positioned within compression plate 256.

Pins 244 prevent blade holders 39 from moving in relation to blade shafts 234. The cross-drilled holes in blade shafts 234 through which pins 244 extend may constitute stress risers; however, the cross-drilled holes are located in a distal portion of blade shaft 234, away from outer bearing 254 and in a region of a reduced bending moment load. As such, cross-drilled holes are not located near the area of peak bending moment for blade shafts 234, which is in the vicinity of outer bearings 254. Further, clamping blade holders 39 together at saw cuts S strengthens the areas of blade shafts 234 within the clamped blade holders 39. Pins 244 extend through a region of blade holder 39 that has thickness T1, which is greater than thickness T2 of shaft housing 39S, as seen in FIG. 25A. Blade shafts 234 also contact blade holders 39, which do not move in relation to blade shafts 234, strengthening blade shafts 234. The interference fit between blade shafts 234 and clamped blade holders 39 strengthens blade shaft 234 in the area where cross-drilled holes extend through blade shaft 234. As a result, the cross-drilled holes for pins 244 are located in reinforced regions of blade shafts 234.

The interference fit between blade shafts 234 and backstops 248 prevents backstops 248 from moving in relation to blade shafts 234, which also provides reinforcement in the region of blade shafts 234 having the stress risers. Pins 244 also help prevent blade shafts 234 from moving relative to backstops 248. Movement of backstops 248 is prevented because pins 244 secure the axial positions of blade shafts 234 with respect to clamped blade holders 39. Backstops 248 allow for inner bearings 252 and outer bearings 254 to be preloaded and have large center-to-center distances. Backstops 248 and inner bearings 252 are spaced to compress conical springs 276 to constantly generate preload force F. Fixing each set of axially opposed inner bearing 252 and outer bearing 254 in a proper position transmits preload force F to inner bearing 252 and outer bearing 254. Conical springs 276 are tightened against inner races 254I of outer bearings 254 without requiring stand-out features, long spacers, or threaded sections of blade shafts 234, simplifying and strengthening blade shafts 234. As each blade shaft 234 has a smooth outer surface, rather than being threaded, there are no stress-risers in the portion of blade shaft 234 that is within shaft housing 39S, or between inner bearing 252 and outer bearing 254. Backstops 248 and blade shafts 234 have an interference fit with backstops 248 being positioned between pitch linkages 236 and shoulders of shaft housings 39S so that axial movement of blade shaft 236 is prevented. Thus, backstops 248 are secured to blade shafts 234 to allow conical springs 276 to continuously exert preload force F on outer bearings 254. Backstops 248 are also used to mount inner seals 250 to blade shafts 234.

Axial pressure from each conical spring 276 is applied on outer bearing 254 and blade holder 39 to preload inner bearing 252 and outer bearing 254. Conical spring 276 applies pressure to inner race 254I of outer bearing 254, and thereby applies pressure to inner race 252I of inner bearing 252. More specifically, conical spring 276 engages inner race 254I of outer bearing 254 and inner race 252I of inner bearing 252 to exert pressure on inner race 254I of outer bearing 254 and inner race 252I of inner bearing 252 to generate preload force F. Conical spring 276 undergoes compression because backstop 248 is fixed.

Conical spring is compressed and exerts axial force through spring ring 274. Spring ring 274 fits under outer seal 272 to transmit the axial force from conical spring 276 to inner race 254I of outer bearing 254. As such, outer bearing 252 is preloaded by conical spring 276, which acts on outer bearing 252 through spring ring 274. Conical spring 276 exerts preload force F on outer bearing 254 toward inner bearing 252, as seen in FIG. 25A. As inner bearing 252 is prevented by backstop 248 from moving away from outer bearing 254, conical spring 276 also generates preload force F that is exerted on inner bearing 254 from backstop 248 toward outer bearing 254. As such, preload force F exerted on outer bearing 252 toward inner bearing 252 causes preload force F to be exerted on inner bearing 252 toward outer bearing 254, as seen in FIG. 25A. Inner bearing 252 is spaced from outer bearing 254 at a distance that results in the desired preload force F exerted on inner bearing 252 and outer bearing 254. As a result, inner race 252I of inner bearing 252 and inner race 254I of outer bearing 254 are compressed together, preloading inner bearing 252 and outer bearing 254. Inner bearing 252 and outer bearing 254 have a negative clearance, keeping inner bearing 252 and outer bearing 254 internally stressed, or constantly preloaded. Conical spring 276 also exerts preload force F on blade holder 39, axial force from conical spring 276 being transmitted through compression plate 256 toward blade holder 39, as seen in FIG. 25A.

Compression plate 256 acts as a cover to protect blade bearing system 246. Spring rings 274 and compression plates 256 simplify the shape of blade holders 39 and the configuration of second seal 278 and seals 280. Second seal 278 and seals 280 provide waterproofing.

Traditional blade shafts are often threaded, introducing stress risers that weaken the blade shafts in areas where peak moment loads on the blade shafts occur. Traditional roller bearings usually retain some amount of internal clearance while in operation. Peak moment loads on blade shafts commonly occur just outside the bearings such that peak blade shaft stress commonly occurs at a location on the blade shaft where there is a significant stress riser. As a result, the strength of blade shafts is compromised, necessitating larger diameters for blade shafts, which increases the size, mass, and cost of the wind turbine nacelle.

Removing stress causing features in blades shafts 234 within shaft housings 39S optimizes the stress in the mechanical design of blade shafts 234, which are carried by inner bearings 252 and outer bearings 254. The strength of blade shafts 234 is maximized as no threading or steps are needed in blade shafts 234 to position inner bearings 252 and outer bearings 154. Stress-risers in blade shafts 234 only exist in regions of blade shafts 234 that have reduced bending moment loads and are away from inner bearings 252 and outer bearings 254.

Because inner bearings 252 and outer bearings 254 are preloaded by conical springs 276, bearing manufacturing clearances and assembly tolerances are removed. Preload force F can maintain the exact positions of inner bearings 252 and outer bearings 254, both radially and axially, maintaining the running accuracy of blade shafts 234. The preload of inner bearings 252 and outer bearings 254 also increases rigidity of inner bearings 252 and outer bearings 254, minimizes noise due to axial vibration and resonance, prevents sliding between the rolling elements and inner races 252I and 254I and outer races 252O and 254O of inner bearings 252 and outer bearings 254, respectively, due to gyroscopic moments, and maintains the rolling elements of inner bearings 252 and outer bearings 254 in their proper positions.

Blade bearing system 246 is stronger, simplified, and more cost-effective, especially for small to medium wind turbine nacelles. Blade bearing system 246 can be used instead of traditional slew bearings, which are cost-prohibitive and not small enough for small to medium wind turbines.

Figure 26:
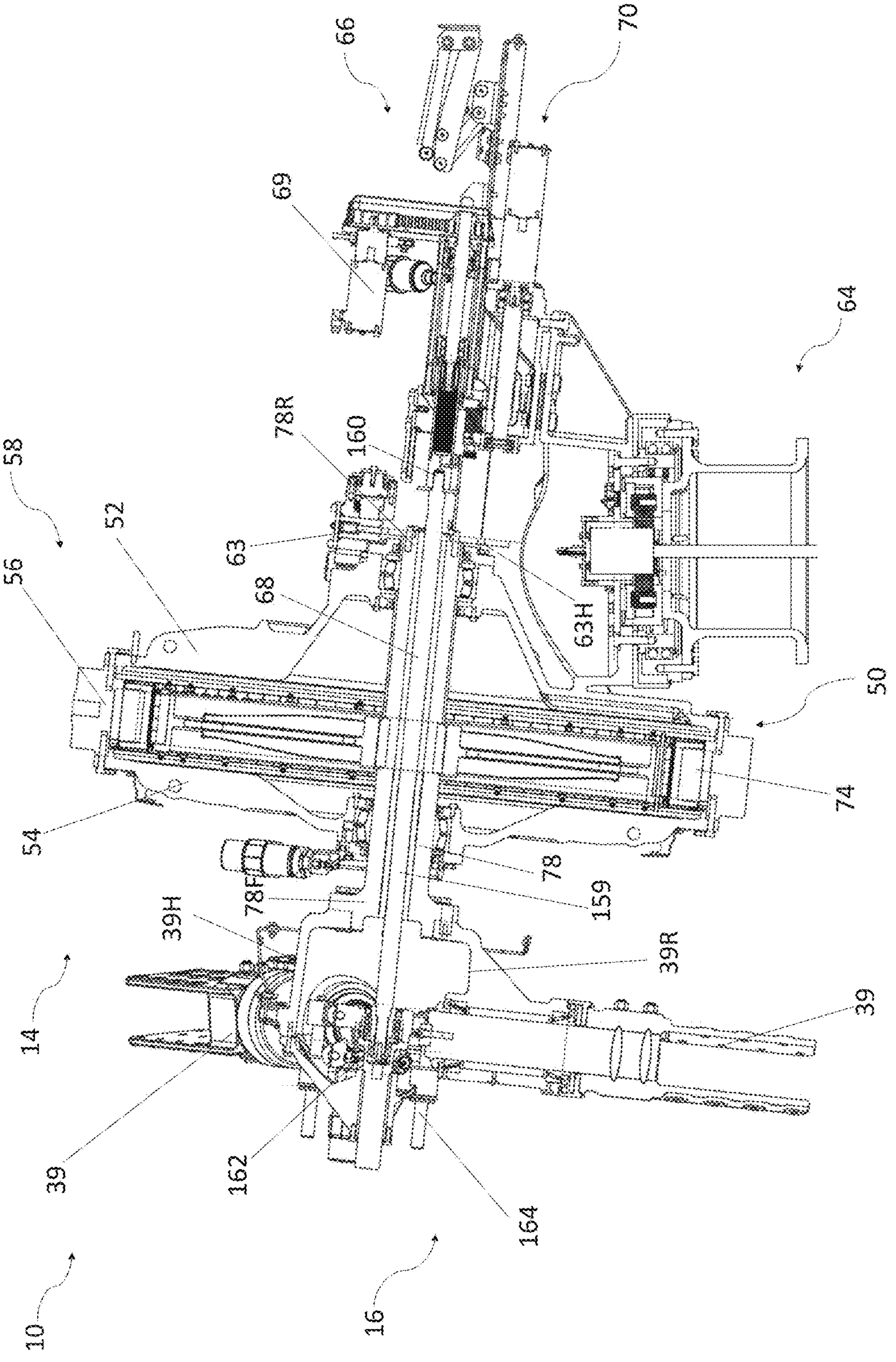
FIG. 26 is a cross-sectional side view of the wind turbine nacelle showing an electromechanical pitch actuator and a fail safe system.

Fail Safe System (FIGS. 26-32C; Also See FIGS. 1A-2E, 8A, 8C, 9, 10A, 18A-25B) Overview (FIG. 26)

FIG. 26 is a cross-sectional side view of wind turbine nacelle 10 showing electromechanical pitch actuator 69 and fail safe system 70. Wind turbine nacelle 10 includes generator 14, rotor head and blade pitch system 16, brake service disc 63 (having holes 63H), blade trim actuator system 66, which includes pitch shaft assembly 68 and electromechanical pitch actuator 69, and fail safe system 70. Generator 14 includes rotor assembly 50, which includes rotor generator shaft 78 (having rear end 78R and forward end 78F). Rotor head and blade pitch system 16 includes blade holders 39, rotor head 39R, and rotor head housing 39H. Pitch shaft assembly 68 includes shaft 159, rear end 160, forward end 162, and pitch head 164.

Rotor generator shaft 78 of rotor assembly 50 is connected to rotor head and blade pitch system 16. Forward end 78F of rotor generator shaft 78 is connected to rotor head housing 39H of rotor head 39R. Rotatable blade holders 39 are connected to rotor head 39R. Brake service disc 63 is mounted to rear end 78R of rotor generator shaft 78. Shaft 159 of pitch shaft assembly 68 extends through a bore in the center of rotor generator shaft 78. A forward end 162 of shaft 159 has pitch head 164, which is connected to rotor head and blade pitch system 16 at the front of wind turbine nacelle 10. A rear end 160 of shaft 159 is connected to electromechanical pitch actuator 69 at the rear of wind turbine nacelle 10. Fail safe system 70 is connected to electromechanical pitch actuator 69. Controller 168 (shown in FIG. 8A) is mounted on wind turbine nacelle 10 and electrically connected to electromechanical pitch actuator 69 and fail safe system 70.

Rotor head and blade pitch system 16 and blade trim actuator system 66 together maximize energy extraction from the wind by orienting blades 18 (shown in FIGS. 1A-1D, 8C, 9, 10A, 18A, 18B) to optimal angles. As a result, wind turbine nacelle 10 extracts power at varying wind speeds and directions, as discussed above with respect to FIGS. 18A-25B. Rotor head and blade pitch system 16 and blade trim actuator system 66 also protect wind turbine nacelle 10 from overspeed by orienting blades 18 to the blade stall position, as discussed above with respect to FIGS. 18A-25B. When blades 18 are in the blade stall position, aerodynamic stall is achieved by increasing the angle of attack of blades 18 to the point where lift decreases, slowing rotor assembly 50 and bringing rotor assembly 50 to a stop.

Shaft 159 of pitch shaft assembly 68 controls the angle of blades 18. The angle of blades 18 is changed by moving shaft 159 of pitch shaft assembly 68 linearly. Actuating electromechanical pitch actuator 69 to translate forward or rearward causes shaft 159 to move forward or rearward. Fail safe system 70 is a safety feature that provides a fail safe mode for wind turbine nacelle 10 in the event of an operational failure that prevents the adjustment of blades 18. For example, if electromechanical pitch actuator 69 fails, if one or more parts of wind turbine nacelle 10 jam such that shaft 159 can no longer move, or if blade holders 39 get stuck, a failure mode of wind turbine nacelle 10 is sensed. Upon sensing the failure mode, controller 168 activates fail safe system 70. Fail safe system 70 moves an entirety of electromechanical pitch actuator 69 rearward to force blades 18 to rotate into the blade stall position.

When wind turbine nacelle 10 is in failure mode, fail safe system 70 actuates to move blades 18 into a fail safe position. In fail safe mode, fail safe system 70 provides a mechanism to bring wind turbine nacelle 10 to a stop to prevent damage to wind turbine nacelle 10. As such, fail safe system 70 increases the safety of wind turbine nacelle 10.

Figure 27A:
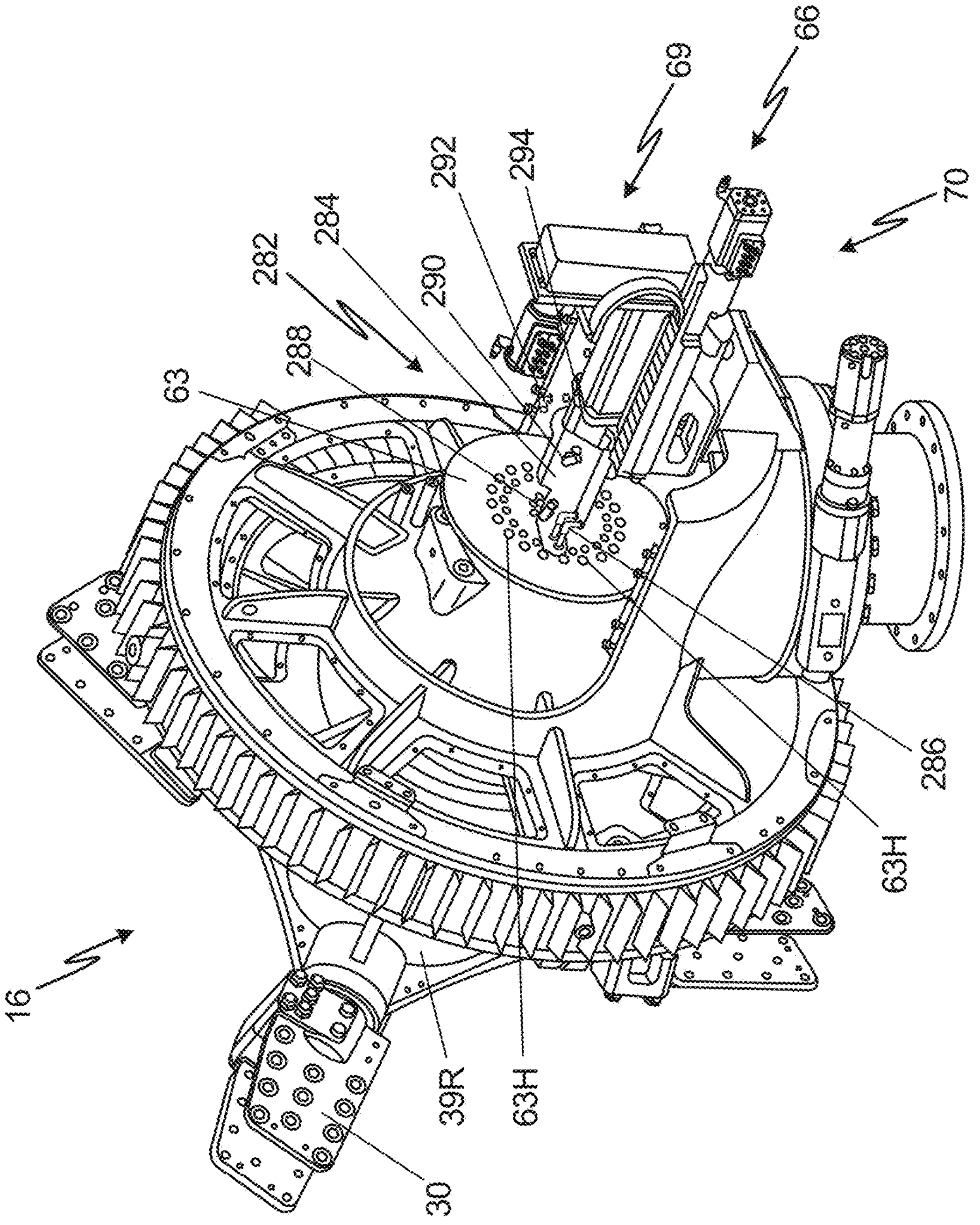
FIG. 27A is an isometric view of the wind turbine nacelle from a left side and rear end showing the electromechanical pitch actuator, the fail safe system, and a sensor assembly.
Figure 27B:
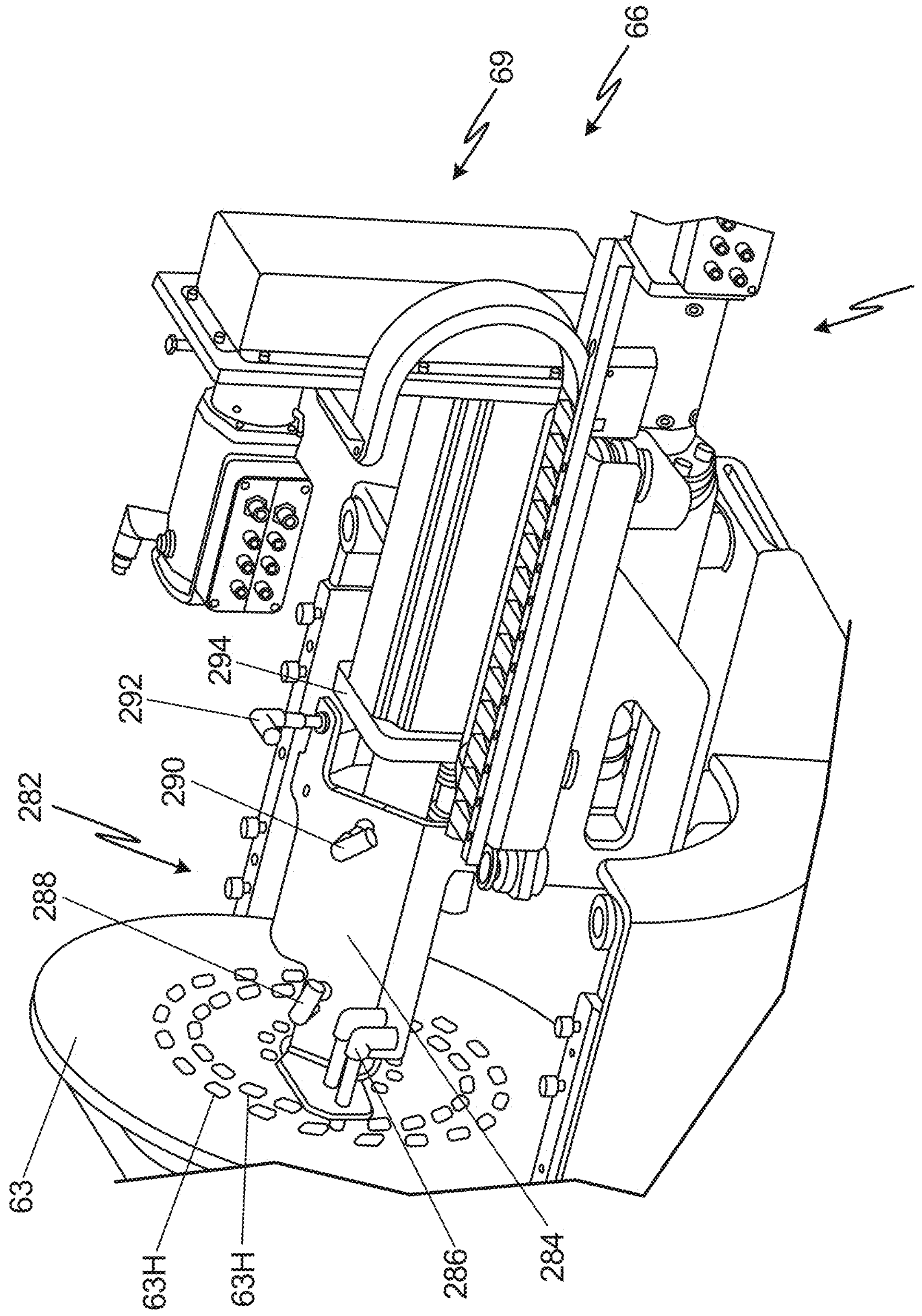
FIG. 27B is an enlarged view of a portion of FIG. 27A showing the electromechanical pitch actuator, the fail safe system, and the sensor assembly.
Figure 27C:
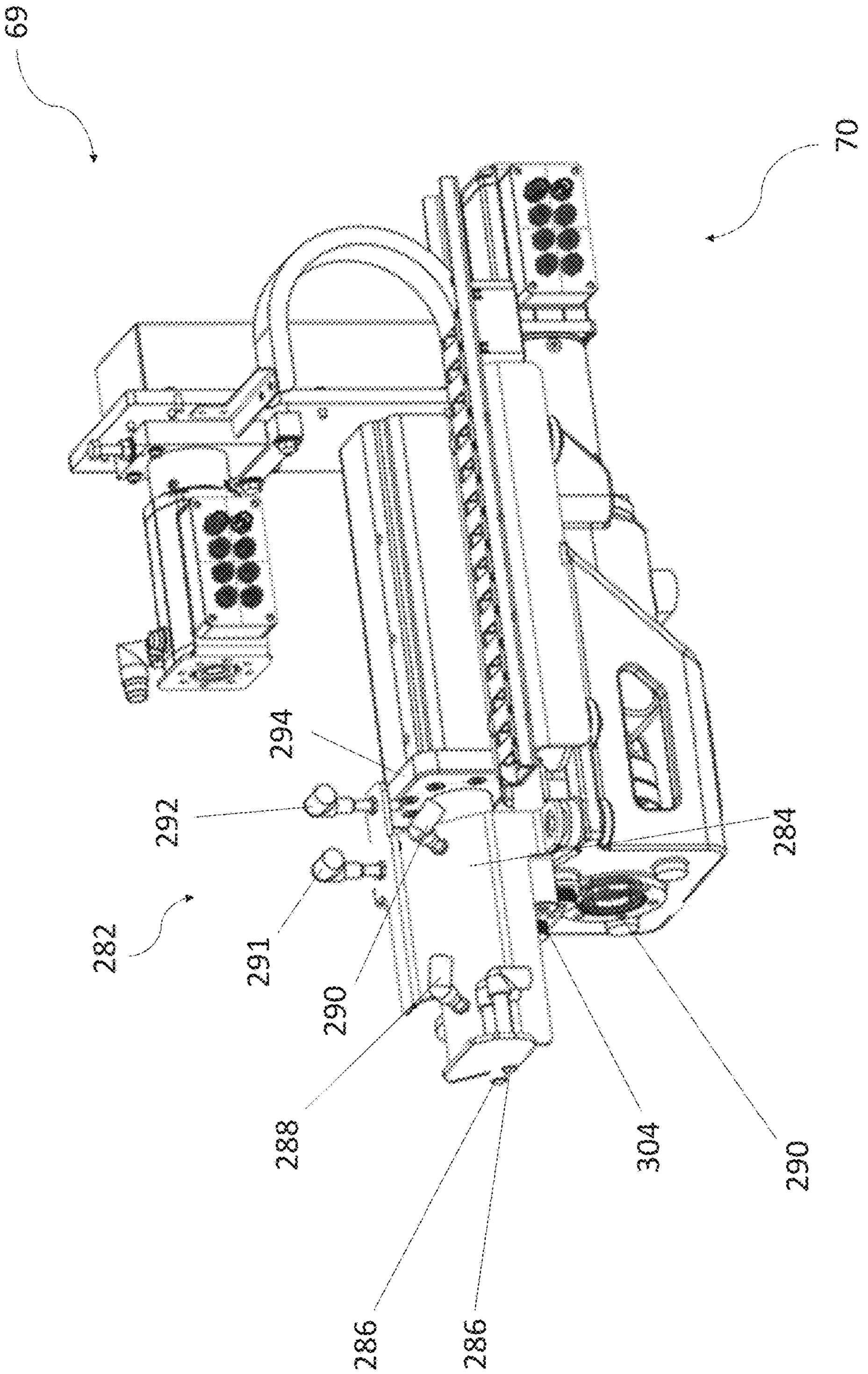
FIG. 27C is an isometric view of the electromechanical pitch actuator, the fail safe system, and the sensor assembly from a left side.

Sensor Assembly (FIGS. 27A-27C)

FIG. 27A is an isometric view of wind turbine nacelle 10 from a left side and rear end showing electromechanical pitch actuator 69, fail safe system 70, and sensor assembly 282. FIG. 27B is an enlarged view of a portion of FIG. 27A showing electromechanical pitch actuator 69, fail safe system 70, and sensor assembly 282. FIG. 27C is an isometric view of electromechanical pitch actuator 69, fail safe system 70, and sensor assembly 282 from a left side.

Wind turbine nacelle 10 includes rotor head and blade pitch system 16 (shown in FIG. 27A), brake service disc 63 (shown in FIGS. 27A and 27B) having holes 63H, blade trim actuator system 66, which includes electromechanical pitch actuator 69, fail safe system 70, and sensor assembly 282. Rotor head and blade pitch system 16 includes blade holders 39 and rotor head 39R. Sensor assembly 282 includes sensor bracket 284, speed sensors 286, maximum position sensor 288, minimum position sensor 290, fail safe sensor 291 (shown in FIG. 27C), and normal position sensor 292.

Electromechanical pitch actuator 69 is connected to rear end 160 of shaft 159 (shown in FIG. 26) of pitch shaft assembly 68. A forward end of electromechanical pitch actuator 69 is adjacent brake service disk 63, which has a plurality of spaced holes 63H. Holes 63H extend through brake service disk 63 and form two concentric circles of spaced holes 63H in brake service disk 63. Holes 63H and portions of brake service disk 63 between holes 63H form two concentric circles of alternating dark-to-light patterns.

Sensor assembly 282 is positioned around electromechanical pitch actuator 69. Sensor assembly 282 has sensor bracket 284, which has a first end connected to fail safe system 70 and a second end connected to fail safe system 70. As such, sensor bracket 284 is positioned around a forward portion of electromechanical pitch actuator 69. A forward portion of electromechanical pitch actuator 69 may move through sensor bracket 284 as electromechanical pitch actuator 69 translates forward and rearward. Speed sensors 286, maximum position sensor 288, minimum position sensor 290, fail safe sensor 291, and normal position sensor 292 are mounted to sensor bracket 284.

Speed sensors 286 are optical proximity sensors of sensor assembly 282. Speed sensors 286 are mounted to a front portion of sensor bracket 284. Two speed sensors 286 are mounted on sensor bracket 284 facing brake service disk 63. As such, speed sensors 286 are adjacent a forward portion of electromechanical pitch actuator 69. A first speed sensor 286 is in alignment with a first circle of spaced holes 63H on brake service disk 63, and a second speed sensor 286 is in alignment with a second circle of spaced holes 63H on brake service disk 63. Speed sensors 286 extend forward of sensor bracket 284 toward brake service disk 63, as seen in FIGS. 27A and 27B.

Maximum position sensor 288 is an optical proximity sensor of sensor assembly 282. Maximum position sensor 288 is mounted to sensor bracket 284 rearward of speed sensors 286. Maximum position sensor 288 extends inward from sensor bracket 284 such that maximum position sensor 288 faces electromechanical pitch actuator 69. Minimum position sensor 290 is an optical proximity sensor of sensor assembly 282. Minimum position sensor 290 is mounted to sensor bracket 284 rearward of maximum position sensor 288 such that maximum position sensor 288 is between minimum position sensor 290 and speed sensors 286. Minimum position sensor 290 extends inward from sensor bracket 284 such that minimum position sensor 290 faces electromechanical pitch actuator 69.

Fail safe sensor 291 is an optical proximity sensor of sensor assembly 282. Fail safe sensor 291 is mounted to sensor bracket next to minimum position sensor 290 such that minimum position sensor 290 and fail safe sensor 291 are in alignment. Fail safe sensor 291 extends inward from sensor bracket 284 such that fail safe sensor 291 faces electromechanical pitch actuator 69. Normal position sensor 292 is an optical proximity sensor of sensor assembly 282. Normal position sensor 292 is mounted to sensor bracket 284 rearward of minimum position sensor 290 such that minimum position sensor 290 and fail safe sensor 291 are between normal position sensor 292 and maximum position sensor 288. Normal position sensor 292 is mounted to a back portion of sensor bracket 284. Normal position sensor 292 extends inward from sensor bracket 284 such that normal position sensor 292 faces electromechanical pitch actuator 69.

Sensor bracket 284 supports speed sensors 286, maximum position sensor 288, minimum position sensor 290, and normal position sensor 292. Sensor bracket 284 extends around a forward end of electromechanical pitch actuator 69 such that a forward end of electromechanical pitch actuator 69 may extend through sensor bracket 284 to align with one or more of maximum position sensor 288, minimum position sensor 290, fail safe sensor 291, and normal position sensor 292.

Speed sensors 286 of sensor assembly 282 face brake service disk 63 to sense the dark-to-light transitions created by spaced holes 63H, the portions of brake service disk 63 between holes 63H representing the dark portion and holes 63H representing the light portion. By sensing the dark-to-light transitions, speed sensors 286 sense the speed of rotor assembly 50 by determining the speed of brake service disk 63, as brake service disk 63 is connected to rotor generator shaft 78. Blades 18 are oriented to change the angle of blades 18 based on wind speed sensed by speed sensors 286, increasing or decreasing the rotational speed of rotor assembly 50.

Maximum position sensor 288 of sensor assembly 282 senses that electromechanical pitch actuator 69 is in the most forward, or fully extended, position such that blades 18 are perpendicular to the wind direction, as seen in FIG. 18A. As such, blades 18 are in position for rotor assembly 50 to rotate at maximum speed. Thus, maximum position sensor 288 indicates that wind turbine nacelle 10 is generating maximum power.

Minimum position sensor 290 of sensor assembly 282 senses that electromechanical pitch actuator 69 is in the most rearward, or fully retracted, position such that blades 18 are parallel to the wind direction, or in the stall blade position, as seen in FIG. 18B. As such, blades 18 are rotated fully out of the wind and are in position for rotor assembly 50 to rotate at minimum speed until rotor assembly 50 comes to a stop. Thus, minimum position sensor 290 indicates that wind turbine nacelle 10 is generating minimum power.

Normal position sensor 292 of sensor assembly 282 senses that electromechanical pitch actuator 69 is in normal operation. In normal operation, normal position sensor 292 is in an ON state and fail safe sensor 291 is in an OFF state. Electromechanical pitch actuator 69 moves shaft 159 forward and rearward between minimum position sensor 290 and maximum position sensor 288 to various positions to control the speed of rotor assembly 50 with varying wind speeds.

Fail safe sensor 291 of sensor assembly 282 indicates that electromechanical pitch actuator 69 is not in normal operation and wind turbine nacelle is in fail safe mode. In fail safe mode, fail safe sensor 291 is in an ON state, and normal position sensor 292 is in an OFF state. Electromechanical pitch actuator 69 is pulled rearward by fail safe system 70 to reach fail safe sensor 291 and minimum position sensor 290. Fail safe sensor 291 senses that electromechanical pitch actuator 69 is in the most rearward position in fail safe mode, or in a fully retracted fail safe position, such that blades 18 are in the stall blade position. As such, blades 18 are rotated fully out of the wind and are in position for rotor assembly 50 to rotate at minimum speed until rotor assembly 50 comes to a stop. Thus, fail safe sensor 291 senses that electromechanical pitch actuator 69 has reached a fail safe position and indicates that wind turbine nacelle 10 is undergoing an emergency stop.

Sensor assembly 282 aids electromechanical pitch actuator 69 in translating linearly. As rotor generator shaft 78 is connected to rotor head 39H, which is connected to blade holders 39 and blades 18 (shown in FIGS. 1A-1D, 8C, 9, 10A, 18A, 18B), the configuration of blades 18 changes the rotational speed of rotor assembly 50. Electromechanical pitch actuator 69 moves rearward and forward to change the configuration of blades. Sensor assembly 282 indicates the position of electromechanical pitch actuator 69 and assists with movement of electromechanical pitch actuator 69 and fail safe system 70 by receiving and transmitting sensor signals from sensor assembly 282. Further, fail safe sensor 291 and normal position sensor 292 activate such that wind turbine nacelle 10 can be in normal operation or in fail safe mode when normal operation fails.

Figure 28:
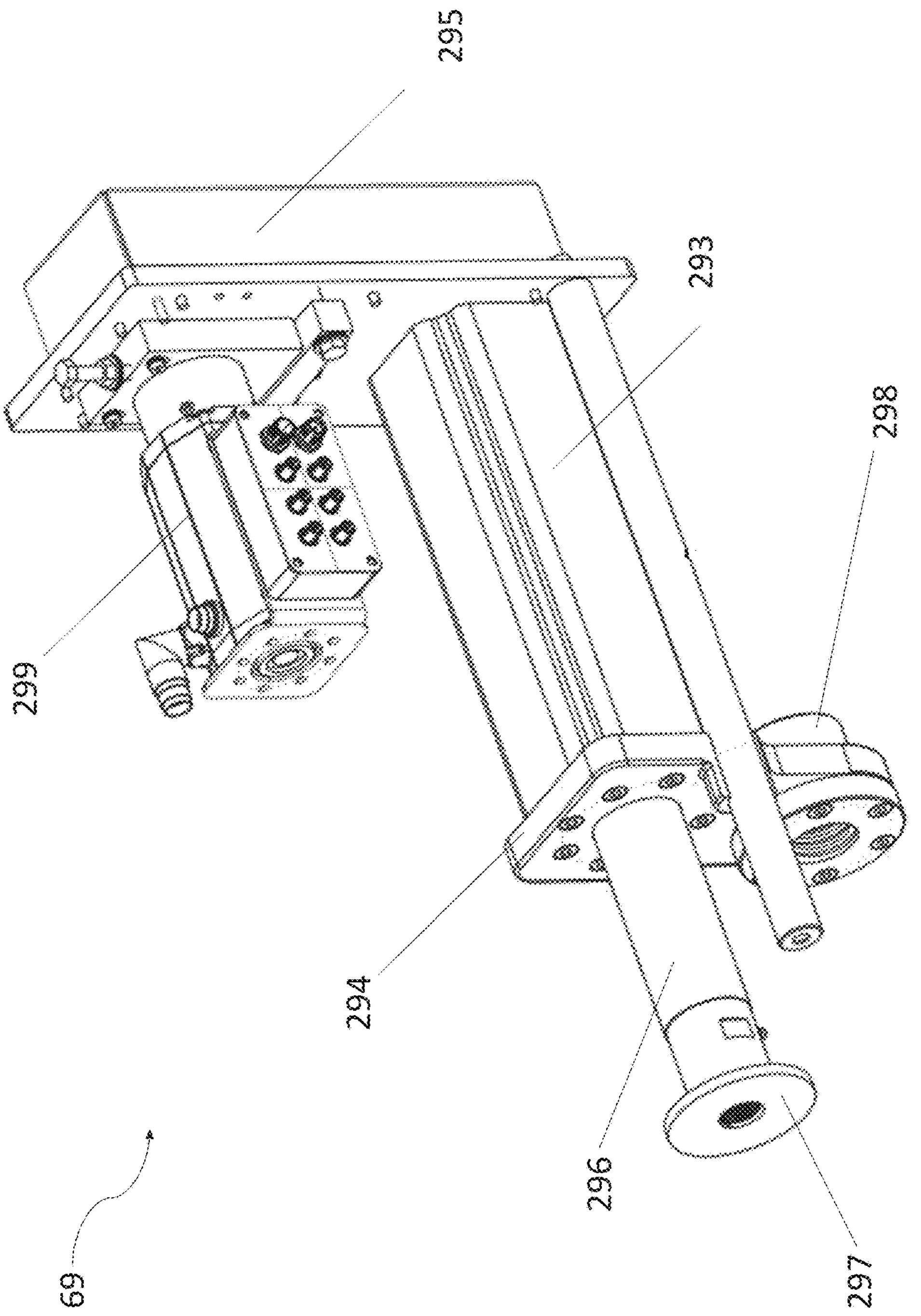
FIG. 28 is an isometric view of the electromechanical pitch actuator from the left side.

Electromechanical Pitch Actuator (FIG. 28)

FIG. 28 is an isometric view of electromechanical pitch actuator 69 from the left side. Electromechanical pitch actuator 69 includes linear drive 293, front plate 294, rotary-to-linear transition 295, outer shaft 296, disk 297, drive nut 298, and electric motor 299.

Electromechanical pitch actuator 69 has linear drive 293 connected to front plate 294. Front plate 294 is connected to the front end of linear drive 293. As seen in FIG. 28, front plate 294 is a plate adjacent the front of electromechanical pitch actuator 69. Rotary-to-linear transition 295 is connected to the rear end of linear drive 293. A front face of a lower portion of rotary-to-linear transition 295 is connected to linear drive 293. Rotary-to-linear transition 295 extends upward from the rear end of linear drive 293. Outer shaft 296 of electromechanical pitch actuator 69 extends forward from a front face of a top portion of front plate 294. Shaft 159 of pitch shaft assembly 68 is connected to electromechanical pitch actuator 69 at outer shaft 296 and disk 297. As seen in FIG. 26, rear end 160 of shaft 159 is positioned within outer shaft 296, and forward end 162 of shaft 159 extends into rotor head 39R. Front plate 294 extends below outer shaft 296 such that a bottom portion of front plate 294 is below outer shaft 296. Disk 294 is connected to shaft 159 such that disk 294 is between outer shaft 296 and shaft 159. Disk 297 is connected to a front end of outer shaft 296. As such, disk 297 forms the front of electromechanical pitch actuator 69. Disk 297 is made of a metal. Drive nut 298 of electromechanical pitch actuator 69 is mounted to the bottom portion of front plate 294. As such, front plate 294 and drive nut 294 form the bottom of electromechanical pitch actuator 69. Drive nut 298 extends through a hole in the bottom portion of front plate 294. A lip of drive nut 298 extends beyond the hole to contact the front face of the bottom portion of front plate 294. Drive nut 298 is trapezoidal. Electric motor 299 extends forward from the front face of an upper portion of rotary-to-linear transition 295. As such, electric motor 299 is spaced from and extends above a portion of linear drive 293.

Maximum position sensor 288 extends inward from sensor bracket 284 such that maximum position sensor 288 faces outer shaft 283 and disk 297. Minimum position sensor 290 extends inward from sensor bracket 284 such that minimum position sensor 290 faces outer shaft 283 and disk 297. Fail safe position sensor 291 extends inward from sensor bracket 284 such that fail safe position sensor 291 faces outer shaft 283 and disk 927. Normal position sensor 292 extends inward from sensor bracket 284 such that normal position sensor 292 faces outer shaft 283 and disk 297.

Electromechanical pitch actuator 69 is configured to translate linearly via linear drive 293. Electric motor 299 powers electromechanical pitch actuator 69. Electric motor 299 produces rotary movement. Rotary-to-linear transition 295 transforms rotary movement from electric motor 299 to linear movement for linear drive 293. As such, linear drive 293 is powered by electric motor 299. Front plate 294 provides a mount for drive nut 298 adjacent fail safe system 70 to connect electromechanical pitch actuator 69 to fail safe system 70. Drive nut 298 has a lip that extends over the front surface of front plate 294 such that rearward movement of drive nut 298 causes rearward movement of electromechanical pitch actuator 69. Outer shaft 296 provides a mount for shaft 159 of pitch shaft assembly 68 such that actuation of electromechanical pitch actuator 69 to move linearly causes shaft 159 of pitch shaft assembly 68 to move linearly along with electromechanical pitch actuator 69. Linear movement of shaft 159 changes the angle of blades 18 (shown in FIGS. 1A-1D, 8C, 9, 10A, 18A, 18B).

Outer shaft 296 has disk 297 to provide a sensing area for maximum position sensor 288, minimum position sensor 290, fail safe sensor 291, and normal position sensor 292 of sensor assembly 282. Disk 297 is configured to align with maximum position sensor 288, minimum position sensor 290, fail safe sensor 291 and normal position sensor 292 as electromechanical pitch actuator 69 translates forward and rearward linearly. In normal operation, normal position sensor 292 is in an ON state. Fail safe sensor 291 is in an OFF state. Disk 297 is sensed by sensor assembly 282 as electromechanical pitch actuator 69 moves linearly. When electromechanical pitch actuator 69 moves forward and rearward, disk 297 aligns with and moves between maximum position sensor 288 and minimum position sensor 290. When disk 297 is in alignment with maximum position sensor 288, maximum position sensor 288 is in an ON state, and minimum position sensor 290 is in an OFF state. When disk 297 is in alignment with minimum position sensor 290, maximum position sensor 288 is in an OFF state, and minimum position sensor 290 is in an ON state.

In normal operation, electromechanical pitch actuator 69 moves shaft 159 back and forth, forward and rearward, between maximum position sensor 288 and minimum position sensor 290 to control the speed of rotor assembly 50 with varying wind speeds.

Figure 29A:
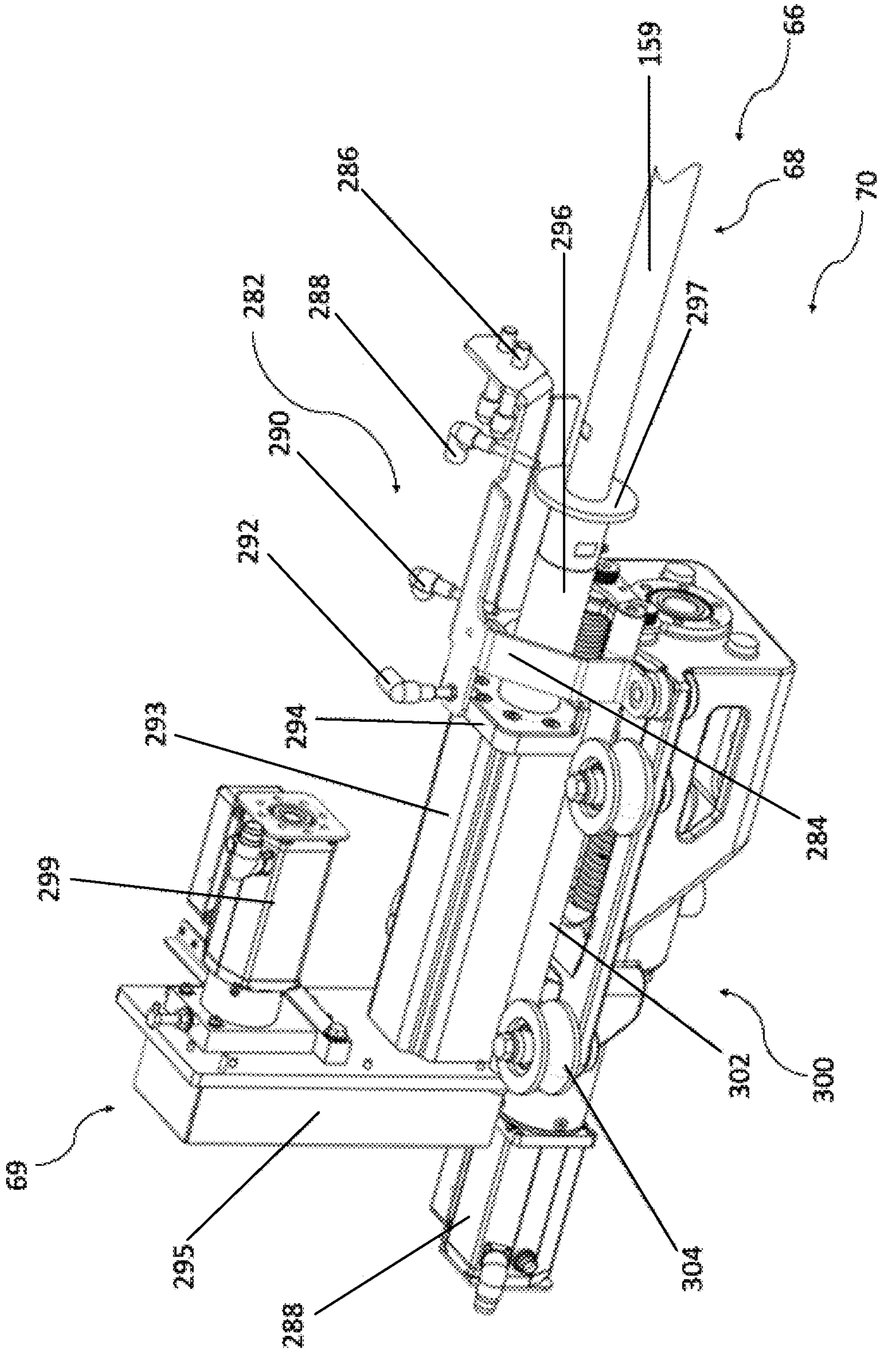
FIG. 29A is an isometric view of the electromechanical pitch actuator and the fail safe system from above a right side showing a portion of the pitch shaft assembly and a linear drive system.
Figure 29B:
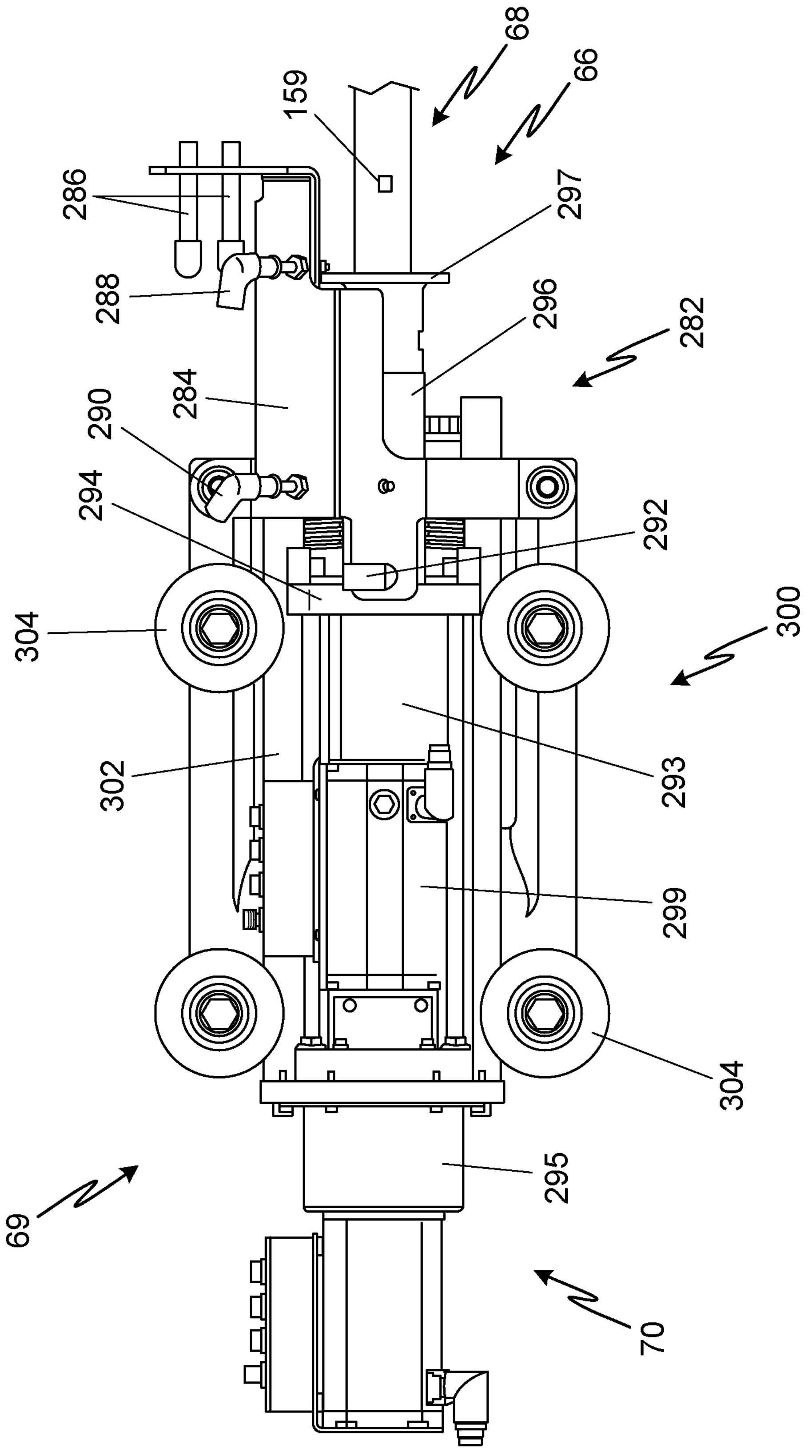
FIG. 29B is a top view of the electromechanical pitch actuator, the fail safe system, and the linear drive system.
Figure 29C:
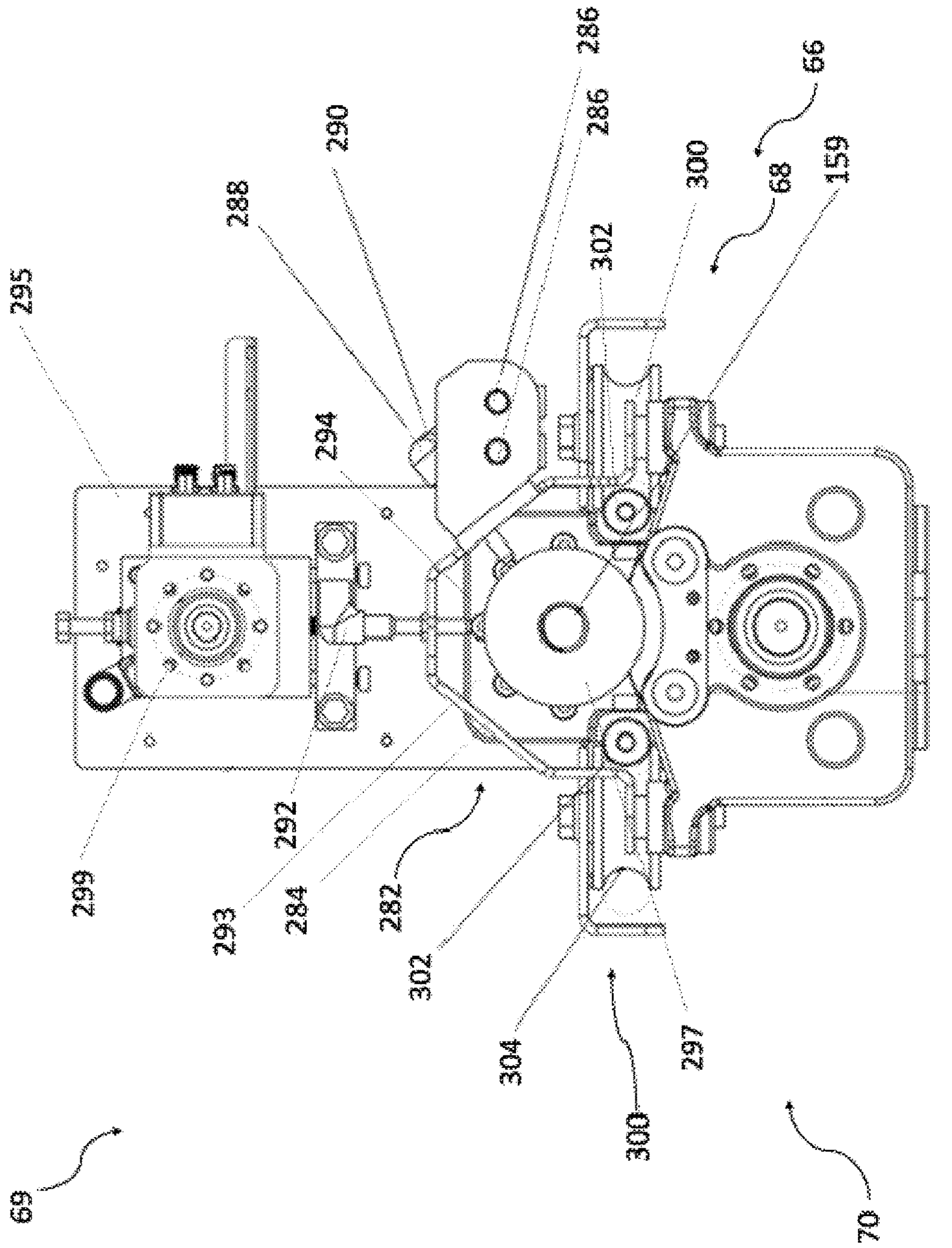
FIG. 29C is a front view of the electromechanical pitch actuator, the fail safe system, and the linear drive system showing a portion of the pitch shaft assembly.

Linear Drive System (FIGS. 29A-29C)

FIG. 29A is an isometric view of electromechanical pitch actuator 69 and fail safe system 70 from above a right side showing a portion of pitch shaft assembly 68 and linear drive system 300. FIG. 29B is a top view of electromechanical pitch actuator 69, fail safe system 70, and linear drive system 300. FIG. 29C is a front view of electromechanical pitch actuator 69, fail safe system 70, and linear drive system 300 showing a portion of pitch shaft assembly 68.

Wind turbine nacelle 10 includes blade trim actuator system 66, which includes pitch shaft assembly 68 and electromechanical pitch actuator 69, fail safe system 70, and sensor assembly 282. Pitch shaft assembly 68 includes shaft 159. Sensor assembly 282 includes sensor bracket 284, speed sensors 286, maximum position sensor 288, minimum position sensor 290, fail safe sensor 291, and normal position sensor 292. Electromechanical pitch actuator 69 includes linear drive 293, front plate 294, rotary-to-linear transition 295, outer shaft 296, disk 297, drive nut 298, and electric motor 299. Electromechanical pitch actuator 69 is mounted to fail safe system 70 via linear drive system 300, which includes guide bars 302 and linear drive pulleys 304.

Shaft 159 of pitch shaft assembly 68 is connected to a front end of electromechanical pitch actuator 69. Fail safe system 70 is connected to a bottom of electromechanical pitch actuator 69. Sensor assembly 282 has bracket 284 that is connected to fail safe system 70 and positioned around electromechanical pitch actuator 69. Speed sensors 286, maximum position sensor 288, minimum position sensor 290, fail safe sensor 291, and normal position sensor 292 are mounted to sensor bracket 284 to face electromechanical pitch actuator 69. Electric motor 299 of electromechanical pitch actuator 69 is connected to an upper portion of rotary-to-linear transition 295, and a rear end of linear drive 293 of electromechanical pitch actuator 69 is connected to a lower portion of rotary-to-linear transition 295. Front plate 294 is connected to a front end of linear drive 293. A first end of outer shaft 296 of electromechanical pitch actuator 69 extends from a front face of a top portion of front plate 294 and a second end of outer shaft 296 is connected to disk 297. Drive nut 298 is connected to a bottom portion of front plate 294.

Electromechanical pitch actuator 69 is mounted to fail safe system 70 via linear drive system 300. Linear drive system 300 is connected to electromechanical pitch actuator 69 and fail safe system 70. Two guide bars 302 of linear drive system 300 are connected to electromechanical pitch actuator 69. A first guide bar 302 extends along a first side of electromechanical pitch actuator 69, and a second guide bar 302 extends along a second side of electromechanical pitch actuator 69. Guide bars 302 are mounted to linear drive pulleys 304 of linear drive system 300. Four linear drive pulleys 304 are mounted to fail safe system 70. A first linear drive pulley 304 and a second linear drive pulley 304 are connected to a first side of fail safe system 70 and hold first guide bar 302. A third linear drive pulley 304 and a fourth linear drive pulley 304 are connected to a second side of fail safe system 70 and hold the second guide bar 302. As such, electromechanical pitch actuator 69 connected to guide bars 302 is mounted between four linear drive pulleys 304 connected to fail safe system 70. Guide bars 302 and linear drive pulleys 304 are shaped such that guide bars 302 translate along linear drive pulleys 304. Linear drive pulleys 304 are grooved, or have U-shaped cross-sections, and guide bars 302 fit within the grooves.

During normal operation of wind turbine nacelle 10, normal position sensor 292 is in an ON state. Fail safe sensor 291 is in an OFF state. Electromechanical pitch actuator 69 is powered by electric motor 299 to move linearly via rotary-to-linear transition 295. As a result, disk 297 moves between maximum position sensor 288 and minimum position sensor 290 to move shaft 159 of pitch shaft assembly 68. When electromechanical pitch actuator 69 is actuated to move forward or rearward, guide bars 302 translate forward or rearward, respectively, along linear drive pulleys 304. As such, electromechanical pitch actuator 69 moves forward and rearward along linear drive pulleys 304.

During fail safe mode of wind turbine nacelle 10, normal position sensor 292 is in an OFF state. Fail safe sensor 291 is in an ON state. Fail safe system 70 pulls electromechanical pitch actuator 70 rearward, along with shaft 159 of pitch shaft assembly 68, until disk 297 reaches fail safe sensor 291. When fail safe system 70 actuates to move electromechanical pitch actuator 69 rearward, guide bars translate rearward along linear drive pulleys 304. Guide bars 302 move rearward along linear drive pulleys 304. Guide bars 302 and linear drive pulleys 304 allow movement of electromechanical pitch actuator 69 in an x-axis direction. Guide bars 302 and linear drive pulleys 304 restrict movement of electromechanical pitch actuator 69 in a y-axis direction and a z-axis direction.

Linear drive system 300 enables electromechanical pitch actuator 69 to translate forward and rearward as guide bars 302 translate within linear drive pulleys 304. Linear drive pulleys 304 are shaped to ensure accurate movement of electromechanical pitch actuator 69 by only allowing electromechanical pitch actuator 69 to translate along the x-direction.

Fail Safe System (FIGS. 30A-30D)

Figure 30A:
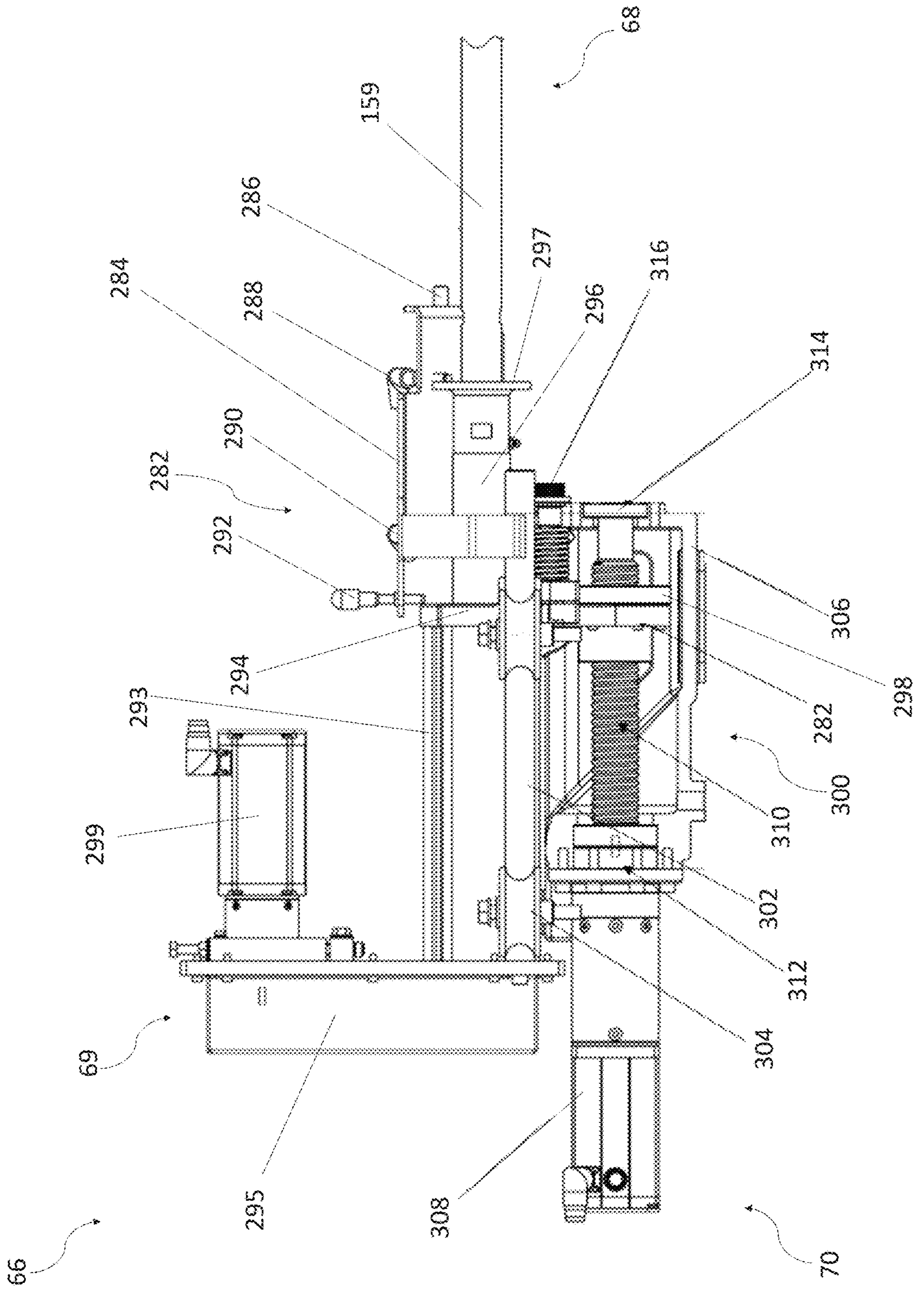
FIG. 30A is a right side view of the electromechanical pitch actuator and the fail safe system from the right side with a portion of a fail safe chassis of the fail safe system removed and showing a portion of the pitch shaft assembly.
Figure 30B:
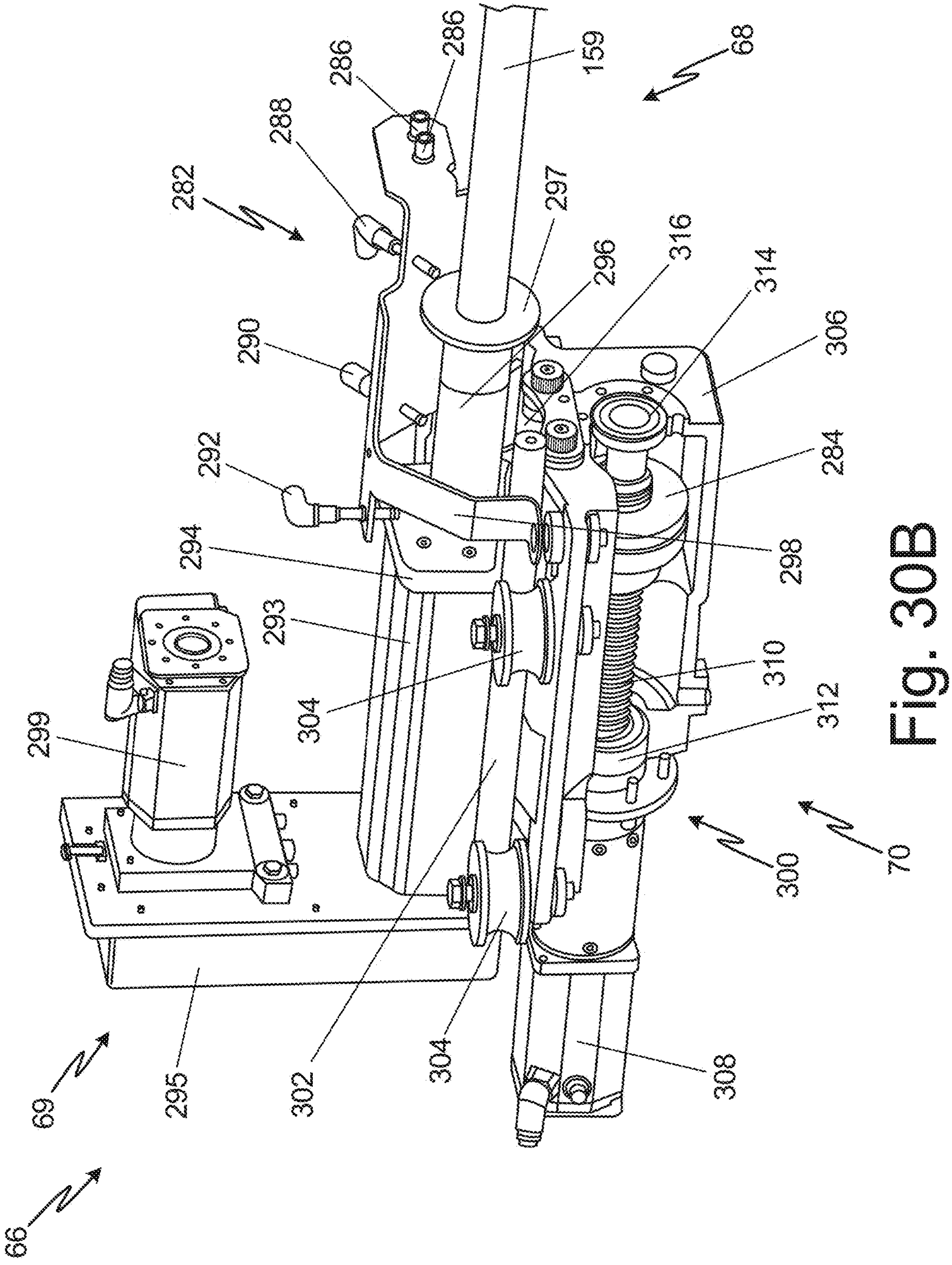
FIG. 30B is an isometric view of the electromechanical pitch actuator and the fail safe system from the right side with a portion of the fail safe chassis of fail safe system 70 removed and showing a portion of the pitch shaft assembly.
Figure 30C:
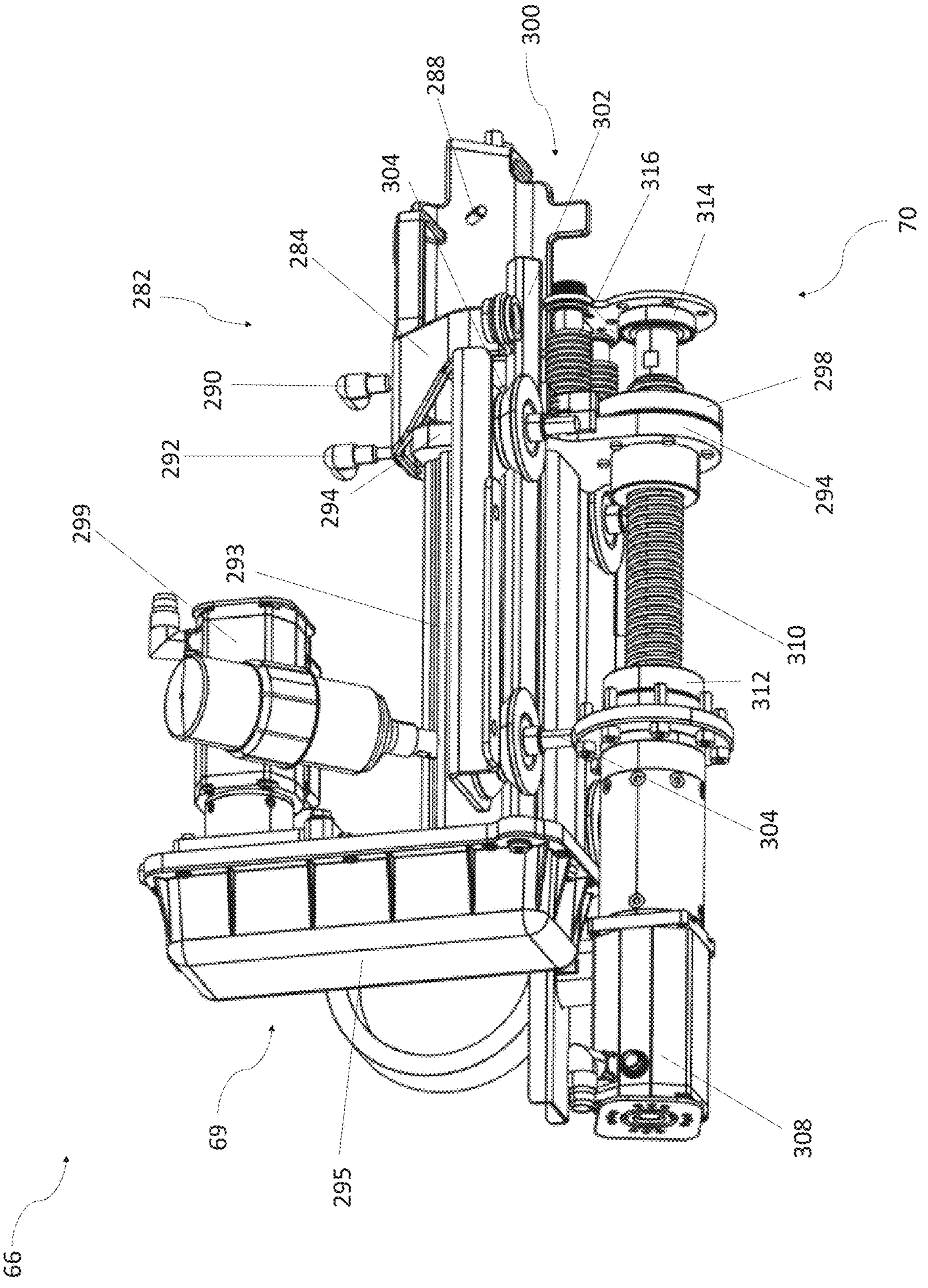
FIG. 30C is an isometric view of the electromechanical pitch actuator and the fail safe system from below the right side with the fail safe chassis of the fail safe system removed.
Figure 30D:
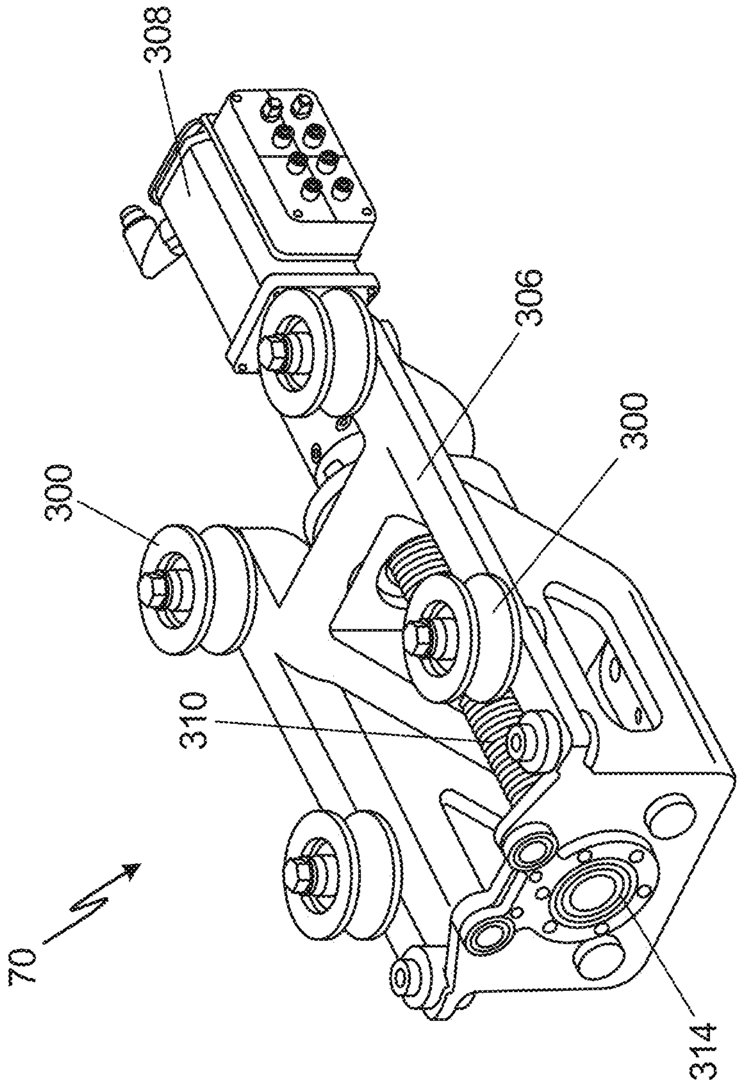
FIG. 30D is an isometric view of the fail safe system from the left side.

FIG. 30A is a right side view of electromechanical pitch actuator 69 and fail safe system 70 from the right side with a portion of fail safe chassis 306 of fail safe system 70 removed and showing a portion of pitch shaft assembly 68. FIG. 30B is an isometric view of electromechanical pitch actuator 69 and fail safe system 70 from the right side with a portion of fail safe chassis 306 of fail safe system 70 removed and showing a portion of pitch shaft assembly 68. FIG. 30C is an isometric view of electromechanical pitch actuator 69 and fail safe system 70 from below the right side with fail safe chassis 306 of fail safe system 70 removed. FIG. 30D is an isometric view of fail safe system 70 from the left side.

Wind turbine nacelle 10 includes blade trim actuator system 66 (shown in FIGS. 30A-30C), which includes pitch shaft assembly 68 (shown in FIGS. 30A and 30B) and electromechanical pitch actuator 69, fail safe system 70, and sensor assembly 282 (shown in FIGS. 30A-30C). Pitch shaft assembly 68 includes shaft 159. Sensor assembly 282 includes sensor bracket 284, speed sensors 286, maximum position sensor 288, minimum position sensor 290, and normal position sensor 292. Electromechanical pitch actuator 69 includes linear drive 293, front plate 294, rotary-to-linear transition 295, outer shaft 296, disk 297, drive nut 298, and electric motor 299. Electromechanical pitch actuator 69 is mounted to fail safe system 70 via linear drive system 300, which includes guide bars 302 and linear drive pulleys 304. Fail safe system 70 includes fail safe chassis 306, fail safe motor 308, shaft 310, high load bearing 312, and shaft stability bearing 314. Further, electromechanical pitch actuator 69 and fail safe system 70 utilize preload spring system 316.

Shaft 159 of pitch shaft assembly 68 is connected to front end of electromechanical pitch actuator 69. Sensor assembly 282 has bracket 284 that is connected to fail safe system 70 and positioned around electromechanical pitch actuator 69. Speed sensors 286, maximum position sensor 288, minimum position sensor 290, fail safe sensor 291, and normal position sensor 292 are mounted to sensor bracket 284 to face electromechanical pitch actuator 69. Electric motor 299 and linear drive 293 of electromechanical pitch actuator 69 are connected to rotary-to-linear transition 295 of electromechanical pitch actuator 69. Front plate 294 is connected to a front end of linear drive 293. Outer shaft 296 extends from front plate 294 and is connected to disk 297. Drive nut 298 is connected to a bottom portion of front plate 294. Electromechanical pitch actuator 69 is mounted to fail safe system 70 via linear drive system 300. Guide bars 302 of linear drive system 300 are connected to electromechanical pitch actuator 69, and linear drive pulleys 304 are connected to fail safe system 70. Linear drive pulleys 304 are shaped such that guide bars 302 move in an x-direction within linear drive pulleys 304.

Fail safe system 70 is fitted to electromechanical pitch actuator 69. Fail safe chassis 306 of fail safe system 70 extends along a bottom of electromechanical pitch actuator 69. Sensor bracket 284 of sensor assembly 282 has a first end connected to fail safe chassis 306 and a second end connected to fail safe chassis 306. Linear drive pulleys 304 of linear drive system 300 are connected to fail safe chassis 306. The first linear drive pulley 304 and the second linear drive pulley 304 are connected to the first side of fail safe chassis 306, and the third linear drive pulley 304 and the fourth linear drive pulley are connected to the second side of fail safe chassis 306.

The bottom portion of front plate 294 of electromechanical pitch actuator 69 extends within fail safe chassis 306. Fail safe motor 308 of fail safe system 70 is coupled to shaft 310 of fail safe system 70 via an output shaft of fail safe motor 308. Fail safe motor 308 includes a gear box. Fail safe motor 308 is powered by a battery, providing battery-backup to wind turbine nacelle 10. Fail safe motor 308 is positioned outside of fail safe chassis 306, and shaft 310 extends within fail safe chassis 306. Shaft 310 is mounted to fail safe chassis 306. As such, fail safe motor 308 is mounted to fail safe chassis 306. Shaft 310 is a trapezoidal threaded shaft. Shaft 310 extends through drive nut 298 and front plate 294 of electromechanical pitch actuator 69 within fail safe chassis 306. As such, fail safe system 70 is mounted to front plate 294 of electromechanical pitch actuator 69 via drive nut 298. Threads of shaft 310 are in contact threads of drive nut 298. Shaft 310 is mounted to fail safe chassis 306 via high load bearing 312 of fail safe system 70 and shaft stability bearing 314 of fail safe system 70. High load bearing 312 and shaft stability bearing 314 surround shaft 310. High load bearing 312 surrounds a rear end of shaft 310 between shaft 310 and fail safe chassis 306. Shaft stability bearing 314 surrounds a forward end of shaft 310 between shaft 310 and fail safe chassis 306. Fail safe system 70 is electrically connected to controller 168 (shown in FIG. 8A) of wind turbine nacelle 10, which initiates fail safe system 70.

Fail safe system 70 and electromechanical pitch actuator 69 are connected to preload spring system 316. Preload spring system 316 is mounted to a front side of front plate 294 of electromechanical pitch actuator 69 above drive nut 298 and below outer shaft 296. Preload spring system is connected to fail safe chassis 306 of fail safe system 70. Preload spring system 316 includes two springs positioned side-by-side. Springs of preload spring system 316 extend between a front of front plate 294 and a front of fail safe chassis 306.

If an emergency stop is required, fail safe system 70 is actuated. An emergency stop is required when an operational failure of wind turbine nacelle 10 is detected by controller 168. The operational failure causes controller 168 to trigger the fail safe system 70, putting wind turbine nacelle 10 in the fail safe mode. Fail safe sensor 291 is in an ON state, and normal position sensor 292 is in an OFF state. Fail safe system 70 moves rearward under extreme load to pull an entirety of electromechanical pitch actuator 69 rearward, which pulls shaft 159 rearward, causing blades 18 (shown in FIGS. 1A-1D, 8C, 9, 10A, 18A, 18B) to rotate to the stall blade position. As such, fail safe system 70 automatically rotates blades 18, bypassing operation of electromechanical pitch actuator 69, to reduce lift on blades 18 and gradually bring rotor assembly 50 to a stop.

More specifically, when controller 168 triggers fail safe system 70, fail safe motor 308, which is powered by the battery-back-up, is triggered. As a result, fail safe motor 308 drives trapezoidal threaded shaft 310, which is supported by the bearing arrangement made up of high load bearing 312 and shaft stability bearing 314. Shaft 310 rotates to move drive nut 298 rearward along shaft 310. Drive nut 298 moves failed electromechanical pitch actuator 69 rearward by applying force to front plate 294. Shaft 310 and drive nut 298 pull complete failed electromechanical pitch actuator 69 connected to shaft 159 of rotor head and blade pitch assembly 16 rearward until minimum position sensor 290 and fail safe sensor 291 are triggered. Minimum position sensor 290 is triggered when shaft 159 has moved to the position where blades 18 are rotated fully out of the wind, or into the blade stall position. As fail safe system 70 is pulling electromechanical pitch actuator 69, guide bars 302 connected to electromechanical pitch actuator 69 translate within linear drive pulleys 304 connected to fail safe system 70. Electromechanical pitch actuator 69 is moved rearward; however, movement of electromechanical pitch actuator 69 is still restricted in the y-axis direction and the z-axis direction.

Preload spring system 316 uses spring force to remove backlash between shaft 310 and drive nut 298, which protects electromechanical pitch actuator 69 from intermittent loading applied by rotor head and blade pitch system 16 when rotating blades 18 by translating shaft 159 linearly. Springs of preload spring system 316 compress between front plate 294 of electromechanical pitch actuator 69 and fail safe chassis 306 of fail safe system 70. Preload spring system 316 matches the maximum actuator load required to pitch blades 18 and assists fail safe motor 308 at the first stages of an emergency stop.

Fail safe system 70 provides a secondary method to bring wind turbine nacelle 10 to a stop. As such, if normal operation of electromechanical pitch actuator 69 is obstructed, fail safe system 70 can force an emergency stop of wind turbine nacelle 10. Fail safe system 70 is powered by battery backup power. Thus, fail safe system 70 may operate without power to wind turbine nacelle 10, which allows fail safe system 70 to function in the event of power loss to wind turbine nacelle 10, which renders electromechanical pitch actuator 69 nonfunctional. As such, fail safe system 70 is operational even when the main power supply is lost to wind turbine nacelle 10.

Operation of Electromechanical Pitch Actuator and Fail Safe System (FIGS. 31, 32A-32C)

Figure 31:
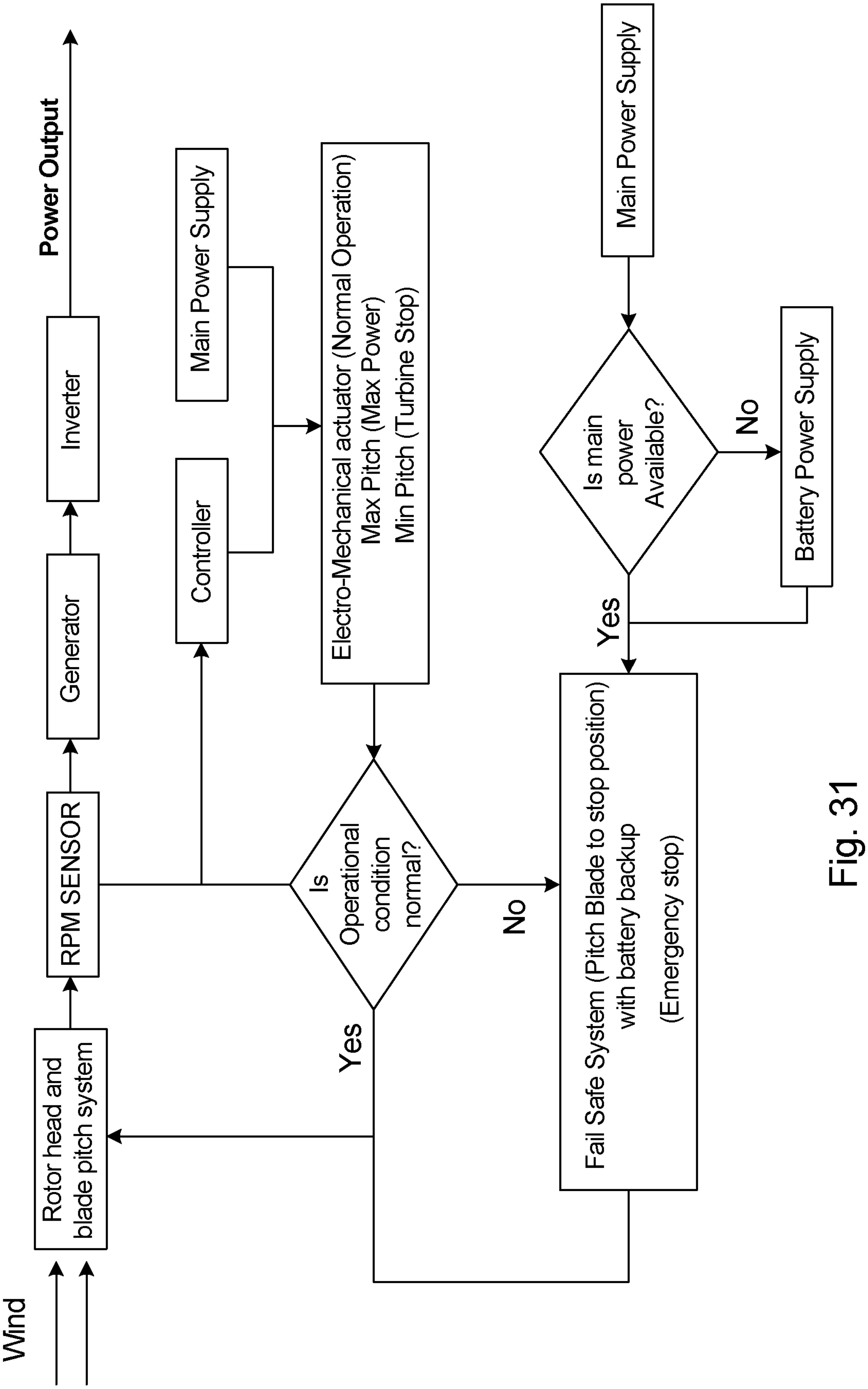
FIG. 31 is a flow chart illustrating operation of the electromechanical pitch actuator and the fail safe system.
Figure 32A:
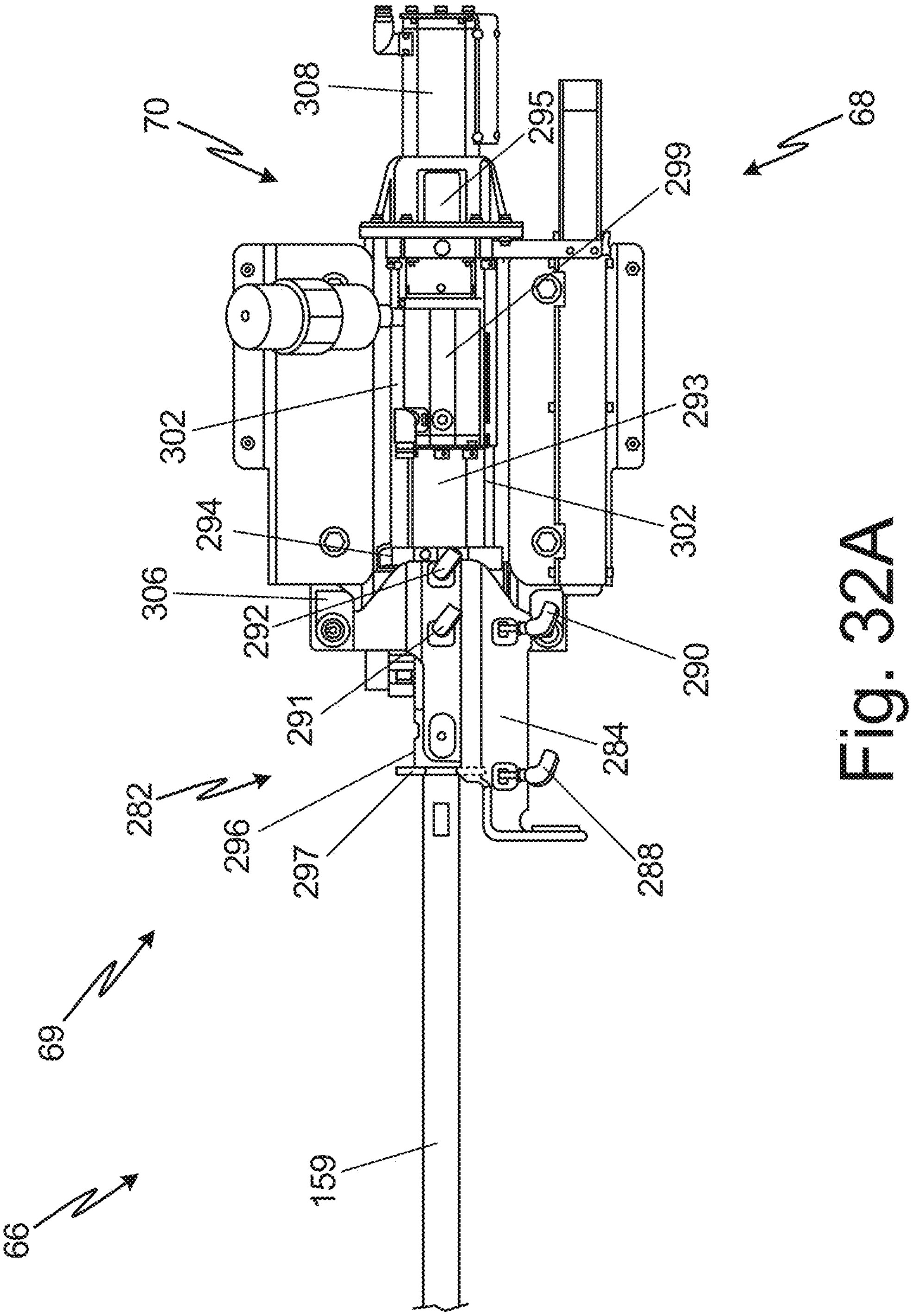
FIG. 32A is a top view of the electromechanical pitch actuator and the fail safe system showing the electromechanical pitch actuator in a fully extended position in normal operation.
Figure 32B:
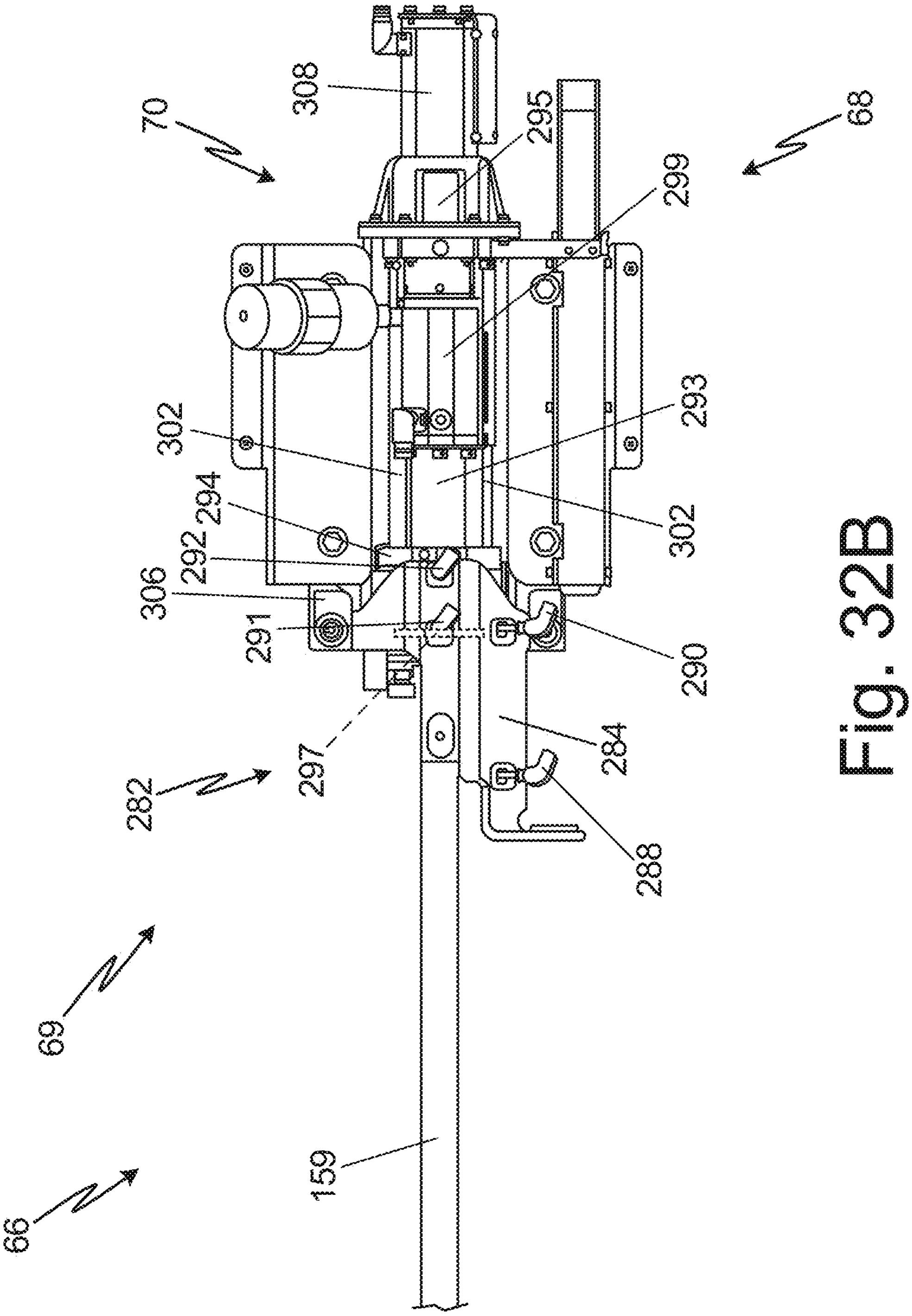
FIG. 32B is a top view of the electromechanical pitch actuator and the fail safe system showing the electromechanical pitch actuator in a fully retracted position in normal operation.
Figure 32C:
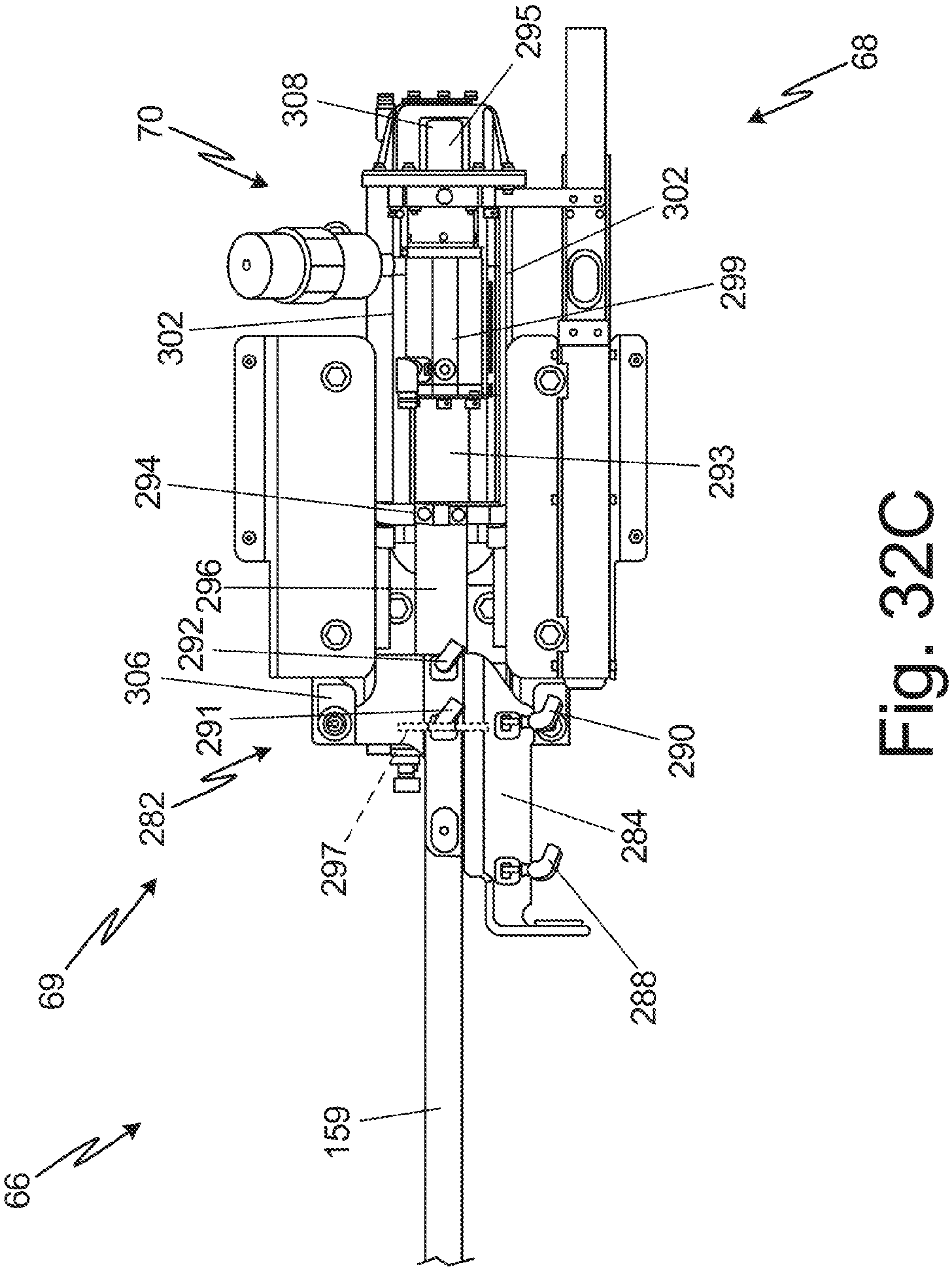
FIG. 32C is a top view of the electromechanical pitch actuator and the fail safe system showing the electromechanical pitch actuator in a retracted position in fail safe mode.

FIG. 31 is a flow chart illustrating operation of electromechanical pitch actuator 69 and fail safe system 70. FIG. 32A is a top view of electromechanical pitch actuator 69 and fail safe system 70 showing electromechanical pitch actuator 69 in a fully extended position in normal operation. FIG. 32B is a top view of electromechanical pitch actuator 69 and fail safe system 70 showing electromechanical pitch actuator 69 in a fully retracted position in normal operation. FIG. 32C is a top view of electromechanical pitch actuator 69 and fail safe system 70 showing electromechanical pitch actuator 69 in a fully retracted position in fail safe mode.

Wind turbine nacelle 10 includes generator 14, rotor head and blade pitch system 16, blade trim actuator system 66, which includes pitch shaft assembly 68 and electromechanical pitch actuator 69, fail safe system 70, and sensor assembly 282. Generator 14 includes rotor assembly 50 (shown in FIG. 26), which includes rotor generator shaft 78. Rotor head and blade pitch system 16 (shown in FIG. 26) includes blade holders 39, rotor head 39R, and rotor head housing 39H. Pitch shaft assembly 68 includes shaft 159. Sensor assembly 282 includes sensor bracket 284, speed sensors 286, maximum position sensor 288, minimum position sensor 290, fail safe sensor 291, and normal position sensor 292. Electromechanical pitch actuator 69 includes linear drive 293, front plate 294, rotary-to-linear transition 295, outer shaft 296, disk 297, and electric motor 299. Electromechanical pitch actuator 69 is mounted to fail safe system 70 via linear drive system 300, which includes guide bars 302. Fail safe system 70 includes fail safe chassis 306 and fail safe motor 308.

Rotor generator shaft 78 of rotor assembly 50 of generator 14 is connected to rotor head and blade pitch system 16. Shaft 159 extends up through the center of rotor generator shaft 78 into rotor head housing 39H of rotor head 39R to connect to blade holders 39. Shaft 159 of pitch shaft assembly 68 is connected to a front end of electromechanical pitch actuator 69 at outer shaft 296 of electromechanical pitch actuator 69. Sensor assembly 282 has speed sensors 286 mounted on sensor bracket 284. Maximum position sensor 288, minimum position sensor 290, fail safe sensor 291, and normal position sensor 292 are mounted on sensor bracket 284 to face electromechanical pitch actuator 69. Electric motor 299 and linear drive 293 of electromechanical pitch actuator 69 are connected to rotary-to-linear transition 295 of electromechanical pitch actuator 69. Front plate 294 is connected to linear drive 293. A first end of outer shaft 296 of electromechanical pitch actuator 69 extends from front plate 294 and a second end of outer shaft 296 is connected to disk 297. Electromechanical pitch actuator 69 is mounted to fail safe system 70 via linear drive system 300, guide bars 302 being connected to electromechanical pitch actuator 69. Fail safe chassis 306 of fail safe system 70 is connected to a bottom of electromechanical pitch actuator 69. Fail safe motor 308 of fail safe system 70 extends out of fail safe chassis and makes up the rear of fail safe system 70.

Electromechanical pitch actuator 69 actuates rotor head and blade pitch system 16 via shaft 159 of pitch shaft assembly 68. Shaft 159 is moved linearly by electromechanical pitch actuator 69, which transforms rotary motion of electric motor 299 to linear motion of linear drive 293 via rotary-to-linear transition 295. Linear movement of shaft 159 causes rotor head and blade pitch system 16 to rotate blades 18 by rotating blade holders 39, as described above with respect to FIGS. 18A-25B. Sensor assembly 282 assists controller 168 (shown in FIG. 8A) in operating rotor head and blade pitch system 16 via electromechanical pitch actuator 69. Electromechanical pitch actuator 69 utilizes a main power supply of wind turbine nacelle 10. When wind rotates blades 18, rotor assembly 50 rotates such that generator 14 generates electrical energy, which is converted by an inverter, and power is output from wind turbine nacelle 10 for use.

In normal operation, the wind interacts with rotor head and blade pitch system 16, which is controlled via electromechanical pitch actuator 69. Electromechanical pitch actuator 69 translates linearly, forward and rearward, to move shaft 159 linearly, forward and rearward, to move blade holders 39. Blade holders 39 rotate blades 18, changing the angle of blades 18 based on wind speed and direction sensed by anemometer 44 and wind vane 46 of wind sensing system 20 (shown in FIGS. 2A-2E). Sensor assembly 282, including normal position sensor 292, maximum position sensor 288, minimum position sensor 290, and speed sensors 286, interact with controller 168, which sends signals to electromechanical pitch actuator 69. Sensor assembly 282 receives and sends information regarding movement and location of electromechanical pitch actuator 69 and to indicate the whether the operational condition of wind turbine nacelle 10 is normal. The main power supply of wind turbine nacelle 10 powers electromechanical pitch actuator 69 to move shaft 159.

As seen in FIG. 32A, electromechanical pitch actuator 69 may be in a fully extended position. When electromechanical pitch actuator is in a fully extended position, disk 297 is aligned with maximum position sensor 288. Shaft 159 is at a maximum power position. Blades 18 are fully pitched into, or perpendicular with, the wind. Maximum position sensor 288 is in an ON state, and minimum position sensor 290 is in an OFF state. Fail safe sensor 291 is in an OFF state. Normal position sensor 292 is in an ON state. Electromechanical pitch actuator 69 is in normal operation and generating maximum power.

As seen in FIG. 32B, electromechanical pitch actuator 69 may be in a fully retracted position. When electromechanical pitch actuator 69 is in a fully retracted position, disk 297 is aligned with minimum position sensor 290. Shaft 159 is at a minimum power position, and electromechanical pitch actuator 69 is actuating a stop in normal operation. Blades 18 are out of, or parallel to, the wind, bringing wind turbine nacelle 10 to a stop. Maximum position sensor 288 is in an OFF state, and minimum position sensor 290 is in an ON state. Fail safe sensor (S3) 291 is in an OFF state. Normal position sensor 292 is in an ON state. Electromechanical pitch actuator 69 is in normal operation and generating minimum power.

If sensor assembly 282 indicates that the operational condition of wind turbine nacelle 10 is not normal, controller 168 triggers fail safe system 70. If the main power from the main power supply is available, fail safe system 70 utilizes the main power. If the main power from the main power supply is not available, fail safe system 70 utilizes the battery backup power supply. Fail safe system 70 brings wind turbine nacelle 10 to an emergency stop by pulling complete electromechanical pitch actuator 70 rearward to move blades 18 into the blade stall position.

As seen in FIG. 32C, electromechanical pitch actuator may be in a fully retracted fail safe position. When electromechanical pitch actuator 69 is in a fail safe position, wind turbine nacelle 10 has failed normal operation and fail safe system 70 is activated. Thus, wind turbine nacelle 10 is in fail safe mode. Fail safe system 70 drives failed electromechanical pitch actuator 69 back until disk 297 aligns with fail safe sensor 291. When fail safe sensor 291 is activated, electromechanical pitch actuator 69 has reached a the fully retracted fail safe position. An entirety of electromechanical pitch actuator 69 is driven rearward by fail safe system 70. Maximum position sensor 288 is in an OFF state, and minimum position sensor 290 is in an OFF state. Fail safe sensor 291 is in an ON state. Normal position sensor 292 is in an OFF state. Wind turbine nacelle 10 is in fail safe operation.

Traditional wind turbine nacelles use active pitch control as the emergency shut down system. When a traditional wind turbine nacelle loses power or the electromechanical pitch actuator experiences mechanical failure, active pitch control is lost. Thus, loss of the emergency shut down system also occurs, reducing the safety of the wind turbine nacelle.

Fail safe system 70 can orient blades 18 to assist with protecting wind turbine nacelle 10 from overspeed. As such, wind turbine nacelle 10 can stop automatically in the case of malfunction of a critical component. For example, if generator 14 overheats or is disconnected from the electrical grid, rotor assembly 50 may no longer be torqued such that rotor assembly 50 starts accelerating rapidly within a matter of seconds. Further, if electromechanical pitch actuator 69 is non-functional, such as due to power loss, wind turbine nacelle 10 loses active pitch control of blades 18. Fail safe system 70 can override electromechanical pitch actuator 69, bringing wind turbine nacelle 10 to a stop without using active pitch control. In that case, fail safe system 70 acts as a secondary system that mitigates the risk associated with failure of active pitch control, greatly improving the safety of wind turbine nacelle 10. As a result, fail safe system 70 ensures that wind turbine nacelle 10 retains overspeed protection.

Yaw Brake Assembly (FIGS. 33A-33F)

Figure 33A:
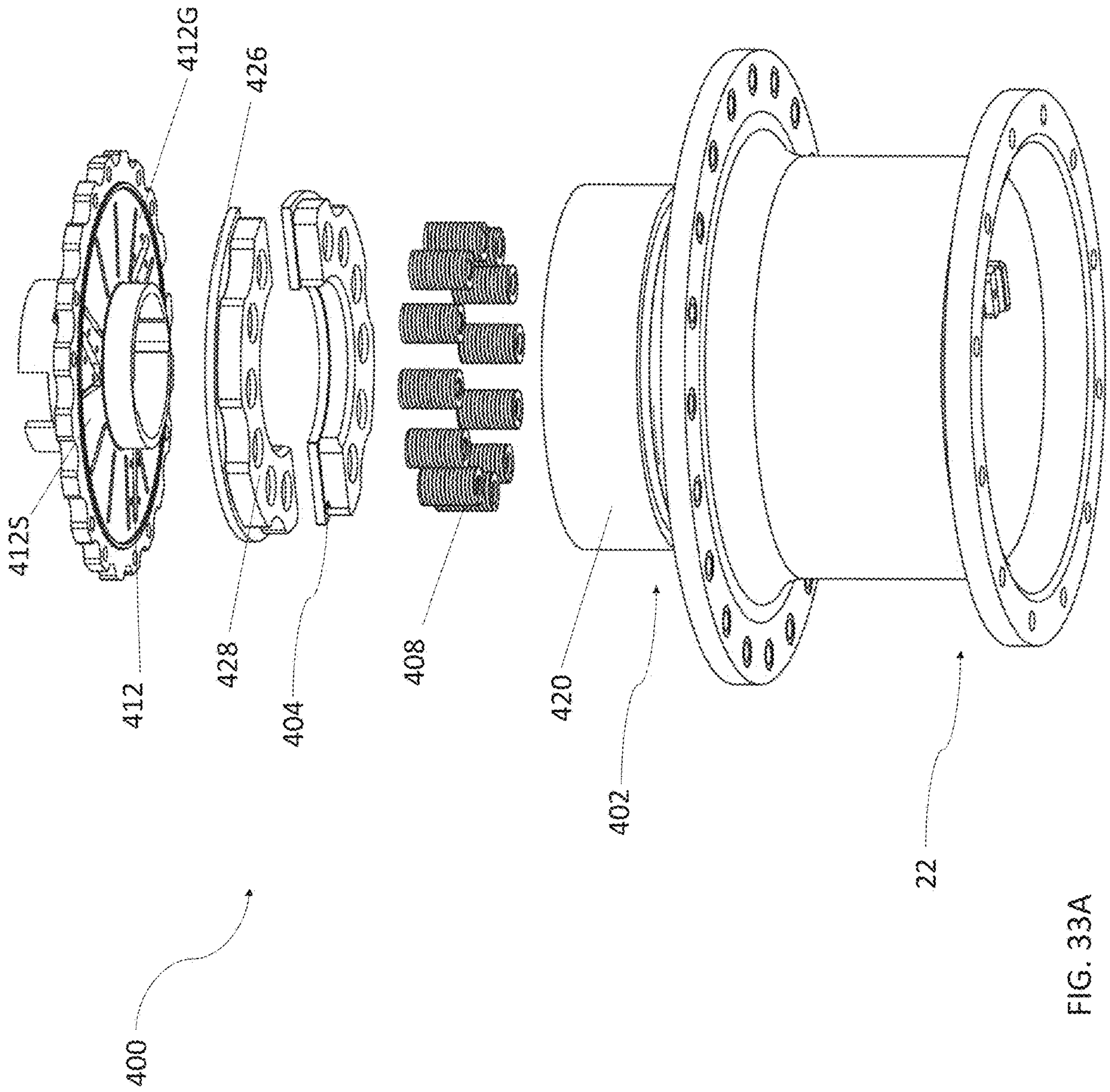
FIG. 33A is an exploded isometric view of a second embodiment of a yaw brake assembly and the stub mast from below.
Figure 33B:
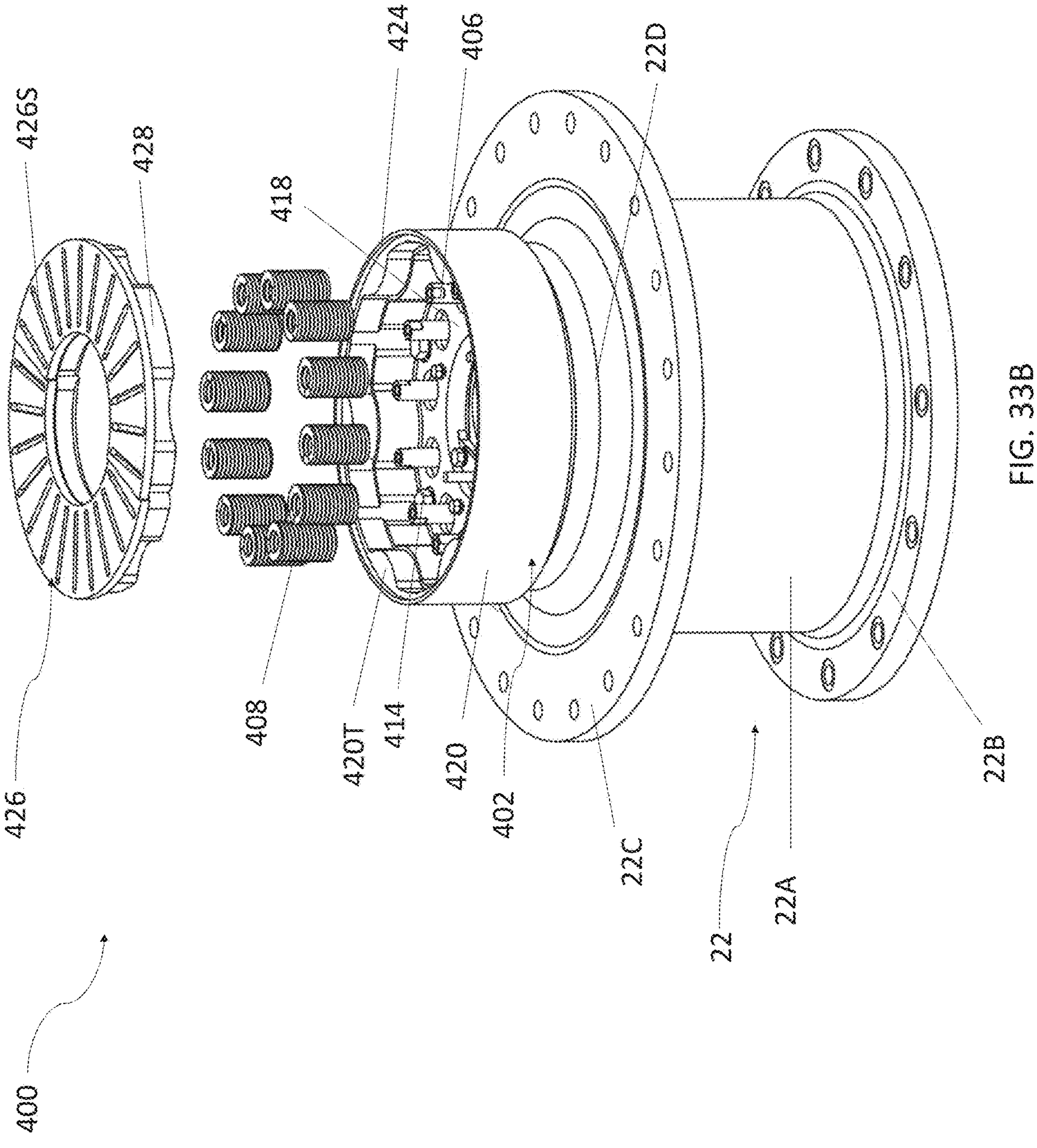
FIG. 33B is a partially exploded isometric view of the second embodiment of the yaw brake assembly from above not showing the brake disk and connected to the stub mast.
Figure 33C:
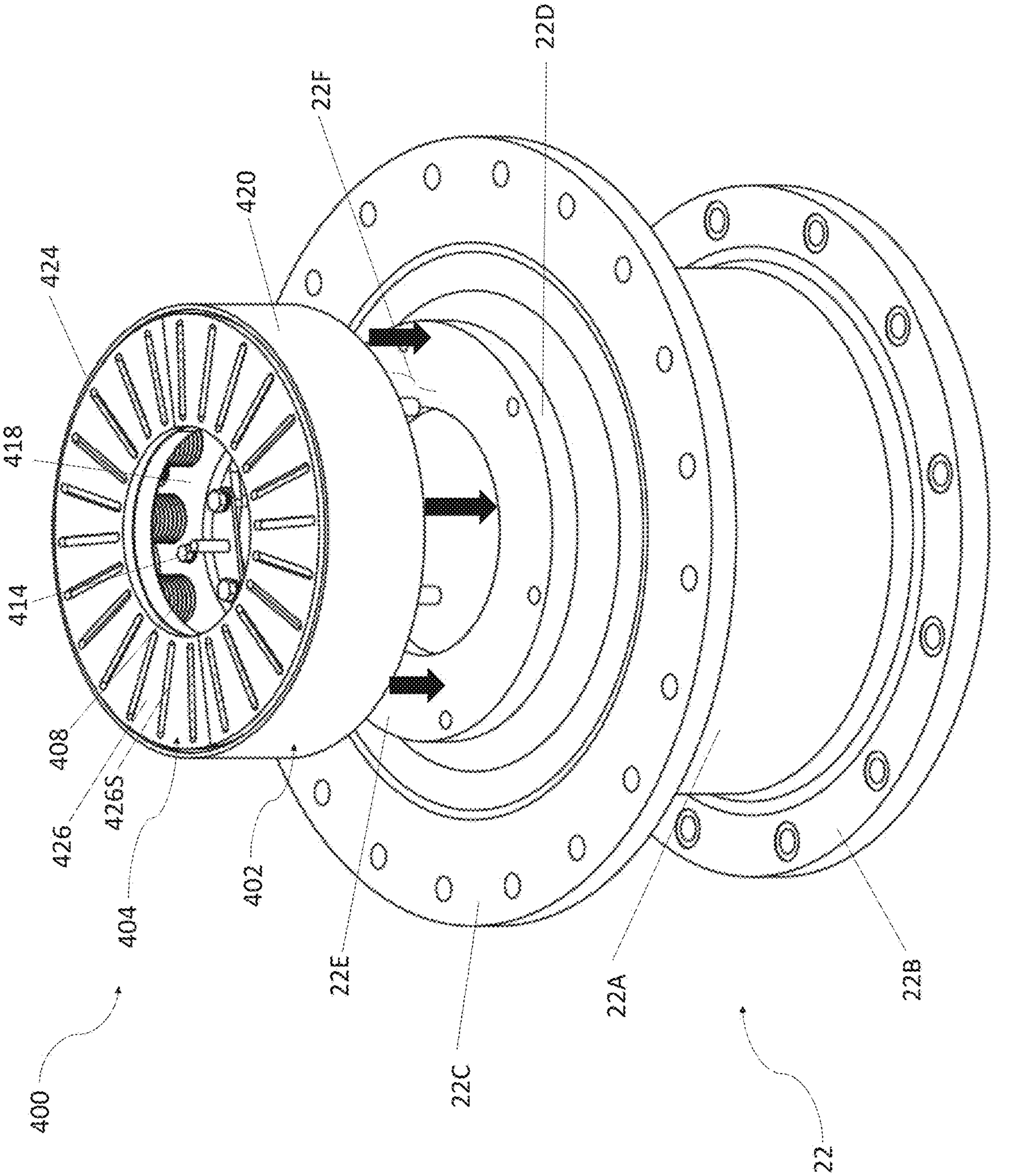
FIG. 33C is a partially exploded isometric view of the second embodiment of the yaw brake assembly, not showing the brake disk, and the stub mast.
Figure 33D:
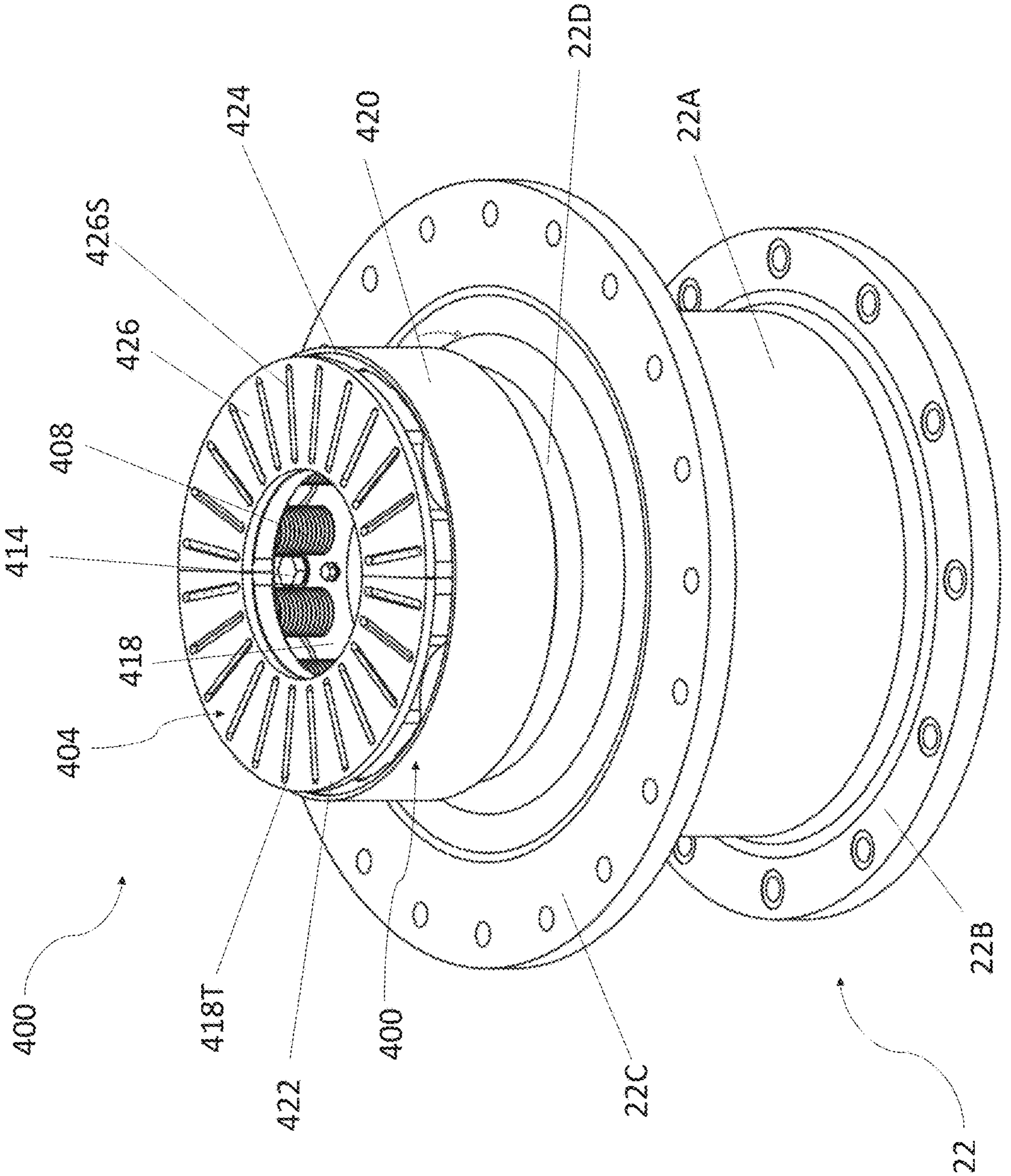
FIG. 33D is an assembled isometric view of the second embodiment of the yaw brake assembly, not showing the brake disk, and the stub mast.
Figure 33E:
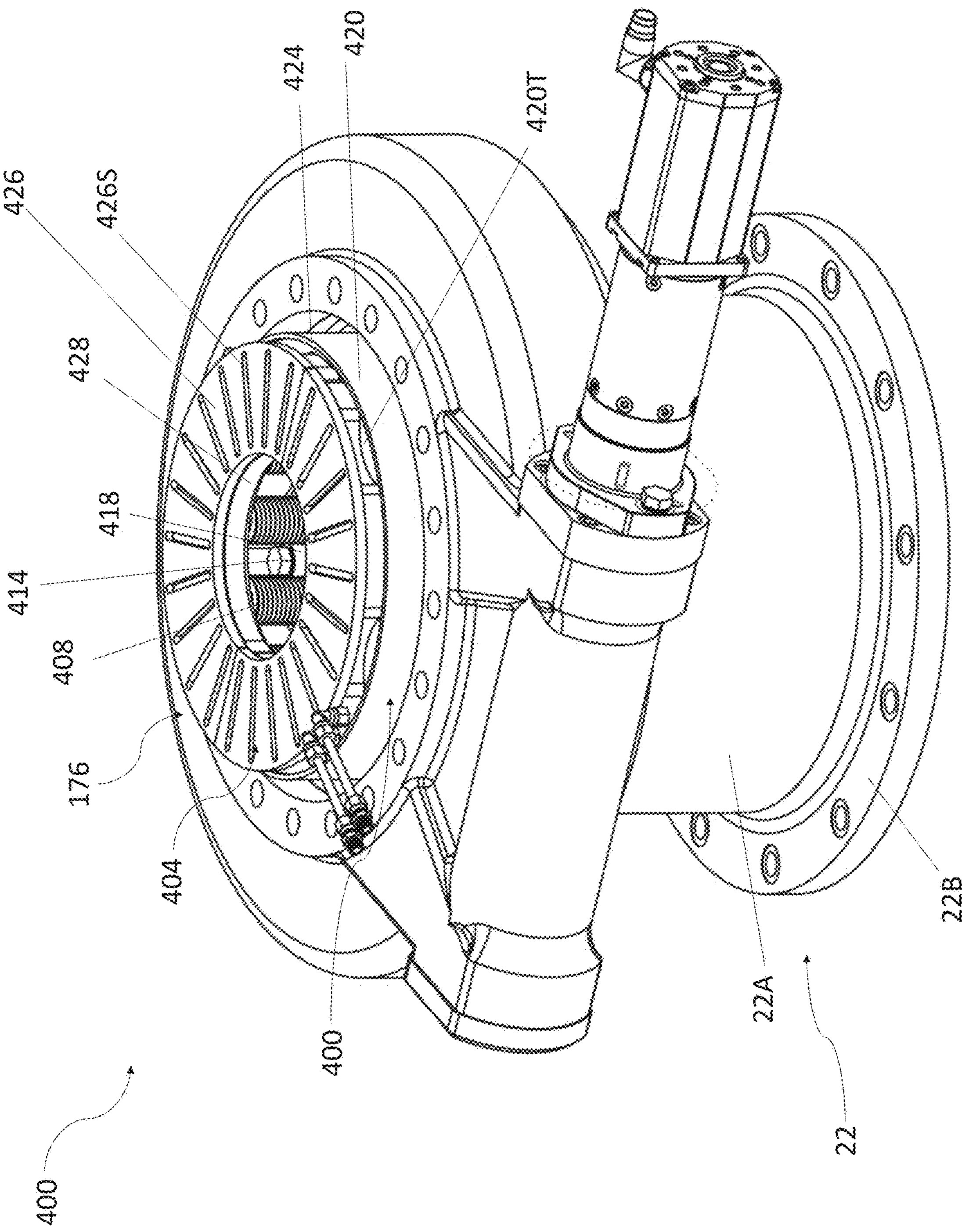
FIG. 33E is an assembled isometric view of the second embodiment of the yaw brake assembly, not showing the brake disk, the stub mast, and a yaw drive housing from above.

FIG. 33A is an exploded isometric view of yaw brake assembly 400 and stub mast 22 from below. FIG. 33B is a partially exploded isometric view of yaw brake assembly 400 from above not showing brake disk 412 and connected to stub mast 22. FIG. 33C is a partially exploded isometric view of yaw brake assembly 400, not showing brake disk 412, and stub mast 22. FIG. 33D is an assembled isometric view of yaw brake assembly 400, not showing brake disk 412, and stub mast 22. FIG. 33E is an assembled isometric view of yaw brake assembly 400, not showing brake disk 412, stub mast 22, and yaw drive housing 176 from above.

Figure 33F:
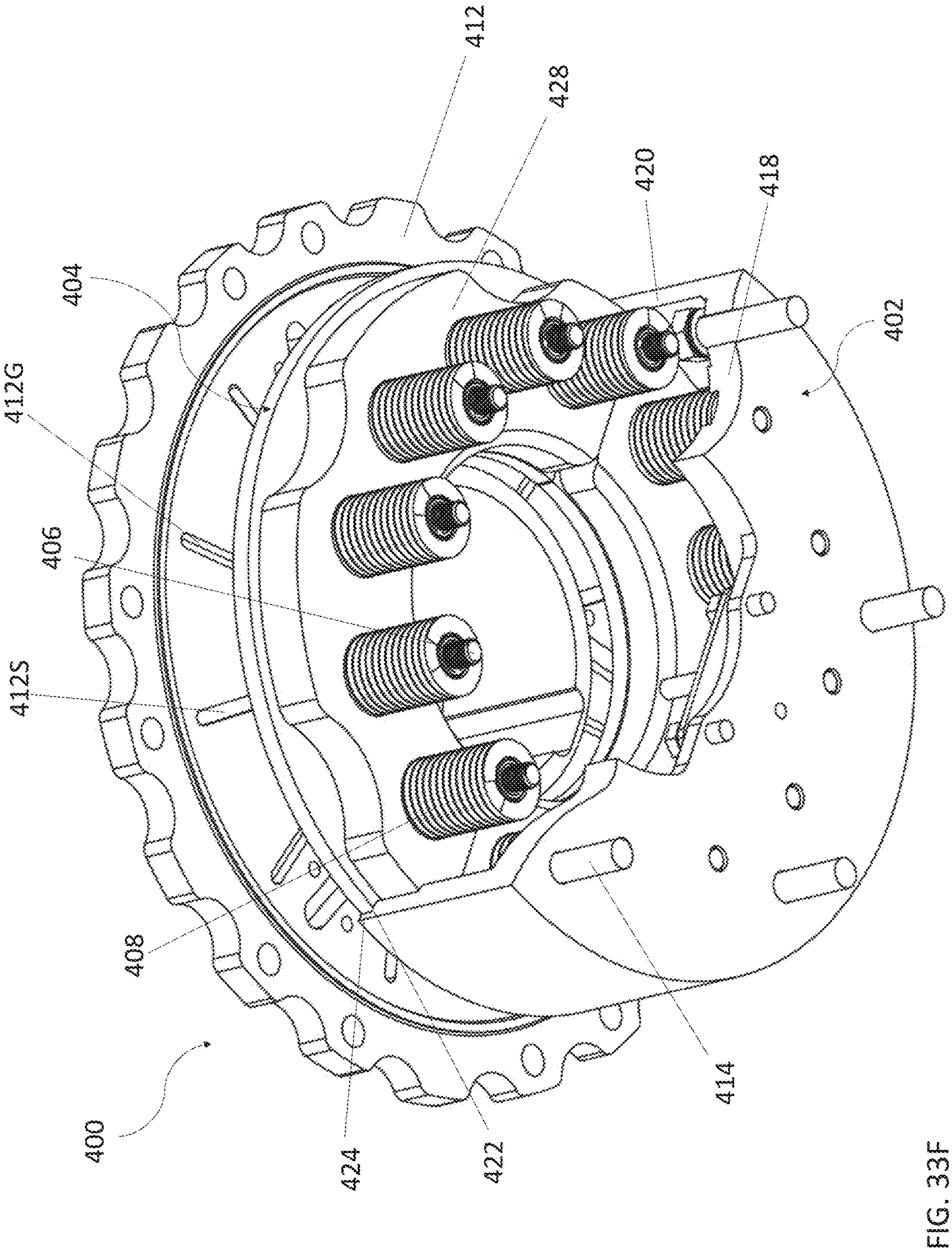
FIG. 33F is an assembled isometric view of the yaw brake assembly from below.

FIG. 33F is an assembled isometric view of yaw brake assembly 400 from below. FIGS. 33A-33F will be discussed together.

Yaw brake assembly 400 includes yaw brake caliper 402, brake pad 404, spring guides 406, springs 408, brush assemblies 410, brake disk 412 (including grooves 412G and slots 412S), bolts 414, and bolts 416. Yaw brake caliper 402 includes lower flange 418, neck 420 (having tabs 420T), shoulder 422, and upper flange 424. Brake pad 404 includes friction pads 426 (including slots 426S) and backing plate 428. Also shown in FIGS. 33A-33F is stub mast 22 (which includes cylindrical body 22A, bottom flange 22B, outer upper flange 22C, pedestal 22D, inner brake support flange 22E, and yaw brake disc surface 22F).

Yaw brake assembly 400 has generally the same structure and function as yaw brake assembly 108 described with respect to FIGS. 14A-16C. However, friction pads 426 are two flat half-ring-shaped pads having slots 426S, and together forming a flat ring-like shape, or disk with a hole in the center, rather than twelve cylindrical pads spaced from each other as with friction pads 223 described with respect to FIGS. 14A-15G. In alternate embodiments, friction pads 426 may be one or any other number of pads that form a flat ring-link shape. Slots 426S extend radially along friction pads 426. Slots 426S are openings that extend from a top surface of each friction pad 426 to a bottom surface of each friction pad 426.

The shape of friction pads 426 allows friction pads 426 to more completely cover brake disk 412, better keeping out dust and moisture. Slots 426S of friction pads 426 are shaped and spaced from each other to allow dust to escape, ensuring friction pads 426 and brake disk 412 are protected from contamination. As brake disk 412 moves, any contamination between brake disk 412 and friction pads 426 falls through slots 426S, onto backing plate 428. Optimal contact between friction pads 426 of brake pad 404 and brake disk 412 allows for removal of brake dust and other contaminants from friction pads 426 as brake pad 404 rotates. Dust and other contaminants that have built up over time are scraped by spring-loaded wire brush assemblies 206 off friction pads 426 to fall into the space of slots 426S and onto backing plate 428. Further, contaminants may collect in grooves 412G and fall within slots 426S of friction pads 426 to be deposited onto backing plate 428 when grooves 412G pass over slots 426S.

Figure 34:
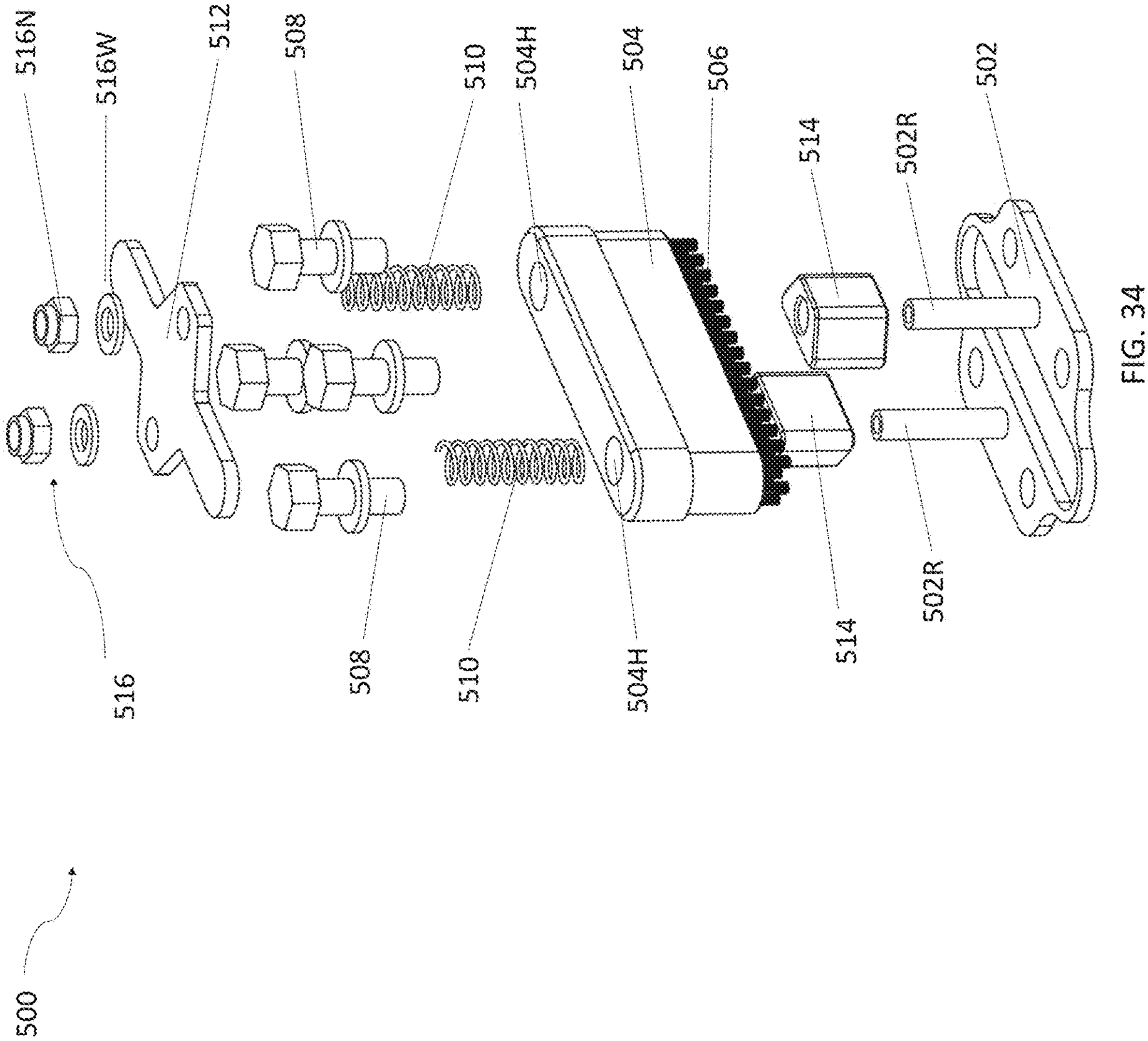
FIG. 34 is an exploded view of a second embodiment of a brush assembly.

Brush Assemblies (FIG. 34)

FIG. 34 is an exploded view of brush assembly 500. Brush assembly 500 includes mounting chassis 502 (having rods 502R), brush body 504 (have holes 504H), bristles 506, connectors 508, springs 510, plate 512, spacers 514, and connectors 516 (each including washer 516W and nut 516N).

Brush assemblies 500 have generally the same structure and function as brush assemblies 206 described with respect to FIGS. 17A-17B. However, brush body 504 has two holes 504H, one near each end of brush body 504, rather than one hole in the center as with brush body 226 described with respect to FIGS. 17A-17B. Further, brush assembly 500 includes two springs 510 rather than one spring 229 as described with respect to FIGS. 17A-17B. Additionally, brush assembly 500 includes spacers 514.

Springs 510 are positioned in a top portion of brush body 504. More specifically, one spring 510 is positioned in first hole 504H extending from the top surface of brush body 504 adjacent a first end of brush body 504 and one spring 510 is positioned in second hole 504H extending from the top surface of brush body 504 adjacent a second end of brush body 504. Plate 512 is positioned over both springs 510 and connected and secured to mounting chassis 502. Each of rods 502R of mounting chassis 502 extends through one of two spacers 514, one of two holes in plate 512, and one of two washers 516W. As such, spacers 514 each include a hole that extends from a top surface of each spacer 514 to a bottom surface of each spacer 514 such that hole extends entirely through each spacer 514. As such, spacers 514 are positioned between mounting chassis 502 and plate 512.

Brush assemblies 500 each having two springs 510, one spring 510 positioned adjacent each end of brush body 504, provides stability to brush body 504. Plate 512 is connected via connectors 516 to rods 502R to exert downward force to compress springs 510. Springs 510 exert downward force on both ends of brush body 504 to force bristles 506 at a bottom of brush body 504 to maintain contact with brake pad 202 during rotation of brake disk 207, which causes movement of brush assemblies 500. Providing downward force from a spring 510 at each end of brush body 504 more evenly ensures that bristles stay in contact with brake disk 207 as brake disk 207 wears and is reduced in height. The number and positioning of springs 510 also ensures that enough pressure is applied by springs 510 to scrub away contaminants on the surface of friction pads 223, but not so much pressure that friction pads 223 are exposed to excessive wear. Spacers 514 are positioned between mounting chassis 502 and plate 512 to provide stability and better control the height of brush assembly 500.

While brush assemblies 500 have been described with respect to yaw brake assembly 108, which includes brake pad 202, brake disk 207, and friction pads 223, brush assemblies 500 can also be used with yaw brake assembly 400, which includes brake pad 404, brake disk 412, and friction pads 426.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for a wind turbine nacelle, the system comprising:
- a rotor head;
- a plurality of blade holders connected to the rotor head;
- a shaft having a first end that extends into the rotor head, wherein linear movement of the shaft causes movement of the plurality of blade holders;
- an electromechanical pitch actuator connected to a second end of the shaft and configured to translate linearly to move the shaft linearly;
- a sensor assembly positioned around the electromechanical pitch actuator;
- a linear drive system connected to the electromechanical pitch actuator; and
- a fail safe system connected to the electromechanical pitch actuator via the linear drive system, wherein the fail safe system actuates to force the electromechanical pitch actuator rearward to move the blades into a stall blade position.

2. The system of claim 1, wherein the fail safe system actuates to force an entirety of the electromechanical pitch actuator rearward to a fail safe position to move the blades into a stall blade position.

3. The system of claim 1, wherein the linear drive system comprises:

a linear drive pulley mounted on the fail safe system; and a guide bar connected to the electromechanical pitch actuator and mounted to the linear drive pulley to translate along the linear drive pulley to move the electromechanical pitch actuator forward and rearward along the linear drive pulley.

4. The system of claim 1, wherein the sensor assembly comprises:

a sensor bracket connected to the fail safe system and positioned around the electromechanical pitch actuator;

a normal position sensor mounted to the sensor bracket to sense that the electromechanical pitch actuator is in normal operation;

a minimum position sensor mounted to the sensor bracket to sense that the electromechanical pitch actuator is in the most rearward position;

a maximum position sensor mounted to the sensor bracket to sense that the electromechanical pitch actuator is in the most forward position.

5. The system of claim 4, wherein the sensor assembly further comprises a speed sensor mounted to the sensor bracket to sense the speed of a rotor assembly of the wind turbine nacelle.

6. The system of claim 5, wherein the speed sensor is mounted to a front portion of the sensor bracket, the maximum position sensor is mounted to the sensor bracket between the minimum position sensor and the speed sensor, the minimum position sensor is mounted to the sensor bracket between the normal position sensor and the maximum position sensor, and the normal position sensor is mounted to a back portion of the sensor bracket.

7. The system of claim 1, further including a brake service disk comprising a plurality of spaced holes extending through the brake service disk and forming two concentric circles of spaced holes in the brake service disk, each of the concentric circles of spaced holes being in alignment with a speed sensor of the sensor assembly such that the speed sensor senses the speed of a rotor assembly of the wind turbine nacelle based on dark-to-light transitions created by the spaced holes and portions of the brake service disk between the spaced holes.

8. The system of claim 1, wherein the electromechanical pitch actuator includes a disk that forms a front of the electromechanical pitch actuator, wherein the disk is configured to align with one or more sensors of the sensor assembly as the electromechanical pitch actuator translates forward and rearward linearly.

9. The system of claim 1, wherein the fail safe system comprises:

a fail safe chassis, one or more linear drive pulleys of the linear drive system being connected to the fail safe chassis;

a fail safe motor;

a shaft connected to the fail safe motor and extending within the fail safe chassis through a drive nut and a front plate of the electromechanical pitch actuator;

wherein the fail safe motor drives the shaft to rotate to move the drive nut rearward along the shaft, which moves the electromechanical pitch actuator rearward via the front plate.

10. The system of claim 9, further including a high load bearing surrounding a rear end of the shaft between the shaft and the fail safe chassis and a shaft stability bearing surrounding a forward end of the shaft between shaft and the fail safe chassis.

11. The system of claim 9, further comprising a preload spring system connected to the electromechanical pitch actuator to remove backlash between the shaft of the fail safe system and the drive nut of the electromechanical pitch actuator.

12. A method for stopping a wind turbine nacelle having one or more blades, the method comprising:

detecting an operational condition of the wind turbine nacelle that requires an emergency stop; and triggering a fail safe system to pull an electromechanical pitch actuator along with a shaft of a pitch shaft assembly to rotate the one or more blades to a stall blade position.

13. The method of claim 12, further comprising detecting failure of the normal operation of the wind turbine nacelle.

14. The method of claim 12, wherein as the fail safe system pulls the electromechanical pitch actuator, movement of the electromechanical pitch actuator is restricted in a y-axis direction and a z-axis direction by a linear drive system.

15. The method of claim 12, wherein the fail safe system pulls the electromechanical pitch actuator using a drive nut of the electromechanical pitch actuator and a rotating shaft within a bearing arrangement.

16. The method of claim 15, wherein spring force removes backlash between the rotating shaft and the drive nut.

17. The method of claim 12, wherein as the fail safe system pulls the electromechanical pitch actuator, guide bars connected to the electromechanical pitch actuator move within drive pulleys connected to the fail safe system.

18. The method of claim 12, the one or more blades are parallel to the wind direction in the stall blade position.

* * * * *